US012470577B1

(12) United States Patent
Patil et al.

(10) Patent No.: US 12,470,577 B1
(45) Date of Patent: Nov. 11, 2025

(54) KERNEL-BASED MONITORING OF CONTAINER ACTIVITY IN A COMPUTE ENVIRONMENT

(71) Applicant: Lacework, Inc., Mountain View, CA (US)

(72) Inventors: Rushikesh P. Patil, Maharashtra (IN); Japneet Singh, Surrey (CA); Maximilien P. Fechner, Arlington, MA (US); Joseph M. Wilder, Natick, MA (US); Yijou Chen, Cupertino, CA (US)

(73) Assignee: Fortinet, Inc., Sunnyvale, CA (US)

( * ) Notice: Subject to any disclaimer, the term of this patent is extended or adjusted under 35 U.S.C. 154(b) by 282 days.

(21) Appl. No.: 18/096,105

(22) Filed: Jan. 12, 2023

Related U.S. Application Data

(63) Continuation-in-part of application No. 17/900,468, filed on Aug. 31, 2022, which is a (Continued)

(51) Int. Cl.
*H04L 9/40* (2022.01)
*G06F 9/455* (2018.01)
(Continued)

(52) U.S. Cl.
CPC .......... *H04L 63/1425* (2013.01); *G06F 9/455* (2013.01); *G06F 9/45558* (2013.01); (Continued)

(58) Field of Classification Search
CPC ....... G06F 9/45558; G06F 2009/45591; G06F 21/50; G06F 21/55; G06F 21/577; (Continued)

(56) References Cited

U.S. PATENT DOCUMENTS 6,301,668 B1 10/2001 Gleichauf et al.
6,347,339 B1 2/2002 Morris et al.
(Continued)

FOREIGN PATENT DOCUMENTS

CA 3079913 A1 5/2019
CN 111652396 A 9/2020
(Continued)

OTHER PUBLICATIONS

Amidon, et al., "Program Fracture and Recombination for Efficient Automatic Code Reuse", 2015 IEEE High Performance Extreme Computing Conference (HPEC), (2015), pp. 1-6, doi: 10.1109/HPEC.2015.7396314.
(Continued)

*Primary Examiner* — Edward Zee
(74) *Attorney, Agent, or Firm* — Jaffery Watson Hamilton & DeSanctis LLP

(57) ABSTRACT

An illustrative agent deployed in a compute environment monitored by a data platform is disclosed. The agent may access kernel data generated by a kernel of an operating system used within the compute environment. Based on the kernel data, the agent may detect a launch of a new container entity of a set of container entities deployed to the compute environment and managed by a container runtime executing on the operating system. Based on the detecting of the launch of the new container entity, the agent may then provide, to the data platform, agent data that indicates the launch of the new container entity. Corresponding methods, systems, and products are also disclosed.

19 Claims, 71 Drawing Sheets

Related U.S. Application Data continuation-in-part of application No. 17/893,721, filed on Aug. 23, 2022, which is a continuation-in-part of application No. 17/504,311, filed on Oct. 18, 2021, now Pat. No. 11,677,772, which is a continuation of application No. 16/665,961, filed on Oct. 28, 2019, now Pat. No. 11,153,339, which is a continuation of application No. 16/134,794, filed on Sep. 18, 2018, now Pat. No. 10,581,891.

(60) Provisional application No. 63/392,300, filed on Jul. 26, 2022, provisional application No. 63/239,262, filed on Aug. 31, 2021, provisional application No. 63/239,275, filed on Aug. 31, 2021, provisional application No. 63/239,310, filed on Aug. 31, 2021, provisional application No. 63/239,288, filed on Aug. 31, 2021, provisional application No. 62/650,971, filed on Mar. 30, 2018, provisional application No. 62/590,986, filed on Nov. 27, 2017.

(51) Int. Cl.

| | |
|---|---|
| ***G06F 9/54*** | (2006.01) |
| ***G06F 16/901*** | (2019.01) |
| ***G06F 16/9038*** | (2019.01) |
| ***G06F 16/9535*** | (2019.01) |
| ***G06F 16/9537*** | (2019.01) |
| ***G06F 21/57*** | (2013.01) |
| ***H04L 29/06*** | (2006.01) |
| ***H04L 67/306*** | (2022.01) |
| ***H04L 67/50*** | (2022.01) |

(52) U.S. Cl.

CPC .......... *G06F 9/545* (2013.01); *G06F 16/9024* (2019.01); *G06F 16/9038* (2019.01); *G06F 16/9535* (2019.01); *G06F 16/9537* (2019.01); *G06F 21/57* (2013.01); *H04L 63/10* (2013.01); *H04L 67/306* (2013.01); *H04L 67/535* (2022.05); *G06F 2009/45591* (2013.01)

(58) Field of Classification Search

CPC . H04L 63/1425; H04L 63/14; H04L 63/1416; H04L 63/1433; H04L 63/20

See application file for complete search history.

(56) References Cited

U.S. PATENT DOCUMENTS

| | | | |
|---|---|---|---|
| 6,363,411 | B1 | 3/2002 | Dugan et al. |
| 6,434,663 | B1 | 8/2002 | Grimsrud et al. |
| 6,477,651 | B1 | 11/2002 | Teal |
| 6,785,821 | B1 | 8/2004 | Teal |
| 6,938,084 | B2 | 8/2005 | Gamache et al. |
| 7,054,873 | B2 | 5/2006 | Nordström et al. |
| 7,233,333 | B2 | 6/2007 | Lomask |
| 7,310,733 | B1 | 12/2007 | Pearson et al. |
| 7,424,489 | B1 | 9/2008 | Duffield et al. |
| 7,424,746 | B1 | 9/2008 | Magdych et al. |
| 7,478,246 | B2 | 1/2009 | Arndt et al. |
| 7,484,091 | B2 | 1/2009 | Bade et al. |
| 7,526,501 | B2 | 4/2009 | Albahari et al. |
| 7,529,801 | B2 | 5/2009 | Moore et al. |
| 7,562,045 | B2 | 7/2009 | Beadle et al. |
| 7,574,740 | B1 | 8/2009 | Kennis |
| 7,577,424 | B2 | 8/2009 | Sinha et al. |
| 7,707,411 | B2 | 4/2010 | Bade et al. |
| 7,739,211 | B2 | 6/2010 | Coffman et al. |
| 7,743,153 | B2 | 6/2010 | Hall et al. |
| 7,747,559 | B2 | 6/2010 | Leitner et al. |
| 7,765,431 | B2 | 7/2010 | Agha et al. |
| 7,779,468 | B1 | 8/2010 | Magdych et al. |
| 7,797,548 | B2 | 9/2010 | Pearson et al. |
| 7,845,007 | B1 | 11/2010 | Kennis |
| 7,856,544 | B2 | 12/2010 | Schenfeld et al. |
| 7,926,026 | B2 | 4/2011 | Klein et al. |
| 7,962,635 | B2 | 6/2011 | Naidu et al. |
| 7,996,885 | B2 | 8/2011 | Jaiswal et al. |
| 8,032,925 | B2 | 10/2011 | Cho |
| 8,037,284 | B2 | 10/2011 | Schenfeld et al. |
| 8,037,521 | B2 | 10/2011 | Minato |
| 8,050,907 | B2 | 11/2011 | Baisley et al. |
| 8,086,852 | B2 | 12/2011 | Bade et al. |
| 8,095,983 | B2 | 1/2012 | Guruswamy |
| 8,122,499 | B2 | 2/2012 | Hall |
| 8,140,977 | B2 | 3/2012 | Kriss et al. |
| 8,151,107 | B2 | 4/2012 | Song et al. |
| 8,160,999 | B2 | 4/2012 | Jin et al. |
| 8,185,619 | B1 | 5/2012 | Maiocco et al. |
| 8,209,204 | B2 | 6/2012 | Adler et al. |
| 8,266,301 | B2 | 9/2012 | Moore et al. |
| 8,266,703 | B1 | 9/2012 | Magdych et al. |
| 8,276,197 | B1 | 9/2012 | Mangal et al. |
| 8,281,019 | B1 | 10/2012 | Woodard et al. |
| 8,291,233 | B2 | 10/2012 | Pearson et al. |
| 8,301,660 | B2 | 10/2012 | Yalamanchi |
| 8,341,711 | B1 | 12/2012 | Pennington et al. |
| 8,347,392 | B2 | 1/2013 | Chess et al. |
| 8,351,456 | B2 | 1/2013 | Kadous et al. |
| 8,352,589 | B2 | 1/2013 | Ridel et al. |
| 8,359,584 | B2 | 1/2013 | Rao et al. |
| 8,392,997 | B2 | 3/2013 | Chen et al. |
| 8,407,798 | B1 | 3/2013 | Lotem et al. |
| 8,464,346 | B2 | 6/2013 | Barai et al. |
| 8,490,055 | B2 | 7/2013 | Basak |
| 8,497,863 | B2 | 7/2013 | Xie et al. |
| 8,549,002 | B2 | 10/2013 | Herter et al. |
| 8,549,121 | B2 | 10/2013 | Nocera et al. |
| 8,561,157 | B2 | 10/2013 | Ge |
| 8,566,939 | B2 | 10/2013 | Suchowski et al. |
| 8,595,262 | B1 | 11/2013 | Hayden |
| 8,607,306 | B1 | 12/2013 | Bridge et al. |
| 8,631,499 | B2 | 1/2014 | Guruswamy |
| 8,655,989 | B2 | 2/2014 | Ritter et al. |
| 8,656,497 | B2 | 2/2014 | Amarasinghe et al. |
| 8,725,587 | B2 | 5/2014 | Beadle et al. |
| 8,726,394 | B2 | 5/2014 | Maor et al. |
| 8,745,197 | B2 | 6/2014 | Nocera et al. |
| 8,769,697 | B2 | 7/2014 | McGinley et al. |
| 8,826,403 | B2 | 9/2014 | Bhaskaran et al. |
| 8,843,646 | B2 | 9/2014 | Kuzin et al. |
| 8,918,884 | B2 | 12/2014 | Jajodia et al. |
| 8,959,608 | B2 | 2/2015 | Ahmed et al. |
| 9,043,764 | B2 | 5/2015 | Ranganathan et al. |
| 9,043,924 | B2 | 5/2015 | Maor et al. |
| 9,053,306 | B2 | 6/2015 | Yoshigaki et al. |
| 9,053,437 | B2 | 6/2015 | Adler et al. |
| 9,064,210 | B1 | 6/2015 | Hart |
| 9,075,618 | B2 | 7/2015 | Winternitz et al. |
| 9,104,859 | B1 | 8/2015 | Banerjee |
| 9,110,873 | B2 | 8/2015 | Woodall et al. |
| 9,118,711 | B2 | 8/2015 | Oliphant et al. |
| 9,159,024 | B2 | 10/2015 | Bhanot et al. |
| 9,177,113 | B2 | 11/2015 | McGinley et al. |
| 9,189,623 | B1 | 11/2015 | Lin et al. |
| 9,197,653 | B2 | 11/2015 | Kruglick |
| 9,225,730 | B1 | 12/2015 | Brezinski |
| 9,231,935 | B1 | 1/2016 | Bridge et al. |
| 9,239,873 | B2 | 1/2016 | Branch et al. |
| 9,246,897 | B2 | 1/2016 | He |
| 9,246,934 | B2 | 1/2016 | Sabin et al. |
| 9,246,935 | B2 | 1/2016 | Lietz et al. |
| 9,280,667 | B1 | 3/2016 | Keanini et al. |
| 9,323,806 | B2 | 4/2016 | Sadikov et al. |
| 9,325,729 | B2 | 4/2016 | Jajodia et al. |
| 9,369,450 | B1 | 6/2016 | Barak et al. |
| 9,391,978 | B2 | 7/2016 | Burch et al. |
| 9,400,882 | B2 | 7/2016 | Pearson et al. |
| 9,430,830 | B2 | 8/2016 | Madabhushi et al. |
| 9,438,634 | B1 | 9/2016 | Ross et al. |
| 9,479,527 | B2 | 10/2016 | McGinley et al. |
| 9,495,522 | B2 | 11/2016 | Singh et al. |

(56) References Cited

U.S. PATENT DOCUMENTS 9,497,224 B2 11/2016 Sweet et al.
9,516,053 B1 12/2016 Muddu et al.
9,516,064 B2 12/2016 Lietz et al.
9,537,851 B2 1/2017 Gordon et al.
9,558,355 B2 1/2017 Madou et al.
9,563,777 B2 2/2017 Deng et al.
9,569,869 B2 2/2017 Hesse et al.
9,582,766 B2 2/2017 Sadikov et al.
9,589,069 B2 3/2017 Yang et al.
9,591,010 B1 3/2017 Muddu et al.
9,596,254 B1 3/2017 Muddu et al.
9,596,295 B2 3/2017 Banadaki et al.
9,600,915 B2 3/2017 Winternitz et al.
9,602,506 B2 3/2017 Kang et al.
9,602,526 B2 3/2017 Liu et al.
9,639,676 B2 5/2017 Betz et al.
9,652,875 B2 5/2017 Vassilvitskii et al.
9,659,337 B2 5/2017 Lee et al.
9,665,660 B2 5/2017 Wensel
9,667,641 B2 5/2017 Muddu et al.
9,678,850 B1 6/2017 Rickard et al.
9,679,243 B2 6/2017 Zou et al.
9,690,553 B1 6/2017 Brodie et al.
9,699,205 B2 7/2017 Muddu et al.
9,705,909 B2 7/2017 Zaw
9,710,332 B1 7/2017 Fan et al.
9,720,703 B2 8/2017 Reick et al.
9,720,704 B2 8/2017 Reick et al.
9,727,441 B2 8/2017 Agarwal et al.
9,727,604 B2 8/2017 Jin et al.
9,729,416 B1 8/2017 Khanal et al.
9,740,744 B2 8/2017 Stetson et al.
9,741,138 B2 8/2017 Friedlander et al.
9,753,960 B1 9/2017 Troyanovsky
9,760,619 B1 9/2017 Lattanzi et al.
9,781,115 B2 10/2017 Heise
9,787,705 B1 10/2017 Love et al.
9,794,379 B2 10/2017 Kumar et al.
9,798,885 B2 10/2017 Deng et al.
9,805,080 B2 10/2017 Joshi et al.
9,805,140 B2 10/2017 Chakrabarti et al.
9,811,790 B2 11/2017 Ahern et al.
9,813,435 B2 11/2017 Muddu et al.
9,819,671 B2 11/2017 Ji
9,824,473 B2 11/2017 Winternitz et al.
9,830,435 B2 11/2017 Haven
9,836,183 B1 12/2017 Love et al.
9,838,410 B2 12/2017 Muddu et al.
9,843,837 B2 12/2017 Gopalan
9,846,780 B2 12/2017 Tonn et al.
9,852,230 B2 12/2017 Fleury et al.
9,858,164 B1 1/2018 McLean et al.
9,864,672 B2 1/2018 Seto et al.
9,882,920 B2 1/2018 Kruglick
9,887,999 B2 2/2018 Dong et al.
9,892,262 B2 2/2018 Schmitt
9,923,911 B2 3/2018 Vasseur et al.
9,930,060 B2 3/2018 Oberheide et al.
9,942,220 B2 4/2018 Bajenov et al.
9,946,800 B2 4/2018 Qian et al.
9,954,842 B2 4/2018 Huang
9,985,827 B2 5/2018 Li
10,003,605 B2 6/2018 Muddu et al.
10,013,491 B2 7/2018 Vasudevan et al.
10,104,071 B2 10/2018 Gordon et al.
10,116,670 B2 10/2018 Muddu et al.
10,120,746 B1 11/2018 Sharifi Mehr
10,121,000 B1 11/2018 Rivlin et al.
10,122,740 B1 11/2018 Finkelshtein et al.
10,129,287 B2 11/2018 Zaw
10,148,677 B2 12/2018 Muddu et al.
10,149,148 B2 12/2018 Zha et al.
10,158,652 B2 12/2018 Muddu et al.
10,182,058 B2 1/2019 Xu
10,182,068 B2 1/2019 Munoz et al.
10,205,735 B2 2/2019 Apostolopoulos
10,225,155 B2 3/2019 Manning et al.
10,235,527 B1 3/2019 Dalessio et al.
10,237,254 B2 3/2019 Mcdowell et al.
10,237,294 B1 3/2019 Zadeh et al.
10,237,379 B2 3/2019 Kumar et al.
10,242,199 B2 3/2019 Muthurajan et al.
10,243,970 B2 3/2019 Muddu et al.
10,249,266 B2 4/2019 Zamir
10,254,848 B2 4/2019 Winternitz et al.
10,331,659 B2 6/2019 Ahuja et al.
10,338,895 B2 7/2019 Zhang et al.
10,339,309 B1 7/2019 Kling et al.
10,367,704 B2 7/2019 Giura et al.
10,382,303 B2 8/2019 Khanal et al.
10,382,529 B2 8/2019 Wan et al.
10,389,738 B2 8/2019 Muddu et al.
10,419,463 B2 9/2019 Muddu et al.
10,419,465 B2 9/2019 Muddu et al.
10,419,468 B2 9/2019 Glatfelter et al.
10,419,469 B1 9/2019 Singh et al.
10,423,793 B2 9/2019 Madou et al.
10,425,437 B1 9/2019 Bog et al.
10,432,639 B1 10/2019 Bebee et al.
10,447,526 B2 10/2019 Tucker et al.
10,454,753 B2 10/2019 Sasturkar et al.
10,454,889 B2 10/2019 Huang
10,454,963 B1 10/2019 Smith
10,459,979 B2 10/2019 Piechowicz et al.
10,462,169 B2 10/2019 Durairaj et al.
10,491,705 B2 11/2019 Oetting et al.
10,496,263 B2 12/2019 So et al.
10,496,468 B2 12/2019 Gefen et al.
10,496,678 B1 12/2019 Tang
10,503,910 B2 12/2019 Johns
10,505,818 B1 12/2019 Yona et al.
10,510,007 B2 12/2019 Singhal et al.
10,515,095 B2 12/2019 Childress et al.
10,516,692 B2 12/2019 Muthurajan et al.
10,521,584 B1 12/2019 Mehr
10,534,633 B2 1/2020 Hilemon et al.
10,534,915 B2 1/2020 Cherny et al.
10,547,521 B1 1/2020 Roy et al.
10,558,809 B1 2/2020 Joyce et al.
10,560,309 B1 2/2020 Chitalia et al.
10,565,373 B1 2/2020 Rao et al.
10,567,344 B2 2/2020 Shanks et al.
10,581,891 B1 3/2020 Kapoor et al.
10,587,609 B2 3/2020 Ebrahimi et al.
10,592,535 B2 3/2020 Ahn et al.
10,599,718 B2 3/2020 Kumar et al.
10,601,856 B1 3/2020 Natanzon et al.
RE47,937 E 4/2020 Ramachandran et al.
RE47,952 E 4/2020 Ramachandran et al.
10,614,200 B2 4/2020 Betz et al.
10,616,259 B2 4/2020 North
10,642,867 B2 5/2020 Palanciuc
10,656,979 B2 5/2020 Ishakian et al.
10,664,757 B2 5/2020 Lastras-Montano et al.
10,666,668 B2 5/2020 Muddu et al.
10,673,880 B1 6/2020 Pratt et al.
10,685,295 B1 6/2020 Ross et al.
10,693,900 B2 6/2020 Zadeh et al.
10,698,954 B2 6/2020 Piechowicz et al.
10,699,017 B2 6/2020 Mendelev et al.
10,701,051 B2 6/2020 Ohsumi
10,701,104 B2 6/2020 Malkov et al.
10,728,121 B1 7/2020 Chitalia et al.
10,754,940 B2 8/2020 Ohsumi
10,756,982 B2 8/2020 Bai et al.
10,771,488 B2 9/2020 Verma et al.
10,775,183 B2 9/2020 Ho et al.
10,776,191 B2 9/2020 Zheng et al.
10,776,441 B1 9/2020 Echeverria et al.
10,788,570 B2 9/2020 Wilson
10,791,131 B2 9/2020 Nor et al.
10,797,974 B2 10/2020 Giura et al.
10,803,169 B1 10/2020 Flatten et al.
10,812,497 B2 10/2020 Venkatramani et al.

(56) References Cited

U.S. PATENT DOCUMENTS 10,824,675 B2 11/2020 Alonso et al.
10,824,813 B2 11/2020 Smith et al.
10,839,052 B2 11/2020 Williams et al.
10,853,082 B1 12/2020 Aleti et al.
10,871,878 B1 12/2020 Mody et al.
10,873,592 B1 12/2020 Singh et al.
10,885,452 B1 1/2021 Garg
10,904,007 B2 1/2021 Kim et al.
10,904,270 B2 1/2021 Muddu et al.
10,911,470 B2 2/2021 Muddu et al.
10,915,628 B2 2/2021 Stopel et al.
10,944,778 B1 3/2021 Golan et al.
10,986,114 B1 4/2021 Singh et al.
10,997,047 B2 5/2021 Pargaonkar et al.
11,036,716 B2 6/2021 Griffith et al.
11,036,800 B1 6/2021 Kayyoor et al.
11,044,264 B2 6/2021 Durairaj et al.
11,048,492 B2 6/2021 Jain et al.
11,082,289 B2 8/2021 Dang et al.
11,120,343 B2 9/2021 Das et al.
11,126,533 B2 9/2021 Knowles et al.
11,153,339 B1 10/2021 Kapoor et al.
11,194,849 B2 12/2021 Lassoued et al.
11,194,914 B2 12/2021 Yang et al.
11,212,299 B2 12/2021 Gamble et al.
11,258,807 B2 2/2022 Muddu et al.
11,281,519 B2 3/2022 Krishnaswamy et al.
11,301,134 B2 4/2022 Hatsutori et al.
11,314,789 B2 4/2022 Goldfarb
11,347,625 B1 5/2022 Agarwal et al.
11,388,211 B1 7/2022 Breeden et al.
11,411,965 B2 8/2022 Williams et al.
11,411,966 B2 8/2022 Muddu et al.
11,431,735 B2 8/2022 Shua
11,463,464 B2 10/2022 Zadeh et al.
11,489,863 B1 11/2022 Shua
11,494,787 B2 11/2022 Erickson et al.
11,509,706 B1 11/2022 Iliofotou et al.
11,514,054 B1 11/2022 Borthwick et al.
11,544,138 B2 1/2023 Kapish et al.
11,575,693 B1 2/2023 Muddu et al.
11,606,272 B1 3/2023 Popelka et al.
11,620,310 B1 4/2023 Akidau et al.
11,636,090 B2 4/2023 Li et al.
11,640,388 B2 5/2023 Yang et al.
11,647,034 B2 5/2023 Levin et al.
11,658,990 B2 5/2023 Shapoury
11,669,571 B2 6/2023 Binkley et al.
11,687,438 B1 6/2023 Torbett et al.
11,693,958 B1 7/2023 Steiman
11,700,190 B2 7/2023 Yadav et al.
11,722,554 B2 8/2023 Keren et al.
11,734,351 B2 8/2023 Binkley et al.
11,734,419 B1 8/2023 Mackle
11,748,473 B2 9/2023 Araujo et al.
11,755,576 B1 9/2023 Jiang et al.
11,755,602 B2 9/2023 Smith et al.
11,757,907 B1 9/2023 Berger et al.
11,769,098 B2 9/2023 Adinarayan et al.
11,770,387 B1 9/2023 Shivamoggi et al.
11,770,398 B1 9/2023 Erlingsson et al.
11,907,368 B1 2/2024 Ye et al.
12,050,507 B1 7/2024 Starosta et al.
12,079,737 B1 9/2024 Biswas
12,099,428 B1 9/2024 Agarwal et al.
12,184,530 B2 12/2024 Xu et al.
2002/0059531 A1 5/2002 Lai
2002/0161889 A1 10/2002 Gamache et al.
2003/0135749 A1 7/2003 Gales et al.
2003/0195803 A1 10/2003 Ketonen
2003/0212779 A1 11/2003 Boyter et al.
2003/0233361 A1 12/2003 Cady
2004/0225929 A1 11/2004 Agha et al.
2005/0022028 A1 1/2005 Hall
2005/0060287 A1 3/2005 Hellman et al.
2005/0097199 A1 5/2005 Woodard et al.
2005/0102365 A1 5/2005 Moore et al.
2005/0108142 A1 5/2005 Beadle et al.
2005/0120101 A1 6/2005 Nocera
2005/0231760 A1 10/2005 Minato
2005/0246288 A1 11/2005 Kimura et al.
2005/0246521 A1 11/2005 Bade et al.
2006/0025987 A1 2/2006 Baisley et al.
2006/0026419 A1 2/2006 Arndt et al.
2006/0036896 A1 2/2006 Gamache et al.
2006/0075128 A1 4/2006 Kotler et al.
2006/0090095 A1 4/2006 Massa et al.
2006/0109271 A1 5/2006 Lomask
2006/0130145 A1 6/2006 Choi et al.
2006/0184682 A1 8/2006 Suchowski et al.
2007/0118909 A1 5/2007 Hertzog et al.
2007/0130330 A1 6/2007 Ridel et al.
2007/0142030 A1 6/2007 Sinha et al.
2007/0162605 A1 7/2007 Chalasani et al.
2007/0162963 A1 7/2007 Penet et al.
2007/0168696 A1 7/2007 Ridel et al.
2007/0169175 A1 7/2007 Hall et al.
2007/0174917 A1 7/2007 Guruswamy
2007/0192863 A1 8/2007 Kapoor et al.
2007/0214111 A1 9/2007 Jin et al.
2007/0225956 A1 9/2007 Pratt et al.
2007/0266425 A1 11/2007 Cho
2007/0282916 A1 12/2007 Albahari et al.
2008/0034411 A1 2/2008 Aoyama
2008/0065879 A1 3/2008 Song et al.
2008/0072062 A1 3/2008 Pearson et al.
2008/0109730 A1 5/2008 Coffman et al.
2008/0147707 A1 6/2008 Jin et al.
2008/0155335 A1 6/2008 Klein et al.
2008/0244718 A1 10/2008 Frost et al.
2008/0263643 A1 10/2008 Jaiswal et al.
2008/0270451 A1 10/2008 Thomsen et al.
2009/0006843 A1 1/2009 Bade et al.
2009/0007010 A1 1/2009 Kriss et al.
2009/0063857 A1 3/2009 Bade et al.
2009/0165109 A1 6/2009 Hird
2009/0177573 A1 7/2009 Beadle et al.
2009/0222740 A1 9/2009 Yuan
2009/0271863 A1 10/2009 Govindavajhala et al.
2009/0287720 A1 11/2009 Herter et al.
2009/0300716 A1 12/2009 Ahn
2009/0307651 A1 12/2009 Senthil et al.
2009/0327328 A1 12/2009 Woodall et al.
2010/0042823 A1 2/2010 Arndt et al.
2010/0138925 A1 6/2010 Barai et al.
2010/0217860 A1 8/2010 Naidu et al.
2010/0228849 A1 9/2010 Moore et al.
2010/0235917 A1 9/2010 Ku et al.
2010/0309206 A1 12/2010 Xie et al.
2010/0329162 A1 12/2010 Kadous et al.
2011/0023098 A1 1/2011 Pearson et al.
2011/0029952 A1 2/2011 Harrington
2011/0119100 A1 5/2011 Ruhl et al.
2011/0154287 A1 6/2011 Mukkamala et al.
2011/0185433 A1 7/2011 Amarasinghe et al.
2011/0276951 A1 11/2011 Jain
2011/0302631 A1 12/2011 Sureshchandra et al.
2012/0005322 A1 1/2012 Nocera et al.
2012/0016706 A1 1/2012 Pargaonkar et al.
2012/0054732 A1 3/2012 Jain et al.
2012/0089875 A1 4/2012 Faust et al.
2012/0102029 A1 4/2012 Larson et al.
2012/0137370 A1 5/2012 Guruswamy
2012/0143898 A1 6/2012 Bruno et al.
2012/0158858 A1 6/2012 Gkantsidis et al.
2012/0159333 A1 6/2012 Mital et al.
2012/0173541 A1 7/2012 Venkataramani
2012/0233699 A1 9/2012 Jajodia et al.
2012/0260344 A1 10/2012 Maor et al.
2012/0317149 A1 12/2012 Jagota et al.
2013/0024412 A1 1/2013 Gong et al.
2013/0067100 A1 3/2013 Kuzin et al.
2013/0081118 A1 3/2013 Ge
2013/0086667 A1 4/2013 Haven

(56) References Cited

U.S. PATENT DOCUMENTS

2013/0091577 A1 4/2013 McGinley et al.
2013/0097320 A1 4/2013 Ritter et al.
2013/0151453 A1 6/2013 Bhanot et al.
2013/0160131 A1 6/2013 Madou et al.
2013/0173915 A1 7/2013 Haulund
2013/0219295 A1 8/2013 Feldman et al.
2013/0269007 A1 10/2013 Yoshigaki et al.
2013/0298244 A1 11/2013 Kumar et al.
2014/0041005 A1 2/2014 He
2014/0067750 A1 3/2014 Ranganathan et al.
2014/0098101 A1 4/2014 Friedlander et al.
2014/0125672 A1 5/2014 Winternitz et al.
2014/0165204 A1 6/2014 Williams et al.
2014/0181944 A1 6/2014 Ahmed et al.
2014/0279779 A1 9/2014 Zou et al.
2014/0298473 A1 10/2014 McGinley et al.
2014/0325631 A1 10/2014 Pearson et al.
2014/0325660 A1 10/2014 Jajodia et al.
2014/0331327 A1 11/2014 Maor et al.
2014/0344937 A1 11/2014 Sabin et al.
2014/0373158 A1 12/2014 Hay et al.
2014/0379716 A1 12/2014 Branch et al.
2015/0058619 A1 2/2015 Sweet et al.
2015/0067139 A1 3/2015 Malnati
2015/0074267 A1 3/2015 Manning et al.
2015/0106939 A1 4/2015 Lietz et al.
2015/0120906 A1 4/2015 Dowling et al.
2015/0161201 A1 6/2015 Sadikov et al.
2015/0172321 A1 6/2015 Kirti et al.
2015/0213598 A1 7/2015 Madabhushi et al.
2015/0304349 A1 10/2015 Bernstein et al.
2015/0310649 A1 10/2015 Winternitz et al.
2015/0319185 A1 11/2015 Kirti et al.
2015/0341379 A1 11/2015 Lefebvre et al.
2015/0365324 A1 12/2015 Kumar et al.
2015/0371047 A1 12/2015 Mendelev et al.
2016/0036847 A1 2/2016 McGinley et al.
2016/0063226 A1 3/2016 Singh et al.
2016/0110549 A1 4/2016 Schmitt
2016/0112457 A1 4/2016 Lietz et al.
2016/0120070 A1 4/2016 Myrah et al.
2016/0191623 A1 6/2016 Vasudevan et al.
2016/0203411 A1 7/2016 Sadikov et al.
2016/0261522 A1 9/2016 Hanis et al.
2016/0261544 A1 9/2016 Conover
2016/0283259 A1 9/2016 Mehta
2016/0321455 A1 11/2016 Deng et al.
2016/0330183 A1 11/2016 Mcdowell et al.
2016/0330206 A1 11/2016 Xu
2016/0352765 A1 12/2016 Mermoud et al.
2016/0352771 A1 12/2016 Sivan et al.
2016/0357521 A1 12/2016 Zhang et al.
2016/0359872 A1 12/2016 Yadav et al.
2016/0373428 A1 12/2016 Shi
2017/0034199 A1 2/2017 Zaw
2017/0053118 A1 2/2017 Malkov et al.
2017/0054685 A1 2/2017 Malkov et al.
2017/0054686 A1 2/2017 Malkov et al.
2017/0054753 A1 2/2017 Adams
2017/0063830 A1 3/2017 Huang
2017/0063888 A1 3/2017 Muddu et al.
2017/0063903 A1 3/2017 Muddu et al.
2017/0063905 A1 3/2017 Muddu et al.
2017/0063906 A1 3/2017 Muddu et al.
2017/0063908 A1 3/2017 Muddu et al.
2017/0063909 A1 3/2017 Muddu et al.
2017/0063910 A1 3/2017 Muddu et al.
2017/0063911 A1 3/2017 Muddu et al.
2017/0063912 A1 3/2017 Muddu et al.
2017/0070594 A1 3/2017 Oetting et al.
2017/0076206 A1 3/2017 Lastras-Montano et al.
2017/0085553 A1 3/2017 Gordon et al.
2017/0085579 A1 3/2017 Ionescu et al.
2017/0086069 A1 3/2017 Liu
2017/0098072 A1 4/2017 Stopel et al.
2017/0102961 A1 4/2017 Hilemon et al.
2017/0103211 A1 4/2017 Madou et al.
2017/0103212 A1 4/2017 Deng et al.
2017/0111245 A1 4/2017 Ishakian et al.
2017/0116315 A1 4/2017 Xiong et al.
2017/0116421 A1 4/2017 M C et al.
2017/0118099 A1 4/2017 Huang
2017/0118240 A1 4/2017 Devi Reddy et al.
2017/0142138 A1 5/2017 Williams et al.
2017/0142140 A1 5/2017 Muddu et al.
2017/0148197 A1 5/2017 Winternitz et al.
2017/0155570 A1 6/2017 Maheshwari et al.
2017/0155672 A1 6/2017 Muthukrishnan et al.
2017/0163666 A1 6/2017 Venkatramani et al.
2017/0180396 A1 6/2017 Finnig et al.
2017/0185784 A1 6/2017 Madou et al.
2017/0187743 A1 6/2017 Madou et al.
2017/0208093 A1 7/2017 Williams et al.
2017/0220805 A1 8/2017 Ng et al.
2017/0223036 A1 8/2017 Muddu et al.
2017/0223042 A1 8/2017 Muthurajan et al.
2017/0223043 A1 8/2017 Munoz et al.
2017/0230183 A1 8/2017 Sweet et al.
2017/0242987 A1 8/2017 Williams et al.
2017/0249069 A1 8/2017 Zamir
2017/0257358 A1 9/2017 Ebrahimi et al.
2017/0262521 A1 9/2017 Cho et al.
2017/0277553 A1 9/2017 Zada et al.
2017/0277582 A1 9/2017 Chen et al.
2017/0277997 A1 9/2017 Zong et al.
2017/0286190 A1 10/2017 Ishakian et al.
2017/0302695 A1 10/2017 Zaw
2017/0330096 A1 11/2017 Das Gupta et al.
2017/0337262 A1 11/2017 Smith et al.
2017/0346683 A1 11/2017 Li et al.
2017/0353853 A1 12/2017 Zha et al.
2017/0359361 A1 12/2017 Modani et al.
2018/0004835 A1 1/2018 Piechowicz et al.
2018/0004859 A1 1/2018 Piechowicz et al.
2018/0007145 A1 1/2018 Piechowicz et al.
2018/0013650 A1 1/2018 Khanal et al.
2018/0013776 A1 1/2018 Gay et al.
2018/0019932 A1 1/2018 Giura et al.
2018/0025361 A1 1/2018 Ferrarons Llagostera et al.
2018/0027101 A1 1/2018 Kumar et al.
2018/0034840 A1 2/2018 Marquardt et al.
2018/0039688 A1 2/2018 Ahn et al.
2018/0063085 A1 3/2018 Shanks et al.
2018/0067981 A1 3/2018 Ahuja et al.
2018/0069885 A1 3/2018 Patterson et al.
2018/0084069 A1 3/2018 Be'Ery et al.
2018/0089132 A1 3/2018 Atta et al.
2018/0096047 A1 4/2018 Childress et al.
2018/0097793 A1 4/2018 Agarwal et al.
2018/0103052 A1 4/2018 Choudhury et al.
2018/0107821 A1 4/2018 Eshkenazi et al.
2018/0123864 A1 5/2018 Tucker et al.
2018/0139200 A1 5/2018 Gordon et al.
2018/0152470 A1 5/2018 Lu
2018/0191781 A1 7/2018 Palani et al.
2018/0205754 A1 7/2018 North
2018/0205755 A1 7/2018 Kavi et al.
2018/0211425 A1 7/2018 Winternitz et al.
2018/0219888 A1 8/2018 Apostolopoulos
2018/0219897 A1 8/2018 Muddu et al.
2018/0227286 A1 8/2018 Ohsumi
2018/0260442 A1 9/2018 Vaidhyanathan et al.
2018/0260574 A1* 9/2018 Morello .............. G06F 9/44505
2018/0267787 A1 9/2018 Rathinasabapathy et al.
2018/0287956 A1 10/2018 Bryc et al.
2018/0307833 A1 10/2018 Noeth et al.
2018/0314576 A1 11/2018 Pasupuleti
2018/0330102 A1 11/2018 Siman et al.
2018/0349602 A1 12/2018 Johns
2018/0359162 A1 12/2018 Savov et al.
2018/0375886 A1 12/2018 Kirti et al.
2019/0005246 A1 1/2019 Cherny et al.
2019/0012979 A1 1/2019 Takahashi et al.
2019/0042353 A1 2/2019 Ahad

(56) References Cited

U.S. PATENT DOCUMENTS

2019/0042879 A1 2/2019 Munoz
2019/0042950 A1 2/2019 Lin et al.
2019/0050445 A1 2/2019 Griffith et al.
2019/0058626 A1 2/2019 Knowles et al.
2019/0065323 A1 2/2019 Dhamdhere et al.
2019/0068627 A1 2/2019 Thampy
2019/0073373 A1 3/2019 Surale et al.
2019/0075126 A1 3/2019 Muddu et al.
2019/0087480 A1 3/2019 Palanciuc
2019/0095599 A1 3/2019 Iliofotou et al.
2019/0098037 A1 3/2019 Shenoy, Jr. et al.
2019/0098068 A1 3/2019 Iliofotou et al.
2019/0101622 A1 4/2019 Wilson
2019/0129620 A1 5/2019 Hatsutori et al.
2019/0132344 A1 5/2019 Lem et al.
2019/0132348 A1 5/2019 Ng et al.
2019/0149553 A1 5/2019 Xu
2019/0158524 A1 5/2019 Zadeh et al.
2019/0163555 A1 5/2019 Zheng et al.
2019/0163754 A1 5/2019 Huang et al.
2019/0171711 A1 6/2019 Carpenter, II et al.
2019/0227860 A1 7/2019 Gefen et al.
2019/0312796 A1 10/2019 Giura et al.
2019/0312898 A1 10/2019 Verma et al.
2019/0318100 A1 10/2019 Bhatia et al.
2019/0327251 A1 10/2019 Muddu et al.
2019/0342282 A1 11/2019 Carbune et al.
2019/0342307 A1 11/2019 Gamble et al.
2019/0342311 A1 11/2019 Muddu et al.
2019/0354554 A1 11/2019 Piechowicz et al.
2019/0356555 A1 11/2019 Bai et al.
2019/0362024 A1 11/2019 Brousseau et al.
2019/0364067 A1 11/2019 Yona et al.
2019/0379684 A1 12/2019 Brown et al.
2019/0385069 A1 12/2019 Weng et al.
2020/0014718 A1 1/2020 Durairaj et al.
2020/0021607 A1 1/2020 Muddu et al.
2020/0026695 A1 1/2020 Yan et al.
2020/0065857 A1 2/2020 Lagi et al.
2020/0074341 A1 3/2020 He et al.
2020/0076836 A1 3/2020 DiValentin et al.
2020/0080856 A1 3/2020 Ho et al.
2020/0120143 A1 4/2020 Nicoll et al.
2020/0125572 A1 4/2020 Hanckel et al.
2020/0128047 A1 4/2020 Biswas et al.
2020/0175042 A1 6/2020 Batruni
2020/0175361 A1 6/2020 Che et al.
2020/0202010 A1 6/2020 Ionescu et al.
2020/0228555 A1 7/2020 Wittenschlaeger
2020/0244673 A1 7/2020 Stockdale et al.
2020/0257797 A1 8/2020 Monsonego et al.
2020/0287923 A1 9/2020 Raghavendra et al.
2020/0287927 A1 9/2020 Zadeh et al.
2020/0320106 A1 10/2020 Goldfarb
2020/0334241 A1 10/2020 Muralidhar et al.
2020/0334293 A1 10/2020 Piechowicz et al.
2020/0336489 A1 10/2020 Wuest et al.
2020/0351151 A1 11/2020 Dang et al.
2020/0404008 A1 12/2020 Venkatramani et al.
2020/0412752 A1 12/2020 Shapoury
2021/0012211 A1 1/2021 Sikka et al.
2021/0019193 A1 1/2021 Ffrench et al.
2021/0019209 A1 1/2021 Krishnaswamy et al.
2021/0030191 A1 2/2021 Bertolina et al.
2021/0049127 A1 2/2021 Kunchakarra et al.
2021/0064666 A1 3/2021 Wang et al.
2021/0110033 A1 4/2021 Noeth et al.
2021/0117232 A1 4/2021 Sriharsha et al.
2021/0117868 A1 4/2021 Sriharsha
2021/0144164 A1 5/2021 Mathur et al.
2021/0232420 A1 7/2021 Dhruvakumar et al.
2021/0256089 A1 8/2021 Linga et al.
2021/0256152 A1 8/2021 Linga et al.
2021/0266288 A1 8/2021 Sutrave et al.
2021/0286798 A1 9/2021 Li et al.
2021/0294798 A1 9/2021 Binkley et al.
2021/0295351 A1 9/2021 Wells et al.
2021/0311957 A1 10/2021 Georgievski et al.
2021/0326528 A1 10/2021 Kemp et al.
2021/0329019 A1 10/2021 Shua
2021/0336976 A1 10/2021 Shua
2021/0342125 A1 11/2021 Burnett et al.
2021/0342742 A1 11/2021 G Rao et al.
2021/0352142 A1 11/2021 Jayaram et al.
2021/0357206 A1 11/2021 Karve et al.
2021/0365462 A1 11/2021 Pippin et al.
2021/0377287 A1 12/2021 Shua
2021/0406917 A1 12/2021 Erickson et al.
2022/0004718 A1 1/2022 Quamar et al.
2022/0019698 A1* 1/2022 Durham ................ H04L 9/0841
2022/0046059 A1 2/2022 Pandurangi et al.
2022/0050840 A1 2/2022 Parravicini et al.
2022/0058193 A1 2/2022 Smith et al.
2022/0060510 A1 2/2022 Clayton et al.
2022/0067186 A1 3/2022 Thakur et al.
2022/0086179 A1 3/2022 Levin et al.
2022/0092481 A1 3/2022 Neithalath et al.
2022/0114078 A1 4/2022 Ravindranath et al.
2022/0121708 A1 4/2022 Burnett et al.
2022/0121741 A1 4/2022 Araujo et al.
2022/0124108 A1 4/2022 Gamble et al.
2022/0129803 A1 4/2022 Bikumala et al.
2022/0191125 A1 6/2022 Xu et al.
2022/0191226 A1 6/2022 Chan et al.
2022/0272117 A1 8/2022 Maheve et al.
2022/0294816 A1 9/2022 Martin et al.
2022/0327119 A1 10/2022 Gasper et al.
2022/0335318 A1 10/2022 Wang et al.
2022/0342690 A1 10/2022 Shua
2022/0345480 A1 10/2022 Shua
2022/0345481 A1 10/2022 Shua
2022/0345483 A1 10/2022 Shua
2022/0350641 A1 11/2022 Gilmore et al.
2022/0350789 A1 11/2022 Yang et al.
2022/0350931 A1 11/2022 Shua
2022/0360600 A1 11/2022 Reed et al.
2022/0374800 A1 11/2022 Adinarayan et al.
2022/0376970 A1 11/2022 Chawathe et al.
2022/0382611 A1 12/2022 Kapish et al.
2022/0394082 A1 12/2022 Keren et al.
2022/0414072 A1 12/2022 Tandon et al.
2022/0414105 A1 12/2022 Umay et al.
2023/0006889 A1 1/2023 Thyagaturu et al.
2023/0011043 A1 1/2023 Panse et al.
2023/0025252 A1 1/2023 Erickson et al.
2023/0035359 A1 2/2023 Flores
2023/0039566 A1 2/2023 Ghag et al.
2023/0052827 A1 2/2023 Araujo et al.
2023/0075355 A1 3/2023 Twigg et al.
2023/0079593 A1 3/2023 Nolan et al.
2023/0083724 A1 3/2023 Cella et al.
2023/0088960 A1 3/2023 Popelka et al.
2023/0096930 A1 3/2023 Dasdan
2023/0101773 A1 3/2023 Katahanas et al.
2023/0107891 A1 4/2023 Miriyala et al.
2023/0113462 A1 4/2023 Sesha et al.
2023/0131525 A1 4/2023 Šopík et al.
2023/0133945 A1 5/2023 Park
2023/0138371 A1 5/2023 Bandukwala et al.
2023/0168874 A1 6/2023 Makhija et al.
2023/0169168 A1 6/2023 Magen Medina et al.
2023/0176562 A1 6/2023 Eichler et al.
2023/0179613 A1 6/2023 Andrews et al.
2023/0208870 A1 6/2023 Yellapragada et al.
2023/0244523 A1 8/2023 Gorantla et al.
2023/0251960 A1 8/2023 Sharma et al.
2023/0275909 A1 8/2023 Shivamoggi et al.
2023/0291755 A1 9/2023 Siebel et al.
2023/0305813 A1 9/2023 Jalal et al.
2023/0325226 A1 10/2023 Malik et al.
2023/0412629 A1 12/2023 Beveridge et al.
2024/0070495 A1 2/2024 Satish et al.

(56) References Cited

U.S. PATENT DOCUMENTS

| | | | |
|---|---|---|---|
| 2024/0160939 A1 | 5/2024 | Mopur et al. |
| 2024/0201983 A1 | 6/2024 | Groenewegen et al. |
| 2024/0220658 A1 | 7/2024 | Herrera et al. |

FOREIGN PATENT DOCUMENTS

| | | | |
|---|---|---|---|
| CN | 111901316 A | 11/2020 |
| EP | 3407572 A1 | 11/2018 |
| WO | 2006009827 A2 | 1/2006 |
| WO | 2017147411 A1 | 8/2017 |
| WO | 2020226979 A2 | 11/2020 |
| WO | 2023163825 A1 | 8/2023 |

OTHER PUBLICATIONS

Long, et al., "Automatic Input Rectification", 2012 34th International Conference on Software Engineering (ICSE), (2012), pp. 80-90, doi: 10.1109/ICSE.2012.6227204.

Perkins, et al., "Automatically Patching Errors in Deployed Software", SOSP '09: Proceedings of the ACM SIGOPS 22nd symposium on Operating systems principles, Oct. 2009, p. 87-102, https://doi.org/10.1145/1629575.1629585.

Rinard, et al., "Living in the Comfort Zone", OOPSLA'07, Oct. 21-25, 2007, Montreal, Quebec, Canada, pp. 611-622.

Rinard, et al., "Manipulating Program Functionality to Eliminate Security Vulnerabilities", Moving Target Defense. Springer, New York, NY, (2011). pp. 109-115.

Samuel, et al., "Let's Parse to Prevent Pwnage Invited Position Paper", LEET'12: Proceedings of the 5th USENIX conference on Large-Scale Exploits and Emergent Threats, Apr. 2012, pp. 3-6.

Shen, et al., "Active Learning for Inference and Regeneration of Applications that Access Databases", ACM Trans. Program. Lang. Syst. 42, 4, Article 18 (Jan. 2021), 119 pages, https://doi.org/10.1145/3430952.

Vasilakis, et al., "Supply-Chain Vulnerability Elimination via Active Learning and Regeneration", Proceedings of the 2021 ACM SIGSAC Conference on Computer and Communications Security (CCS '21), Nov. 15-19, 2021, Virtual Event, Republic of Korea. ACM, New York, NY, USA, 16 pages, https://doi.org/10.1145/3460120.3484736.

Brojo Kishore Mishra et al., "Intrusion Detection Systems for High Performance Computing Environment", 978-1-4799-5958-7, 2014 IEEE, 6 pages.

Eran Levy, "Data Lake Ingestion: 7 Best Practices", Data Lakes, Jan. 10, 2022, 8 pages.

Final Office Action for U.S. Appl. No. 17/853,002 mailed Oct. 1, 2024, 22 pages.

Final Office Action for U.S. Appl. No. 18/426,799 mailed Jan. 24, 2025, 16 pages.

Josh O'Brien, "New Styra DAS Compliance Packs Foster Collaboration Across Teams," Published Apr. 14, 2021, Styra. (Year: 2021), 4 pages.

Lauri Moilanen; "Collecting Logs from Docker Containers," Bachelor's thesis, School of Technology, Degree Program in Information Technology, May 2020, 58 pages.

Notice of Allowance for U.S. Appl. No. 17/853,002 mailed Jan. 24, 2025, 10 pages.

Notice of Allowance for U.S. Appl. No. 17/854,432 mailed Mar. 7, 2025, 7 pages.

Notice of Allowance for U.S. Appl. No. 18/410,804, mailed Mar. 7, 2025, 8 pages.

Notice of Allowance for U.S. Appl. No. 18/415,879, mailed Jan. 29, 2025, 8 pages.

Office Action for U.S. Appl. No. 17/809,804 Mar. 13, 2025, 12 pages.

Office Action for U.S. Appl. No. 17/829,110 mailed Dec. 16, 2024, 31 pages.

Office Action for U.S. Appl. No. 17/838,974 mailed Jan. 14, 2025, 16 pages.

Office Action for U.S. Appl. No. 17/855,112 mailed Jan. 2, 2025, 5 pages.

Office Action for U.S. Appl. No. 17/855,247 mailed Nov. 15, 2024, 16 pages.

Office Action for U.S. Appl. No. 17/893,721, mailed Dec. 16, 2024, 12 pages.

Office Action for U.S. Appl. No. 17/964,311 mailed Feb. 4, 2025, 15 pages.

Office Action for U.S. Appl. No. 17/964,378 mailed Feb. 18, 2025, 17 pages.

Office Action for U.S. Appl. No. 17/988,743 mailed Feb. 27, 2025, 16 pages.

Office action for U.S. Appl. No. 18/096,114 mailed Dec. 19, 2024, 13 pages.

Office Action for U.S. Appl. No. 18/161,709 mailed Mar. 3, 2025, 9 pages.

Office Action for U.S. Appl. No. 18/162,247 mailed Mar. 7, 2025, 15 pages.

Office Action for U.S. Appl. No. 18/162,474 mailed Mar. 12, 2025, 16 pages.

Office Action for U.S. Appl. No. 18/186,888 mailed Feb. 25, 2025, 12 pages.

Office Action for U.S. Appl. No. 18/192,391, mailed Feb. 27, 25, 13 pages.

Office Action for U.S. Appl. No. 18/322,840 mailed Mar. 18, 25, 21 pages.

Paul Foryt, "The Guide to Kubernetes Compliance," Published Jul. 7, 2022, Styra. (Year: 2022).

Yin et al., "Behavioral graph fraud detection in E-commerce," 2022 IEEE International Conference on Data Mining Workshops ( ICDMW), 2375-9259/22/$31.00 © 2022 IEEE, DOI 10.1109/ICDMW58026.2022.00105. (Year: 2022).

* cited by examiner

390

| MID | start_time | PID_hash | src_IP_addr | src_port | dst_IP_addr | dst_port | prot | dir |
|---|---|---|---|---|---|---|---|---|
| A | t1 | A1 | 1.1.1.10 | 10000 | 2.2.2.20 | 22 | TCP | Incoming |
| A | t2 | A3 | 2.2.2.20 | 10001 | 2.2.2.21 | 22 | TCP | Outgoing |
| B | t2 | B1 | 2.2.2.20 | 10001 | 2.2.2.21 | 22 | TCP | Incoming |

Fig. 3K

391

| src_MID | src_PID_hash | dst_MID | dst_PID_hash | dst_start_time | src_IP_addr | src_port | dst_IP_addr | dst_port |
|---|---|---|---|---|---|---|---|---|
| null | null | A | A1 | t1 | 1.1.1.10 | 10000 | 2.2.2.20 | 22 |
| A | A3 | B | B1 | t2 | 2.2.2.20 | 10001 | 2.2.2.21 | 22 |

Fig. 3L

| MID | login_time | sshd_PID_hash |
|---|---|---|
| A | t1 | A1 |
| B | t2 | B1 |

Fig. 3M

| MID | sshd_PID_hash | login_time | login_username | src_IP_addr | src_port | dst_IP_addr | dst_port |
|---|---|---|---|---|---|---|---|
| A | A1 | t1 | X | 1.1.1.10 | 10000 | 2.2.2.20 | 22 |
| B | B1 | t2 | Y | 2.2.2.20 | 10001 | 2.2.2.21 | 22 |

Fig. 3N

| MID | start_time | PID_hash | exe_path | parent_PID_hash |
|---|---|---|---|---|
| A | t1 | A1 | /usr/sbin/sshd | A0 |
| A | t1 | A2 | /bin/bash | A1 |
| A | t2 | A3 | /usr/bin/ssh | A2 |
| B | t2 | B1 | /usr/sbin/sshd | B0 |
| B | t2 | B2 | /bin/bash | B1 |
| B | t3 | B3 | /usr/bin/curl | B2 |

Fig. 3O

| MID | sshd_PID_hash | PID_hash |
|---|---|---|
| A | A1 | A1 |
| A | A1 | A2 |
| A | A1 | A3 |
| B | B1 | B1 |
| B | B1 | B2 |
| B | B1 | B3 |

Fig. 3P

| parent_MID | parent_sshd_PID_hash | child_MID | origin_sshd_PID_hash |
|---|---|---|---|
| A | A1 | B | B1 |

Fig. 3Q

| MID | sshd_PID_hash | parent_MID | parent_sshd_PID_hash | origin_MID | origin_sshd_PID_hash |
|---|---|---|---|---|---|
| A | A1 | null | null | A | A1 |
| B | B1 | A | A1 | A | A1 |

Fig. 3R

KERNEL-BASED MONITORING OF CONTAINER ACTIVITY IN A COMPUTE ENVIRONMENT

RELATED APPLICATIONS

This application is a continuation-in-part of U.S. patent application Ser. No. 17/900,468, filed Aug. 31, 2022, which is a continuation-in-part of U.S. patent application Ser. No. 17/893,721, filed Aug. 23, 2022, which is a continuation-in-part of U.S. patent application Ser. No. 17/504,311, filed Oct. 18, 2021, which is a continuation of U.S. patent application Ser. No. 16/665,961, filed Oct. 28, 2019, now U.S. Pat. No. 11,153,339, which is a continuation of U.S. patent application Ser. No. 16/134,794, filed Sep. 18, 2018, now U.S. Pat. No. 10,581,891, which claims priority to U.S. Provisional Patent Application No. 62/590,986, filed Nov. 27, 2017, and also claims priority to U.S. Provisional Patent Application No. 62/650,971, filed Mar. 30, 2018, each of which is hereby incorporated by reference in its entirety. U.S. patent application Ser. No. 17/900,468 and U.S. patent application Ser. No. 17/893,721 also each claims priority under 35 U.S.C. § 119 (e) to U.S. Provisional Patent Application No. 63/239,288, filed on Aug. 31, 2021, U.S. Provisional Patent Application No. 63/239,275, filed on Aug. 31, 2021, U.S. Provisional Patent Application No. 63/239,310, filed on Aug. 31, 2021, U.S. Provisional Patent Application No. 63/239,262, filed on Aug. 31, 2021, and U.S. Provisional Patent Application No. 63/392,300, filed on Jul. 26, 2022, each of which is hereby incorporated by reference in its entirety.

BRIEF DESCRIPTION OF THE DRAWINGS

The accompanying drawings illustrate various embodiments and are a part of the specification. The illustrated embodiments are merely examples and do not limit the scope of the disclosure. Throughout the drawings, identical or similar reference numbers designate identical or similar elements.

FIG. 2O illustrates an example of a machine server graph as rendered in an interface.

FIG. 3K illustrates example records.

FIG. 3L illustrates example output from performing an ssh connection match.

FIG. 3M illustrates example records.

FIG. 3N illustrates example records.

FIG. 3O illustrates example records.

FIG. 3P illustrates example records.

FIG. 3Q illustrates an adjacency relationship between two login sessions.

FIG. 3R illustrates example records.

DETAILED DESCRIPTION

Various illustrative embodiments are described herein with reference to the accompanying drawings. It will, however, be evident that various modifications and changes may be made thereto, and additional embodiments may be implemented, without departing from the scope of the invention as set forth in the claims. For example, certain features of one embodiment described herein may be combined with or substituted for features of another embodiment described herein. The description and drawings are accordingly to be regarded in an illustrative rather than a restrictive sense.

Figure 1A:
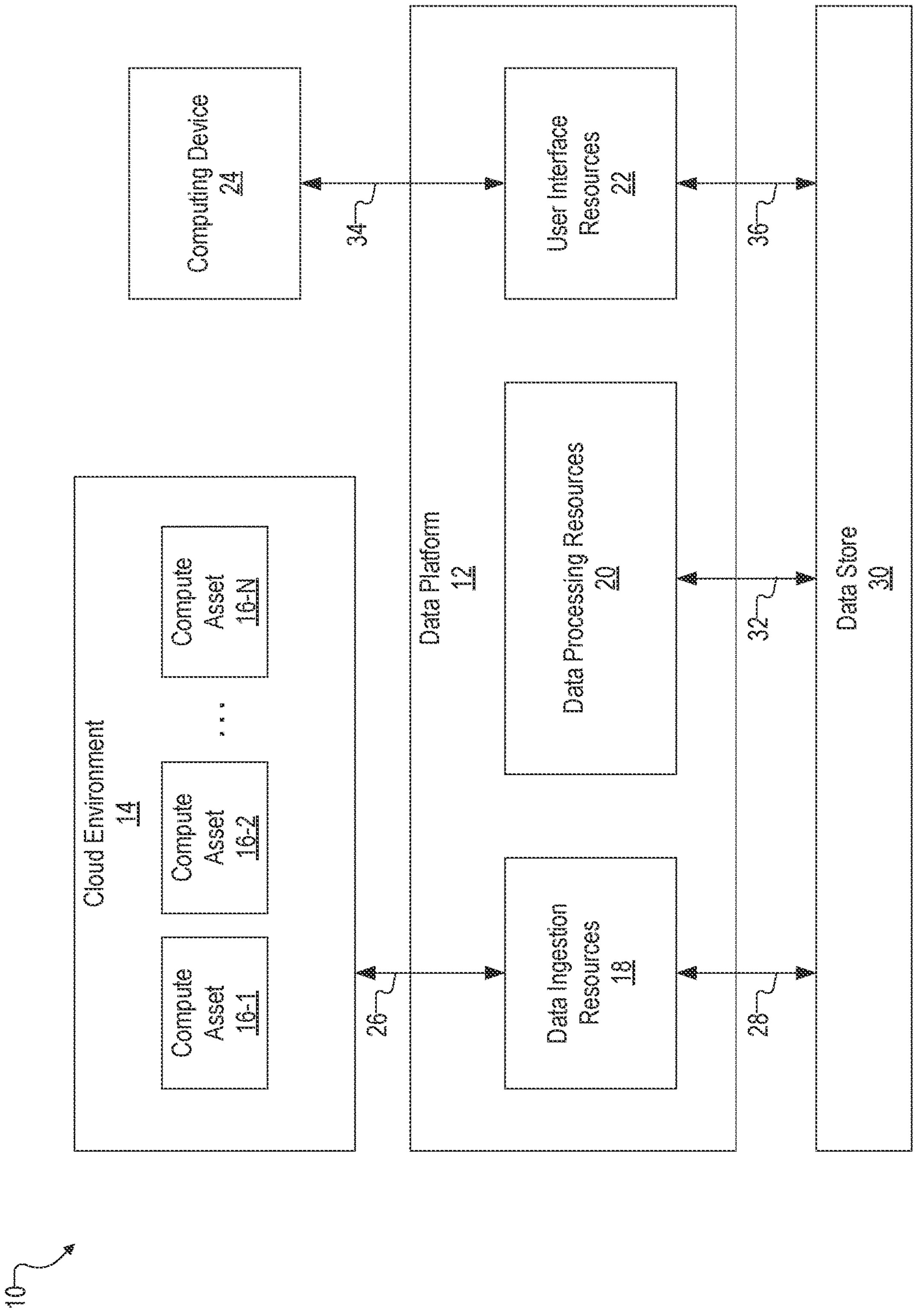
FIG. 1A shows an illustrative configuration in which a data platform is configured to perform various operations with respect to a cloud environment that includes a plurality of compute assets.

FIG. 1A shows an illustrative configuration 10 in which a data platform 12 is configured to perform various operations with respect to a cloud environment 14 that includes a plurality of compute assets 16-1 through 16-N (collectively "compute assets 16"). For example, data platform 12 may include data ingestion resources 18 configured to ingest data from cloud environment 14 into data platform 12, data processing resources 20 configured to perform data processing operations with respect to the data, and user interface resources 22 configured to provide one or more external users and/or compute resources (e.g., computing device 24) with access to an output of data processing resources 20. Each of these resources are described in detail herein.

Cloud environment 14 may include any suitable network-based computing environment as may serve a particular application. For example, cloud environment 14 may be implemented by one or more compute resources provided and/or otherwise managed by one or more cloud service providers, such as Amazon Web Services™ (AWS™), Google Cloud Platform™ (GCP™), Microsoft® Azure®, and/or any other cloud service provider configured to provide public and/or private access to network-based compute resources.

Compute assets 16 may include, but are not limited to, containers (e.g., container images, deployed and executing container instances, etc.), virtual machines, workloads, applications, processes, physical machines, compute nodes, clusters of compute nodes, software runtime environments (e.g., container runtime environments), and/or any other virtual and/or physical compute resource that may reside in and/or be executed by one or more computer resources in cloud environment 14. In some examples, one or more compute assets 16 may reside in one or more datacenters.

A compute asset 16 may be associated with (e.g., owned, deployed, or managed by) a particular entity, such as a customer or client of cloud environment 14 and/or data platform 12. Accordingly, for purposes of the discussion herein, cloud environment 14 may be used by one or more entities.

Data platform 12 may be configured to perform one or more data security monitoring and/or remediation services, compliance monitoring services, anomaly detection services, DevOps services, compute asset management services, and/or any other type of data analytics service as may serve a particular implementation. Data platform 12 may be managed or otherwise associated with any suitable data platform provider, such as a provider of any of the data analytics services described herein. The various resources included in data platform 12 may reside in the cloud and/or be located on-premises and be implemented by any suitable combination of physical and/or virtual compute resources, such as one or more computing devices, microservices, applications, etc.

Data ingestion resources 18 may be configured to ingest data from cloud environment 14 into data platform 12. This may be performed in various ways, some of which are described in detail herein. For example, as illustrated by arrow 26, data ingestion resources 18 may be configured to receive the data from one or more agents deployed within cloud environment 14, utilize an event streaming platform (e.g., Kafka) to obtain the data, and/or pull data (e.g., configuration data) from cloud environment 14. In some examples, data ingestion resources 18 may obtain the data using one or more agentless configurations.

The data ingested by data ingestion resources 18 from cloud environment 14 may include any type of data as may serve a particular implementation. For example, the data may include data representative of configuration information associated with compute assets 16, information about one or more processes running on compute assets 16, network activity information, information about events (creation events, modification events, communication events, user-initiated events, etc.) that occur with respect to compute assets 16, etc. In some examples, the data may or may not include actual customer data processed or otherwise generated by compute assets 16.

As illustrated by arrow 28, data ingestion resources 18 may be configured to load the data ingested from cloud environment 14 into a data store 30. Data store 30 is illustrated in FIG. 1A as being separate from and communicatively coupled to data platform 12. However, in some alternative embodiments, data store 30 is included within data platform 12.

Data store 30 may be implemented by any suitable data warehouse, data lake, data mart, and/or other type of database structure as may serve a particular implementation. Such data stores may be proprietary or may be embodied as vendor provided products or services such as, for example, Snowflake™, Google BigQuery®, Druid™, Amazon Redshift™, IBM DB2®, Dremio™, Databricks™ Lakehouse Platform, Cloudera™, Azure® Synapse Analytics, and others.

Although the examples described herein largely relate to embodiments where data is collected from agents and ultimately stored in a data store such as those provided by Snowflake, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in an enterprise data warehouse (EDW). "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged.

Data processing resources 20 may be configured to perform various data processing operations with respect to data ingested by data ingestion resources 18, including data ingested and stored in data store 30. For example, data processing resources 20 may be configured to perform one or more data security monitoring and/or remediation operations, compliance monitoring operations, anomaly detection operations, DevOps operations, compute asset management operations, and/or any other type of data analytics operation as may serve a particular implementation. Various examples of operations performed by data processing resources 20 are described herein.

As illustrated by arrow 32, data processing resources 20 may be configured to access data in data store 30 to perform the various operations described herein. In some examples, this may include performing one or more queries with respect to the data stored in data store 30. Such queries may be generated using any suitable query language.

In some examples, the queries provided by data processing resources 20 may be configured to direct data store 30 to perform one or more data analytics operations with respect to the data stored within data store 30. These data analytics operations may be with respect to data specific to a particular entity (e.g., data residing in one or more silos within data store 30 that are associated with a particular customer) and/or data associated with multiple entities. For example, data processing resources 20 may be configured to analyze data associated with a first entity and use the results of the analysis to perform one or more operations with respect to a second entity.

One or more operations performed by data processing resources 20 may be performed periodically according to a predetermined schedule. For example, one or more operations may be performed by data processing resources 20 every hour or any other suitable time interval. Additionally or alternatively, one or more operations performed by data processing resources 20 may be performed in substantially real-time (or near real-time) as data is ingested into data platform 12. In this manner, the results of such operations (e.g., one or more detected anomalies in the data) may be provided to one or more external entities (e.g., computing device 24 and/or one or more users) in substantially real-time and/or in near real-time.

User interface resources 22 may be configured to perform one or more user interface operations, examples of which are described herein. For example, user interface resources 22 may be configured to present one or more results of the data processing performed by data processing resources 20 to one or more external entities (e.g., computing device 24 and/or one or more users), as illustrated by arrow 34. As illustrated by arrow 36, user interface resources 22 may access data in data store 30 to perform the one or more user interface operations.

Figure 1B:
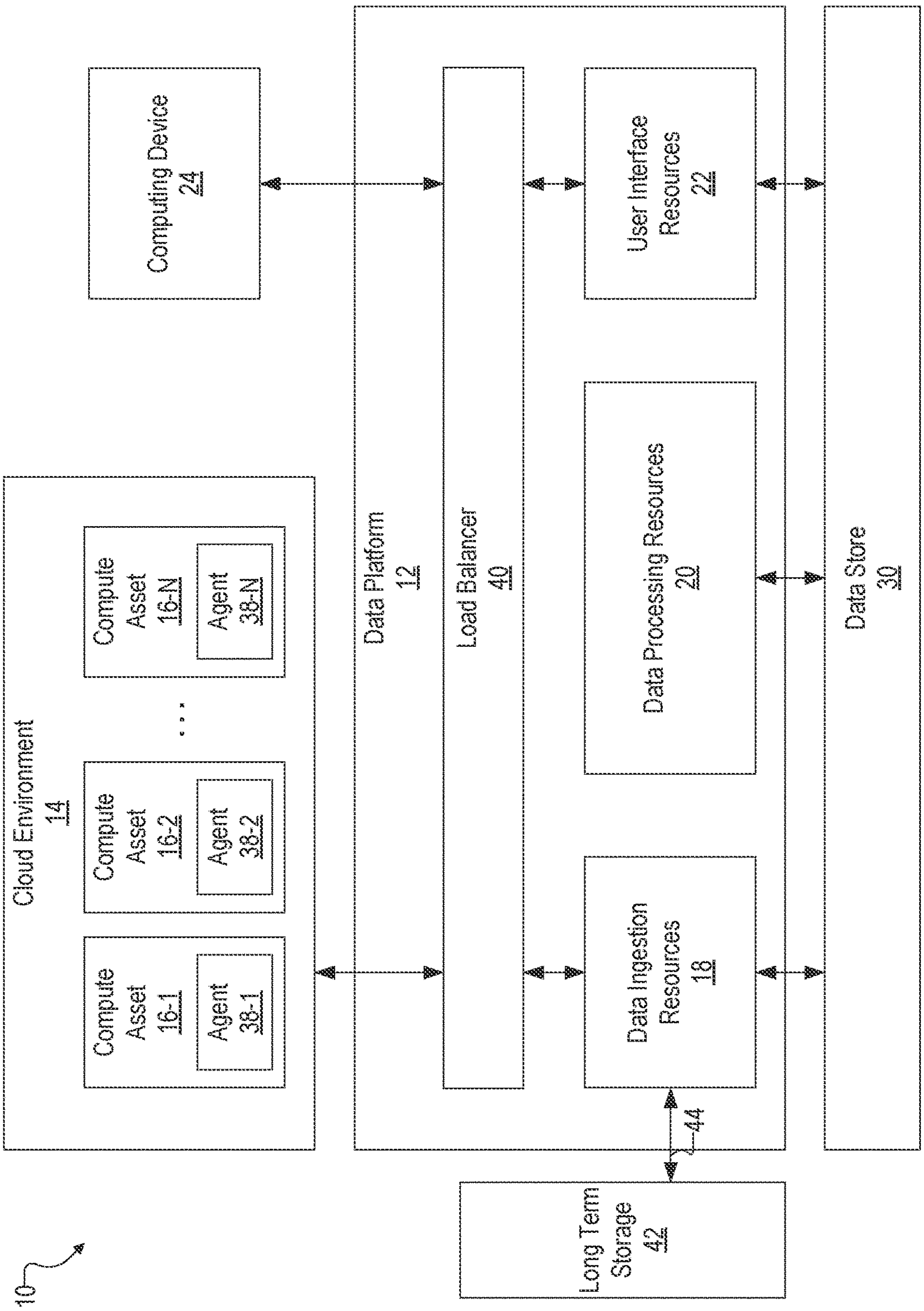
FIG. 1B shows an illustrative implementation of the configuration of FIG. 1A.

FIG. 1B illustrates an implementation of configuration 10 in which an agent 38 (e.g., agent 38-1 through agent 38-N) is installed on each of compute assets 16. As used herein, an agent may include a self-contained binary and/or other type of code or application that can be run on any appropriate platforms, including within containers and/or other virtual compute assets. Agents 38 may monitor the nodes on which they execute for a variety of different activities, including but not limited to, connection, process, user, machine, and file activities. In some examples, agents 38 can be executed in user space, and can use a variety of kernel modules (e.g., auditd, iptables, netfilter, pcap, etc.) to collect data. Agents can be implemented in any appropriate programming language, such as C or Golang, using applicable kernel APIs.

Agents 38 may be deployed in any suitable manner. For example, an agent 38 may be deployed as a containerized application or as part of a containerized application. As described herein, agents 38 may selectively report information to data platform 12 in varying amounts of detail and/or with variable frequency.

Also shown in FIG. 1B is a load balancer 40 configured to perform one or more load balancing operations with respect to data ingestion operations performed by data ingestion resources 18 and/or user interface operations performed by user interface resources 22. Load balancer 40 is shown to be included in data platform 12. However, load balancer 40 may alternatively be located external to data platform 12. Load balancer 40 may be implemented by any suitable microservice, application, and/or other computing resources. In some alternative examples, data platform 12 may not utilize a load balancer such as load balancer 40.

Also shown in FIG. 1B is long term storage 42 with which data ingestion resources 18 may interface, as illustrated by arrow 44. Long term storage 42 may be implemented by any suitable type of storage resources, such as cloud-based storage (e.g., AWS S3, etc.) and/or on-premises storage and may be used by data ingestion resources 18 as part of the data ingestion process. Examples of this are described herein. In some examples, data platform 12 may not utilize long term storage 42.

The embodiments described herein can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the principles described herein. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

In some examples, a non-transitory computer-readable medium storing computer-readable instructions may be provided in accordance with the principles described herein. The instructions, when executed by a processor of a computing device, may direct the processor and/or computing device to perform one or more operations, including one or more of the operations described herein. Such instructions may be stored and/or transmitted using any of a variety of known computer-readable media.

A non-transitory computer-readable medium as referred to herein may include any non-transitory storage medium that participates in providing data (e.g., instructions) that may be read and/or executed by a computing device (e.g., by a processor of a computing device). For example, a non-transitory computer-readable medium may include, but is not limited to, any combination of non-volatile storage media and/or volatile storage media. Exemplary non-volatile storage media include, but are not limited to, read-only memory, flash memory, a solid-state drive, a magnetic storage device (e.g. a hard disk, a floppy disk, magnetic tape, etc.), ferroelectric random-access memory ("RAM"), and an optical disc (e.g., a compact disc, a digital video disc, a Blu-ray disc, etc.). Exemplary volatile storage media include, but are not limited to, RAM (e.g., dynamic RAM).

Figure 1C:
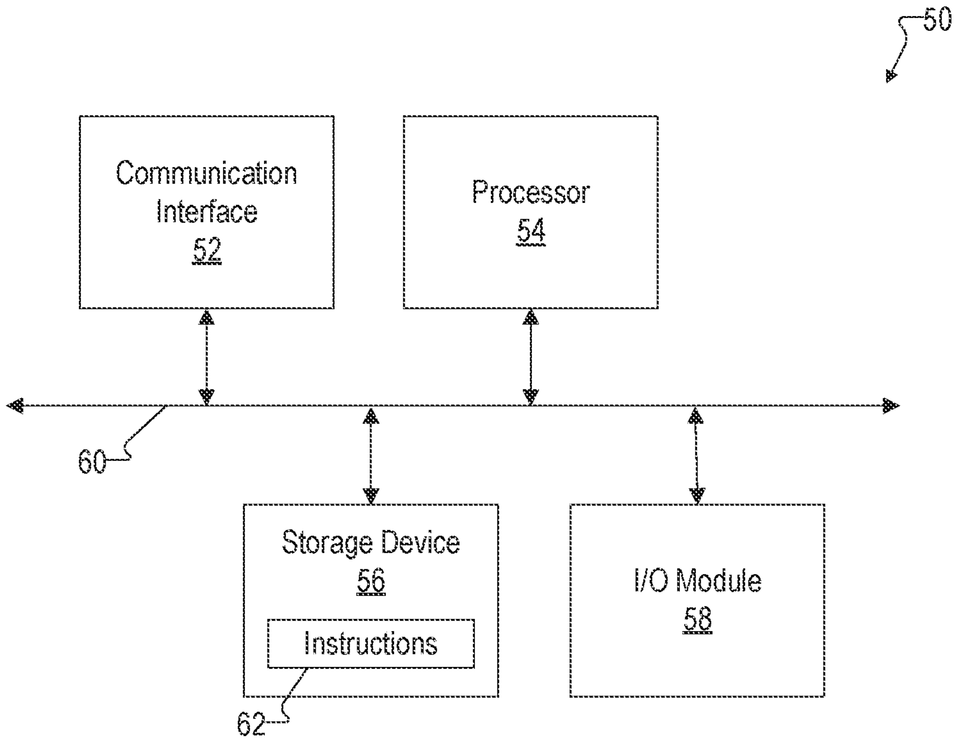
FIG. 1C illustrates an example computing device.

FIG. 1C illustrates an example computing device 50 that may be specifically configured to perform one or more of the processes described herein. Any of the systems, microservices, computing devices, and/or other components described herein may be implemented by computing device 50.

As shown in FIG. 1C, computing device 50 may include a communication interface 52, a processor 54, a storage device 56, and an input/output ("I/O") module 58 communicatively connected one to another via a communication infrastructure 60. While an exemplary computing device 50 is shown in FIG. 1C, the components illustrated in FIG. 1C are not intended to be limiting. Additional or alternative components may be used in other embodiments. Components of computing device 50 shown in FIG. 1C will now be described in additional detail.

Communication interface 52 may be configured to communicate with one or more computing devices. Examples of communication interface 52 include, without limitation, a wired network interface (such as a network interface card), a wireless network interface (such as a wireless network interface card), a modem, an audio/video connection, and any other suitable interface.

Processor 54 generally represents any type or form of processing unit capable of processing data and/or interpreting, executing, and/or directing execution of one or more of the instructions, processes, and/or operations described herein. Processor 54 may perform operations by executing computer-executable instructions 62 (e.g., an application, software, code, and/or other executable data instance) stored in storage device 56.

Storage device 56 may include one or more data storage media, devices, or configurations and may employ any type, form, and combination of data storage media and/or device. For example, storage device 56 may include, but is not limited to, any combination of the non-volatile media and/or volatile media described herein. Electronic data, including data described herein, may be temporarily and/or permanently stored in storage device 56. For example, data representative of computer-executable instructions 62 configured to direct processor 54 to perform any of the operations described herein may be stored within storage device 56. In some examples, data may be arranged in one or more databases residing within storage device 56.

I/O module 58 may include one or more I/O modules configured to receive user input and provide user output. I/O module 58 may include any hardware, firmware, software, or combination thereof supportive of input and output capabilities. For example, I/O module 58 may include hardware and/or software for capturing user input, including, but not limited to, a keyboard or keypad, a touchscreen component (e.g., touchscreen display), a receiver (e.g., an RF or infrared receiver), motion sensors, and/or one or more input buttons.

I/O module 58 may include one or more devices for presenting output to a user, including, but not limited to, a graphics engine, a display (e.g., a display screen), one or more output drivers (e.g., display drivers), one or more audio speakers, and one or more audio drivers. In certain embodiments, I/O module 58 is configured to provide graphical data to a display for presentation to a user. The graphical data may be representative of one or more graphical user interfaces and/or any other graphical content as may serve a particular implementation.

Figure 1D:
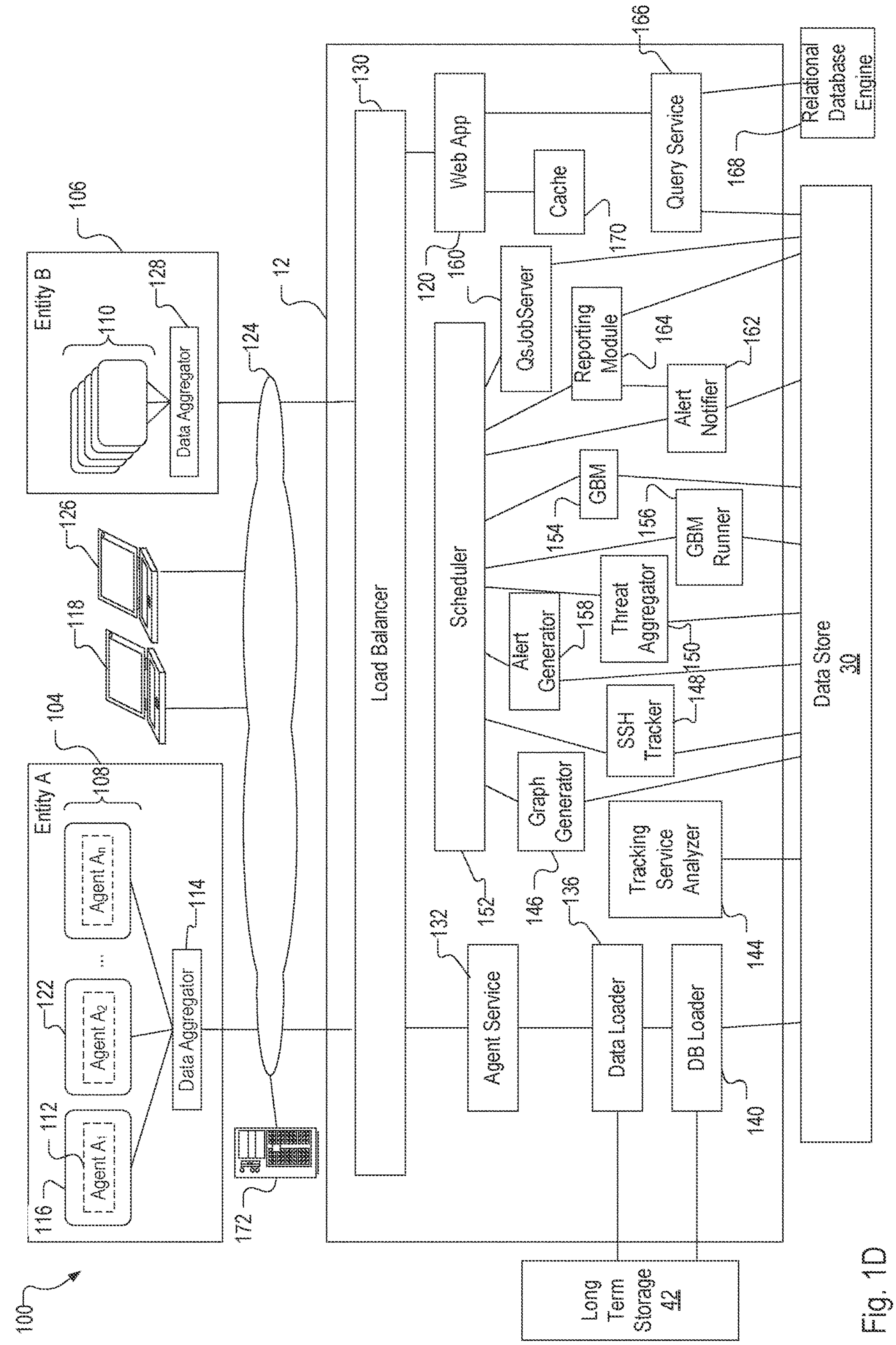
FIG. 1D illustrates an example of an environment in which activities that occur within datacenters are modeled.

FIG. 1D illustrates an example implementation 100 of configuration 10. As such, one or more components shown in FIG. 1D may implement one or more components shown in FIG. 1A and/or FIG. 1B. In particular, implementation 100 illustrates an environment in which activities that occur within datacenters are modeled using data platform 12. Using techniques described herein, a baseline of datacenter activity can be modeled, and deviations from that baseline can be identified as anomalous. Anomaly detection can be beneficial in a security context, a compliance context, an asset management context, a DevOps context, and/or any other data analytics context as may serve a particular implementation.

Two example datacenters (104 and 106) are shown in FIG. 1D, and are associated with (e.g., belong to) entities named entity A and entity B, respectively. A datacenter may include dedicated equipment (e.g., owned and operated by entity A, or owned/leased by entity A and operated exclusively on entity A's behalf by a third party). A datacenter can also include cloud-based resources, such as infrastructure as a service (IaaS), platform as a service (PaaS), and/or software as a service (SaaS) elements. The techniques described herein can be used in conjunction with multiple types of datacenters, including ones wholly using dedicated equipment, ones that are entirely cloud-based, and ones that use a mixture of both dedicated equipment and cloud-based resources.

Both datacenter 104 and datacenter 106 include a plurality of nodes, depicted collectively as set of nodes 108 and set of nodes 110, respectively, in FIG. 1D. These nodes may implement compute assets 16. Installed on each of the nodes are in-server/in-virtual-machine (VM)/embedded-in-IoT device agents (e.g., agent 112), which are configured to collect data and report it to data platform 12 for analysis. As described herein, agents may be small, self-contained binaries that can be run on any appropriate platforms, including virtualized ones (and, as applicable, within containers). Agents may monitor the nodes on which they execute for a variety of different activities, including: connection, process, user, machine, and file activities. Agents can be executed in user space, and can use a variety of kernel modules (e.g., auditd, iptables, netfilter, pcap, etc.) to collect data. Agents can be implemented in any appropriate programming language, such as C or Golang, using applicable kernel APIs.

As described herein, agents can selectively report information to data platform 12 in varying amounts of detail and/or with variable frequency. As is also described herein, the data collected by agents may be used by data platform 12 to create polygraphs, which are graphs of logical entities, connected by behaviors. In some embodiments, agents report information directly to data platform 12. In other embodiments, at least some agents provide information to a data aggregator, such as data aggregator 114, which in turn provides information to data platform 12. The functionality of a data aggregator can be implemented as a separate binary or other application (distinct from an agent binary), and can also be implemented by having an agent execute in an "aggregator mode" in which the designated aggregator node acts as a Layer 7 proxy for other agents that do not have access to data platform 12. Further, a chain of multiple aggregators can be used, if applicable (e.g., with agent 112 providing data to data aggregator 114, which in turn provides data to another aggregator (not pictured) which provides data to data platform 12). An example way to implement an aggregator is through a program written in an appropriate language, such as C or Golang.

Use of an aggregator can be beneficial in sensitive environments (e.g., involving financial or medical transactions) where various nodes are subject to regulatory or other architectural requirements (e.g., prohibiting a given node from communicating with systems outside of datacenter 104). Use of an aggregator can also help to minimize security exposure more generally. As one example, by limiting communications with data platform 12 to data aggregator 114, individual nodes in nodes 108 need not make external network connections (e.g., via Internet 124), which can potentially expose them to compromise (e.g., by other external devices, such as device 118, operated by a criminal). Similarly, data platform 12 can provide updates, configuration information, etc., to data aggregator 114 (which in turn distributes them to nodes 108), rather than requiring nodes 108 to allow incoming connections from data platform 12 directly.

Another benefit of an aggregator model is that network congestion can be reduced (e.g., with a single connection being made at any given time between data aggregator 114 and data platform 12, rather than potentially many different connections being open between various of nodes 108 and data platform 12). Similarly, network consumption can also be reduced (e.g., with the aggregator applying compression techniques/bundling data received from multiple agents).

One example way that an agent (e.g., agent 112, installed on node 116) can provide information to data aggregator 114 is via a REST API, formatted using data serialization protocols such as Apache Avro. One example type of information sent by agent 112 to data aggregator 114 is status information. Status information may be sent by an agent periodically (e.g., once an hour or once any other predetermined amount of time). Alternatively, status information may be sent continuously or in response to occurrence of one or more events. The status information may include, but is not limited to, a. an amount of event backlog (in bytes) that has not yet been transmitted, b. configuration information, c. any data loss period for which data was dropped, d. a cumulative count of errors encountered since the agent started, e. version information for the agent binary, and/or f. cumulative statistics on data collection (e.g., number of network packets processed, new processes seen, etc.).

A second example type of information that may be sent by agent 112 to data aggregator 114 is event data (described in more detail herein), which may include a UTC timestamp for each event. As applicable, the agent can control the amount of data that it sends to the data aggregator in each call (e.g., a maximum of 10 MB) by adjusting the amount of data sent to manage the conflicting goals of transmitting data as soon as possible, and maximizing throughput. Data can also be compressed or uncompressed by the agent (as applicable) prior to sending the data.

Each data aggregator may run within a particular customer environment. A data aggregator (e.g., data aggregator 114) may facilitate data routing from many different agents (e.g., agents executing on nodes 108) to data platform 12. In various embodiments, data aggregator 114 may implement a SOCKS 5 caching proxy through which agents can connect to data platform 12. As applicable, data aggregator 114 can encrypt (or otherwise obfuscate) sensitive information prior to transmitting it to data platform 12, and can also distribute key material to agents which can encrypt the information (as applicable). Data aggregator 114 may include a local storage, to which agents can upload data (e.g., pcap packets). The storage may have a key-value interface. The local storage can also be omitted, and agents configured to upload data to a cloud storage or other storage area, as applicable. Data aggregator 114 can, in some embodiments, also cache locally and distribute software upgrades, patches, or configuration information (e.g., as received from data platform 12).

Various examples associated with agent data collection and reporting will now be described.

In the following example, suppose that a user (e.g., a network administrator) at entity A (hereinafter "user A") has decided to begin using the services of data platform 12. In some embodiments, user A may access a web frontend (e.g., web app 120) using a computer 126 and enrolls (on behalf of entity A) an account with data platform 12. After enrollment is complete, user A may be presented with a set of installers, pre-built and customized for the environment of entity A, that user A can download from data platform 12 and deploy on nodes 108. Examples of such installers include, but are not limited to, a Windows executable file, an iOS app, a Linux package (e.g., .deb or .rpm), a binary, or a container (e.g., a Docker container). When a user (e.g., a network administrator) at entity B (hereinafter "user B") also signs up for the services of data platform 12, user B may be similarly presented with a set of installers that are pre-built and customized for the environment of entity B.

User A deploys an appropriate installer on each of nodes 108 (e.g., with a Windows executable file deployed on a Windows-based platform or a Linux package deployed on a Linux platform, as applicable). As applicable, the agent can be deployed in a container. Agent deployment can also be performed using one or more appropriate automation tools, such as Chef, Puppet®, Salt, and Ansible™. Deployment can also be performed using managed/hosted container management/orchestration frameworks such as Kubernetes®, Apache Mesos®, and/or Docker Swarm®.

In various embodiments, the agent may be installed in the user space (i.e., is not a kernel module), and the same binary is executed on each node of the same type (e.g., all Windows-based platforms have the same Windows-based binary installed on them). An illustrative function of an agent, such as agent 112, is to collect data (e.g., associated with node 116) and report it (e.g., to data aggregator 114). Other tasks that can be performed by agents include data configuration and upgrading.

One approach to collecting data as described herein is to collect virtually all information available about a node (and, e.g., the processes running on it). Alternatively, the agent may monitor for network connections, and then begin collecting information about processes associated with the network connections, using the presence of a network packet associated with a process as a trigger for collecting additional information about the process. As an example, if a user of node 116 executes an application, such as a calculator application, which does not typically interact with the network, no information about use of that application may be collected by agent 112 and/or sent to data aggregator 114. If, however, the user of node 116 executes an ssh command (e.g., to ssh from node 116 to node 122), agent 112 may collect information about the process and provide associated information to data aggregator 114. In various embodiments, the agent may always collect/report information about certain events, such as privilege escalation, irrespective of whether the event is associated with network activity.

Figure 2A:
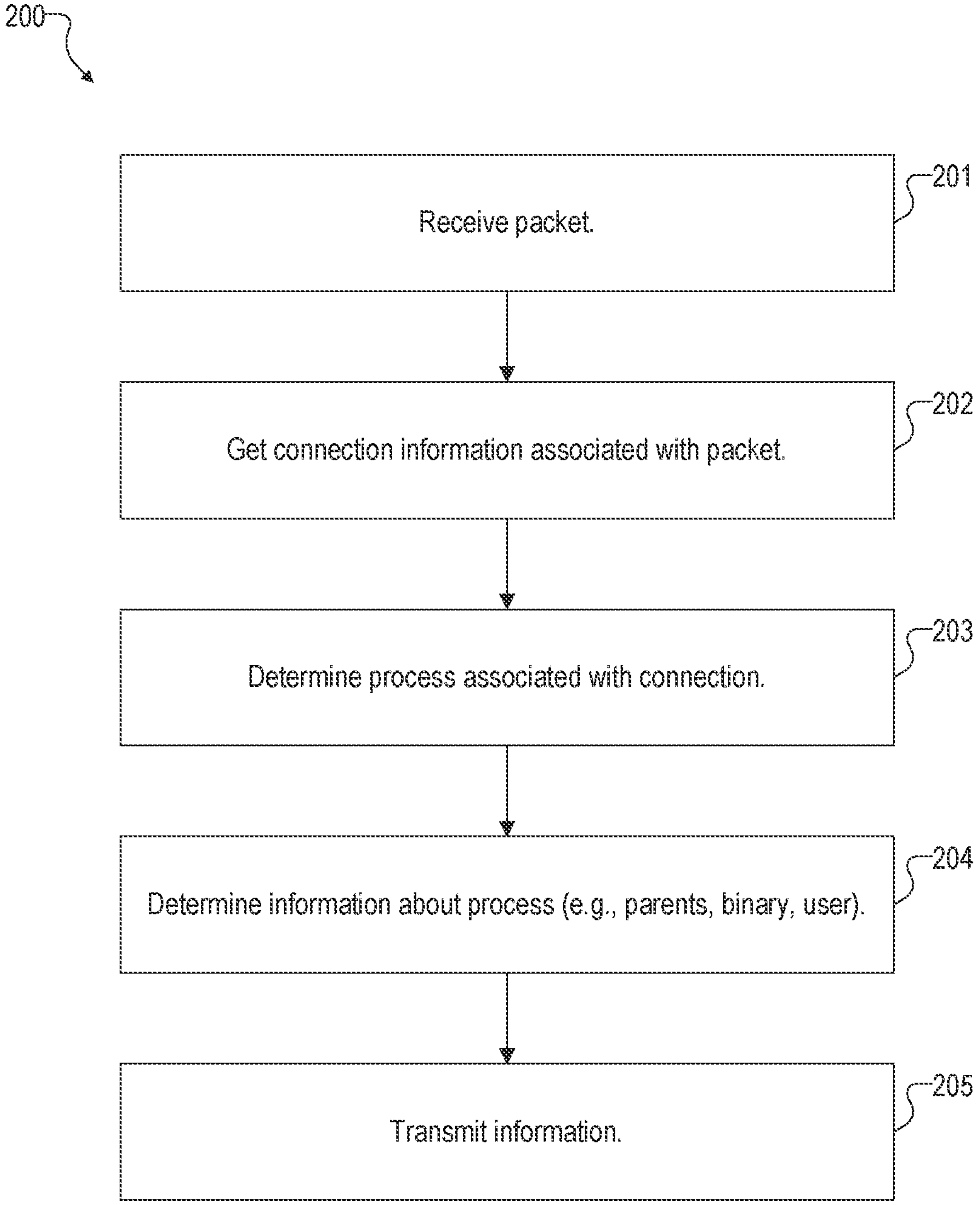
FIG. 2A illustrates an example of a process, used by an agent, to collect and report information about a client.

An approach to collecting information (e.g., by an agent) is as follows, and described in conjunction with process 200 depicted in FIG. 2A. An agent (e.g., agent 112) monitors its node (e.g., node 116) for network activity. One example way that agent 112 can monitor node 116 for network activity is by using a network packet capture tool (e.g., listening using libpcap). As packets are received (201), the agent obtains and maintains (e.g., in an in-memory cache) connection information associated with the network activity (202). Examples of such information include DNS query/response, TCP, UDP, and IP information.

The agent may also determine a process associated with the network connection (203). One example approach is for the agent to use a kernel network diagnostic API (e.g., netlink_diag) to obtain inode/process information from the kernel. Another example approach is for the agent to scan using netstat (e.g., on/proc/net/tcp,/proc/net/tcp6,/proc/net/udp, and/proc/net/udp6) to obtain sockets and relate them to processes. Information such as socket state (e.g., whether a socket is connected, listening, etc.) can also be collected by the agent.

One way an agent can obtain a mapping between a given inode and a process identifier is to scan within the/proc/pid directory. For each of the processes currently running, the agent examines each of their file descriptors. If a file descriptor is a match for the inode, the agent can determine that the process associated with the file descriptor owns the inode. Once a mapping is determined between an inode and a process identifier, the mapping is cached. As additional packets are received for the connection, the cached process information is used (rather than a new search being performed).

In some cases, exhaustively scanning for an inode match across every file descriptor may not be feasible (e.g., due to CPU limitations). In various embodiments, searching through file descriptors is accordingly optimized. User filtering is one example of such an optimization. A given socket is owned by a user. Any processes associated with the socket will be owned by the same user as the socket. When matching an inode (identified as relating to a given socket) against processes, the agent can filter through the processes and only examine the file descriptors of processes sharing the same user owner as the socket. In various embodiments, processes owned by root are always searched against (e.g., even when user filtering is employed).

Another example of an optimization is to prioritize searching the file descriptors of certain processes over others. One such prioritization is to search through the subdirectories of/proc/starting with the youngest process. One approximation of such a sort order is to search through/proc/in reverse order (e.g., examining highest numbered processes first). Higher numbered processes are more likely to be newer (i.e., not long-standing processes), and thus more likely to be associated with new connections (i.e., ones for which inode-process mappings are not already cached). In some cases, the most recently created process may not have the highest process identifier (e.g., due to the kernel wrapping through process identifiers).

Another example prioritization is to query the kernel for an identification of the most recently created process and to search in a backward order through the directories in/proc/ (e.g., starting at the most recently created process and working backwards, then wrapping to the highest value (e.g., 32768) and continuing to work backward from there). An alternate approach is for the agent to keep track of the newest process that it has reported information on (e.g., to data aggregator 114), and begin its search of/proc/in a forward order starting from the PID of that process.

Another example prioritization is to maintain, for each user actively using node 116, a list of the five (or any other number) most recently active processes. Those processes are more likely than other processes (less active, or passive) on node 116 to be involved with new connections, and can thus be searched first. For many processes, lower valued file descriptors tend to correspond to non-sockets (e.g., stdin, stdout, stderr). Yet another optimization is to preferentially search higher valued file descriptors (e.g., across processes) over lower valued file descriptors (that are less likely to yield matches).

In some cases, while attempting to locate a process identifier for a given inode, an agent may encounter a socket that does not correspond to the inode being matched against and is not already cached. The identity of that socket (and its corresponding inode) can be cached, once discovered, thus removing a future need to search for that pair.

In some cases, a connection may terminate before the agent is able to determine its associated process (e.g., due to a very short-lived connection, due to a backlog in agent processing, etc.). One approach to addressing such a situation is to asynchronously collect information about the connection using the audit kernel API, which streams information to user space. The information collected from the audit API (which can include PID/inode information) can be matched by the agent against pcap/inode information. In some embodiments, the audit API is always used, for all connections. However, due to CPU utilization considerations, use of the audit API can also be reserved for short/otherwise problematic connections (and/or omitted, as applicable).

Once the agent has determined which process is associated with the network connection (203), the agent can then collect additional information associated with the process (204). As will be described in more detail below, some of the collected information may include attributes of the process (e.g., a process parent hierarchy, and an identification of a binary associated with the process). As will also be described in more detail below, other of the collected information is derived (e.g., session summarization data and hash values).

The collected information is then transmitted (205), e.g., by an agent (e.g., agent 112) to a data aggregator (e.g., data aggregator 114), which in turn provides the information to data platform 12. In some embodiments, all information collected by an agent may be transmitted (e.g., to a data aggregator and/or to data platform 12). In other embodiments, the amount of data transmitted may be minimized (e.g., for efficiency reasons), using various techniques.

One approach to minimizing the amount of data flowing from agents (such as agents installed on nodes 108) to data platform 12 is to use a technique of implicit references with unique keys. The keys can be explicitly used by data platform 12 to extract/derive relationships, as necessary, in a data set at a later time, without impacting performance.

As previously mentioned, some data collected about a process is constant and does not change over the lifetime of the process (e.g., attributes), and some data changes (e.g., statistical information and other variable information). Constant data can be transmitted (205) once, when the agent first becomes aware of the process. And, if any changes to the constant data are detected (e.g., a process changes its parent), a refreshed version of the data can be transmitted (205) as applicable.

In some examples, an agent may collect variable data (e.g., data that may change over the lifetime of the process). In some examples, variable data can be transmitted (205) at periodic (or other) intervals. Alternatively, variable data may be transmitted in substantially real time as it is collected. In some examples, the variable data may indicate a thread count for a process, a total virtual memory used by the process, the total resident memory used by the process, the total time spent by the process executing in user space, and/or the total time spent by the process executing in kernel space. In some examples, the data may include a hash that may be used within data platform 12 to join process creation time attributes with runtime attributes to construct a full dataset.

Below are additional examples of data that an agent, such as agent 112, can collect and provide to data platform 12.

1. User Data

Core User Data: user name, UID (user ID), primary group, other groups, home directory.

Failed Login Data: IP address, hostname, username, count.

User Login Data: user name, hostname, IP address, start time, TTY (terminal), UID (user ID), GID (group ID), process, end time.

2. Machine Data

Dropped Packet Data: source IP address, destination IP address, destination port, protocol, count.

Machine Data: hostname, domain name, architecture, kernel, kernel release, kernel version, OS, OS version, OS description, CPU, memory, model number, number of cores, last boot time, last boot reason, tags (e.g., Cloud provider tags such as AWS, GCP, or Azure tags), default router, interface name, interface hardware address, interface IP address and mask, promiscuous mode.

3. Network Data

Network Connection Data: source IP address, destination IP address, source port, destination port, protocol, start time, end time, incoming and outgoing bytes, source process, destination process, direction of connection, histograms of packet length, inter packet delay, session lengths, etc.

Listening Ports in Server: source IP address, port number, protocol, process.

Dropped Packet Data: source IP address, destination IP address, destination port, protocol, count.

Arp Data: source hardware address, source IP address, destination hardware address, destination IP address.

DNS Data: source IP address, response code, response string, question (request), packet length, final answer (response).

4. Application Data

Package Data: exe path, package name, architecture, version, package path, checksums (MD5, SHA-1, SHA-256), size, owner, owner ID.

Application Data: command line, PID (process ID), start time, UID (user ID), EUID (effective UID), PPID (parent process ID), PGID (process group ID), SID (session ID), exe path, username, container ID.

5. Container Data

Container Image Data: image creation time, parent ID, author, container type, repo, (AWS) tags, size, virtual size, image version.

Container Data: container start time, container type, container name, container ID, network mode, privileged, PID mode, IP addresses, listening ports, volume map, process ID.

6. File Data

File path, file data hash, symbolic links, file creation data, file change data, file metadata, file mode.

As mentioned above, an agent, such as agent 112, can be deployed in a container (e.g., a Docker® container), and can also be used to collect information about containers. Collection about a container can be performed by an agent irrespective of whether the agent is itself deployed in a container or not (as the agent can be deployed in a container running in a privileged mode that allows for monitoring).

Agents can discover containers (e.g., for monitoring) by listening for container create events (e.g., provided by Docker®), and can also perform periodic ordered discovery scans to determine whether containers are running on a node. When a container is discovered, the agent can obtain attributes of the container, e.g., using standard Docker® API calls (e.g., to obtain IP addresses associated with the container, whether there's a server running inside, what port it is listening on, associated PIDs, etc.). Information such as the parent process that started the container can also be collected, as can information about the image (which comes from the Docker® repository).

In various embodiments, agents may use namespaces to determine whether a process is associated with a container. Namespaces are a feature of the Linux kernel that can be used to isolate resources of a collection of processes. Examples of namespaces include process ID (PID) namespaces, network namespaces, and user namespaces. Given a process, the agent can perform a fast lookup to determine whether the process is part of the namespace the container claims to be its namespace.

As mentioned, agents can be configured to report certain types of information (e.g., attribute information) once, when the agent first becomes aware of a process. In various embodiments, such static information is not reported again (or is reported once a day, every twelve hours, etc.), unless it changes (e.g., a process changes its parent, changes its owner, or a SHA-1 of the binary associated with the process changes).

In contrast to static/attribute information, certain types of data change constantly (e.g., network-related data). In various embodiments, agents are configured to report a list of current connections every minute (or other appropriate time interval). In that connection list will be connections that started in that minute interval, connections that ended in that minute interval, and connections that were ongoing throughout the minute interval (e.g., a one minute slice of a one hour connection).

In various embodiments, agents are configured to collect/compute statistical information about connections (e.g., at the one minute level of granularity and or at any other time interval). Examples of such information include, for the time interval, the number of bytes transferred, and in which direction. Another example of information collected by an agent about a connection is the length of time between packets. For connections that span multiple time intervals (e.g., a seven minute connection), statistics may be calculated for each minute of the connection. Such statistical information (for all connections) can be reported (e.g., to a data aggregator) once a minute.

In various embodiments, agents are also configured to maintain histogram data for a given network connection, and provide the histogram data (e.g., in the Apache Avro data exchange format) under the Connection event type data. Examples of such histograms include: 1. a packet length histogram (packet_len_hist), which characterizes network packet distribution; 2. a session length histogram (session_len_hist), which characterizes a network session length; 3. a session time histogram (session_time_hist), which characterizes a network session time; and 4. a session switch time histogram (session_switch_time_hist), which characterizes network session switch time (i.e., incoming→outgoing and vice versa). For example, histogram data may include one or more of the following fields: 1. count, which provides a count of the elements in the sampling; 2. sum, which provides a sum of elements in the sampling; 3. max, which provides the highest value element in the sampling; 4. std_dev, which provides the standard deviation of elements in the sampling; and 5. buckets, which provides a discrete sample bucket distribution of sampling data (if applicable).

For some protocols (e.g., HTTP), typically, a connection is opened, a string is sent, a string is received, and the connection is closed. For other protocols (e.g., NFS), both sides of the connection engage in a constant chatter. Histograms allow data platform 12 to model application behavior (e.g., using machine learning techniques), for establishing baselines, and for detecting deviations. As one example, suppose that a given HTTP server typically sends/receives 1,000 bytes (in each direction) whenever a connection is made with it. If a connection generates 500 bytes of traffic, or 2,000 bytes of traffic, such connections would be considered within the typical usage pattern of the server. Suppose, however, that a connection is made that results in 10G of traffic. Such a connection is anomalous and can be flagged accordingly.

Returning to FIG. 1D, as previously mentioned, data aggregator 114 may be configured to provide information (e.g., collected from nodes 108 by agents) to data platform 12. Data aggregator 128 may be similarly configured to provide information to data platform 12. As shown in FIG. 1D, both aggregator 114 and aggregator 128 may connect to a load balancer 130, which accepts connections from aggregators (and/or as applicable, agents), as well as other devices, such as computer 126 (e.g., when it communicates with web app 120), and supports fair balancing. In various embodiments, load balancer 130 is a reverse proxy that load balances accepted connections internally to various microservices (described in more detail below), allowing for services provided by data platform 12 to scale up as more agents are added to the environment and/or as more entities subscribe to services provided by data platform 12. Example ways to implement load balancer 130 include, but are not limited to, using HaProxy, using nginx, and using elastic load balancing (ELB) services made available by Amazon®.

Agent service 132 is a microservice that is responsible for accepting data collected from agents (e.g., provided by aggregator 114). In various embodiments, agent service 132 uses a standard secure protocol, such as HTTPS to communicate with aggregators (and, as applicable, agents), and receives data in an appropriate format such as Apache Avro. When agent service 132 receives an incoming connection, it can perform a variety of checks, such as to see whether the data is being provided by a current customer, and whether the data is being provided in an appropriate format. If the data is not appropriately formatted (and/or is not provided by a current customer), it may be rejected.

If the data is appropriately formatted, agent service 132 may facilitate copying the received data to a streaming data stable storage using a streaming service (e.g., Amazon Kinesis and/or any other suitable streaming service). Once the ingesting into the streaming service is complete, agent service 132 may send an acknowledgement to the data provider (e.g., data aggregator 114). If the agent does not receive such an acknowledgement, it is configured to retry sending the data to data platform 12. One way to implement agent service 132 is as a REST API server framework (e.g., Java® DropWizard), configured to communicate with Kinesis (e.g., using a Kinesis library).

In various embodiments, data platform 12 uses one or more streams (e.g., Kinesis streams) for all incoming customer data (e.g., including data provided by data aggregator 114 and data aggregator 128), and the data is sharded based on the node (also referred to herein as a "machine") that originated the data (e.g., node 116 vs. node 122), with each node having a globally unique identifier within data platform 12. Multiple instances of agent service 132 can write to multiple shards.

Kinesis is a streaming service with a limited period (e.g., 1-7 days). To persist data longer than a day, the data may be copied to long term storage 42 (e.g., Amazon S3™). Data loader 136 is a microservice that is responsible for picking up data from a data stream (e.g., a Kinesis stream) and persisting it in long term storage 42. In one example embodiment, files collected by data loader 136 from the Kinesis stream are placed into one or more buckets, and segmented using a combination of a customer identifier and time slice. Given a particular time segment, and a given customer identifier, the corresponding file (stored in long term storage) contains five minutes (or another appropriate time slice) of data collected at that specific customer from all of the customer's nodes. Data loader 136 can be implemented in any appropriate programming language, such as Java® or C, and can be configured to use a Kinesis library to interface with Kinesis. In various embodiments, data loader 136 uses the Amazon Simple Queue Service™ (SQS) (e.g., to alert DB loader 140 that there is work for it to do).

DB loader 140 is a microservice that is responsible for loading data into an appropriate data store 30, such as SnowflakeDB or Amazon Redshift™, using individual per-customer databases. In particular, DB loader 140 is configured to periodically load data into a set of raw tables from files created by data loader 136 as per above. DB loader 140 manages throughput, errors, etc., to make sure that data is loaded consistently and continuously. Further, DB loader 140 can read incoming data and load into data store 30 data that is not already present in tables of data store 30 (also referred to herein as a database). DB loader 140 can be implemented in any appropriate programming language, such as Java or C, and an SQL framework such as jOOQ™ (e.g., to manage SQLs for insertion of data), and SQL/JDBC libraries. In some examples, DB loader 140 may use Amazon S3™ and Amazon Simple Queue Service™ (SQS) to manage files being transferred to and from data store 30.

Customer data included in data store 30 can be augmented with data from additional data sources, such as AWS CloudTrail™ and/or other types of external tracking services. To this end, data platform may include a tracking service analyzer 144, which is another microservice. Tracking service analyzer 144 may pull data from an external tracking service (e.g., Amazon CloudTrail™) for each applicable customer account, as soon as the data is available. Tracking service analyzer 144 may normalize the tracking data as applicable, so that it can be inserted into data store 30 for later querying/analysis. Tracking service analyzer 144 can be written in any appropriate programming language, such as Java or C Tracking service analyzer 144 also makes use of SQL/JDBC libraries to interact with data store 30 to insert/query data.

As described herein, data platform 12 can model activities that occur within datacenters, such as datacenters 104 and 106. The model may be stable over time, and differences, even subtle ones (e.g., between a current state of the datacenter and the model) can be surfaced. The ability to surface such anomalies can be particularly beneficial in datacenter environments where rogue employees and/or external attackers may operate slowly (e.g., over a period of months), hoping that the elastic nature of typical resource use (e.g., virtualized servers) will help conceal their nefarious activities.

Using techniques described herein, data platform 12 can automatically discover entities (which may implement compute assets 16) deployed in a given datacenter. Examples of entities include workloads, applications, processes, machines, virtual machines, containers, files, IP addresses, domain names, and users. The entities may be grouped together logically (into analysis groups) based on behaviors, and temporal behavior baselines can be established. In particular, using techniques described herein, periodic graphs can be constructed (also referred to herein as polygraphs), in which the nodes are applicable logical entities, and the edges represent behavioral relationships between the logical entities in the graph. Baselines can be created for every node and edge.

Communication (e.g., between applications/nodes) is one example of a behavior. A model of communications between processes is an example of a behavioral model. As another example, the launching of applications is another example of a behavior that can be modeled. The baselines may be periodically updated (e.g., hourly) for every entity. Additionally or alternatively, the baselines may be continuously updated in substantially real-time as data is collected by agents. Deviations from the expected normal behavior can then be detected and automatically reported (e.g., as anomalies or threats detected). Such deviations may be due to a desired change, a misconfiguration, or malicious activity. As applicable, data platform 12 can score the detected deviations (e.g., based on severity and threat posed). Additional examples of analysis groups include models of machine communications, models of privilege changes, and models of insider behaviors (monitoring the interactive behavior of human users as they operate within the datacenter).

Two example types of information collected by agents are network level information and process level information. As previously mentioned, agents may collect information about every connection involving their respective nodes. And, for each connection, information about both the server and the client may be collected (e.g., using the connection-to-process identification techniques described above). DNS queries and responses may also be collected. The DNS query information can be used in logical entity graphing (e.g., collapsing many different IP addresses to a single service—e.g., s3.amazon.com). Examples of process level information collected by agents include attributes (user ID, effective user ID, and command line). Information such as what user/application is responsible for launching a given process and the binary being executed (and its SHA-256 values) may also provided by agents.

The dataset collected by agents across a datacenter can be very large, and many resources (e.g., virtual machines, IP addresses, etc.) are recycled very quickly. For example, an IP address and port number used at a first point in time by a first process on a first virtual machine may very rapidly be used (e.g., an hour later) by a different process/virtual machine.

Figure 2B:
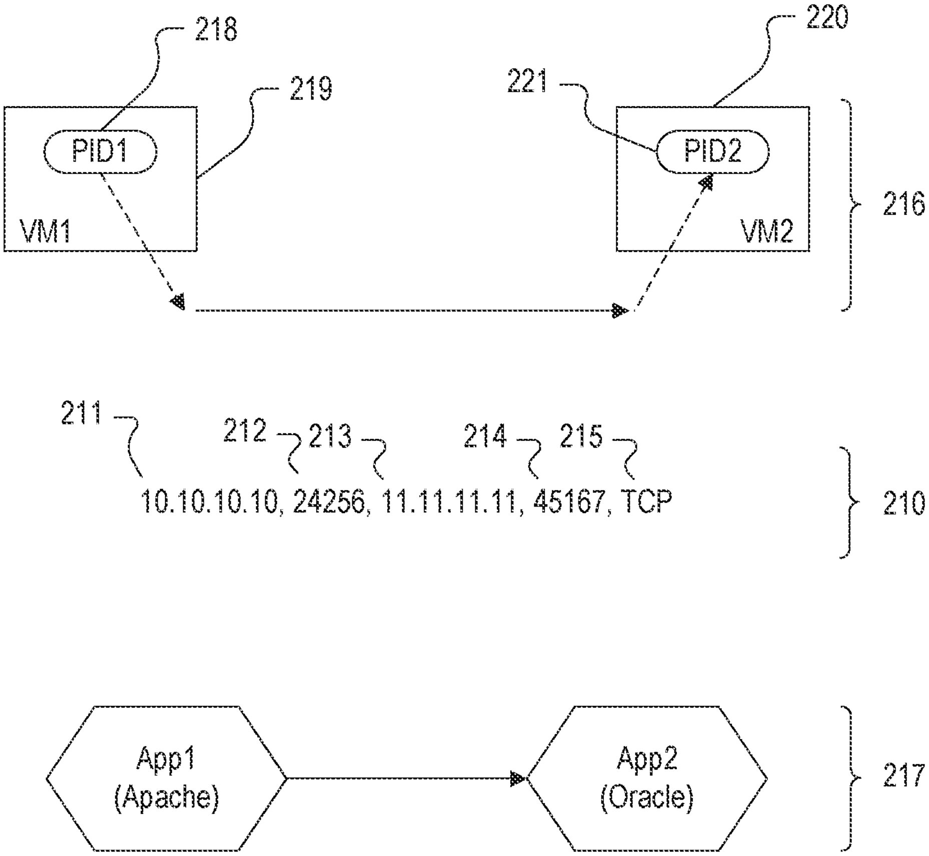
FIG. 2B illustrates a 5-tuple of data collected by an agent, physically and logically.

A dataset (and elements within it) can be considered at both a physical level, and a logical level as illustrated in FIG. 2B. In particular, FIG. 2B illustrates an example 5-tuple of data 210 collected by an agent, represented physically (216) and logically (217). The 5-tuple includes a source address 211, a source port 212, a destination address 213, a destination port 214, and a protocol 215. In some cases, port numbers (e.g., 212,214) may be indicative of the nature of a connection (e.g., with certain port usage standardized). However, in many cases, and in particular in datacenters, port usage is ephemeral For example, a Docker® container can listen on an ephemeral port, which is unrelated to the service it will run. Then another Docker® container starts (for the same service), the port may well be different. Similarly, particularly in a virtualized environment, IP addresses may be recycled frequently (and are thus also potentially ephemeral) or could be NATed, which makes identification difficult.

A physical representation of the 5-tuple is depicted in region 216. A process 218 (executing on machine 219) has opened a connection to machine 220. In particular, process 218 is in communication with process 221. Information such as the number of packets exchanged between the two machines over the respective ports can be recorded.

As previously mentioned, in a datacenter environment, portions of the 5-tuple may change—potentially frequently—but still be associated with the same behavior. Namely, one application (e.g., Apache) may frequently be in communication with another application (e.g., Oracle), using ephemeral datacenter resources. Further, either/both of Apache and Oracle may be multi-homed. This can lead to potentially thousands of 5-tuples (or more) that all correspond to Apache communicating with Oracle within a datacenter. For example, Apache could be executed on a single machine, and could also be executed across fifty machines, which are variously spun up and down (with different IP addresses each time). An alternate representation of the 5-tuple of data 210 is depicted in region 217, and is logical. The logical representation of the 5-tuple aggregates the 5-tuple (along with other connections between Apache and Oracle having other 5-tuples) as logically representing the same connection. By aggregating data from raw physical connection information into logical connection information, using techniques described herein, a size reduction of six orders of magnitude in the data set can be achieved.

Figure 2C:
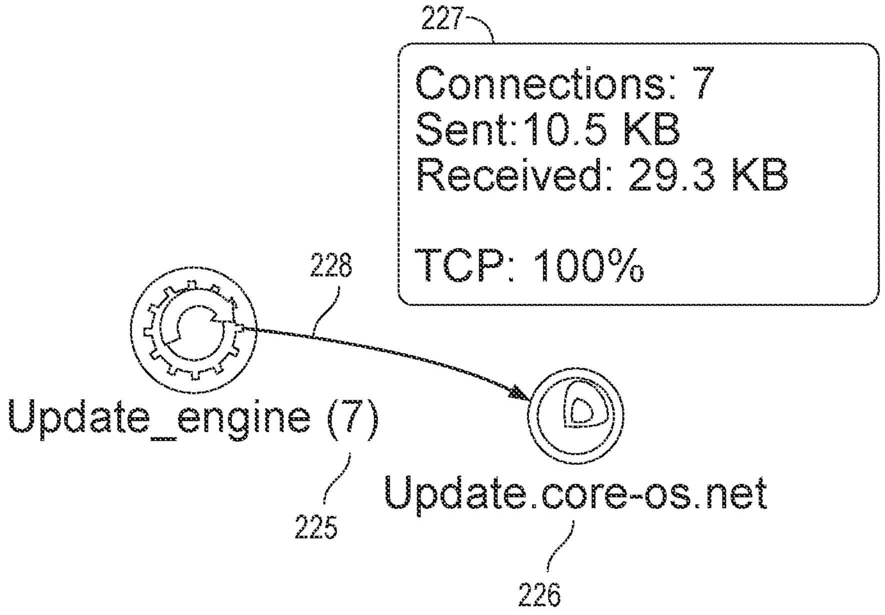
FIG. 2C illustrates a portion of a polygraph.

FIG. 2C depicts a portion of a logical polygraph. Suppose a datacenter has seven instances of the application update_engine 225, executing as seven different processes on seven different machines, having seven different IP addresses, and using seven different ports. The instances of update_engine variously communicate with update.coreos.net 226, which may have a single IP address or many IP addresses itself, over the one hour time period represented in the polygraph. In the example shown in FIG. 2C, update_engine is a client, connecting to the server update.coreos.net, as indicated by arrow 228.

Behaviors of the seven processes are clustered together, into a single summary. As indicated in region 227, statistical information about the connections is also maintained (e.g., number of connections, histogram information, etc.). A polygraph such as is depicted in FIG. 2C can be used to establish a baseline of behavior (e.g., at the one-hour level), allowing for the future detection of deviations from that baseline. As one example, suppose that statistically an update engine instance transmits data at 11 bytes per second. If an instance were instead to transmit data at 1000 bytes per second, such behavior would represent a deviation from the baseline and could be flagged accordingly. Similarly, changes that are within the baseline (e.g., an eighth instance of update_engine appears, but otherwise behaves as the other instances; or one of the seven instances disappears) are not flagged as anomalous. Further, datacenter events, such as failover, autobalancing, and A-B refresh are unlikely to trigger false alarms in a polygraph, as at the logical level, the behaviors remain the same.

Figure 2D:
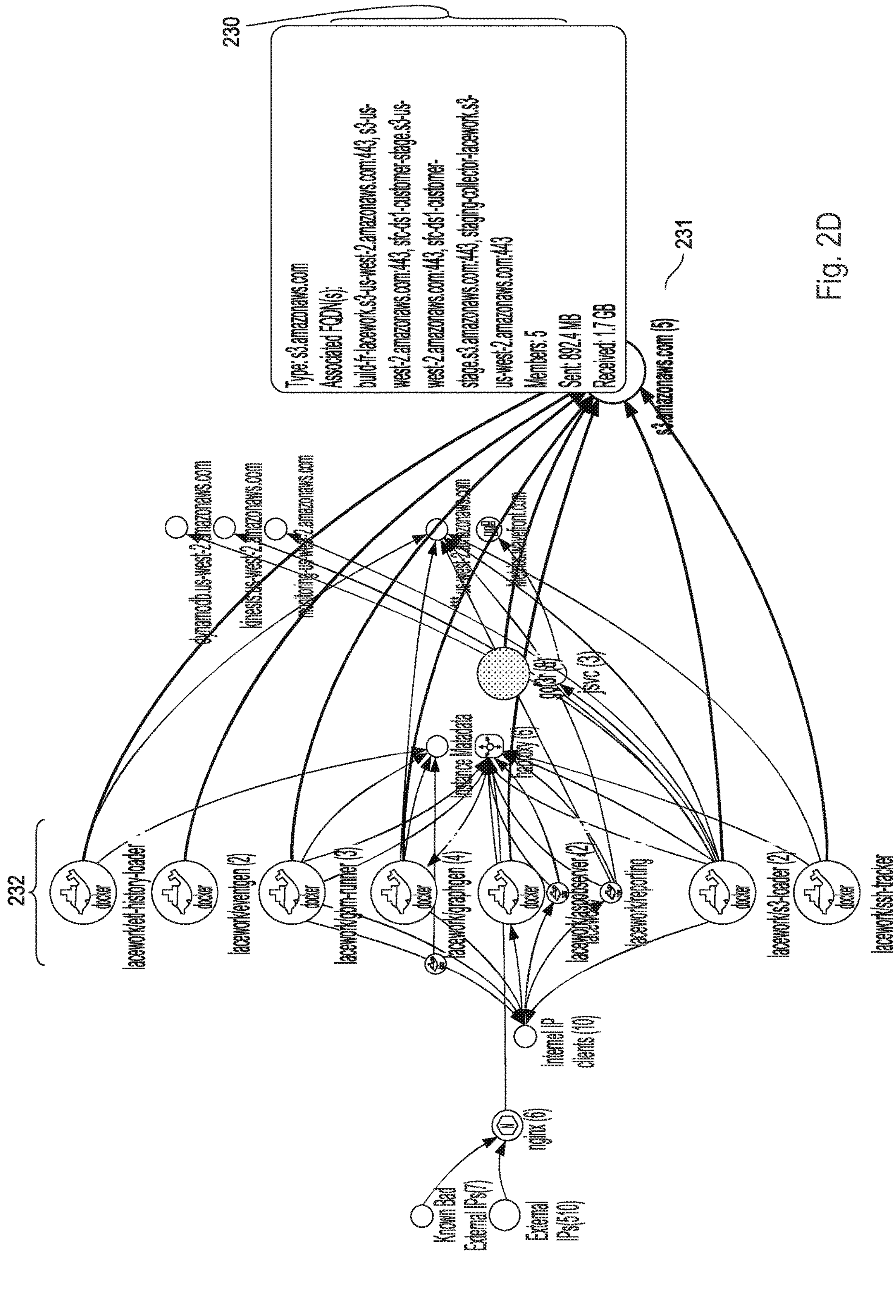
FIG. 2D illustrates a portion of a polygraph.

In various embodiments, polygraph data is maintained for every application in a datacenter, and such polygraph data can be combined to make a single datacenter view across all such applications. FIG. 2D illustrates a portion of a polygraph for a service that evidences more complex behaviors than are depicted in FIG. 2C. In particular, FIG. 2D illustrates the behaviors of S3 as a service (as used by a particular customer datacenter). Clients within the datacenter variously connect to the S3 service using one of five fully qualified domains (listed in region 230). Contact with any of the domains is aggregated as contact with S3 (as indicated in region 231). Depicted in region 232 are various containers which (as clients) connect with S3. Other containers (which do not connect with S3) are not included. As with the polygraph portion depicted in FIG. 2C, statistical information about the connections is known and summarized, such as the number of bytes transferred, histogram information, etc.

Figure 2E:
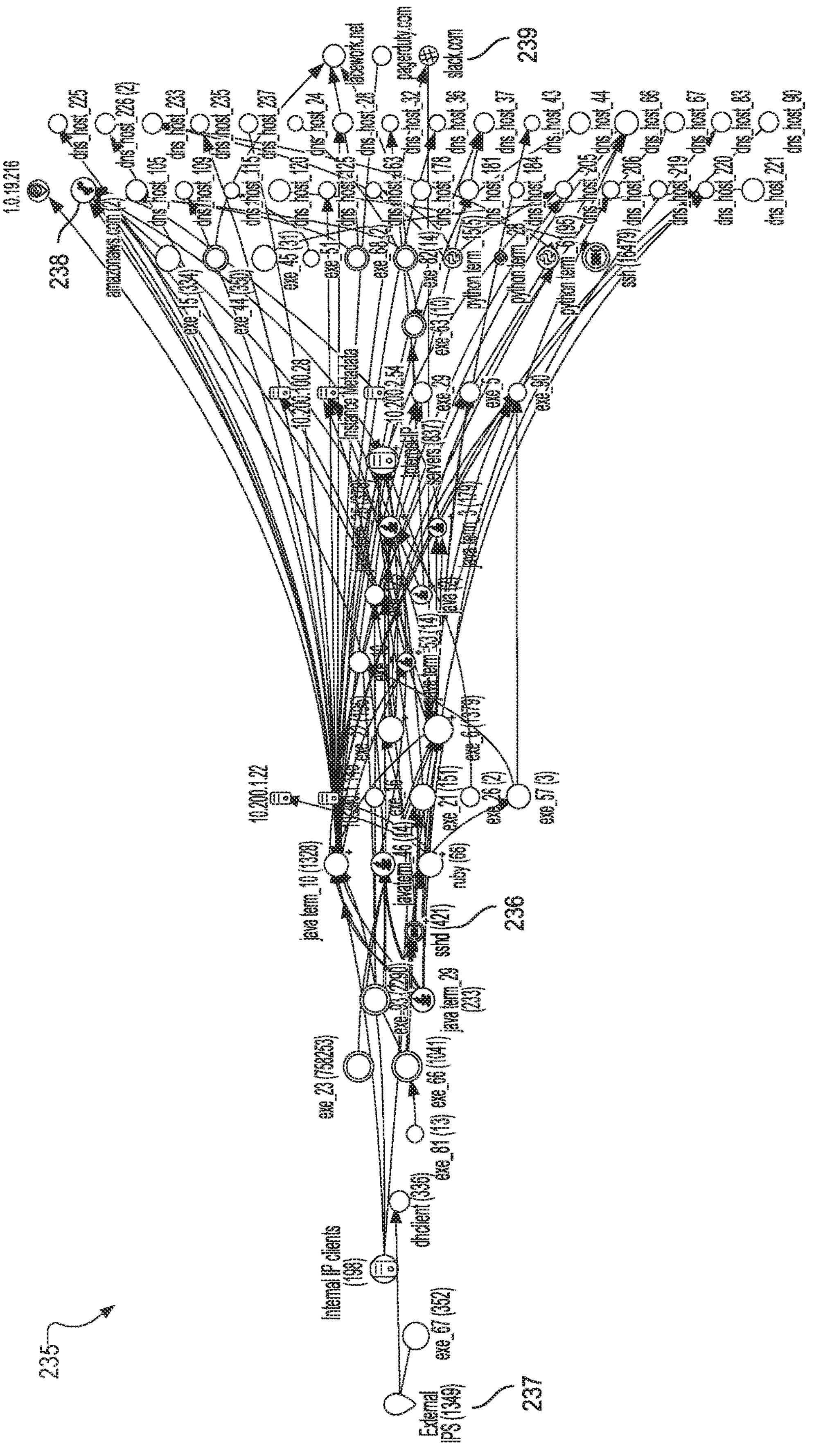
FIG. 2E illustrates an example of a communication polygraph.

FIG. 2E illustrates a communication polygraph for a datacenter. In particular, the polygraph indicates a one hour summary of approximately 500 virtual machines, which collectively run one million processes, and make 100 million connections in that hour. As illustrated in FIG. 2E, a polygraph represents a drastic reduction in size (e.g., from tracking information on 100 million connections in an hour, to a few hundred nodes and a few hundred edges). Further, as a datacenter scales up (e.g., from using 10 virtual machines to 100 virtual machines as the datacenter uses more workers to support existing applications), the polygraph for the datacenter will tend to stay the same size (with the 100 virtual machines clustering into the same nodes that the 10 virtual machines previously clustered into). As new applications are added into the datacenter, the polygraph may automatically scale to include behaviors involving those applications.

In the particular polygraph shown in FIG. 2E, nodes generally correspond to workers, and edges correspond to communications the workers engage in (with connection activity being the behavior modeled in polygraph 235). Another example polygraph could mode! other behavior, such as application launching. The communications graphed in FIG. 2E include traffic entering the datacenter, traffic exiting the datacenter, and traffic that stays wholly within the datacenter (e.g., traffic between workers). One example of a node included in polygraph 235 is the sshd application, depicted as node 236. As indicated in FIG. 2E, 421 instances of sshd were executing during the one hour time period of data represented in polygraph 235. As indicated in region 237, nodes within the datacenter communicated with a total of 1349 IP addresses outside of the datacenter (and not otherwise accounted for, e.g., as belonging to a service such as Amazon AWS™ 238 or Slack™ 239).

In the following examples, suppose that user B, an administrator of datacenter 106, is interacting with data platform 12 to view visualizations of polygraphs in a web browser (e.g., as served to user B via web app 120). One type of polygraph user B can view is an application-communication polygraph, which indicates, for a given one hour window (or any other suitable time interval), which applications communicated with which other applications. Another type of polygraph user B can view is an application launch polygraph. User B can also view graphs related to user behavior, such as an insider behavior graph which tracks user connections (e.g., to internal and external applications, including chains of such behavior), a privilege change graph which tracks how privileges change between processes, and a user login graph, which tracks which (logical) machines a user logs into.

Figure 2F:
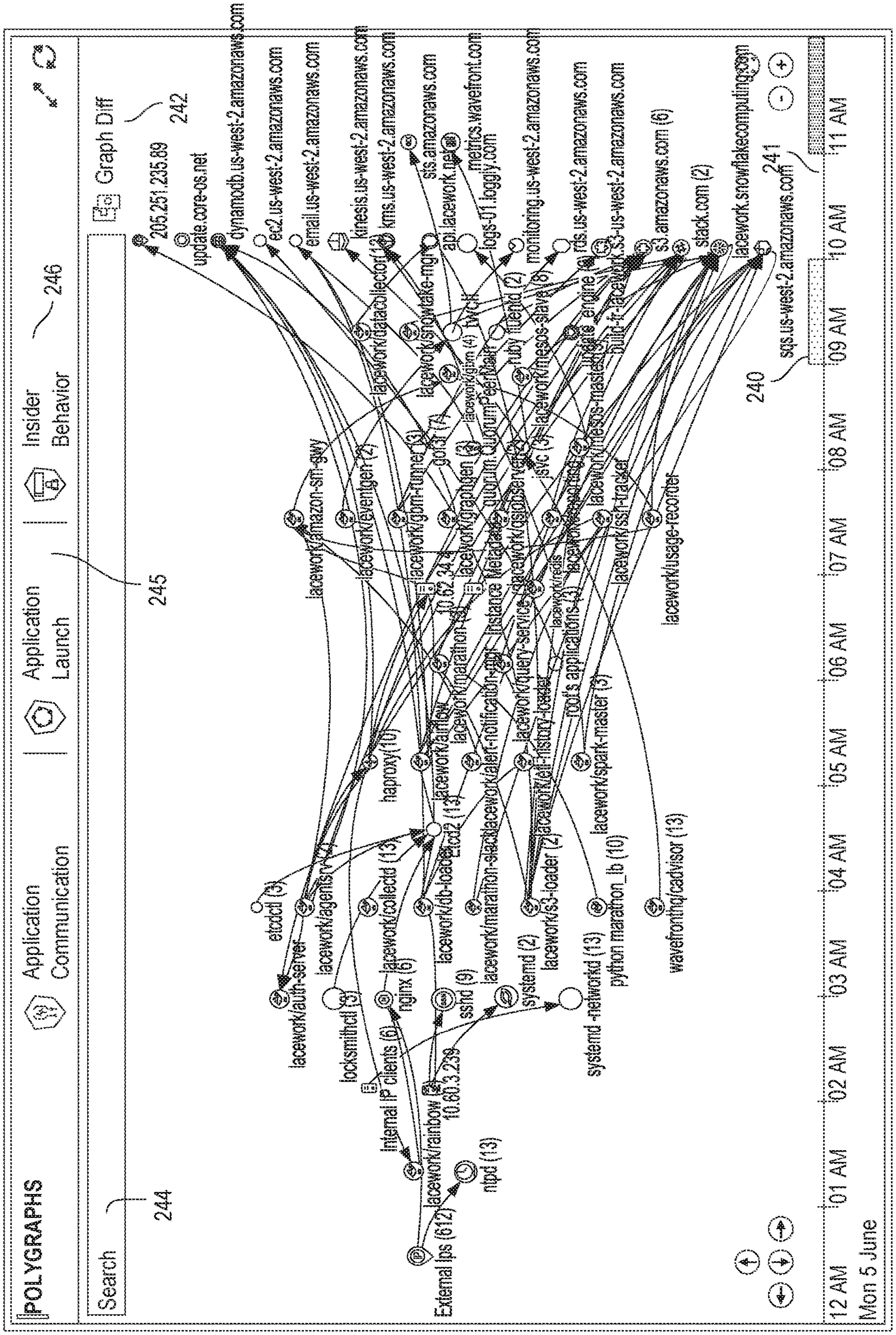
FIG. 2F illustrates an example of a polygraph.

FIG. 2F illustrates an example of an application-communication polygraph for a datacenter (e.g., datacenter 106) for the one hour period of 9 am-10 am on June 5. The time slice currently being viewed is indicated in region 240. If user B clicks his mouse in region 241, user B will be shown a representation of the application-communication polygraph as generated for the following hour (10 am-11 am on June 5).

Figure 2G:
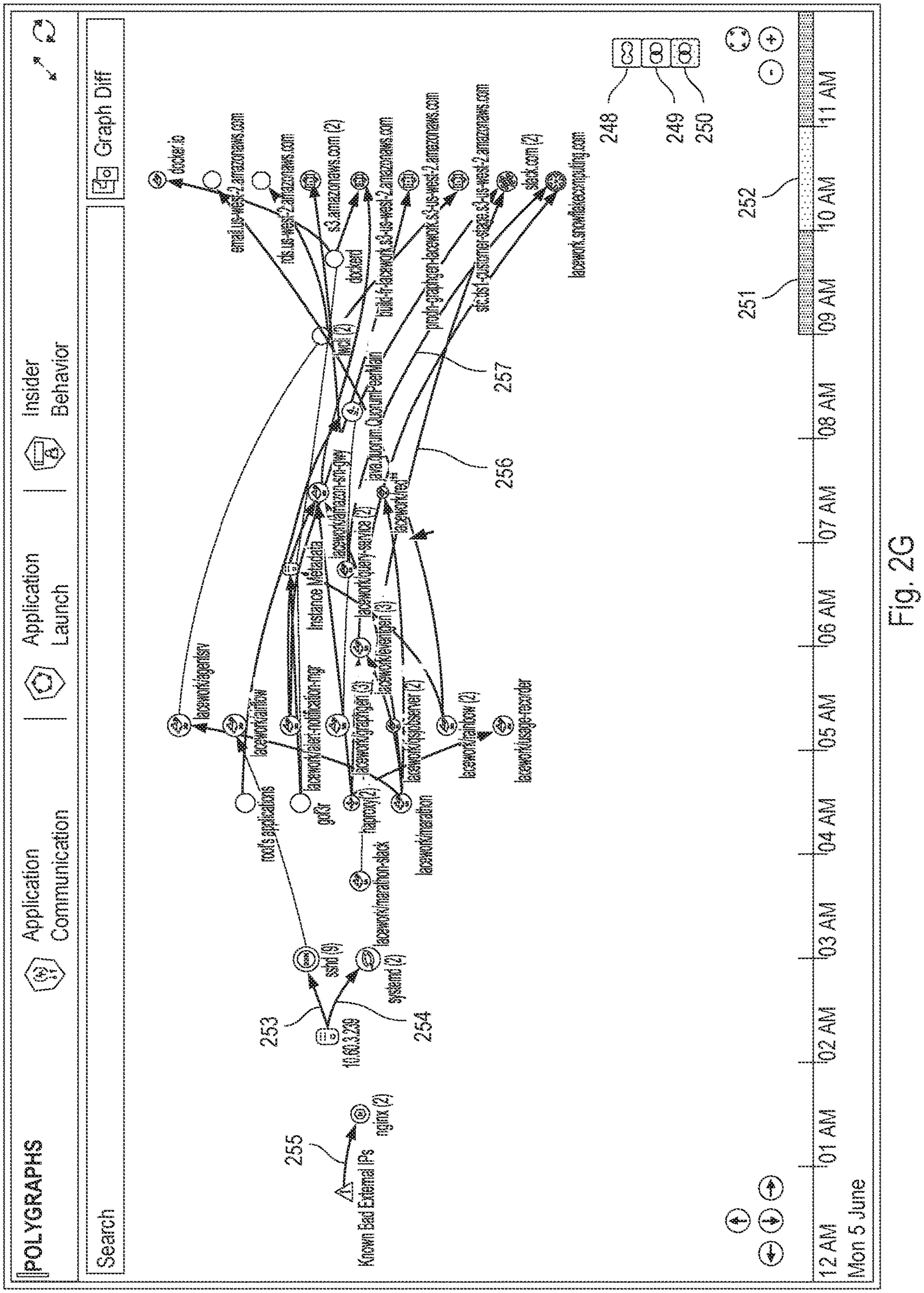
FIG. 2G illustrates an example of a polygraph as rendered in an interface.

FIG. 2G depicts what is shown in user B's browser after he has clicked on region 241, and has further clicked on region 242. The selection in region 242 turns on and off the ability to compare two time intervals to one another. User B can select from a variety of options when comparing the 9 am-10 am and 10 am-11 am time intervals. By clicking region 248, user B will be shown the union of both graphs (i.e., any connections that were present in either time interval). By clicking region 249, user B will be shown the intersection of both graphs (i.e., only those connections that were present in both time intervals).

As shown in FIG. 2G, user B has elected to click on region 250, which depicts connections that are only present in the 9 am-10 am polygraph in a first color 251, and depicts connections that are only present in the 10 am-11 am polygraph in a second color 252. Connections present in both polygraphs are omitted from display. As one example, in the 9 am-10 am polygraph (corresponding to connections made during the 9 am-10 am time period at datacenter 106), a connection was made by a server to sshd (253) and also to systemd (254). Both of those connections ended prior to 10 am and are thus depicted in the first color. As another example, in the 10 am-11 am polygraph (corresponding to connections made during the 10 am-11 am time period at datacenter 106), a connection was made from a known bad external IP to nginx (255). The connection was not present during the 9 am-10 am time slice and thus is depicted in the second color. As yet another example, two different connections were made to a Slack service between 9 am and 11 am. However, the first was made by a first client during the 9 am-10 am time slice (256) and the second was made by a different client during the 10 am-11 am slice (257), and so the two connections are depicted respectively in the first and second colors and blue.

Figure 2H:
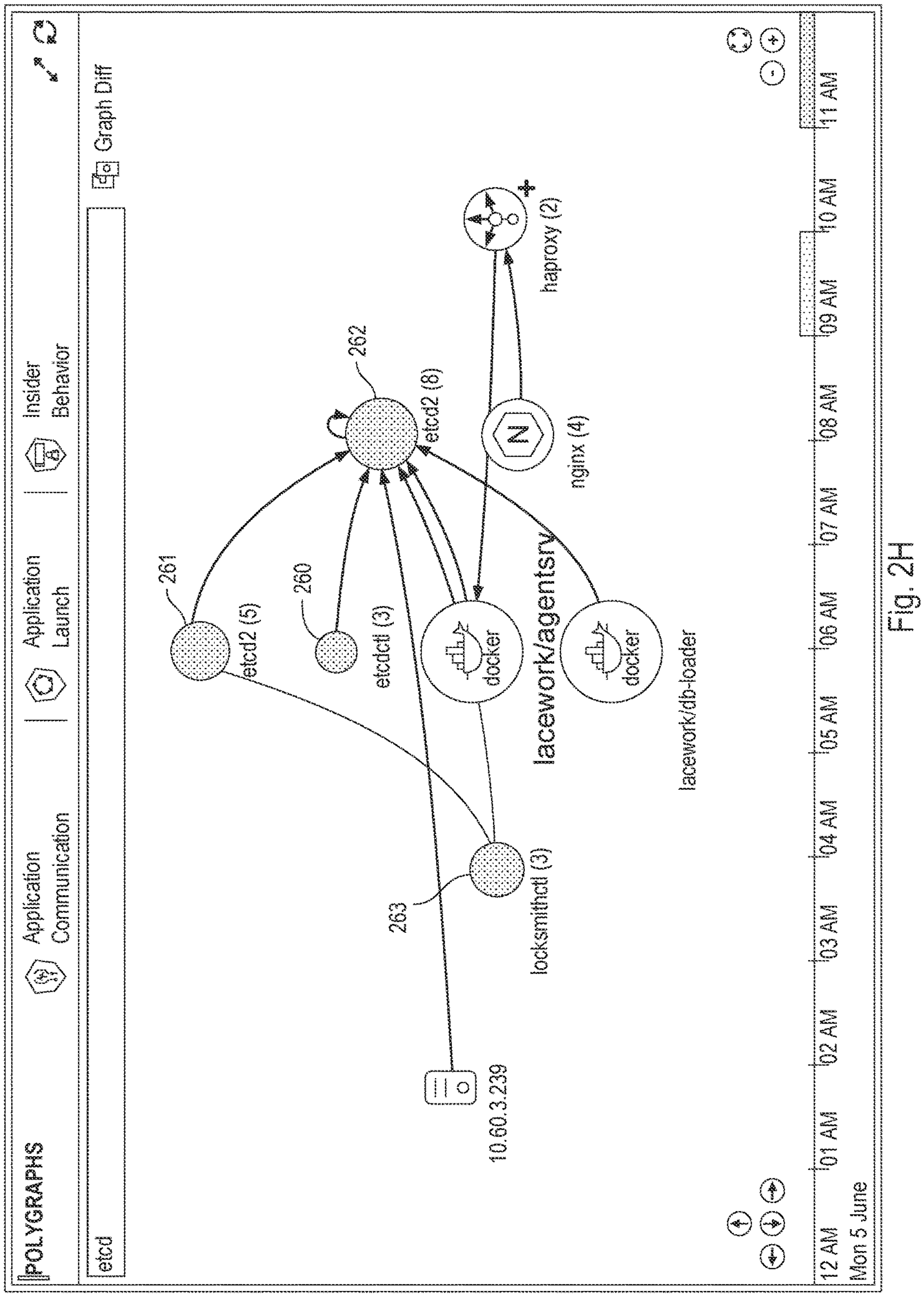
FIG. 2H illustrates an example of a portion of a polygraph as rendered in an interface.
Figure 2I:
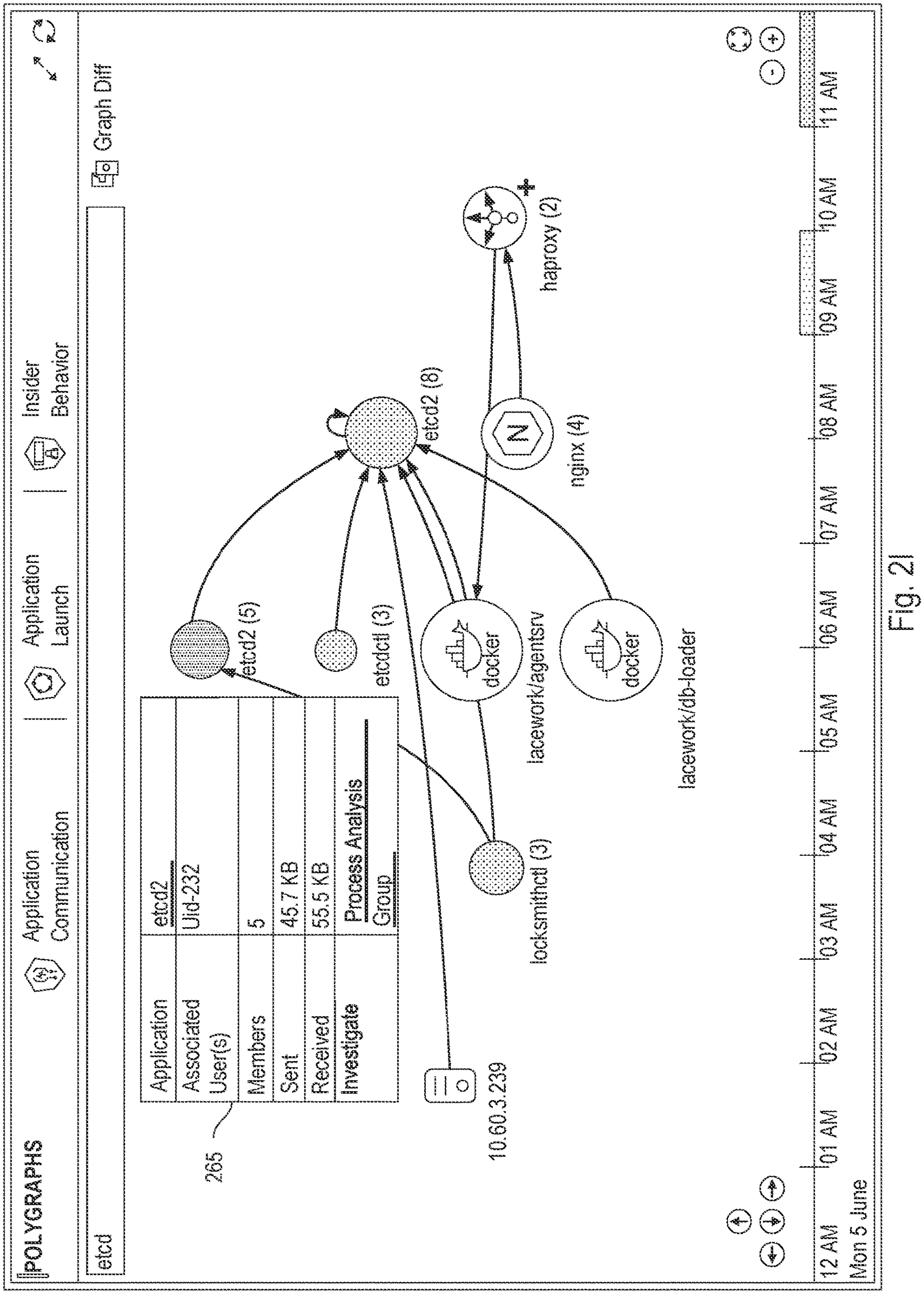
FIG. 2I illustrates an example of a portion of a polygraph as rendered in an interface.

Returning to the polygraph depicted in FIG. 2F, suppose user B enters "etcd" into the search box located in region 244. User B will then be presented with the interface illustrated in FIG. 2H. As shown in FIG. 2H, three applications containing the term "etcd" were engaged in communications during the 9 am-10 am window. One application is etcdctl, a command line client for etcd. As shown in FIG. 2H, a total of three different etcdctl processes were executed during the 9 am-10 am window, and \Vere clustered together (260). FIG. 2H also depicts two different clusters that are both named etcd2. The first cluster includes (for the 9 am-10 am window) five members (261) and the second cluster includes (for the same window) eight members (262). The reason for these two distinct clusters is that the two groups of applications behave differently (e.g., they exhibit two distinct sets of communication patterns). Specifically, the instances of etcd2 in cluster 261 only communicate with locksmithctl (263) and other etcd2 instances (in both clusters 261 and 262). The instances of etcd2 in duster 262 communicate with additional entities, such as etcdctl and Docker® containers. As desired, user B can click on one of the clusters (e.g., cluster 261) and be presented with summary information about the applications included in the cluster, as is shown in FIG. 2I (e.g., in region 265). User B can also double click on a given cluster (e.g., cluster 261) to see details on each of the individual members of the cluster broken out.

Figure 2J:
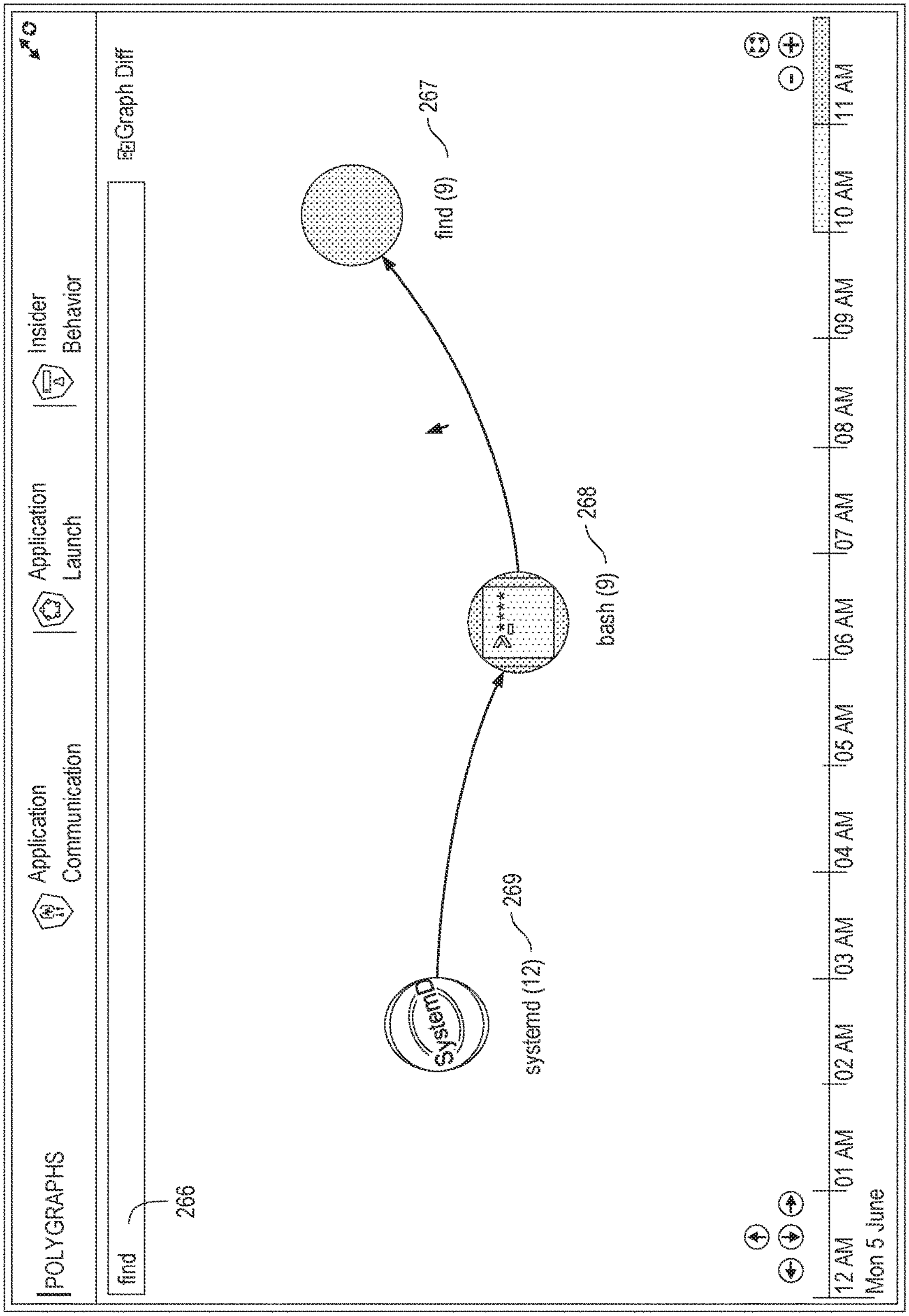
FIG. 2J illustrates an example of a portion of a polygraph as rendered in an interface.

Suppose user B now clicks on region 245 of the interface shown in FIG. 2F. User B will then be shown an application launch polygraph. Launching an application is another example of a behavior. The launch polygraph models how applications are launched by other applications. FIG. 2J illustrates an example of a portion of a launch polygraph. In particular, user B has typed "find" into region 266, to see how the "find" application is being launched. As shown in FIG. 2J, in the launch polygraph for the 10 am-11 am time period, find applications (267) are always launched by bash (268), which is in turn always launched by systemd (269). If find is launched by a different application, this would be anomalous behavior.

Figure 2K:
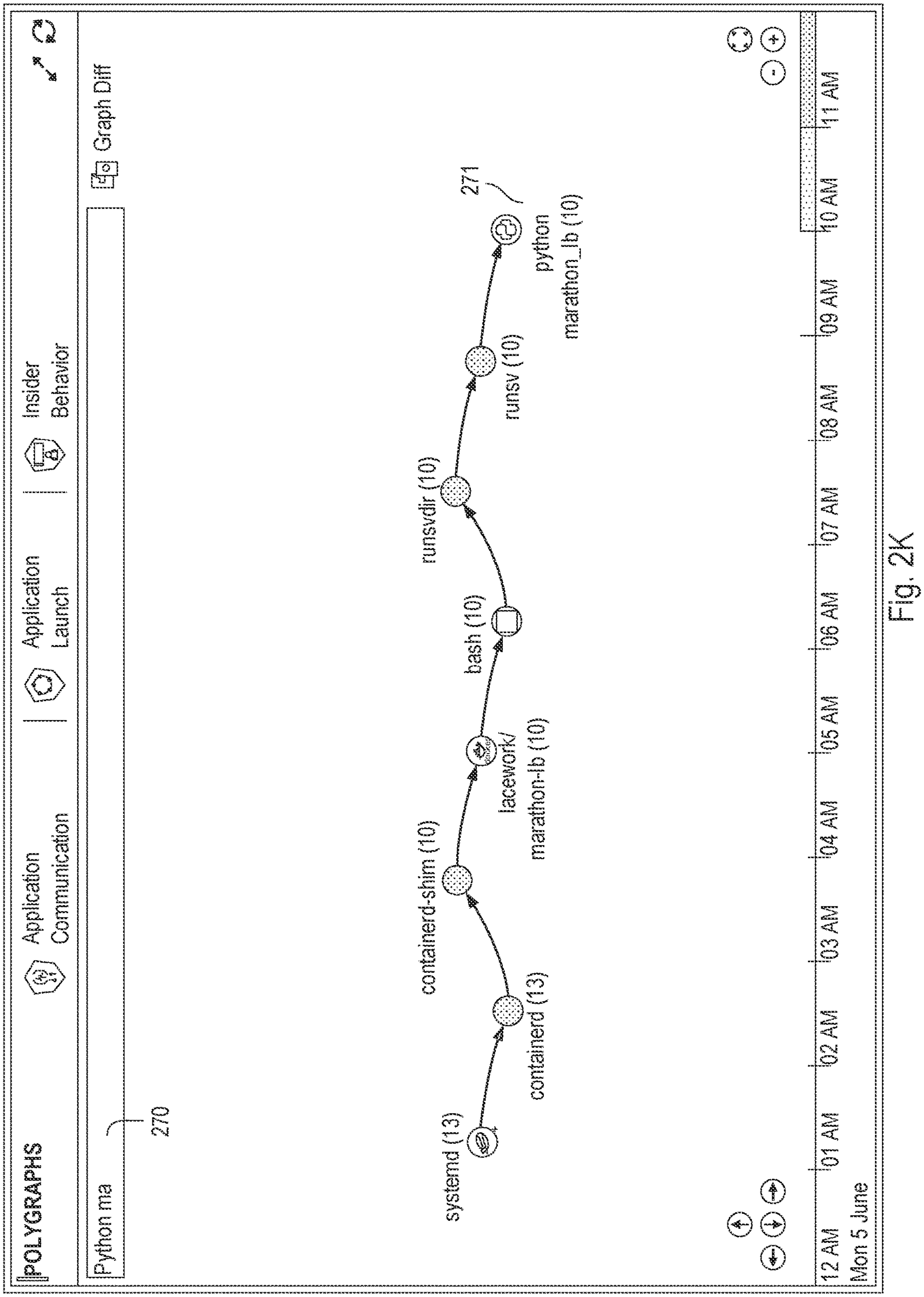
FIG. 2K illustrates an example of a portion of a polygraph as rendered in an interface.

FIG. 2K illustrates another example of a portion of an application launch polygraph. In FIG. 2K, user B has searched (270) for "python ma" to see how "python marathon_lb" (271) is launched. As shown in FIG. 2K, in each case (during the one hour time slice of 10 am-11 am), python marathon_lb is launched as a result of a chain of the same seven applications each time. If python marathon_lb is ever launched in a different manner, this indicates anomalous behavior. The behavior could be indicative of malicious activities, but could also be due to other reasons, such as a misconfiguration, a performance-related issue, and/or a failure, etc.

Suppose user B now clicks on region 246 of the interface shown in FIG. 2F. User B will then be shown an insider behavior graph. The insider behavior graph tracks information about behaviors such as processes started by a user interactively using protocols such as ssh or telnet, and any processes started by those processes. As one example, suppose an administrator logs into a first virtual machine in datacenter 106 (e.g., using sshd via an external connection he makes from a hotel), using a first set of credentials (e.g., first.last@example.com and an appropriate password). From the first virtual machine, the administrator connects to a second virtual machine (e.g., using the same credentials), then uses the sudo command to change identities to those of another user, and then launches a program. Graphs built by data platform 12 can be used to associate the administrator with each of his actions, including launching the program using the identity of another user.

Figure 2L:
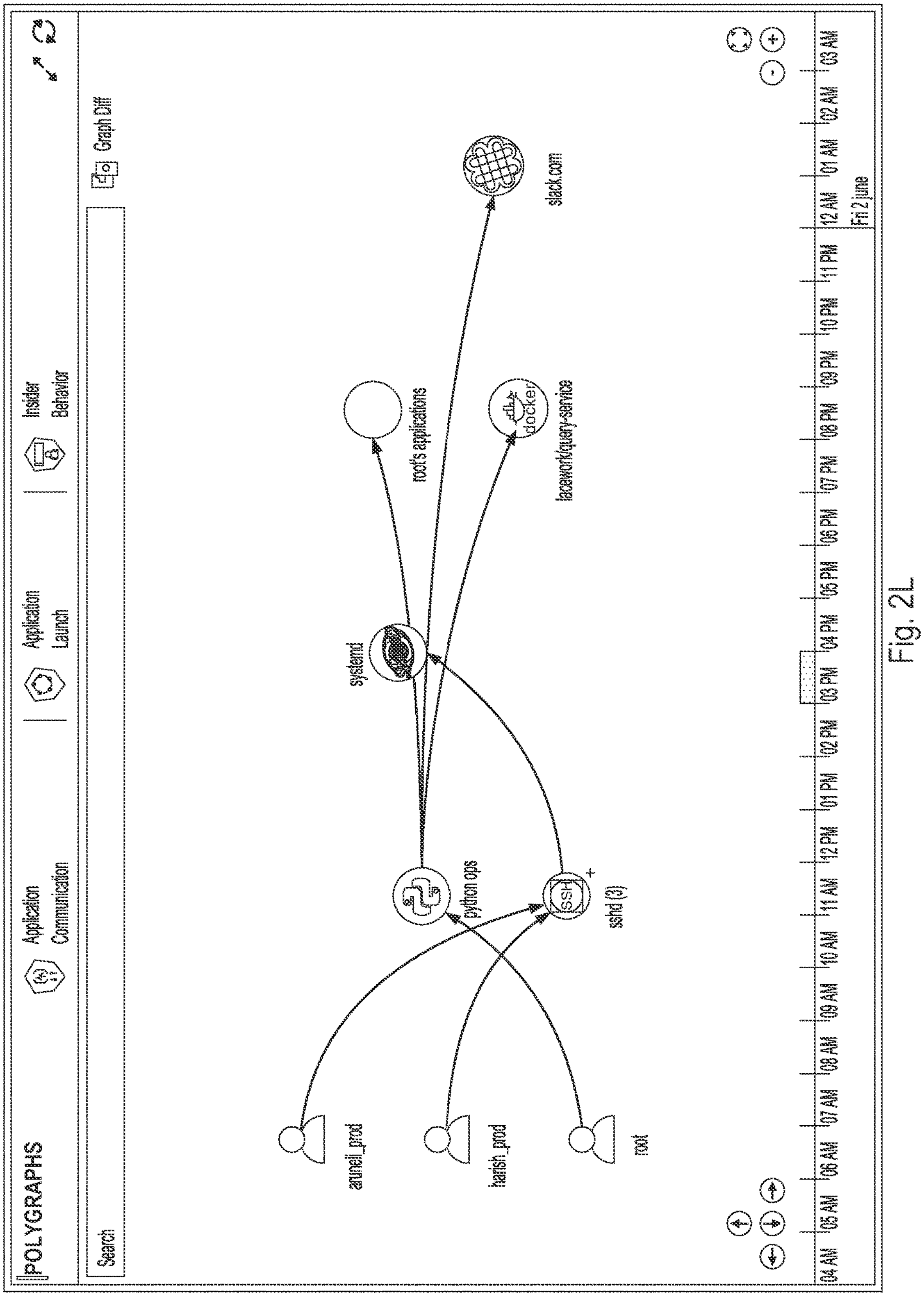
FIG. 2L illustrates an example of an insider behavior graph as rendered in an interface.

FIG. 2L illustrates an example of a portion of an insider behavior graph. In particular, in FIG. 2L, user B is viewing a graph that corresponds to the time slice of 3 pm-4 pm on June 1. FIG. 2L illustrates the internal/external applications that users connected to during the one hour time slice. If a user typically communicates with particular applications, that information will become part of a baseline. If the user deviates from his baseline behavior (e.g., using new applications, or changing privilege in anomalous ways), such anomalies can be surfaced.

Figure 2M:
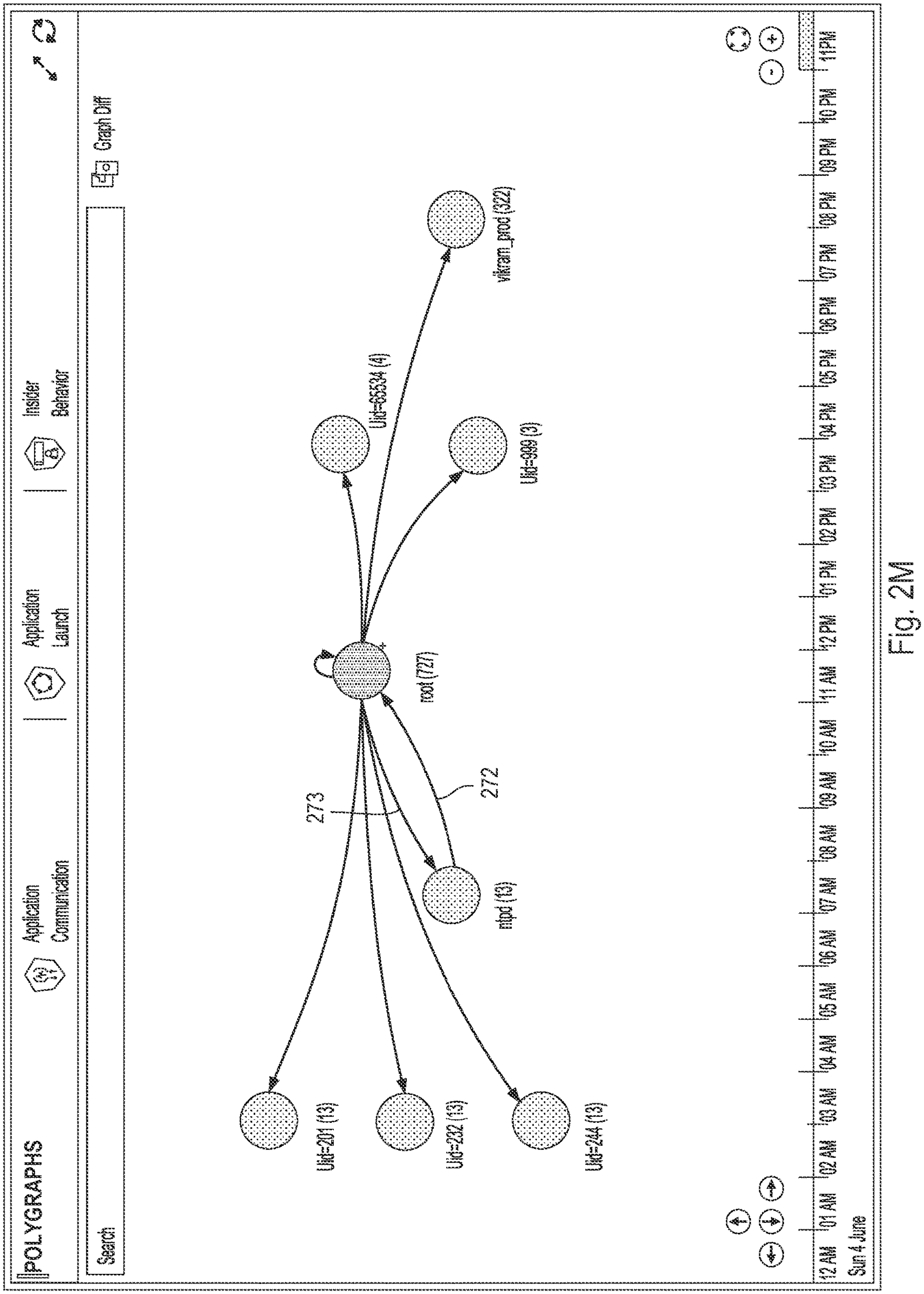
FIG. 2M illustrates an example of a privilege change graph as rendered in an interface.

FIG. 2M illustrates an example of a portion of a privilege change graph, which identifies how privileges are changed between processes. Typically, when a user launches a process (e.g., "Is"), the process inherits the same privileges that the user has. And, while a process can have fewer privileges than the user (i.e., go down in privilege), it is rare (and generally undesirable) for a user to escalate in privilege. Information included in the privilege change graph can be determined by examining the parent of each running process, and determining whether there is a match in privilege between the parent and the child. If the privileges are different, a privilege change has occurred (whether a change up or a change down). The application ntpd is one rare example of a scenario in which a process escalates (272) to root, and then returns back (273). The sudo command is another example (e.g., used by an administrator to temporarily have a higher privilege). As with the other examples, ntpd's privilege change actions, and the legitimate actions of various administrators (e.g., using sudo) will be incorporated into a baseline model by data platform 12. When deviations occur, such as where a new application that is not ntpd escalates privilege, or where an individual that has not previously/does not routinely use sudo does so, such behaviors can be identified as anomalous.

Figure 2N:
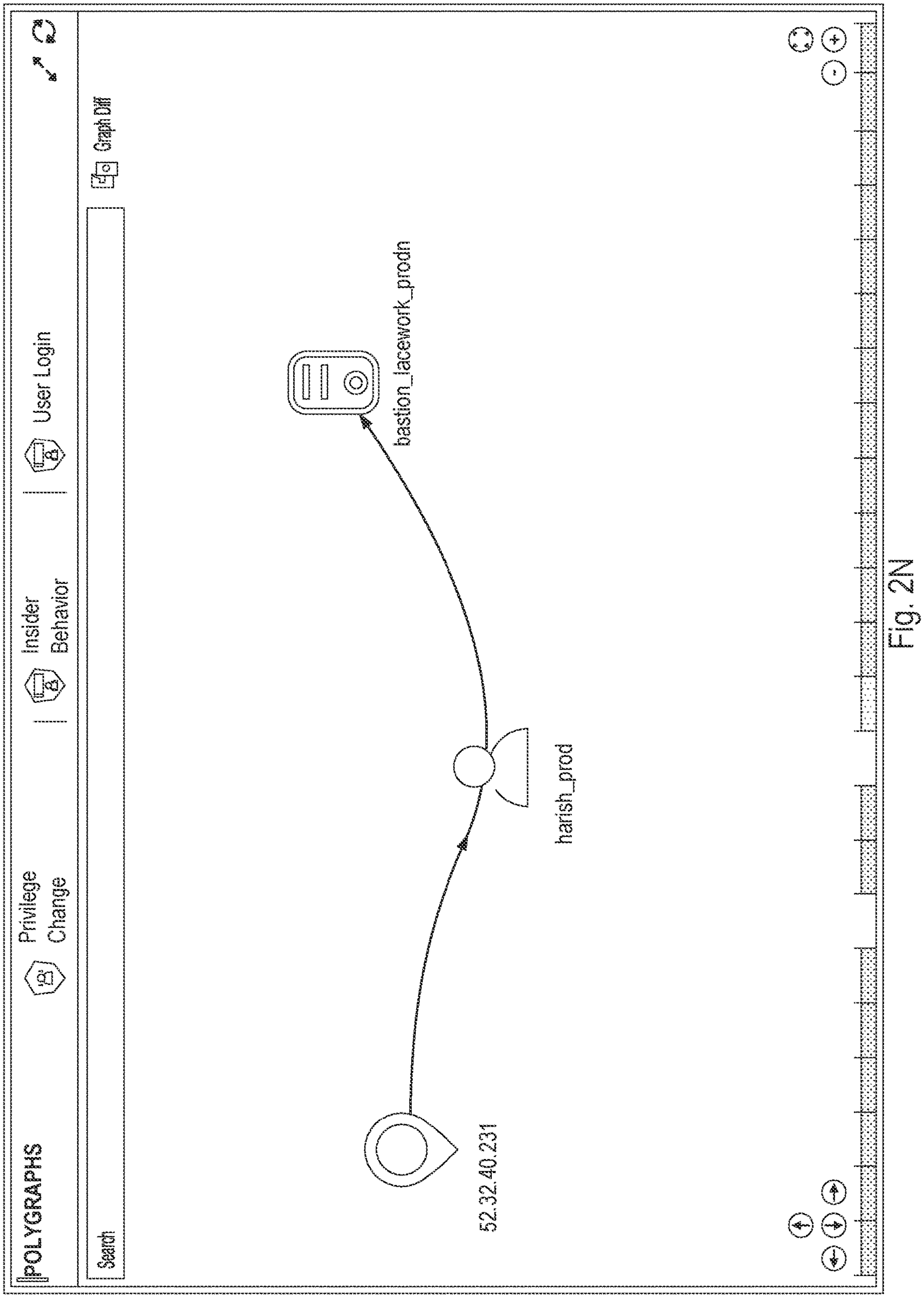
FIG. 2N illustrates an example of a user login graph as rendered in an interface.
Figure 20:
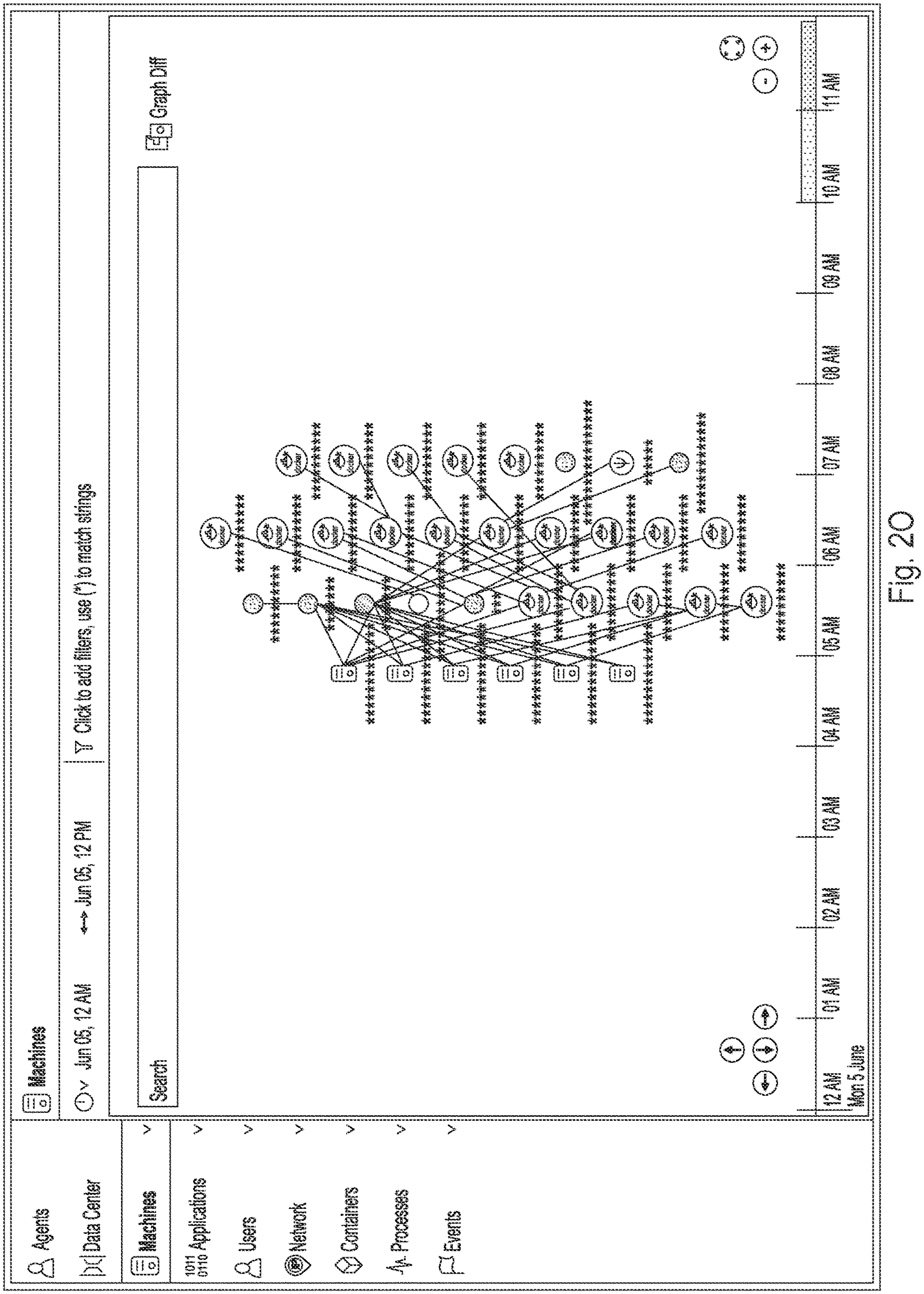

FIG. 2N illustrates an example of a portion of a user login graph, which identifies which users log into which logical nodes. Physical nodes (whether bare metal or virtualized) are clustered into a logical machine duster, for example, using yet another graph, a machine-server graph, an example of which is shown in FIG. 20. For each machine, a determination is made as to what type of machine it is, based on what kind(s) of workflows it runs. As one example, some machines run as master nodes (having a typical set of workflows they run, as master nodes) and can thus be clustered as master nodes. Worker nodes are different from master nodes, for example, because they run Docker® containers, and frequently change as containers move around. Worker nodes can similarly be clustered.

As previously mentioned, the polygraph depicted in FIG. 2E corresponds to activities in a datacenter in which, in a given hour, approximately 500 virtual machines collectively run one million processes, and make 100 million connections in that hour. The polygraph represents a drastic reduction in size (e.g., from tracking information on 100 million connections in an hour, to a few hundred nodes and a few hundred edges). Using techniques described herein, such a polygraph can be constructed (e.g., using commercially available computing infrastructure) in less than an hour (e.g., within a few minutes). Thus, ongoing hourly snapshots of a datacenter can be created within a two hour moving window (i.e., collecting data for the time period 8 am-9 am, while also generating a snapshot for the time previous time period 7 am-8 am). The following describes various example infrastructure that can be used in polygraph construction, and also describes various techniques that can be used to construct polygraphs.

Returning to FIG. 1D, embodiments of data platform 12 may be built using any suitable infrastructure as a service (faaS) (e.g., AWS). For example, data platform 12 can use Amazon Simple Storage Service (S3)™ for data storage, Key Management Service (KMS) for managing secrets, Amazon Simple Queue Service™ (SQS) for managing messaging between applications, Simple Email Service (SES) for sending emails, and Route 53 for managing DNS. Other infrastructure tools can also be used. Examples include: orchestration tools (e.g., Kubernetes® or Mesos®/Marathon), service discovery tools (e.g., Mesos®-DNS), service load balancing tools (e.g., marathon-LB), container tools (e.g., Docker® or rkt), log/metric tools (e.g., collectd, fluentd, Kibana™, etc.), big data processing systems (e.g., Apache Spark™, Hadoop®, AWS Redshift™, Snowflake™ etc.), and distributed key value stores (e.g., Apache Zookeeper™ or etcd2).

As previously mentioned, in various embodiments, data platform 12 may make use of a collection of microservices. Each microservice can have multiple instances, and may be configured to recover from failure, scale, and distribute work amongst various such instances, as applicable. For example, microservices are auto-balancing for new instances, and can distribute workload if new instances are started or existing instances are terminated. In various embodiments, microservices may be deployed as self-contained Docker® containers. A Mesos®-Marathon or Apache Spark™ framework can be used to deploy the microservices (e.g., with Marathon monitoring and restarting failed instances of microservices as needed). The service etcd2 can be used by microservice instances to discover how many peer instances are running, and used for calculating a hash-based scheme for workload distribution. Microservices may be configured to publish various health/status metrics to either an SQS queue, or etcd2, as applicable. In some examples, Amazon DynamoDB™ can be used for state management.

Additional information on various microservices used in embodiments of data platform 12 is provided below.

Graph generator 146 is a microservice that may be responsible for generating raw behavior graphs on a per customer basis periodically (e.g., once an hour). In particular, graph generator 146 may generate graphs of entities (as the nodes in the graph) and activities between entities (as the edges). In various embodiments, graph generator 146 also performs other functions, such as aggregation, enrichment (e.g., geolocation and threat), reverse DNS resolution, TF-IDF based command line analysis for command type extraction, parent process tracking, etc.

Graph generator 146 may perform joins on data collected by the agents, so that both sides of a behavior are linked. For example, suppose a first process on a first virtual machine (e.g., having a first IP address) communicates with a second process on a second virtual machine (e.g., having a second IP address). Respective agents on the first and second virtual machines may each report information on their view of the communication (e.g., the PID of their respective processes, the amount of data exchanged and in which direction, etc.). When graph generator performs a join on the data provided by both agents, the graph will include a node for each of the processes, and an edge indicating communication between them (as well as other information, such as the directionality of the communication—i.e., which process acted as the server and which as the client in the communication).

In some cases, connections are process to process (e.g., from a process on one virtual machine within the cloud environment associated with entity A to another process on a virtual machine within the cloud environment associated with entity A). In other cases, a process may be in communication with a node (e.g., outside of entity A) which does not have an agent deployed upon it. As one example, a node within entity A might be in communication with node 172, outside of entity A. In such a scenario, communications with node 172 are modeled (e.g., by graph generator 146) using the IP address of node 172. Similarly, where a node within entity A does not have an agent deployed upon it, the IP address of the node can be used by graph generator in modeling.

Graphs created by graph generator 146 may be written to data store 30 and cached for further processing. A graph may be a summary of all activity that happened in a particular time interval. As each graph corresponds to a distinct period of time, different rows can be aggregated to find summary information over a larger timestamp. In some examples, picking two different graphs from two different timestamps can be used to compare different periods. If necessary, graph generator 146 can parallelize its workload (e.g., where its backlog cannot otherwise be handled within a particular time period, such as an hour, or if is required to process a graph spanning a long time period).

Graph generator 146 can be implemented in any appropriate programming language, such as Java or C, and machine learning libraries, such as Spark's MLLib. Example ways that graph generator computations can be implemented include using SQL or Map-R, using Spark or Hadoop.

SSH tracker 148 is a microservice that may be responsible for following ssh connections and process parent hierarchies to determine trails of user ssh activity. Identified ssh trails are placed by the SSH tracker 148 into data store 30 and cached for further processing.

SSH tracker 148 can be implemented in any appropriate programming language, such as Java or C, and machine libraries, such as Spark's MLLib. Example ways that SSH tracker computations can be implemented include using SQL or Map-R, using Spark or Hadoop.

Threat aggregator 150 is a microservice that may be responsible for obtaining third party threat information from various applicable sources, and making it available to other micro-services. Examples of such information include reverse DNS information, GeoIP information, lists of known bad domains/IP addresses, lists of known bad files, etc. As applicable, the threat information is normalized before insertion into data store 30. Threat aggregator 150 can be implemented in any appropriate programming language, such as Java or C, using SQL/JDBC libraries to interact with data store 30 (e.g., for insertions and queries).

Scheduler 152 is a microservice that may act as a scheduler and that may run arbitrary jobs organized as a directed graph. In some examples, scheduler 152 ensures that all jobs for all customers are able to run during a given time interval (e.g., every hour). Scheduler 152 may handle errors and retrying for failed jobs, track dependencies, manage appropriate resource levels, and/or scale jobs as needed. Scheduler 152 can be implemented in any appropriate programming language, such as Java or C. A variety of components can also be used, such as open source scheduler frameworks (e.g., Airflow), or AWS services (e.g., the AWS Data pipeline) which can be used for managing schedules.

Graph Behavior Modeler (GBM) 154 is a microservice that may compute polygraphs. In particular, GBM 154 can be used to find clusters of nodes in a graph that should be considered similar based on some set of their properties and relationships to other nodes. As described herein, the clusters and their relationships can be used to provide visibility into a datacenter environment without requiring user specified labels. GBM 154 may track such clusters over time persistently, allowing for changes to be detected and alerts to be generated.

GBM 154 may take as input a raw graph (e.g., as generated by graph generator 146). Nodes are actors of a behavior, and edges are the behavior relationship itself. For example, in the case of communication, example actors include processes, which communicate with other processes. The GBM 154 clusters the raw graph based on behaviors of actors and produces a summary (the polygraph). The polygraph summarizes behavior at a datacenter level. The GBM 154 also produces "observations" that represent changes detected in the datacenter. Such observations may be based on differences in cumulative behavior (e.g., the baseline) of the datacenter with its current behavior. The GBM 154 can be implemented in any appropriate programming language, such as Java, C, or Golang, using appropriate libraries (as applicable) to handle distributed graph computations (handling large amounts of data analysis in a short amount of time). Apache Spark is another example tool that can be used to compute polygraphs. The GBM 154 can also take feedback from users and adjust the model according to that feedback. For example, if a given user is interested in relearning behavior for a particular entity, the GBM 154 can be instructed to "forget" the implicated part of the polygraph.

GBM runner 156 is a microservice that may be responsible for interfacing with GBM 154 and providing GBM 154 with raw graphs (e.g., using a query language, such as SQL, to push any computations it can to data store 30). GBM runner 156 may also insert polygraph output from GBM 154 to data store 30. GBM runner 156 can be implemented in any appropriate programming language, such as Java or C, using SQL/JDBC libraries to interact with data store 30 to insert and query data.

Alert generator 158 is a microservice that may be responsible for generating alerts. Alert generator 158 may examine observations (e.g., produced by GBM 154) in aggregate, deduplicate them, and score them. Alerts may be generated for observations with a score exceeding a threshold. Alert generator 158 may also compute (or retrieve, as applicable) data that a customer (e.g., user A or user B) might need when reviewing the alert. Examples of events that can be detected by data platform 12 (and alerted on by alert generator 158) include, but are not limited to the following:

new user: This event may be created the first time a user (e.g., of node 116) is first observed by an agent within a datacenter.

user launched new binary: This event may be generated when an interactive user launches an application for the first time.

new privilege escalation: This event may be generated when user privileges are escalated and a new application is run.

new application or container: This event may be generated when an application or container is seen for the first time.

new external connection: This event may be generated when a connection to an external IP/domain is made from a new application.

new external host or IP: This event may be generated when a new external host or IP is involved in a connection with a datacenter.

new internal connection: This event may be generated when a connection between internal-only applications is seen for the first time.

new external client: This event may be generated when a new external connection is seen for an application which typically does not have external connections.

new parent: This event may be generated when an application is launched by a different parent.

connection to known bad IP/domain: Data platform 12 maintains (or can otherwise access) one or more reputation feeds. If an environment makes a connection to a known bad IP or domain, an event will be generated.

login from a known bad IP/domain: An event may be generated when a successful connection to a datacenter from a known bad IP is observed by data platform 12.

Alert generator 158 can be implemented in any appropriate programming language, such as Java or C, using SQL/JDBC libraries to interact with data store 30 to insert and query data. In various embodiments, alert generator 158 also uses one or more machine learning libraries, such as Spark's MLLib (e.g., to compute scoring of various observations). Alert generator 158 can also take feedback from users about which kinds of events are of interest and which to suppress.

QsJobServer 160 is a microservice that may look at all the data produced by data platform 12 for an hour, and compile a materialized view (MV) out of the data to make queries faster. The MV helps make sure that the queries customers most frequently run, and data that they search for, can be easily queried and answered. QsJobServer 160 may also precompute and cache a variety of different metrics so that they can quickly be provided as answers at query time. QsJobServer 160 can be implemented using any appropriate programming language, such as Java or C, using SQL/JDBC libraries. In some examples, QsJobServer 160 is able to compute an MV efficiently at scale, where there could be a large number of joins. An SQL engine, such as Oracle, can be used to efficiently execute the SQL, as applicable.

Alert notifier 162 is a microservice that may take alerts produced by alert generator 158 and send them to customers' integrated Security Information and Event Management (SIEM) products (e.g., Splunk, Slack, etc.). Alert notifier 162 can be implemented using any appropriate programming language, such as Java or C. Alert notifier 162 can be configured to use an email service (e.g., AWS SES or pagerduty) to send emails. Alert notifier 162 may also provide templating support (e.g., Velocity or Moustache) to manage templates and structured notifications to SIEM products.

Reporting module 164 is a microservice that may be responsible for creating reports out of customer data (e.g., daily summaries of events, etc.) and providing those reports to customers (e.g., via email). Reporting module 164 can be implemented using any appropriate programming language, such as Java or C. Reporting module 164 can be configured to use an email service (e.g., AWS SES or pagerduty) to send emails. Reporting module 164 may also provide templating support (e.g., Velocity or Moustache) to manage templates (e.g., for constructing HTML-based email).

Web app 120 is a microservice that provides a user interface to data collected and processed on data platform 12. Web app 120 may provide login, authentication, query, data visualization, etc. features. Web app 120 may, in some embodiments, include both client and server elements. Example ways the server elements can be implemented are using Java DropWizard or Node.Js to serve business logic, and a combination of JSON/HTTP to manage the service. Example ways the client elements can be implemented are using frameworks such as React, Angular, or Backbone. JSON, jQuery, and JavaScript libraries (e.g., underscore) can also be used.

Query service 166 is a microservice that may manage all database access for web app 120. Query service 166 abstracts out data obtained from data store 30 and provides a JSON-based REST API service to web app 120. Query service 166 may generate SQL queries for the REST APIs that it receives at run time. Query service 166 can be implemented using any appropriate programming language, such as Java or C and SQL/JDBC libraries, or an SQL framework such as jOOQ. Query service 166 can internally make use of a variety of types of databases, including a relational database engine 168 (e.g., AWS Aurora) and/or data store 30 to manage data for clients. Examples of tables that query service 166 manages are OLTP tables and data warehousing tables.

Cache 170 may be implemented by Redis and/or any other service that provides a key-value store. Data platform 12 can use cache 170 to keep information for frontend services about users. Examples of such information include valid tokens for a customer, valid cookies of customers, the last time a customer tried to login, etc.

Figure 3A:
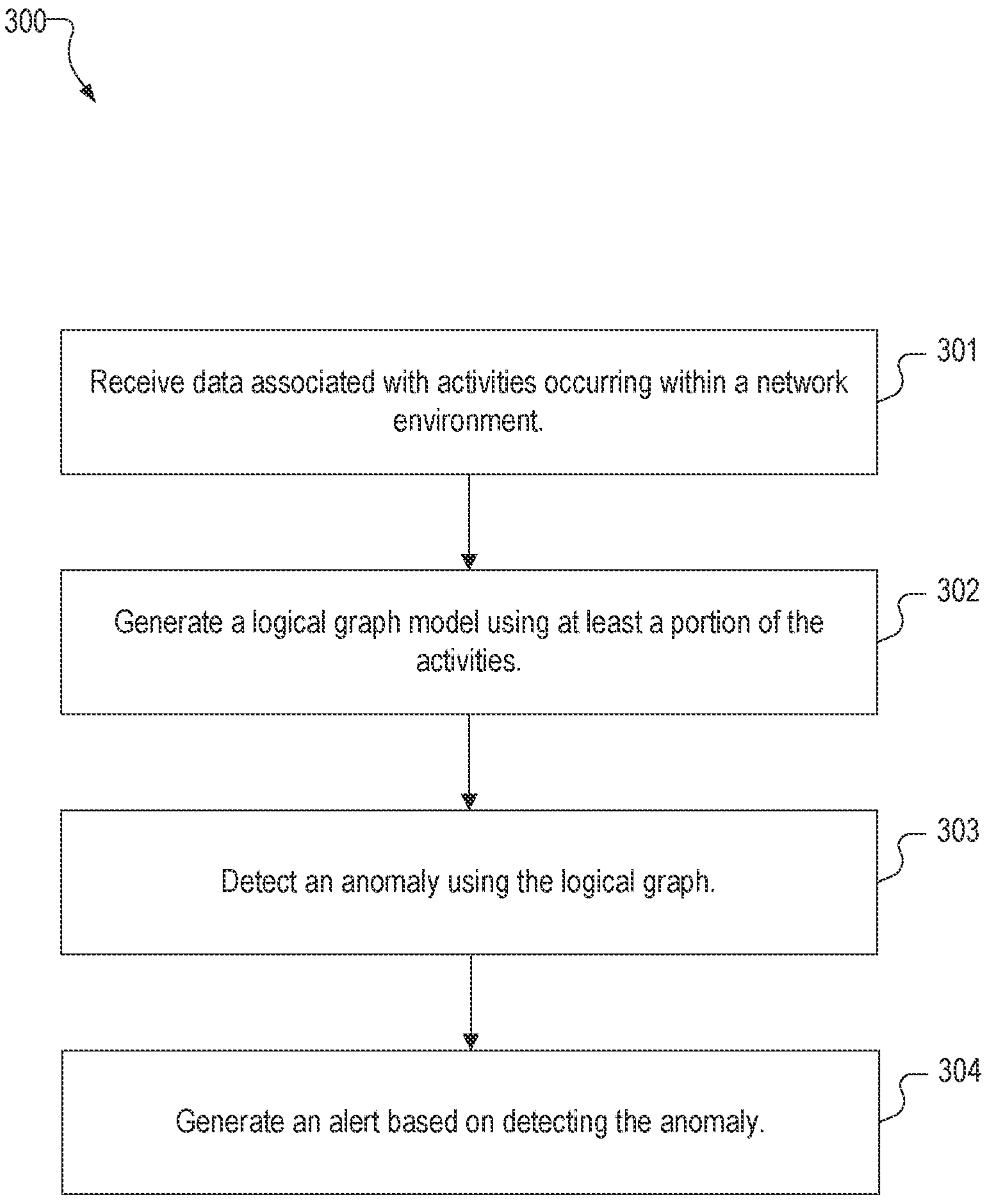
FIG. 3A illustrates an example of a process for detecting anomalies in a network environment.

FIG. 3A illustrates an example of a process for detecting anomalies in a network environment. In various embodiments, process 300 is performed by data platform 12. The process begins at 301 when data associated with activities occurring in a network environment (such as entity A's datacenter) is received. One example of such data that can be received at 301 is agent-collected data described above (e.g., in conjunction with process 200).

At 302, a logical graph model is generated, using at least a portion of the monitored activities. A variety of approaches can be used to generate such logical graph models, and a variety of logical graphs can be generated (whether using the same, or different approaches). The following is one example of how data received at 301 can be used to generate and maintain a model.

During bootstrap, data platform 12 creates an aggregate graph of physical connections (also referred to herein as an aggregated physical graph) by matching connections that occurred in the first hour into communication pairs. Clustering is then performed on the communication pairs. Examples of such clustering, described in more detail below, include performing Matching Neighbor clustering and similarity (e.g., SimRank) clustering. Additional processing can also be performed (and is described in more detail below), such as by splitting clusters based on application type, and annotating nodes with DNS query information. The resulting graph (also referred to herein as a base graph or common graph) can be used to generate a variety of models, where a subset of node and edge types (described in more detail below) and their properties are considered in a given model. One example of a model is a UID to UID model (also referred to herein as a Uid2Uid model) which clusters together processes that share a username and show similar privilege change behavior. Another example of a model is a CType model, which clusters together processes that share command line similarity. Yet another example of a model is a PType model, which clusters together processes that share behaviors over time.

Each hour (or any other predetermined time interval) after bootstrap, a new snapshot is taken (i.e., data collected about a datacenter in the last hour is processed) and information from the new snapshot is merged with existing data to create and (as additional data is collected/processed) maintain a cumulative graph. The cumulative graph (also referred to herein as a cumulative PType graph and a polygraph) is a running model of how processes behave over time. Nodes in the cumulative graph are PType nodes, and provide information such as a list of all active processes and PIDs in the last hour, the number of historic total processes, the average number of active processes per hour, the application type of the process (e.g., the CType of the PType), and historic CType information/frequency. Edges in the cumulative graph can represent connectivity and provide information such as connectivity frequency. The edges can be weighted (e.g., based on number of connections, number of bytes exchanged, etc.). Edges in the cumulative graph (and snapshots) can also represent transitions.

One approach to merging a snapshot of the activity of the last hour into a cumulative graph is as follows. An aggregate graph of physical connections is made for the connections included in the snapshot (as was previously done for the original snapshot used during bootstrap). And, clustering/splitting is similarly performed on the snapshot's aggregate graph. Next, PType clusters in the snapshot's graph are compared against PType clusters in the cumulative graph to identify commonality.

One approach to determining commonality is, for any two nodes that are members of a given CmdType (described in more detail below), comparing internal neighbors and calculating a set membership Jaccard distance. The pairs of nodes are then ordered by decreasing similarity (i.e., with the most similar sets first). For nodes with a threshold amount of commonality (e.g., at least 66% members in common), any new nodes (i.e., appearing in the snapshot's graph but not the cumulative graph) are assigned the same PType identifier as is assigned to the corresponding node in the cumulative graph. For each node that is not classified (i.e., has not been assigned a PType identifier), a network signature is generated (i.e., indicative of the kinds of network connections the node makes, who the node communicates with, etc.). The following processing is then performed until convergence. If a match of the network signature is found in the cumulative graph, the unclassified node is assigned the PType identifier of the corresponding node in the cumulative graph. Any nodes which remain unclassified after convergence are new PTypes and are assigned new identifiers and added to the cumulative graph as new. As applicable, the detection of a new PType can be used to generate an alert. If the new PType has a new CmdType, a severity of the alert can be increased. If any surviving nodes (i.e., present in both the cumulative graph and the snapshot graph) change PTypes, such change is noted as a transition, and an alert can be generated. Further, if a surviving node changes PType and also changes CmdType, a severity of the alert can be increased.

Changes to the cumulative graph (e.g., a new PType or a new edge between two PTypes) can be used (e.g., at 303) to detect anomalies (described in more detail below). Two example kinds of anomalies that can be detected by data platform 12 include security anomalies (e.g., a user or process behaving in an unexpected manner) and devops/root cause anomalies (e.g., network congestion, application failure, etc.). Detected anomalies can be recorded and surfaced (e.g., to administrators, auditors, etc.), such as through alerts which are generated at 304 based on anomaly detection.

Additional detail regarding processing performed, by various components depicted in FIG. 1D (whether performed individually or in combination), in conjunction with model/polygraph construction (e.g., as performed at 302) are provided below.

As explained above, an aggregated physical graph can be generated on a per customer basis periodically (e.g., once an hour) from raw physical graph information, by matching connections (e.g., between two processes on two virtual machines). In various embodiments, a deterministic fixed approach is used to cluster nodes in the aggregated physical graph (e.g., representing processes and their communications). As one example, Matching Neighbors Clustering (MNC) can be performed on the aggregated physical graph to determine which entities exhibit identical behavior and cluster such entities together.

Figure 3B:
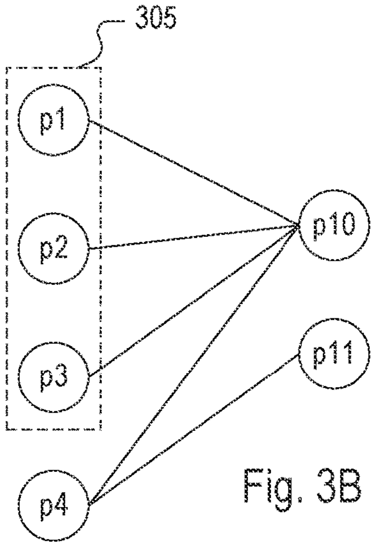
FIG. 3B depicts a set of example processes communicating with other processes.

FIG. 3B depicts a set of example processes (p1, p2, p3, and p4) communicating with other processes (p10 and p11). FIG. 3B is a graphical representation of a small portion of an aggregated physical graph showing (for a given time period, such as an hour) which processes in a datacenter communicate with which other processes. Using MNC, processes p1, p2, and p3 will be clustered together (305), as they exhibit identical behavior (they communicate with p10 and only p10). Process p4, which communicates with both p10 and p11, will be clustered separately.

In MNC, only those processes exhibiting identical (communication) behavior will be clustered. In various embodiments, an alternate clustering approach can also/instead be used, which uses a similarity measure (e.g., constrained by a threshold value, such as a 60% similarity) to cluster items. In some embodiments, the output of MNC is used as input to SimRank, in other embodiments, MNC is omitted.

Figure 3C:
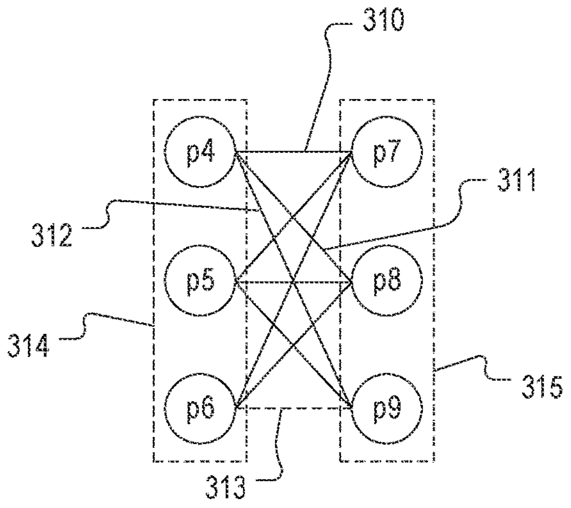
FIG. 3C depicts a set of example processes communicating with other processes.

FIG. 3C depicts a set of example processes (p4, p5, p6) communicating with other processes (p7, p8, p9). As illustrated, most of nodes p4, p5, and p6 communicate with most of nodes p7, p8, and p9 (as indicated in FIG. 3C with solid connection lines). As one example, process p4 communicates with process p7 (310), process p8 (311), and process p9 (312). An exception is process p6, which communicates with processes p7 and p8, but does not communicate with process p9 (as indicated by dashed line 313). If MNC were applied to the nodes depicted in FIG. 3C, nodes p4 and p5 would be clustered (and node p6 would not be included in their cluster).

One approach to similarity clustering is to use SimRank. In an embodiment of the SimRank approach, for a given node v in a directed graph, I(v) and O(v) denote the respective set of in-neighbors and out-neighbors of v. Individual in-neighbors are denoted as $I_i(v)$, for $1 \le i \le |I(v)|$, and individual out-neighbors are denoted as $O_i(v)$, for $1 \le i \le O(v)$ I. The similarity between two objects a and b can be denoted by s(a,b)∈[1,0]. A recursive equation (hereinafter "the SimRank equation") can be written for s(a,b), where, if a=b, then s(a,b) is defined as 1, otherwise, $$s(a,b)=\frac{C}{|I(a)||I(b)|}\sum_{i=1}^{|I(a)|}\sum_{j=1}^{|I(b)|}s(I_i(a),I_j(b))$$

value for the decay factor C is 0.8 (and a fixed number of iterations such as five). Another example value for the decay factor C is 0.6 (and/or a different number of iterations). In the event that a or b has no in-neighbors, similarity is set to s(a,b)=0, so the summation is defined to be 0 when I(a)=Ø or I(b)=Ø.

The SimRank equations for a graph G can be solved by iteration to a fixed point. Suppose n is the number of nodes in G. For each iteration k, $n^2$ entries $s_k(*,*)$ are kept, where $s_k(a,b)$ gives the score between a and b on iteration k. Successive computations of $s_{k+1}(*,*)$ are made based on $s_k(*,*)$. Starting with $s_0(*,*)$, where each $s_0(a,b)$ is a lower bound on the actual SimRank score $$s(a,b): s_0(a,b)=\begin{cases}1, \text{ if } a=b,\\ 0, \text{ if } a\neq b.\end{cases}$$

The SimRank equation can be used to compute $s_{k+1}(a,b)$ from $s_k(*,*)$ with $$s_{k+1}(a,b)=\frac{C}{|I(a)||I(b)|}\sum_{i=1}^{|I(a)|}\sum_{j=1}^{|I(b)|}s_k(I_i(a),I_j(b))$$

for a≠b, and $s_{k+1}(a,b)=1$ for a=b. On each iteration k+1, the similarity of (a,b) is updated using the similarity scores of the neighbors of (a,b) from the previous iteration k according to the SimRank equation. The values $s_k(*,*)$ are nondecreasing as k increases.

Returning to FIG. 3C, while MNC would cluster nodes p4 and p5 together (and not include node p6 in their cluster), application of SimRank would cluster nodes p4-p6 into one cluster (314) and also cluster nodes p7-p9 into another cluster (315).

Figure 3D:
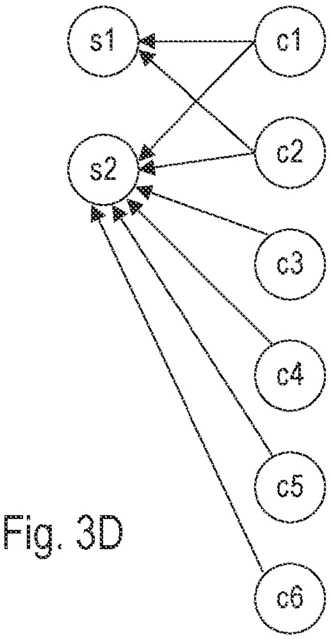
FIG. 3D depicts a set of example processes communicating with other processes.

FIG. 3D depicts a set of processes, and in particular server processes s1 and s2, and client processes c1, c2, c3, c4, c5, and c6. Suppose only nodes s1, s2, c1, and c2 are present in the graph depicted in FIG. 3D (and the other nodes depicted are omitted from consideration). Using MNC, nodes s1 and s2 would be clustered together, as would nodes c1 and c2. Performing SimRank clustering as described above would also result in those two clusters (s1 and s2, and c1 and c2). As previously mentioned, in MNC, identical behavior is required. Thus, if node c3 were now also present in the graph, MNC would not include c3 in a cluster with c2 and c1 because node c3 only communicates with node s2 and not node s1. In contrast, a SimRank clustering of a graph that includes nodes s1, s2, c1, c2, and c3 would result (based, e.g., on an applicable selected decay value and number of iterations) in a first cluster comprising nodes s1 and s2, and a second cluster of c1, c2, and c3. As an increasing number of nodes which communicate with server process s2, and do not also communicate with server process s1, are included in the graph (e.g., as c4, c5, and c6 are added), under SimRank, nodes s1 and s2 will become decreasingly similar (i.e., their intersection is reduced).

In various embodiments, SimRank is modified (from what is described above) to accommodate differences between the asymmetry of client and server connections. As one example, SimRank can be modified to use different thresholds for client communications (e.g., an 80% match among nodes c1-c6) and for server communications (e.g., a 60% match among nodes s1 and s2). Such modification can also help achieve convergence in situations such as where a server process dies on one node and restarts on another node.

The application of MNC/SimRank to an aggregated physical graph results in a smaller graph, in which processes which are determined to be sufficiently similar are clustered together. Typically, clusters generated as output of MNC will be underinclusive. For example, for the nodes depicted in FIG. 3C, process p6 will not be included in a cluster with processes p4 and p5, despite substantial similarity in their communication behaviors. The application of SimRank (e.g., to the output of MNC) helps mitigate the underinclusiveness of MNC, but can result in overly inclusive clusters. As one example, suppose (returning to the nodes depicted in FIG. 3B) that as a result of applying SimRank to the depicted nodes, nodes p1-p4 are all included in a single cluster. Both MNC and SimRank operate agnostically of which application a given process belongs to. Suppose processes p1-p3 each correspond to a first application (e.g., an update engine), and process p4 corresponds to a second application (e.g., sshd). Further suppose process p10 corresponds to contact with AWS. Clustering all four of the processes together (e.g., as a result of SimRank) could be problematic, particularly in a security context (e.g., where granular information useful in detecting threats would be lost).

As previously mentioned, data platform 12 may maintain a mapping between processes and the applications to which they belong. In various embodiments, the output of SimRank (e.g., SimRank clusters) is split based on the applications to which cluster members belong (such a split is also referred to herein as a "CmdType split"). If all cluster members share a common application, the cluster remains. If different cluster members originate from different applications, the cluster members are split along application-type (CmdType) lines. Using the nodes depicted in FIG. 3D as an example, suppose that nodes c1, c2, c3, and c5 all share "update engine" as the type of application to which they belong (sharing a CmdType). Suppose that node c4 belongs to "ssh," and suppose that node c6 belongs to "bash." As a result of SimRank, all six nodes (c1-c6) might be clustered into a single cluster. After a CmdType split is performed on the cluster, however, the single cluster will be broken into three clusters (c1, c2, c3, c5; c4; and c6). Specifically, the resulting clusters comprise processes associated with the same type of application, which exhibit similar behaviors (e.g., communication behaviors). Each of the three clusters resulting from the CmdType split represents, respectively, a node (also referred to herein as a PType) of a particular CmdType. Each PType is given a persistent identifier and stored persistently as a cumulative graph.

A variety of approaches can be used to determine a CmdType for a given process. As one example, for some applications (e.g., sshd), a one-to-one mapping exists between the CmdType and the application/binary name. Thus, processes corresponding to the execution of sshd will be classified using a CmdType of sshd. In various embodiments, a list of common application/binary names (e.g., sshd, apache, etc.) is maintained by data platform 12 and manually curated as applicable. Other types of applications (e.g., Java, Python, and Ruby) are multi-homed, meaning that several very different applications may all execute using the binary name, "java." For these types of applications, information such as command line/execution path information can be used in determining a CmdType. In particular, the subapplication can be used as the CmdType of the application, and/or term frequency analysis (e.g., TF/IDF) can be used on command line information to group, for example, any marathon related applications together (e.g., as a python.marathon CmdType) and separately from other Python applications (e.g., as a python.airflow CmdType).

In various embodiments, machine learning techniques are used to determine a CmdType. The CmdType model is constrained such that the execution path for each CmdType is unique. One example approach to making a CmdType model is a random forest based approach. An initial CmdType model is bootstrapped using process parameters (e.g., available within one minute of process startup) obtained using one hour of information for a given customer (e.g., entity A). Examples of such parameters include the command line of the process, the command line of the process's parent(s) (if applicable), the uptime of the process, UID/EUID and any change information, TTY and any change information, listening ports, and children (if any). Another approach is to perform term frequency clustering over command line information to convert command lines into cluster identifiers.

The random forest model can be used (e.g., in subsequent hours) to predict a CmdType for a process (e.g., based on features of the process). If a match is found, the process can be assigned the matching CmdType. If a match is not found, a comparison between features of the process and its nearest CmdType (e.g., as determined using a Levenstein distance) can be performed. The existing CmdType can be expanded to include the process, or, as applicable, a new CmdType can be created (and other actions taken, such as generating an alert). Another approach to handling processes which do not match an existing CmdType is to designate such processes as unclassified, and once an hour, create a new random forest seeded with process information from a sampling of classified processes (e.g., 10 or 100 processes per CmdType) and the new processes. If a given new process winds up in an existing set, the process is given the corresponding CmdType. If a new cluster is created, a new CmdType can be created.

Conceptually, a polygraph represents the smallest possible graph of clusters that preserve a set of rules (e.g., in which nodes included in the cluster must share a CmdType and behavior). As a result of performing MNC, SimRank, and cluster splitting (e.g., CmdType splitting) many processes are clustered together based on commonality of behavior (e.g., communication behavior) and commonality of application type. Such clustering represents a significant reduction in graph size (e.g., compared to the original raw physical graph). Nonetheless, further clustering can be performed (e.g., by iterating on the graph data using the GBM to achieve such a polygraph). As more information within the graph is correlated, more nodes can be clustered together, reducing the size of the graph, until convergence is reached and no further clustering is possible.

Figure 3E:
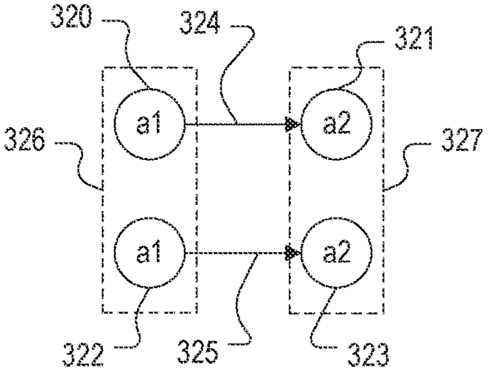
FIG. 3E depicts two pairs of clusters.

FIG. 3E depicts two pairs of clusters. In particular, cluster 320 represents a set of client processes sharing the same CmdType ("a1"), communicating (collectively) with a server process having a CmdType ("a2"). Cluster 322 also represents a set of client processes having a CmdType a1 communicating with a server process having a CmdType a2. The nodes in clusters 320 and 322 (and similarly nodes in 321 and 323) remain separately clustered (as depicted) after MNC/SimRank/CmdType splitting-isolated islands. One reason this could occur is where server process 321 corresponds to processes executing on a first machine (having an IP address of 1.1.1.1). The machine fails and a new server process 323 starts, on a second machine (having an IP address of 2.2.2.2) and takes over for process 321.

Communications between a cluster of nodes (e.g., nodes of cluster 320) and the first IP address can be considered different behavior from communications between the same set of nodes and the second IP address, and thus communications 324 and 325 will not be combined by MNC/SimRank in various embodiments. Nonetheless, it could be desirable for nodes of clusters 320/322 to be combined (into cluster 326), and for nodes of clusters 321/323 to be combined (into cluster 327), as representing (collectively) communications between a1 and a2. One task that can be performed by data platform 12 is to use DNS query information to map IP addresses to logical entities. As will be described in more detail below, GBM 154 can make use of the DNS query information to determine that graph nodes of cluster 320 and graph nodes of cluster 322 both made DNS queries for "appserverabc.example.com," which first resolved to 1.1.1.1 and then to 2.2.2.2, and to combine nodes 320/322 and 321/323 together into a single pair of nodes (326 communicating with 327).

In various embodiments, GBM 154 operates in a batch manner in which it receives as input the nodes and edges of a graph for a particular time period along with its previous state, and generates as output clustered nodes, cluster membership edges, cluster-to-cluster edges, events, and its next state.

GBM 154 may not try to consider all types of entities and their relationships that may be available in a conceptual common graph all at once. Instead, GBM uses a concept of models where a subset of node and edge types and their properties are considered in a given model. Such an approach is helpful for scalability, and also to help preserve detailed information (of particular importance in a security context)—as clustering entities in a more complex and larger graph could result in less useful results. In particular, such an approach allows for different types of relationships between entities to be preserved/more easily analyzed.

While GBM 154 can be used with different models corresponding to different subgraphs, core abstractions remain the same across types of models.

For example, each node type in a GBM model is considered to belong to a class. The class can be thought of as a way for the GBM to split nodes based on the criteria it uses for the model. The class for a node is represented as a string whose value is derived from the node's key and properties depending on the GBM Model. Note that different GBM models may create different class values for the same node. For each node type in a given GBM model, GBM 154 can generate clusters of nodes for that type. A GBM generated cluster for a given member node type cannot span more than one class for that node type. GBM 154 generates edges between clusters that have the same types as the edges between source and destination cluster node types.

Additionally or alternatively, the processes described herein as being used for a particular model can be used (can be the same) across models, and different models can also be configured with different settings.

Additionally or alternatively, the node types and the edge types may correspond to existing types in the common graph node and edge tables but this is not necessary. Even when there is a correspondence, the properties provided to GBM 154 are not limited to the properties that are stored in the corresponding graph table entries. They can be enriched with additional information before being passed to GBM 154.

Logically, the input for a GBM model can be characterized in a manner that is similar to other graphs. Edge triplets can be expressed, for example, as an array of source node type, edge type, and destination node type. And, each node type is associated with node properties, and each edge type is associated with edge properties. Other edge triplets can also be used (and/or edge triplets can be extended) in accordance with various embodiments.

Note that the physical input to the GBM model need not (and does not, in various embodiments) conform to the logical input. For example, the edges in the PtypeConn model correspond to edges between Matching Neighbors (MN) clusters, where each process node has an MN cluster identifier property. In the User ID to User ID model (also referred to herein as the Uid2Uid model), edges are not explicitly provided separately from nodes (as the cuid array in the node properties serves the same purpose). In both cases, however, the physical information provides the applicable information necessary for the logical input.

The state input for a particular GBM model can be stored in a file, a database, or other appropriate storage. The state file (from a previous run) is provided, along with graph data, except for when the first run for a given model is performed, or the model is reset. In some cases, no data may be available for a particular model in a given time period, and GBM may not be run for that time period. As data becomes available at a future time, GBM can run using the latest state file as input.

GBM 154 outputs cluster nodes, cluster membership edges, and inter-cluster relationship edges that are stored (in some embodiments) in the graph node tables: node_c, node_cm, and node_icr, respectively. The type names of nodes and edges may conform to the following rules:

- A given node type can be used in multiple different GBM models. The type names of the cluster nodes generated by two such models for that node type will be different. For instance, process type nodes will appear in both PtypeConn and Uid2Uid models, but their cluster nodes will have different type names.
- The membership edge type name is "MemberOf."
- The edge type names for cluster-to-cluster edges will be the same as the edge type names in the underlying node-to-node edges in the input.

The following are example events GBM 154 can generate: new class, new cluster, new edge from class to class, split class (the notion that GBM 154 considers all nodes of a given type and class to be in the same cluster initially and if GBM 154 splits them into multiple clusters, it is splitting a class), new edge from cluster and class, new edge between cluster and cluster, and/or new edge from class to cluster.

One underlying node or edge in the logical input can cause multiple types of events to be generated. Conversely, one event can correspond to multiple nodes or edges in the input. Not every model generates every event type.

Additional information regarding examples of data structures/models that can be used in conjunction with models used by data platform 12 is now provided.

In some examples, a PTypeConn Model clusters nodes of the same class that have similar connectivity relationships. For example, if two processes had similar incoming neighbors of the same class and outgoing neighbors of the same class, they could be clustered.

The node input to the PTypeConn model for a given time period includes non-interactive (i.e., not associated with tty) process nodes that had connections in the time period and the base graph nodes of other types (IP Service Endpoint (IPSep) comprising an IP address and a port, DNS Service Endpoint (DNSSep) and IPAddress) that have been involved in those connections. The base relationship is the connectivity relationship for the following type triplets:

Process, ConnectedTo, Process
Process, ConnectedTo, IP Service Endpoint (IPSep)
Process, ConnectedTo, DNS Service Endpoint (DNSSep)
IP Address, ConnectedTo, ProcessProcess, DNS, ConnectedTo, Process The edge inputs to this model are the ConnectedTo edges from the MN cluster, instead of individual node-to-node ConnectedTo edges from the base graph. The membership edges created by this model refer to the base graph node type provided in the input.

Class Values:

The class values of nodes are determined as follows depending on the node type (e.g., Process nodes, IPSep nodes, DNSSep nodes, and IP Address nodes).

Process Nodes:

if exe_path contains java then "java <cmdline_term_1> . . . "
else if exe_path contains python then "python <cmdline_term_1> . . . "
else "last_part_of_exe_path"

Ipsep Nodes:

if IP_internal then "IntIPS"
else if severity=0 then "<IP_addr>:<protocol>:<port>"
else "<IP_addr>:<port>BadIP"

Dnssep Nodes:

if IP_internal=1 then "<hostname>"
else if severity=0 then "<hostname>:<protocol>:port"
else "<hostname>:<port>BadIP"

IPAddress nodes (will appear only on client side):

if IP_internal=1 then "IPIntC"
else if severity=0 then "ExtIPC"
else "ExtBadIPC"

Events:

A new class event in this model for a process node is equivalent to seeing a new CType being involved in a connection for the first time. Note that this does not mean the CType was not seen before. It is possible that it was previously seen but did not make a connection at that time.

A new class event in this model for an IPSep node with IP_internal=0 is equivalent to seeing a connection to a new external IP address for the first time.

A new class event in this model for a DNSSep node is equivalent to seeing a connection to a new domain for the first time.

A new class event in this model for an IPAddress node with IP_internal=0 and severity=0 is equivalent to seeing a connection from any external IP address for the first time.

A new class event in this model for an IPAddress node with IP_internal=0 and severity>0 is equivalent to seeing a connection from any bad external IP address for the first time.

A new class to class to edge from a class for a process node to a class for a process node is equivalent to seeing a communication from the source CType making a connection to the destination CType for the first time.

A new class to class to edge from a class for a process node to a class for a DNSSep node is equivalent to seeing a communication from the source CType making a connection to the destination domain name for the first time.

An IntPConn Model may be similar to the PtypeConn Model, except that connection edges between parent/child processes and connections between processes where both sides are not interactive are filtered out.

A Uid2Uid Model may cluster processes with the same username that show similar privilege change behavior. For instance, if two processes with the same username had similar effective user values, launched processes with similar usernames, and were launched by processes with similar usernames, then they could be clustered.

An edge between a source cluster and destination cluster generated by this model means that all of the processes in the source cluster had a privilege change relationship to at least one process in the destination cluster.

The node input to this model for a given time period includes process nodes that are running in that period. The value of a class of process nodes is "<username>".

The base relationship that is used for clustering is privilege change, either by the process changing its effective user ID, or by launching a child process which runs with a different user.

The physical input for this model includes process nodes (only), with the caveat that the complete ancestor hierarchy of process nodes active (i.e., running) for a given time period is provided as input even if an ancestor is not active in that time period. Note that effective user IDs of a process are represented as an array in the process node properties, and launch relationships are available from ppid_hash fields in the properties as well.

A new class event in this model is equivalent to seeing a user for the first time.

A new class to class edge event is equivalent to seeing the source user making a privilege change to the destination user for the first time.

A Ct2Ct Model may cluster processes with the same CType that show similar launch behavior. For instance, if two processes with the same CType have launched processes with similar CTypes, then they could be clustered.

The node input to this model for a given time period includes process nodes that are running in that period. The value class of process nodes is CType (similar to how it is created for the PtypeConn Model).

The base relationship that is used for clustering is a parent process with a given CType launching a child process with another given destination CType.

The physical input for this model includes process nodes (only) with the caveat that the complete ancestor hierarchy active process nodes (i.e., that are running) for a given time period is provided as input even if an ancestor is not active in that time period. Note that launch relationships are available from ppid_hash fields in the process node properties.

An edge between a source cluster and destination cluster generated by this model means that all of the processes in the source cluster launched at least one process in the destination cluster.

A new class event in this model is equivalent to seeing a CType for the first time. Note that the same type of event will be generated by the PtypeConn Model as well.

A new class to class edge event is equivalent to seeing the source CType launching the destination CType for the first time.

An MTypeConn Model may cluster nodes of the same class that have similar connectivity relationships. For example, if two machines had similar incoming neighbors of the same class and outgoing neighbors of the same class, they could be clustered.

A new class event in this model will be generated for external IP addresses or (as applicable) domain names seen for the first time. Note that a new class to class to edge Machine, class to class for an IPSep or DNSName node will also be generated at the same time.

The membership edges generated by this model will refer to Machine, IPAddress, DNSName, and IPSep nodes in the base graph. Though the nodes provided to this model are IPAddress nodes instead of IPSep nodes, the membership edges it generates will refer to IPSep type nodes. Alternatively, the base graph can generate edges between Machine and IPSep node types. Note that the Machine to IPAddress edges have tcp_dst_ports/udp_dst_ports properties that can be used for this purpose.

The node input to this model for a given time period includes machine nodes that had connections in the time period and the base graph nodes of other types (IPAddress and DNSName) that were involved in those connections.

The base relationship is the connectivity relationship for the following type triplets:

Machine, ConnectedTo, Machine
Machine, ConnectedTo, IPAddress
Machine, ConnectedTo, DNSName
IPAddress, ConnectedTo, Machine, DNS, ConnectedTo, Machine The edge inputs to this model are the corresponding ConnectedTo edges in the base graph.

Class Values:

Machine:

The class value for all Machine nodes is "Machine."

The machine_terms property in the Machine nodes is used, in various embodiments, for labeling machines that are clustered together. If a majority of the machines clustered together share a term in the machine_terms, that term can be used for labeling the cluster.

IPSep:

The class value for IPSep nodes is determined as follows:
if IP_internal then "IntIPS"
else
if severity=0 then "<ip_addr>:<protocol>:<port>"
else "<IP_addr_BadIP>"

IP Address:

The class value for IpAddress nodes is determined as follows:
if IP_internal then "IntIPC"
else
if severity=0 then "ExtIPC"
else "ExtBadIPC"

DNSName:

The class value for DNSName nodes is determined as follows:
if severity=0 then "<hostname>"
else then "<hostname>BadIP"

An example structure for a New Class Event is now described.

The key field for this event type looks as follows (using the PtypeConn model as an example):

{
"node": {
"class": {
"cid": "httpd"
},
"key": {
"cid": "29654"
},
"type": "PtypeConn"
}
}

It contains the class value and also the ID of the cluster where that class value is observed. Multiple clusters can be observed with the same value in a given time period. It contains the class value and also the ID of the cluster where that class value is observed. Multiple clusters can be observed with the same value in a given time period. Accordingly, in some embodiments, GBM 154 generates multiple events of this type for the same class value.

The properties field looks as follows:

{
"set_size": 5
}

The set_size indicates the size of the cluster referenced in the keys field.

Conditions:

For a given model and time period, multiple NewClass events can be generated if there is more than one cluster in that class. NewNode events will not be generated separately in this case.

Example New Class to Class Edge Event Structure:

The key field for this event type looks as follows (using the PtypeConn model as an example):

"edge": {
"dst_node": {
"class": {
"cid": "java war"
},
"key": {
"cid": "27635"
},
"type": "PtypeConn"
},
"src_node": {
"class": {
"cid": "IntIPC"
},
"key": {
"cid": "20881"
},
"type": "PtypeConn"
},
"type": "ConnectedTo"
}
}

The key field contains source and destination class values and also source and destination cluster identifiers (i.e., the src/dst_node:key.cid represents the src/dst cluster identifier).

In a given time period for a given model, an event of this type could involve multiple edges between different cluster pairs that have the same source and destination class values. GBM 154 can generate multiple events in this case with different source and destination cluster identifiers.

The props fields look as follows for this event type:

{
"dst_set_size": 2,
"src_set_size": 1
}

The source and destination sizes represent the sizes of the clusters given in the keys field.

Conditions:

For a given model and time period, multiple NewClassToClass events can be generated if there are more than one pair of clusters in that class pair. NewNodeToNode events are not generated separately in this case.

Combining Events at the Class Level: for a given model and time period, the following example types of events can represent multiple changes in the underlying GBM cluster level graph in terms of multiple new clusters or multiple new edges between clusters:

NewClass
NewEdgeClassToClass
NewEdgeNodeToClass
NewEdgeClassToNode

Multiple NewClass events with the same model and class can be output if there are multiple clusters in that new class.

Multiple NewEdgeClassToClass events with the same model and class pair can be output if there are multiple new cluster edges within that class pair.

Multiple NewEdgeNodeToClass events with the same model and destination class can be output if there are multiple new edges from the source cluster to the destination clusters in that destination class (the first time seeing this class as a destination cluster class for the source cluster).

Multiple NewEdgeClassToNode events with the same model and source class can be output if there are multiple new edges from source clusters to the destination clusters in that source class (the first time seeing this class as a source cluster class for the destination cluster).

These events may be combined at the class level and treated as a single event when it is desirable to view changes at the class level, e.g., when one wants to know when there is a new CType.

In some examples, different models may have partial overlap in the types of nodes they use from the base graph. Therefore, they can generate NewClass type events for the same class. NewClass events can also be combined across models when it is desirable to view changes at the class level.

Using techniques herein, actions can be associated with processes and (e.g., by associating processes with users) actions can thus also be associated with extended user sessions. Such information can be used to track user behavior correctly, even where a malicious user attempts to hide his trail by changing user identities (e.g., through lateral movement). Extended user session tracking can also be useful in operational use cases without malicious intent, e.g., where users make original logins with distinct usernames (e.g., "charlie" or "dave") but then perform actions under a common username (e.g., "admin" or "support"). One such example is where multiple users with administrator privileges exist, and they need to gain superuser privilege to perform a particular type of maintenance. It may be desirable to know which operations are performed (as the superuser) by which original user when debugging issues. In the following examples describing extended user session tracking, reference is generally made to using the secure shell (ssh) protocol as implemented by openssh (on the server side) as the mechanism for logins. However, extended user session tracking is not limited to the ssh protocol or a particular limitation and the techniques described herein can be extended to other login mechanisms.

On any given machine, there will be a process that listens for and accepts ssh connections on a given port. This process can run the openssh server program running in daemon mode or it could be running another program (e.g., initd on a Linux system). In either case, a new process running openssh will be created for every new ssh login session and this process can be used to identify an ssh session on that machine. This process is called the "privileged" process in openssh.

After authentication of the ssh session, when an ssh client requests a shell or any other program to be run under that ssh session, a new process that runs that program will be created under (i.e., as a child of) the associated privileged process. If an ssh client requests port forwarding to be performed, the connections will be associated with the privileged process.

In modern operating systems such as Linux and Windows, each process has a parent process (except for the very first process) and when a new process is created the parent process is known. By tracking the parent-child hierarchy of processes, one can determine if a particular process is a descendant of a privileged openssh process and thus if it is associated with an ssh login session.

For user session tracking across machines (or on a single machine with multiple logins) in a distributed environment, it is established when two login sessions have a parent-child relationship. After that, the "original" login session, if any, for any given login session can be determined by following the parent relationship recursively.

Figure 3F:
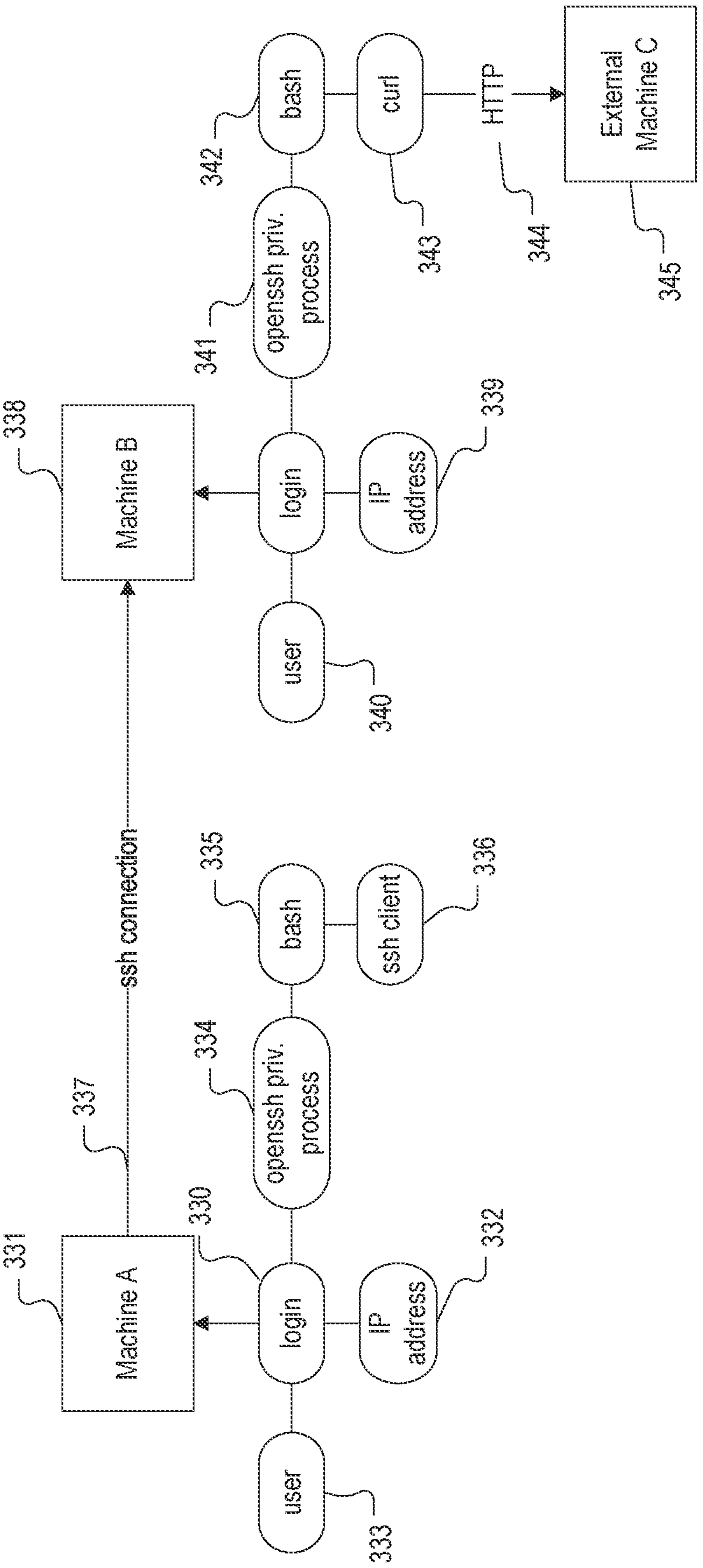
FIG. 3F is a representation of a user logging into a first machine, then into a second machine from the first machine, and then making an external connection.

FIG. 3F is a representation of a user logging into a first machine and then into a second machine from the first machine, as well as information associated with such actions. In the example of FIG. 3F, a user, Charlie, logs into Machine A (331) from a first IP address (332). As part of the login process, he provides a username (333). Once connected to Machine A, an openssh privileged process (334) is created to handle the connection for the user, and a terminal session is created and a bash process (335) is created as a child. Charlie launches an ssh client (336) from the shell, and uses it to connect (337) to Machine B (338). As with the connection he makes to Machine A, Charlie's connection to Machine B will have an associated incoming IP address (339), in this case, the IP address of Machine A. And, as part of the login process with Machine B, Charlie will provide a username (340) which need not be the same as username 333. An openssh privileged process (341) is created to handle the connection, and a terminal session and child bash process (342) will be created. From the command line of Machine B, Charlie launches a curl command (343), which opens an HTTP connection (344) to an external Machine C (345)

Figure 3G:
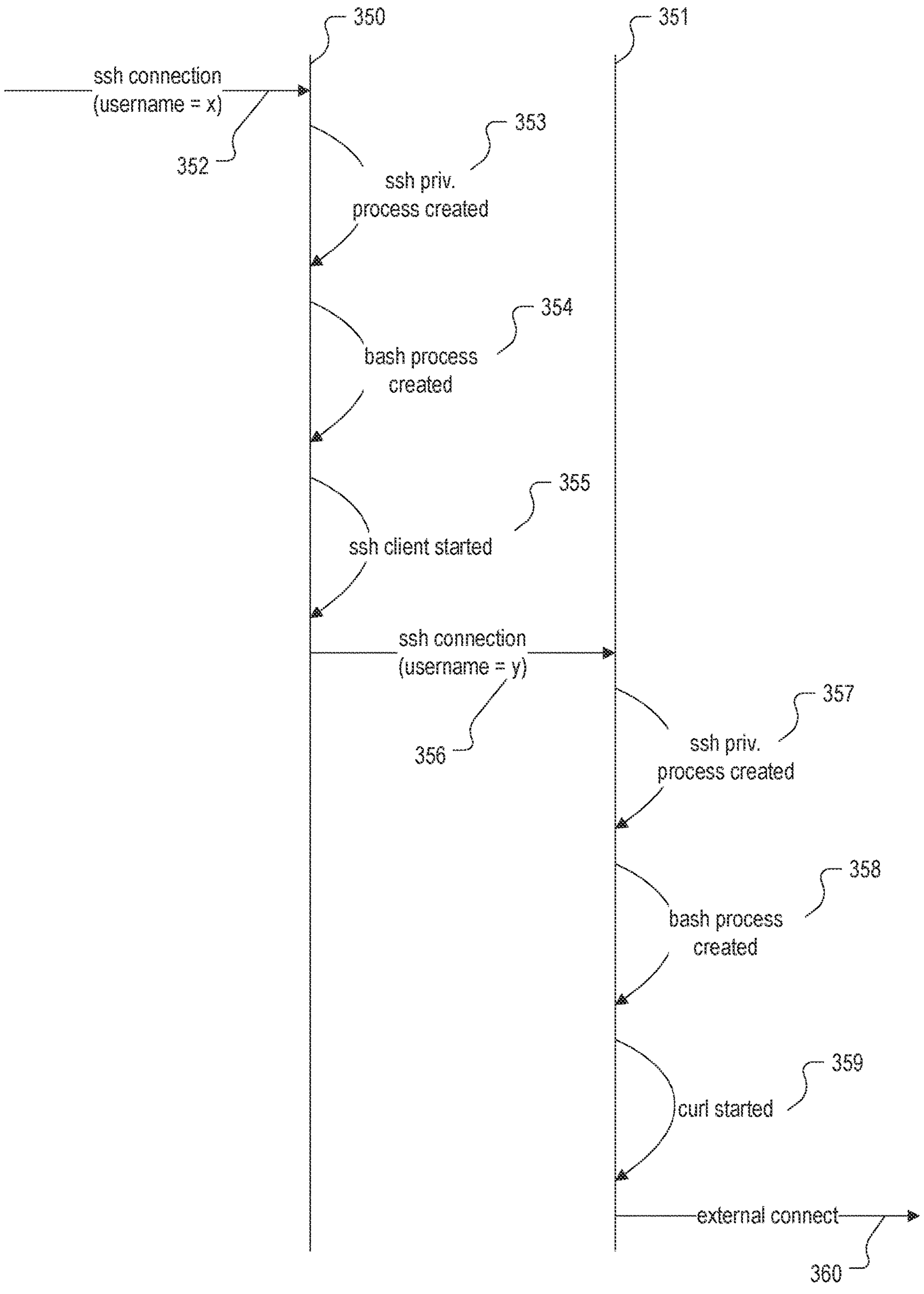
FIG. 3G is an alternate representation of actions occurring in FIG. 3F.

FIG. 3G is an alternate representation of actions occurring in FIG. 3F, where events occurring on Machine A are indicated along line 350, and events occurring on Machine B are indicated along line 351. As shown in FIG. 3G, an incoming ssh connection is received at Machine A (352). Charlie logs in (as user "x") and an ssh privileged process is created to handle Charlie's connection (353). A terminal session is created and a bash process is created (354) as a child of process 353. Charlie wants to ssh to Machine B, and so executes an ssh client on Machine A (355), providing credentials (as user "y") at 356. Charlie logs into Machine B, and an sash privileged process is created to handle Charlie's connection (357). A terminal session is created and a bash process is created (358) as a child of process 357. Charlie then executes curl (359) to download content from an external domain (via connection 360).

The external domain could be a malicious domain, or it could be benign. Suppose the external domain is malicious (and, e.g., Charlie has malicious intent). It would be advantageous (e.g., for security reasons) to be able to trace the contact with the external domain back to Machine A, and then back to Charlie's IP address. Using techniques described herein (e.g., by correlating process information collected by various agents), such tracking of Charlie's activities back to his original login (330) can be accomplished. In particular, an extended user session can be tracked that associates Charlie's ssh processes together with a single original login and thus original user.

As described herein, software agents (such as agent 112) may run on machines (such as a machine that implements one of nodes 116) and detect new connections, processes, and/or logins. As also previously explained, such agents send associated records to data platform 12 which includes one or more datastores (e.g., data store 30) for persistently storing such data. Such data can be modeled using logical tables, also persisted in datastores (e.g., in a relational database that provides an SQL interface), allowing for querying of the data. Other datastores such as graph oriented databases and/or hybrid schemes can also be used.

The following identifiers are commonly used in the tables:

MID

PID_hash

An ssh login session can be identified uniquely by an (MID, PID_hash) tuple. The MID is a machine identifier that is unique to each machine, whether physical or virtual, across time and space. Operating systems use numbers called process identifiers (PIDs) to identify processes running at a given time. Over time processes may die and new processes may be started on a machine or the machine itself may restart. The PID is not necessarily unique across time in that the same PID value can be reused for different processes at different times. In order to track process descendants across time, one should therefore account for time as well. In order to be able to identify a process on a machine uniquely across time, another number called a PID hash is generated for the process. In various embodiments, the PID_hash is generated using a collision-resistant hash function that takes the PID, start time, and (in various embodiments, as applicable) other properties of a process.

Input data collected by agents comprises the input data model and is represented by the following logical tables:

connections processes logins

A connections table may maintain records of TCP/IP connections observed on each machine. Example columns included in a connections table are as follows:

| Column Name | Description |
|---|---|
| MID | Identifier of the machine that the connection was observed on. |
| start_time | Connection start time. |
| PID_hash | Identifier of the process that was associated with the connection. |
| src_IP_addr | Source IP address (the connection was initiated from this IP address). |
| src_port | Source port. |
| dst_IP_addr | Destination IP address (the connection was made to this IP address). |
| dst_port | Destination port. |
| Prot | Protocol (TCP or UDP). |
| Dir | Direction of the connection (incoming or outgoing) with respect to this machine. |

The source fields (IP address and port) correspond to the side from which the connection was initiated. On the destination side, the agent associates an ssh connection with the privileged ssh process that is created for that connection.

For each connection in the system, there will be two records in the table, assuming that the machines on both sides of the connection capture the connection. These records can be matched based on equality of the tuple (src_IP_addr, sre_port, dst_IP_addr, dst_port, Prot) and proximity of the start_time fields (e.g., with a one minute upper threshold between the start time fields).

A processes table maintains records of processes observed on each machine. It may have the following columns:

| Column Name | Description |
|---|---|
| MID | Identifier of the machine that the process was observed on. |
| PID_hash | Identifier of the process. |
| start_time | Start time of the process. |
| exe_path | The executable path of the process. |
| PPID_hash | Identifier of the parent process. |

A logins table may maintain records of logins to machines. It may have the following columns:

| Column Name | Description |
|---|---|
| MID | Identifier of the machine that the login was observed on. |
| sshd_PID_hash | Identifier of the sshd privileged process associated with login. |
| login_time | Time of login. |
| login_username | Username used in login. |

Output data generated by session tracking is represented with the following logical tables:

login-local-descendant login-connection login-lineage

Using data in these tables, it is possible to determine descendant processes of a given ssh login session across the environment (i.e., spanning machines). Conversely, given a process, it is possible to determine if it is an ssh login descendant as well as the original ssh login session for it if so.

A login-local-descendant table maintains the local (i.e., on the same machine) descendant processes of each ssh login session. It may have the following columns:

| Column Name | Description |
|---|---|
| MID | Identifier of the machine that the login was observed on. |
| sshd_PID_hash | Identifier of the sshd privileged process associated with login. |
| login_time | Time of login. |
| login_username | Username used in login. |

A login-connections table may maintain the connections associated with ssh logins. It may have the following columns:

| Column Name | Description |
|---|---|
| MID | Identifier of the machine that the process was observed on. |
| sshd_PID_hash | Identifier of the sshd privileged process associated with the login. |
| login_time | Time of login. |
| login_username | The username used in the login. |
| src_IP_addr | Source IP address (connection was initiated from this IP address). |
| src_port | Source port. |
| dst_IP_addr | Destination IP address (connection was made to this IP address). |
| dst_port | Destination port. |

A login-lineage table may maintain the lineage of ssh login sessions. It may have the following columns:

| Column Name | Description |
|---|---|
| MID | Identifier of the machine that the ssh login was observed on. |
| sshd_PID_hash | Identifier of the sshd privileged process associated with the login. |
| parent_MID | Identifier of the machine that the parent ssh login was observed on. |
| parent_sshd_PID_hash | Identifier of the sshd privileged process associated with the parent login. |
| origin_MID | Identifier of the machine that the origin ssh login was observed on. |
| origin_sshd_PID_hash | Identifier of the sshd privileged process associated with the origin login. |

The parent_MID and parent_sshd_PID_hash columns can be null if there is no parent ssh login. In that case, the (MID, sshd_PID_hash) tuple will be the same as the (origin_MID, origin_sshd_PID_hash) tuple.

Figure 3H:
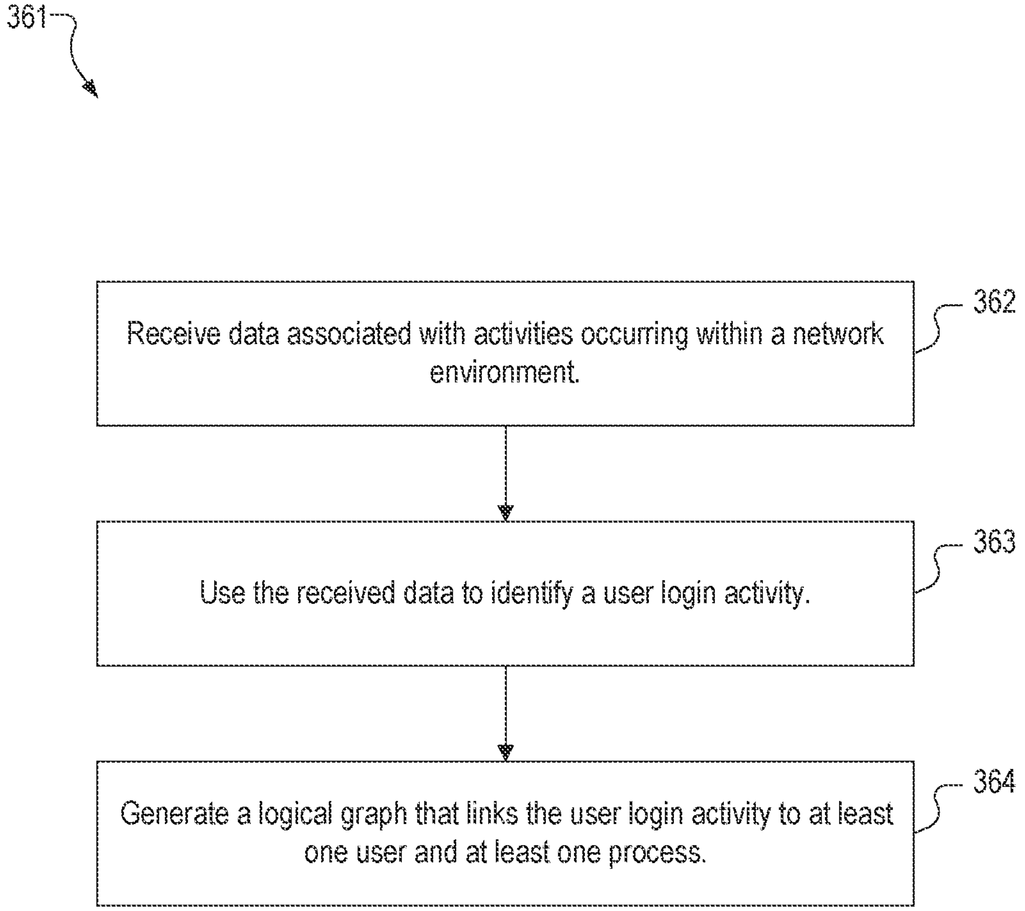
FIG. 3H illustrates an example of a process for performing extended user tracking.

FIG. 3H illustrates an example of a process for performing extended user tracking. In various embodiments, process 361 is performed by data platform 12. The process begins at 362 when data associated with activities occurring in a network environment (such as entity A's datacenter) is received. One example of such data that can be received at 362 is agent-collected data described above (e.g., in conjunction with process 200). At 363, the received network activity is used to identify user login activity. And, at 364, a logical graph that links the user login activity to at least one user and at least one process is generated (or updated, as applicable). Additional detail regarding process 361, and in particular, portions 363 and 364 of process 361 are described in more detail below (e.g., in conjunction with discussion of FIG. 3J).

Figure 3I:
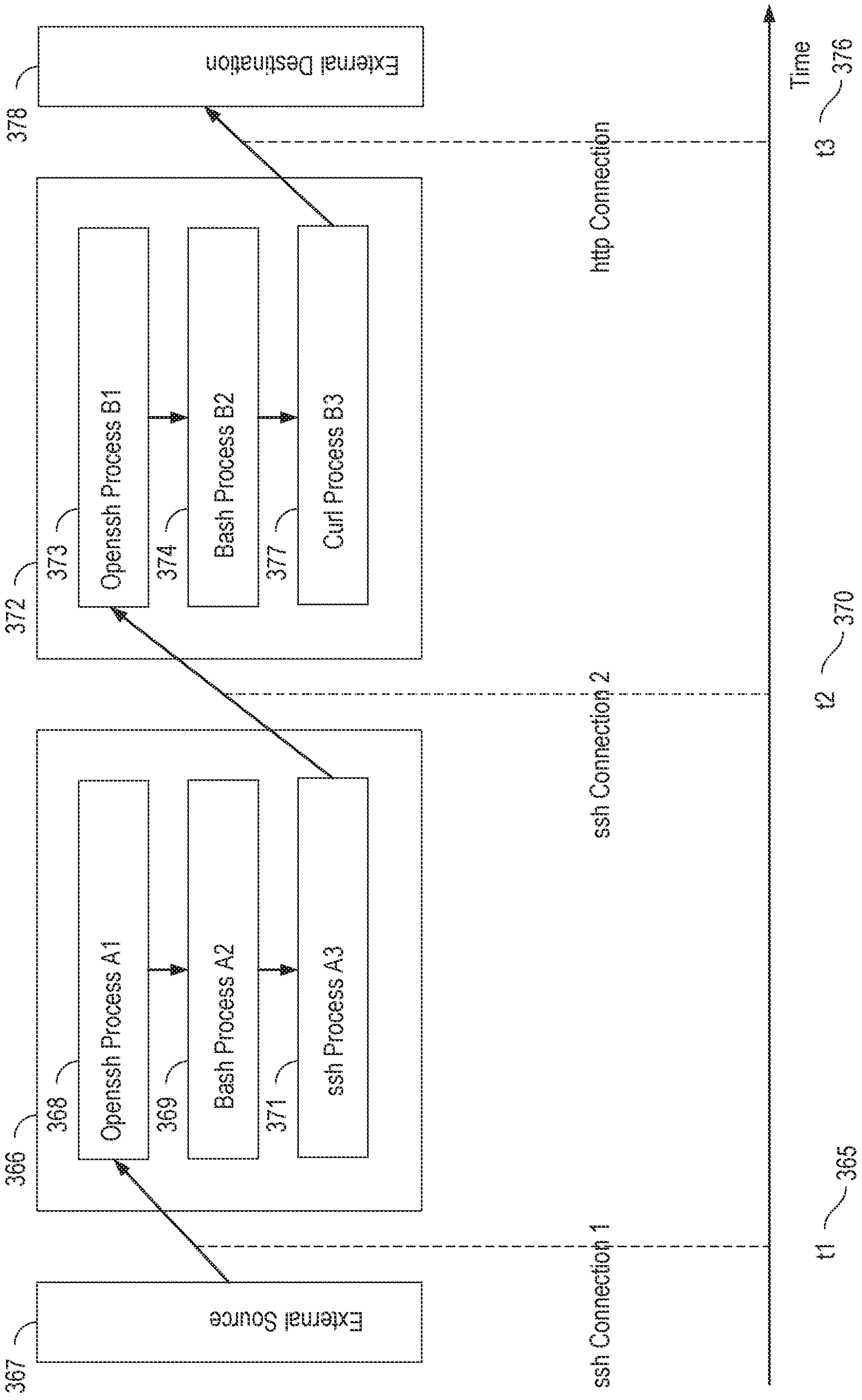
FIG. 3I is a representation of a user logging into a first machine, then into a second machine from the first machine, and then making an external connection.

FIG. 3I depicts a representation of a user logging into a first machine, then into a second machine from the first machine, and then making an external connection. The scenario depicted in FIG. 3I is used to describe an example of processing that can be performed on data collected by agents to generate extended user session tracking information. FIG. 31 is an alternate depiction of the information shown in FIGS. 3F and 3G.

At time t1 (365), a first ssh connection is made to Machine A (366) from an external source (367) by a user having a username of "X." In the following example, suppose the external source has an IP address of 1.1.1.10 and uses source port 10000 to connect to Machine A (which has an IP address of 2.2.2.20 and a destination port 22). External source 367 is considered an external source because its IP address is outside of the environment being monitored (e.g., is a node outside of entity A's datacenter, connecting to a node inside of entity A's datacenter).

A first ssh login session LS1 is created on machine A for user X. The privileged openssh process for this login is A1 (368). Under the login session LS1, the user creates a bash shell process with PID_hash A2 (369).

At time t2 (370), inside the bash shell process A2, the user runs an ssh program under a new process A3 (371) to log in to machine B (372) with a different username ("Y"). In particular, an ssh connection is made from source IP address 2.2.2.20 and source port 10001 (Machine A's source information) to destination IP address 2.2.2.21 and destination port 22 (Machine B's destination information).

A second ssh login session LS2 is created on machine B for user Y. The privileged openssh process for this login is B1 (373). Under the login session LS2, the user creates a bash shell process with PID_hash B2 (374).

At time t3 (376), inside the bash shell process B2, the user runs a curl command under a new process B3 (377) to download a file from an external destination (378). In particular, an HTTPS connection is made from source IP address 2.2.2.21 and source port 10002 (Machine B's source information) to external destination IP address 3.3.3.30 and destination port 443 (the external destination's information).

Using techniques described herein, it is possible to determine the original user who initiated the connection to external destination 378, which in this example is a user having the username X on machine A (where the extended user session can be determined to start with ssh login session LS1).

Based on local descendant tracking, the following determinations can be on machine A and B without yet having performed additional processing (described in more detail below):

A3 is a descendant of A1 and thus associated with LS1.

The connection to the external domain from machine B is initiated by B3.

B3 is a descendant of B1 and is thus associated with LS2.

Connection to the external domain is thus associated with LS2.

An association between A3 and LS2 can be established based on the fact that LS2 was created based on an ssh connection initiated from A3. Accordingly, it can be determined that LS2 is a child of LS1.

To determine the user responsible for making the connection to the external destination (e.g., if it were a known bad destination), first, the process that made the connection would be traced, i.e., from B3 to LS2. Then LS2 would be traced to LS1 (i.e., LS1 is the origin login session for LS2). Thus the user for this connection is the user for LS1, i.e., X. As represented in FIG. 31, one can visualize the tracing by following the links (in the reverse direction of arrows) from external destination 378 to A1 (368).

In the example scenario, it is assumed that both ssh connections occur in the same analysis period. However, the approaches described herein will also work for connections and processes that are created in different time periods.

Figure 3J:
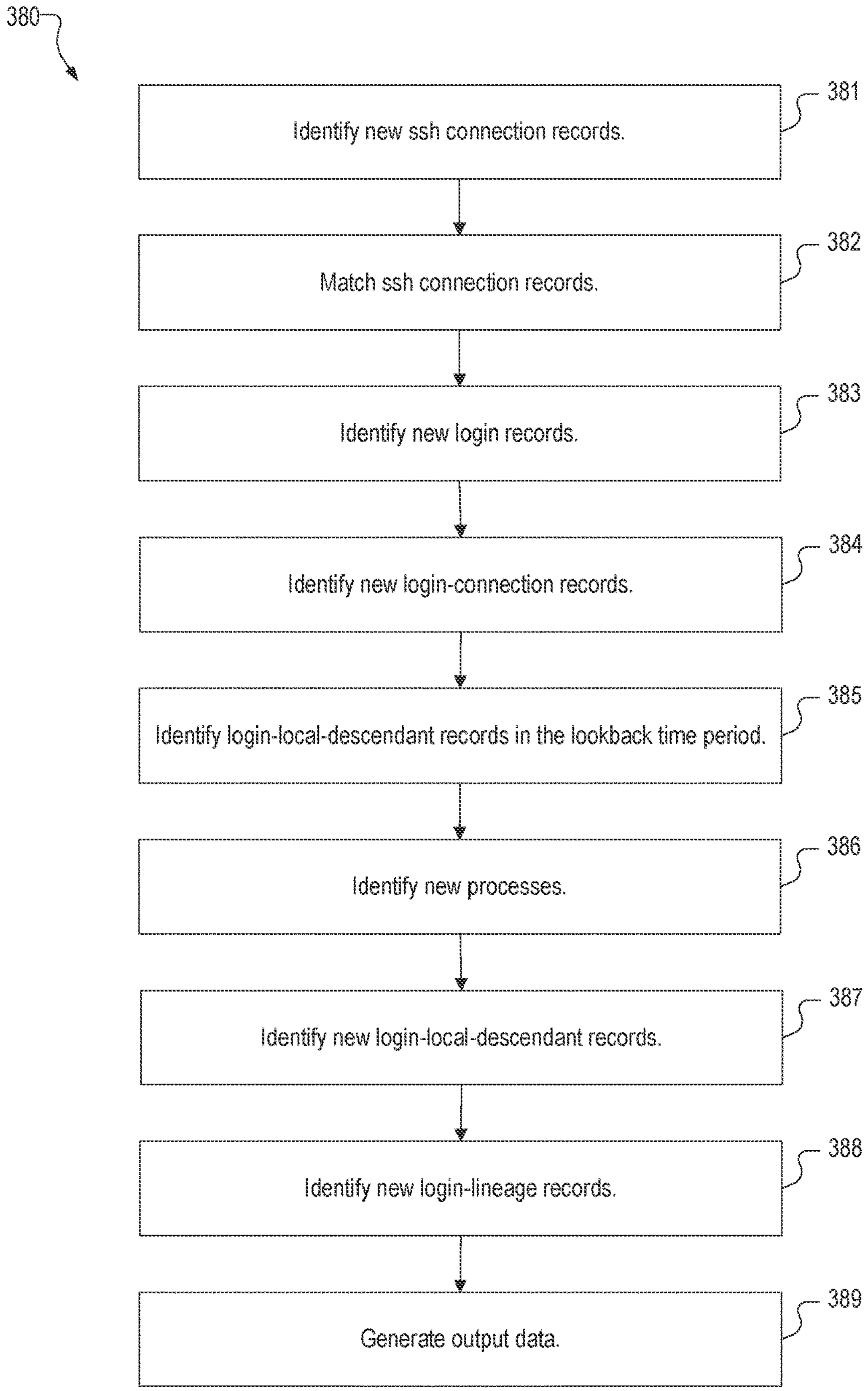
FIG. 3J illustrates an example of a process for performing extended user tracking.

FIG. 3J illustrates an example of a process for performing extended user tracking. In various embodiments, process 380 is performed periodically (e.g., once an hour in a batch fashion) by ssh tracker 148 to generate new output data. In general, batch processing allows for efficient analysis of large volumes of data. However, the approach can be adapted, as applicable, to process input data on a record-by-record fashion while maintaining the same logical data processing flow. As applicable the results of a given portion of process 380 are stored for use in a subsequent portion.

The process begins at 381 when new ssh connection records are identified. In particular, new ssh connections started during the current time period are identified by querying the connections table. The query uses filters on the start time and dst_port columns. The values of the range filter on the start_time column are based on the current time period. The dst_port column is checked against ssh listening port(s). By default, the ssh listening port number is 22. However, as this could vary across environments, the port(s) that openssh servers are listening to in the environment can be determined by data collection agents dynamically and used as the filter value for the dst_port as applicable. In the scenario depicted in FIG. 3I, the query result will generate the records shown in FIG. 3K. Note that for the connection between machine A and B, the two machines are likely to report start time values that are not exactly the same but close enough to be considered matching (e.g., within one minute or another appropriate amount of time). In the above table, they are shown to be the same for simplicity.

At 382, ssh connection records reported from source and destination sides of the same connection are matched. The ssh connection records (e.g., returned from the query at 381) are matched based on the following criteria:

The five tuples (src_IP, dst_IP, IP_prot, src_port, dst_port) of the connection records must match.

The delta between the start times of the connections must be within a limit that would account for the worst case clock difference expected between two machines in the environment and typical connection setup latency.

If there are multiple matches possible, then the match with the smallest time delta is chosen.

Note that record 390 from machine A for the incoming connection from the external source cannot be matched with another record as there is an agent only on the destination side for this connection. Example output of portion 382 of process 380 is shown in FIG. 3L. The values in the dst_PID_hash column (391) are that of the sshd privileged process associated with ssh logins.

At 383, new logins during the current time period are identified by querying the logins table. The query uses a range filter on the login_time column with values based on the current time period. In the example depicted in FIG. 3I, the query result will generate the records depicted in FIG. 3M.

At 384, matched ssh connection records created at 382 and new login records created at 383 are joined to create new records that will eventually be stored in the login-connection table. The join condition is that dst_MID of the matched connection record is equal to the MID of the login record and the dst_PID hash of the matched connection record is equal to the sshd_PID_hash of the login record. In the example depicted in FIG. 31, the processing performed at 384 will generate the records depicted in FIG. 3N.

At 385, login-local-descendant records in the lookback time period are identified. It is possible that a process that is created in a previous time period makes an ssh connection in the current analysis batch period. Although not depicted in the example illustrated in FIG. 3I, consider a case where bash process A2 does not create ssh process A3 right away but instead that the ssh connection A3 later makes to machine B is processed in a subsequent time period than the one where A2 was processed. While processing this subsequent time period in which processes A3 and B1 are seen, knowledge of A2 would be useful in establishing that B1 is associated with A3 (via ssh connection) which is associated with A2 (via process parentage) which in turn would be useful in establishing that the parent of the second ssh login is the first ssh login. The time period for which look back is performed can be limited to reduce the amount of historical data that is considered. However, this is not a requirement (and the amount of look back can be determined, e.g., based on available processing resources). The login local descendants in the lookback time period can be identified by querying the login-local-descendant table. The query uses a range filter on the login_time column where the range is from start_time_of_current_period−lookback_time_to_start_time_of_current_period. (No records as a result of performing 385 on the scenario depicted in FIG. 3I are obtained, as only a single time period is applicable in the example scenario.)

At 386, new processes that are started in the current time period are identified by querying the processes table. The query uses a range filter on the start_time column with values based on the current time period. In the example depicted in FIG. 31, the processing performed at 386 will generate the records depicted in FIG. 30.

At 387, new login-local-descendant records are identified. The purpose is to determine whether any of the new processes in the current time period are descendants of an ssh login process and if so to create records that will be stored in the login-local-descendant table for them. In order to do so, the parent-child relationships between the processes are recursively followed. Either a top down or bottom up approach can be used. In a top down approach, the ssh local descendants in the lookback period identified at 385, along with new ssh login processes in the current period identified at 384 are considered as possible ancestors for the new processes in the current period identified at 386.

Conceptually, the recursive approach can be considered to include multiple sub-steps where new processes that are identified to be ssh local descendants in the current sub-step are considered as ancestors for the next step. In the example scenario depicted in FIG. 31, the following descendancy relationships will be established in two sub-steps:

Sub-Step 1:

Process A2 is a local descendant of LS1 (i.e., MID=A, sshd_PID_hash=A1) because it is a child of process A1 which is the login process for LS1.

Process B2 is a local descendant of LS2 (i.e., MID=B, sshd_PID_hash=B1) because it is a child of process B1 which is the login process for LS2.

Sub-Step 2:

Process A3 is a local descendant of LS1 because it is a child of process A2 which is associated to LS1 in sub-step 1.

Process B3 is a local descendant of LS2 because it is a child of process B1 which is associated to LS2 in sub-step 1.

Implementation portion 387 can use a datastore that supports recursive query capabilities, or, queries can be constructed to process multiple conceptual sub-steps at once. In the example depicted in FIG. 31, the processing performed at 387 will generate the records depicted in FIG. 3P. Note that the ssh privileged processes associated with the logins are also included as they are part of the login session.

At 388, the lineage of new ssh logins created in the current time period is determined by associating their ssh connections to source processes that may be descendants of other ssh logins (which may have been created in the current period or previous time periods). In order to do so, first an attempt is made to join the new ssh login connections in the current period (identified at 384) with the combination of the login local descendants in the lookback period (identified at 385) and the login local descendants in the current time period (identified at 386). This will create adjacency relationships between child and parent logins. In the example depicted in FIG. 31, the second ssh login connection will be associated with process A3 and an adjacency relationship between the two login sessions will be created (as illustrated in FIG. 3Q).

Next, the adjacency relationships are used to find the original login sessions. While not shown in the sample scenario, there could be multiple ssh logins in a chain in the current time period, in which case a recursive approach (as in 387) could be used. At the conclusion of portion 388, the login lineage records depicted in FIG. 3R will be generated.

Finally, at 389, output data is generated. In particular, the new login-connection, login-local-descendant, and login-lineage records generated at 384, 387, and 388 are inserted into their respective output tables (e.g., in a transaction manner).

An alternate approach to matching TCP connections between machines running an agent is for the client to generate a connection GUID and send it in the connection request (e.g., the SYN packet) it sends and for the server to extract the GUID from the request. If two connection records from two machines have the same GUID, they are for the same connection. Both the client and server will store the GUID (if if exists) in the connection records they maintain and report. On the client side, the agent can configure the network stack (e.g. using IP tables functionality on Linux) to intercept an outgoing TCP SYN packet and modify it to add the generated GUID as a TCP option. On the server side, the agent already extracts TCP SYN packets and thus can look for this option and extract the GUID if it exists.

Example graph-based user tracking and threat detection embodiments associated with data platform 12 will now be described. Administrators and other users of network environments (e.g., entity A's datacenter 104) often change roles to perform tasks. As one example, suppose that at the start of a workday, an administrator (hereinafter "Joe Smith") logs in to a console, using an individualized account (e.g., username=joe.smith). Joe performs various tasks as himself (e.g., answering emails, generating status reports, writing code, etc.). For other tasks (e.g., performing updates), Joe may require different/additional permission than his individual account has (e.g., root privileges). One way Joe can gain access to such permissions is by using sudo, which will allow Joe to run a single command with root privileges. Another way Joe can gain access to such permissions is by su or otherwise logging into a shell as root. After gaining root privileges, another thing that Joe can do is switch identities. As one example, to perform administrative tasks, Joe may use "su help" or "su database-admin" to become (respectively) the help user or the database-admin user on a system. He may also connect from one machine to another, potentially changing identities along the way (e.g., logging in as joe smith at a first console, and connecting to a database server as database-admin). When he's completed various administrative tasks, Joe can relinquish his root privileges by closing out of any additional shells created, reverting back to a shell created for user joe.smith.

While there are many legitimate reasons for Joe to change his identity throughout the day, such changes may also correspond to nefarious activity. Joe himself may be nefarious, or Joe's account (joe smith) may have been compromised by a third party (whether an "outsider" outside of entity A's network, or an "insider"). Using techniques described herein, the behavior of users of the environment can be tracked (including across multiple accounts and/or multiple machines) and modeled (e.g., using various graphs described herein). Such models can be used to generate alerts (e.g., to anomalous user behavior). Such models can also be used forensically, e.g., helping an investigator visualize various aspects of a network and activities that have occurred, and to attribute particular types of actions (e.g., network connections or file accesses) to specific users.

In a typical day in a datacenter, a user (e.g., Joe Smith) will log in, run various processes, and (optionally) log out. The user will typically log in from the same set of IP addresses, from IP addresses within the same geographical area (e.g., city or country), or from historically known IP addresses/geographical areas (i.e., ones the user has previously/occasionally used). A deviation from the user's typical (or historical) behavior indicates a change in login behavior. However, it does not necessarily mean that a breach has occurred. Once logged into a datacenter, a user may take a variety of actions. As a first example, a user might execute a binary/script. Such binary/script might communicate with other nodes in the datacenter, or outside of the datacenter, and transfer data to the user (e.g., executing "curl" to obtain data from a service external to the datacenter). As a second example, the user can similarly transfer data (e.g., out of the datacenter), such as by using POST. As a third example, a user might change privilege (one or more times), at which point the user can send/receive data as per above. As a fourth example, a user might connect to a different machine within the datacenter (one or more times), at which point the user can send/receive data as per the above.

In various embodiments, the above information associated with user behavior is broken into four tiers. The tiers represent example types of information that data platform 12 can use in modeling user behavior:

1. The user's entry point (e.g., domains, IP addresses, and/or geolocation information such as country/city) from which a user logs in.

2. The login user and machine class.

3. Binaries, executables, processes, etc. a user launches.

4. Internal servers with which the user (or any of the user's processes, child processes, etc.) communicates, and external contacts (e.g., domains, IP addresses, and/or geolocation information such as country/city) with which the user communicates (i.e., transfers data).

In the event of a security breach, being able to concretely answer questions about such information can be very important. And, collectively, such information is useful in providing an end-to-end path (e.g., for performing investigations).

In the following example, suppose a user ("UserA") logs into a machine ("Machine01") from a first IP address ("IP01"). Machine01 is inside a datacenter. UserA then launches a script ("runnable.sh") on Machine01. From Machine01, UserA next logs into a second machine ("Machine02") via ssh, also as UserA, also within the datacenter. On Machine02, UserA again launches a script ("new_runnable.sh"). On Machine02, UserA then changes privilege, becoming root on Machine02. From Machine02, UserA (now as root) logs into a third machine ("Machine03") in the datacenter via ssh, as root on Machine03. As root on Machine03, the user executes a script ("collect_data.sh") on Machine03. The script internally communicates (as root) to a MySQL-based service internal to the datacenter, and downloads data from the MySQL-based service. Finally, as root on Machine03, the user externally communicates with a server outside the datacenter ("External01"), using a POST command. To summarize what has occurred, in this example, the source/entry point is IP01. Data is transferred to an external server External01. The machine performing the transfer to External01 is Machine03. The user transferring the data is "root" (on Machine03), while the actual user (hiding behind root) is UserA.

In the above scenario, the "original user" (ultimately responsible for transmitting data to External01) is UserA, who logged in from IP01. Each of the processes ultimately started by UserA, whether started at the command line (tty) such as "runnable.sh" or started after an ssh connection such as "new_runnable.sh," and whether as UserA, or as a subsequent identity, are all examples of child processes which can be arranged into a process hierarchy.

As previously mentioned, machines can be clustered together logically into machine clusters. One approach to clustering is to classify machines based on information such as the types of services they provide/binaries they have installed upon them/processes they execute. Machines sharing a given machine class (as they share common binaries/services/etc.) will behave similarly to one another. Each machine in a datacenter can be assigned to a machine cluster, and each machine cluster can be assigned an identifier (also referred to herein as a machine class). One or more tags can also be assigned to a given machine class (e.g., database_servers_west or prod_web_frontend). One approach to assigning a tag to a machine class is to apply term frequency analysis (e.g., TF/IDF) to the applications run by a given machine class, selecting as tags those most unique to the class. Data platform 12 can use behavioral baselines taken for a class of machines to identify deviations from the baseline (e.g., by a particular machine in the class).

Figure 3S:
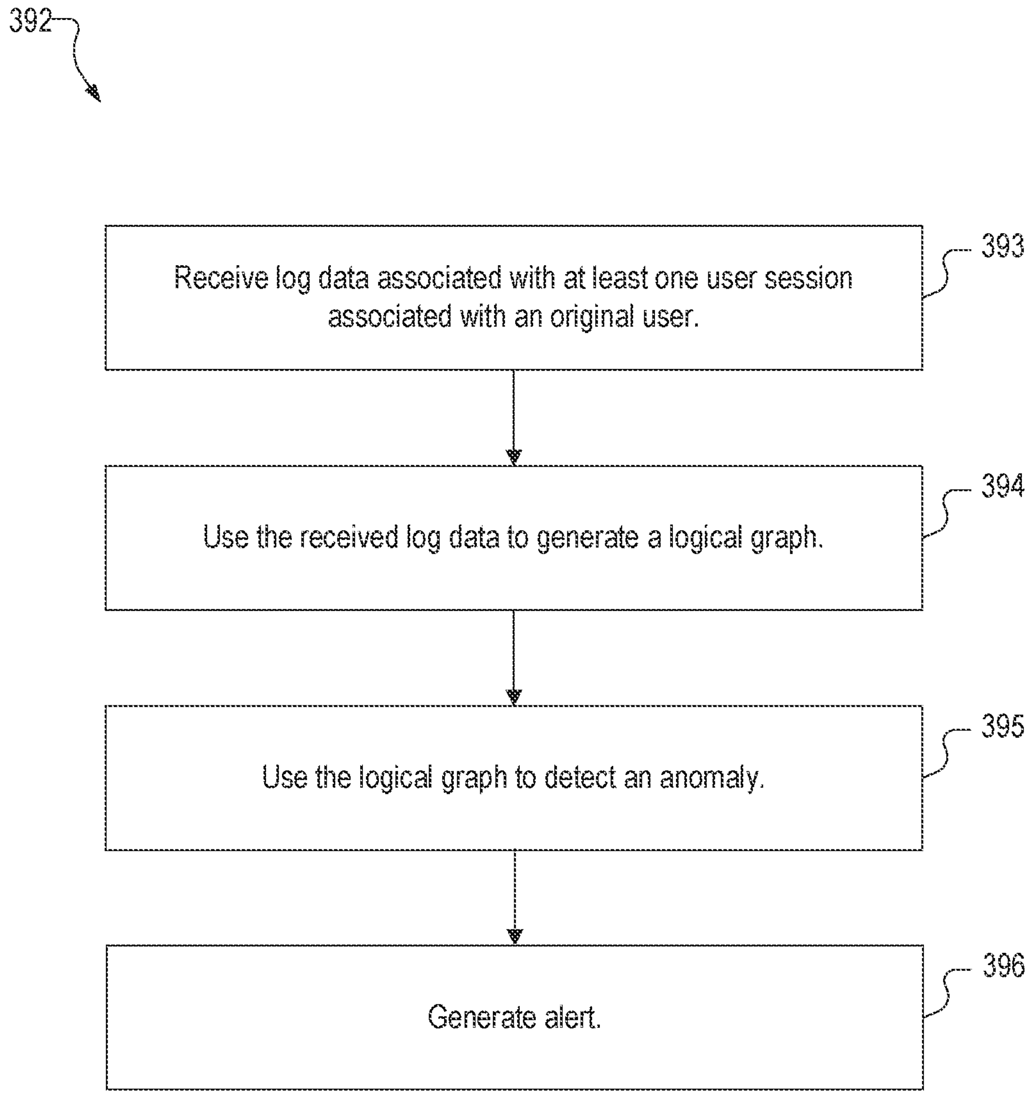
FIG. 3S illustrates an example of a process for detecting anomalies.

FIG. 3S illustrates an example of a process for detecting anomalies. In various embodiments, process 392 is performed by data platform 12. As explained above, a given session will have an original user. And, each action taken by the original user can be tied back to the original user, despite privilege changes and/or lateral movement throughout a datacenter. Process 392 begins at 393 when log data associated with a user session (and thus an original user) is received. At 394, a logical graph is generated, using at least a portion of the collected data. When an anomaly is detected (395), it can be recorded, and as applicable, an alert is generated (396). The following are examples of graphs that can be generated (e.g., at 394), with corresponding examples of anomalies that can be detected (e.g., at 395) and alerted upon (e.g., at 396).

Figure 4A:
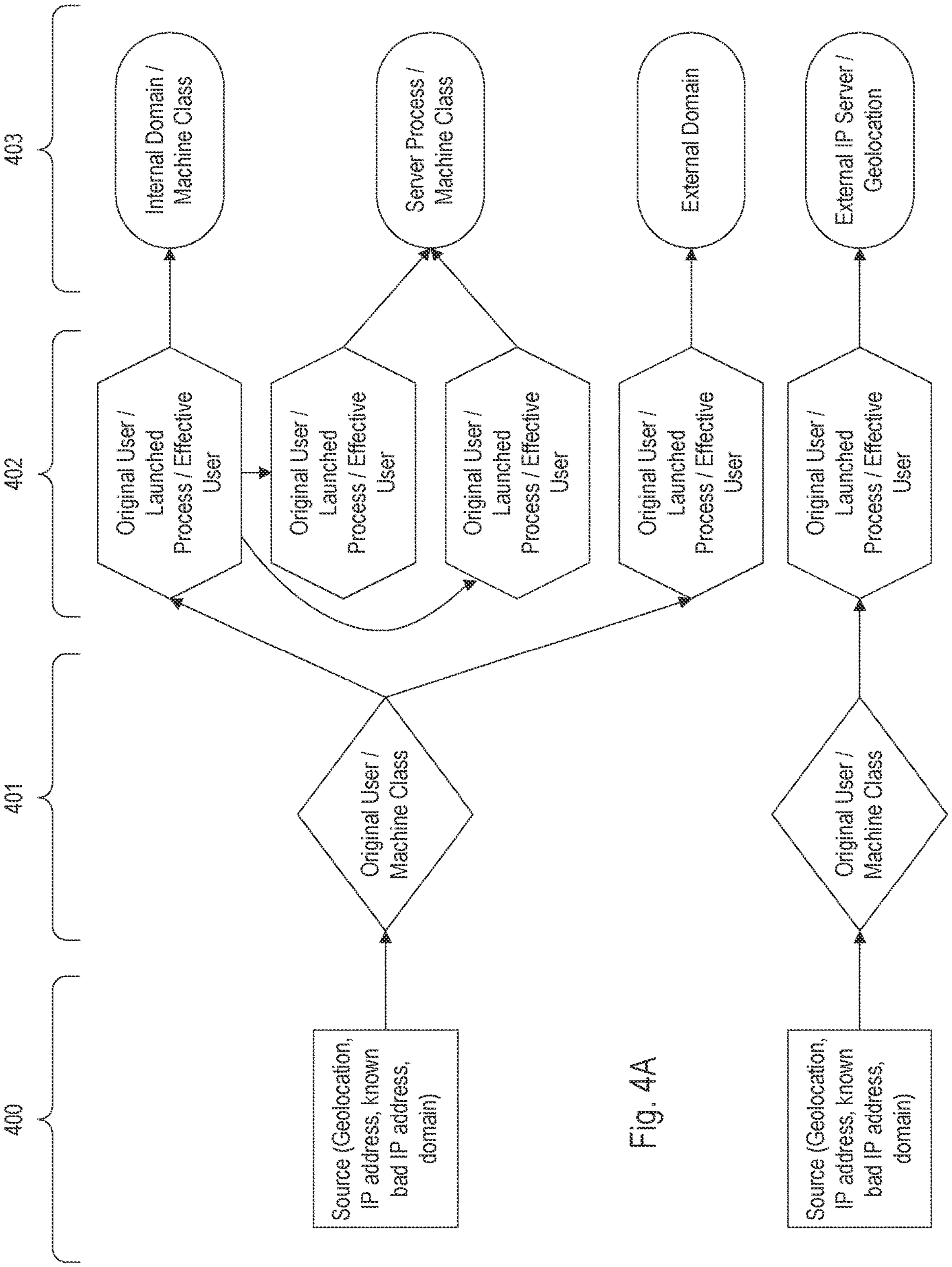
FIG. 4A illustrates a representation of an embodiment of an insider behavior graph.

FIG. 4A illustrates a representation of an embodiment of an insider behavior graph. In the example of FIG. 4A, each node in the graph can be: (1) a cluster of users; (2) a cluster of launched processes; (3) a cluster of processes/servers running on a machine class; (4) a cluster of external IP addresses (of incoming clients); or (5) a cluster of external servers based on DNS/IP/etc. As depicted in FIG. 4A, graph data is vertically tiered into four tiers. Tier 0 (400) corresponds to entry point information (e.g., domains, IP addresses, and/or geolocation information) associated with a client entering the datacenter from an external entry point. Entry points are clustered together based on such information. Tier 1 (401) corresponds to a user on a machine class, with a given user on a given machine class represented as a node. Tier 2 (402) corresponds to launched processes, child processes, and/or interactive processes. Processes for a given user and having similar connectivity (e.g., sharing the processes they launch and the machines with which they communicate) are grouped into nodes. Finally, Tier 3 (403) corresponds to the services/servers/domains/IP addresses with which processes communicate. A relationship between the tiers can be stated as follows: Tier 0 nodes log in to tier 1 nodes. Tier 1 nodes launch tier 2 nodes. Tier 2 nodes connect to tier 3 nodes.

The inclusion of an original user in both Tier 1 and Tier 2 allows for horizontal tiering. Such horizontal tiering ensures that there is no overlap between any two users in Tier 1 and Tier 2. Such lack of overlap provides for faster searching of an end-to-end path (e.g., one starting with a Tier 0 node and terminating at a Tier 3 node). Horizontal tiering also helps in establishing baseline insider behavior. For example, by building an hourly insider behavior graph, new edges/changes in edges between nodes in Tier 1 and Tier 2 can be identified. Any such changes correspond to a change associated with the original user. And, any such changes can be surfaced as anomalous and alerts can be generated.

As explained above, Tier 1 corresponds to a user (e.g., user "U") logging into a machine having a particular machine class (e.g., machine class "M"). Tier 2 is a cluster of processes having command line similarity (e.g., CType "C"), having an original user "U," and running as a particular effective user (e.g., user "U1"). The value of U1 may be the same as U (e.g., joe.smith in both cases), or the value of U1 may be different (e.g., U=joe.smith and U1=root). Thus, while an edge may be present from a Tier 1 node to a Tier 2 node, the effective user in the Tier 2 node may or may not match the original user (while the original user in the Tier 2 node will match the original user in the Tier 1 node).

A change from a user U into a user U1 can take place in a variety of ways. Examples include where U becomes U1 on the same machine (e.g., via su), and also where U sshes to other machine(s). In both situations, U can perform multiple changes, and can combine approaches. For example, U can become U1 on a first machine, ssh to a second machine (as U1), become U2 on the second machine, and ssh to a third machine (whether as user U2 or user U3). In various embodiments, the complexity of how user U ultimately becomes U3 (or US, etc.) is hidden from a viewer of an insider behavior graph, and only an original user (e.g., U) and the effective user of a given node (e.g., US) are depicted. As applicable (e.g., if desired by a viewer of the insider behavior graph), additional detail about the path (e.g., an end-to-end path of edges from user U to user US) can be surfaced (e.g., via user interactions with nodes).

Figure 4B:
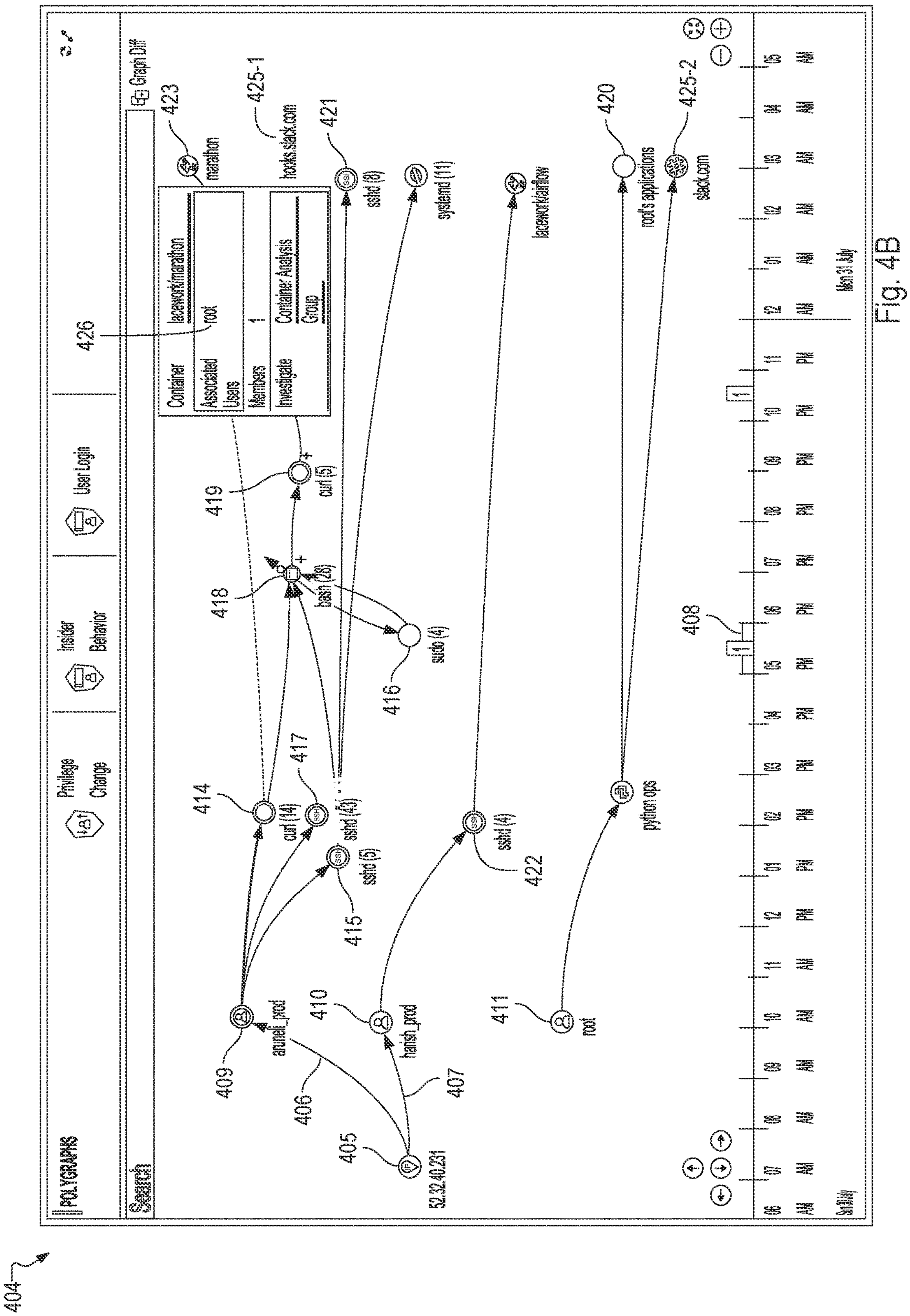
FIG. 4B illustrates an embodiment of a portion of an insider behavior graph.

FIG. 4B illustrates an example of a portion of an insider behavior graph (e.g., as rendered in a web browser). In the example shown, node 405 (the external IP address, 52.32.40.231) is an example of a Tier 0 node, and represents an entry point into a datacenter. As indicated by directional arrows 406 and 407, two users, "user1_prod" and "user2_prod," both made use of the source IP 52.32.40.231 when logging in between 5 μm and 6 pm on Sunday July 30 (408). Nodes 409 and 410 are examples of Tier 1 nodes, having user1_prod and user2_prod as associated respective original users. As previously mentioned, Tier 1 nodes correspond to a combination of a user and a machine class. In the example depicted in FIG. 4B, the machine class associated with nodes 409 and 410 is hidden from view to simplify visualization, but can be surfaced to a viewer of interface 404 (e.g., when the user clicks on node 409 or 410).

Nodes 414-423 are examples of Tier 2 nodes-processes that are launched by users in Tier 1 and their child, grandchild, etc. processes. Note that also depicted in FIG. 4B is a Tier 1 node 411 that corresponds to a user, "root," that logged in to a machine cluster from within the datacenter (i.e., has an entry point within the datacenter). Nodes 425-1 and 425-2 are examples of Tier 3 nodes—internal/external IP addresses, servers, etc., with which Tier 2 nodes communicate.

In the example shown in FIG. 4B, a viewer of interface 404 has clicked on node 423. As indicated in region 426, the user running the marathon container is "root." However, by following the directional arrows in the graph backwards from node 423 (i.e. from right to left), the viewer can determine that the original user, responsible for node 423, is "user1_prod," who logged into the datacenter from IP 52.32.40.231.

The following are examples of changes that can be tracked using an insider behavior graph model:

A user logs in from a new IP address.

A user logs in from a geolocation not previously used by that user.

A user logs into a new machine class.

A user launches a process not previously used by that user.

A user connects to an internal server to which the user has not previously connected.

An original user communicates with an external server (or external server known to be malicious) with which that user has not previously communicated.

A user communicates with an external server which has a geolocation not previously used by that user.

Such changes can be surfaced as alerts, e.g., to help an administrator determine when/what anomalous behavior occurs within a datacenter. Further, the behavior graph model can be used (e.g., during forensic analysis) to answer questions helpful during an investigation. Examples of such questions include:

Was there any new login activity (Tier 0) in the timeframe being investigated? As one example, has a user logged in from an IP address with unknown geolocation information? Similarly, has a user started communicating externally with a new Tier 3 node (e.g., one with unknown geolocation information).

Has there been any suspicious login activity (Tier 0) in the timeframe being investigated? As one example, has a user logged in from an IP address that corresponds to a known bad IP address as maintained by Threat aggregator 150? Similarly, has there been any suspicious Tier 3 activity?

Were any anomalous connections made within the datacenter during the timeframe being investigated? As one example, suppose a given user ("Frank") typically enters a datacenter from a particular IP address (or range of IP addresses), and then connects to a first machine type (e.g., bastion), and then to a second machine type (e.g., database_prod). If Frank has directly connected to database_prod (instead of first going through bastion) during the timeframe, this can be surfaced using the insider graph.

Who is (the original user) responsible for running a particular process?

Figure 4C:
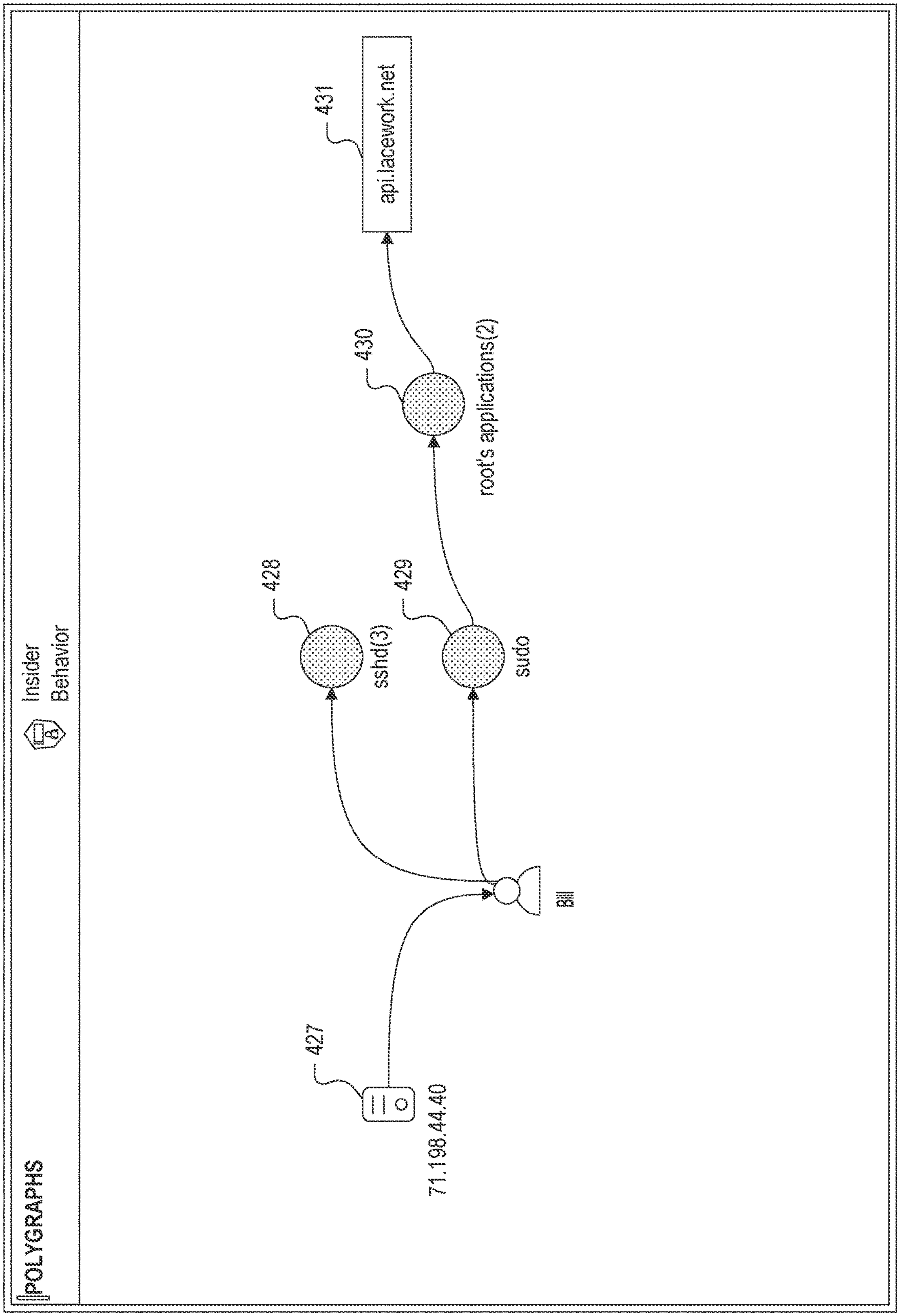
FIG. 4C illustrates an embodiment of a portion of an insider behavior graph.
Figure 4D:
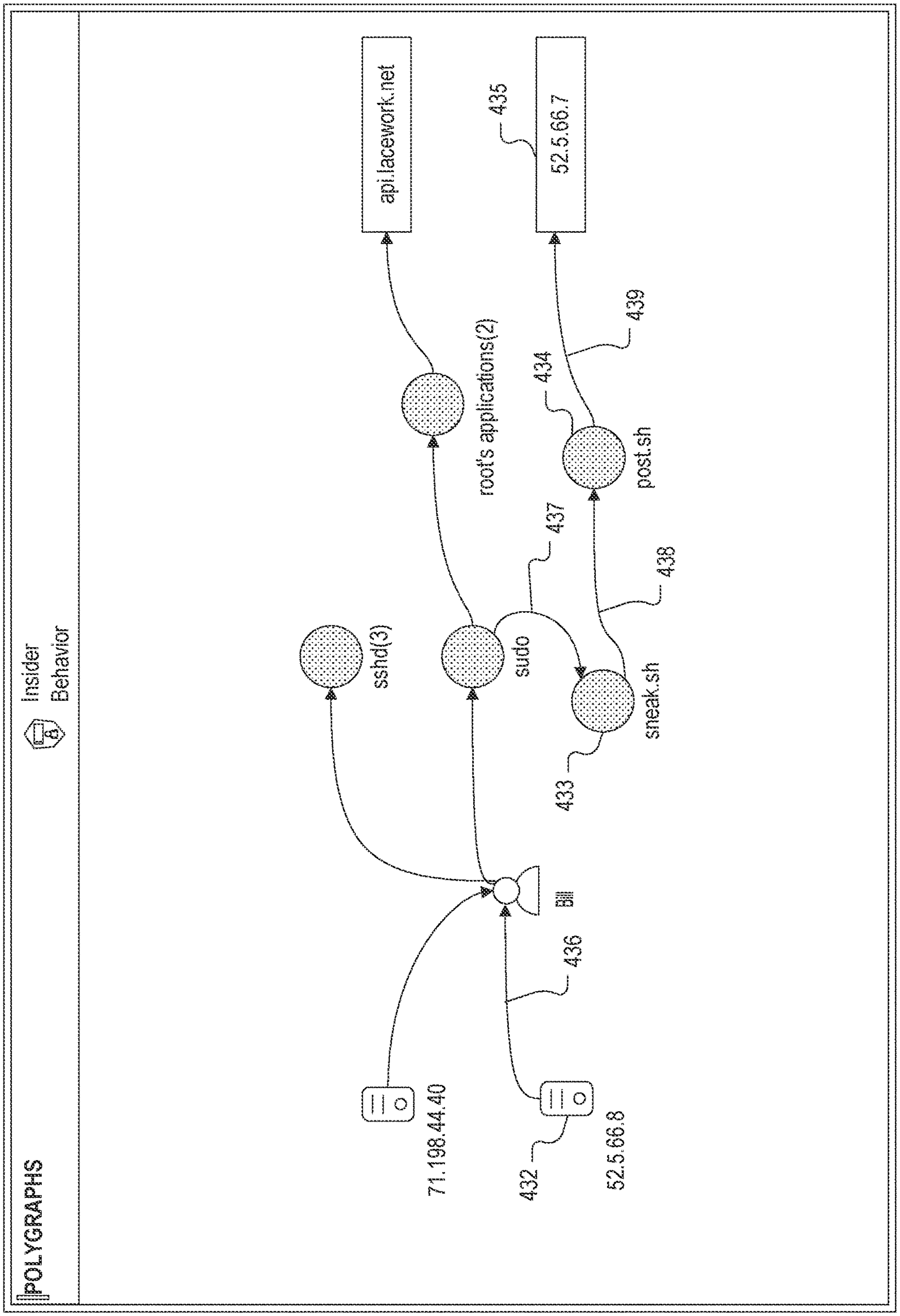
FIG. 4D illustrates an embodiment of a portion of an insider behavior graph.

An example of an insider behavior graph being used in an investigation is depicted in FIGS. 4C and 4D. FIG. 4C depicts a baseline of behavior for a user, "Bill." As shown in FIG. 4C, Bill typically logs into a datacenter from the IP address, 71.198.44.40 (427). He typically makes use of ssh (428), and sudo (429), makes use of a set of typical applications (430) and connects (as root) with the external service, api.lacework.net (431).

Suppose Bill's credentials are compromised by a nefarious outsider ("Eddie"). FIG. 4D depicts an embodiment of how the graph depicted in FIG. 4C would appear once Eddie begins exfiltrating data from the datacenter. Eddie logs into the datacenter (using Bill's credentials) from 52.5.66.8 (432). As Bill, Eddie escalates her privilege to root (e.g., via su), and then becomes a different user, Alex (e.g., via su alex). As Alex, Eddie executes a script, "sneak.sh" (433), which launches another script, "post.sh" (434), which contacts external server 435 which has an IP address of 52.5.66.7, and transmits data to it. Edges 436-439 each represent changes in Bill's behavior. As previously mentioned, such changes can be detected as anomalies and associated alerts can be generated. As a first example, Bill logging in from an IP address he has not previously logged in from (436) can generate an alert. As a second example, while Bill does typically make use of sudo (429), he has not previously executed sneak.sh (433) or post.sh (434) and the execution of those scripts can generate alerts as well. As a third example, Bill has not previously communicated with server 435, and an alert can be generated when he does so (439). Considered individually, each of edges 436-439 may indicate nefarious behavior, or may be benign. As an example of a benign edge, suppose Bill begins working from a home office two days a week. The first time he logs in from his home office (i.e., from an IP address that is not 71.198.44.40), an alert can be generated that he has logged in from a new location. Over time, however, as Bill continues to log in from his home office but otherwise engages in typical activities, Bill's graph will evolve to include logins from both 71.198.44.40 and his home office as baseline behavior. Similarly, if Bill begins using a new tool in his job, an alert can be generated the first time he executes the tool, but over time will become part of his baseline.

In some cases, a single edge can indicate a serious threat. For example, if server 432 (or 435) is included in a known bad IP listing, edge 436 (or 439) indicates compromise. An alert that includes an appropriate severity level (e.g., "threat level high") can be generated. In other cases, a combination of edges could indicate a threat (where a single edge might otherwise result in a lesser warning). In the example shown in FIG. 4D, the presence of multiple new edges is indicative of a serious threat. Of note, even though "sneak.sh" and "post.sh" were executed by Alex, because data platform 12 also keeps track of an original user, the compromise of user B's account will be discovered.

Figure 4E:
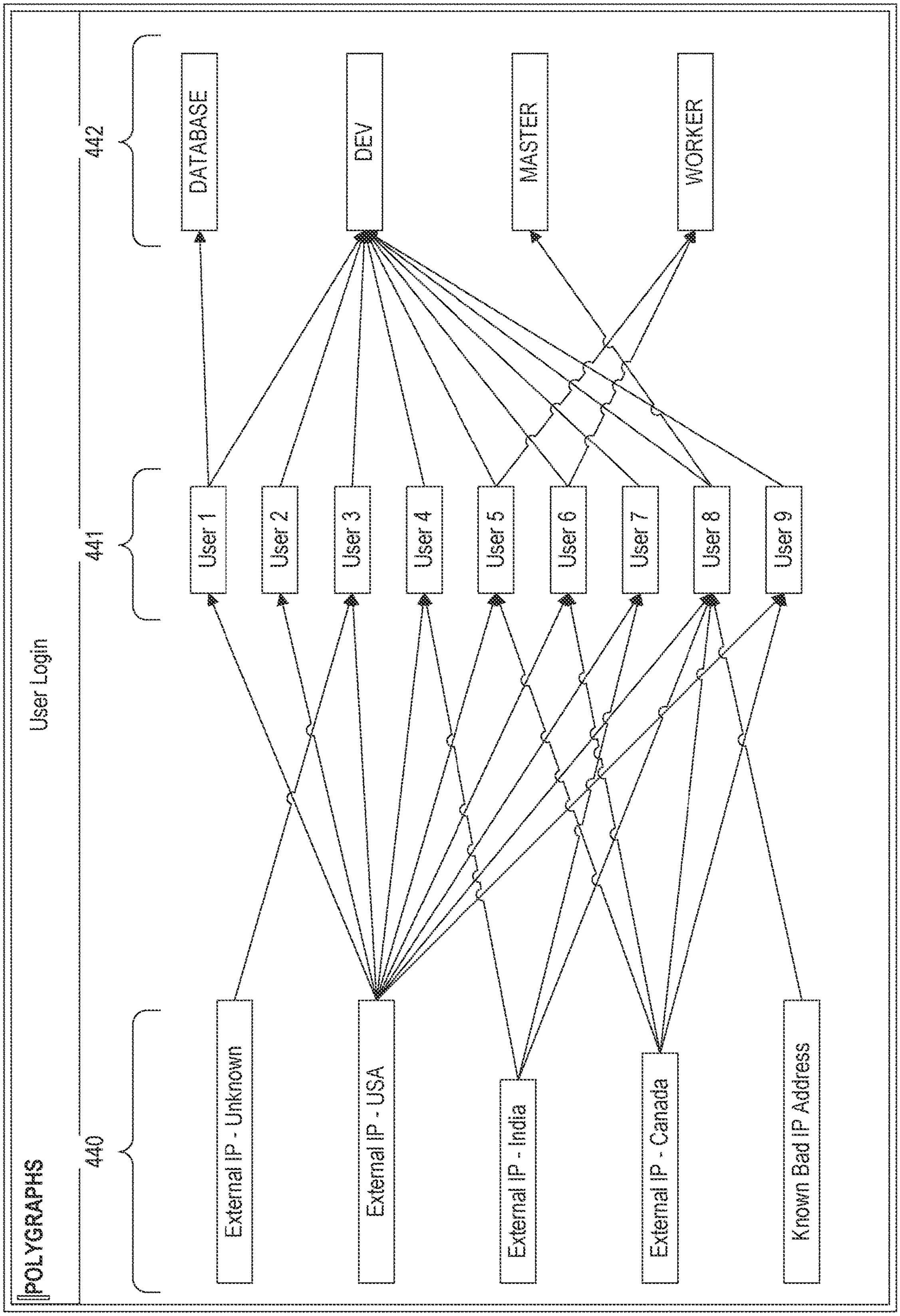
FIG. 4E illustrates a representation of an embodiment of a user login graph.

FIG. 4E illustrates a representation of an embodiment of a user login graph. In the example of FIG. 4E, tier 0 (440) clusters source IP addresses as belonging to a particular country (including an "unknown" country) or as a known bad IP. Tier 1 (441) clusters user logins, and tier 2 (442) clusters type of machine class into which a user is logging in. The user login graph tracks the typical login behavior of users. By interacting with a representation of the graph, answers to questions such as the following can be obtained:

- Where is a user logging in from?
- Have any users logged in from a known bad address?
- Have any non-developer users accessed development machines?
- Which machines does a particular user access?

Examples of alerts that can be generated using the user login graph include:

- A user logs in from a known bad IP address.
- A user logs in from a new country for the first time.
- A new user logs into the datacenter for the first time.
- A user accesses a machine class that the user has not previously accessed.

One way to track privilege changes in a datacenter is by monitoring a process hierarchy of processes. To help filter out noisy commands/processes such as "su-u," the hierarchy of processes can be constrained to those associated with network activity. In a *nix system, each process has two identifiers assigned to it, a process identifier (PID) and a parent process identifier (PPID). When such a system starts, the initial process is assigned a PID 0. Each user process has a corresponding parent process.

Using techniques described herein, a graph can be constructed (also referred to herein as a privilege change graph) which models privilege changes. In particular, a graph can be constructed which identifies where a process P1 launches a process P2, where P1 and P2 each have an associated user U1 and U2, with U1 being an original user, and U2 being an effective user. In the graph, each node is a cluster of processes (sharing a CType) executed by a particular (original) user. As all the processes in the cluster belong to the same user, a label that can be used for the cluster is the user's username. An edge in the graph, from a first node to a second node, indicates that a user of the first node changed its privilege to the user of the second node.

Figure 4F:
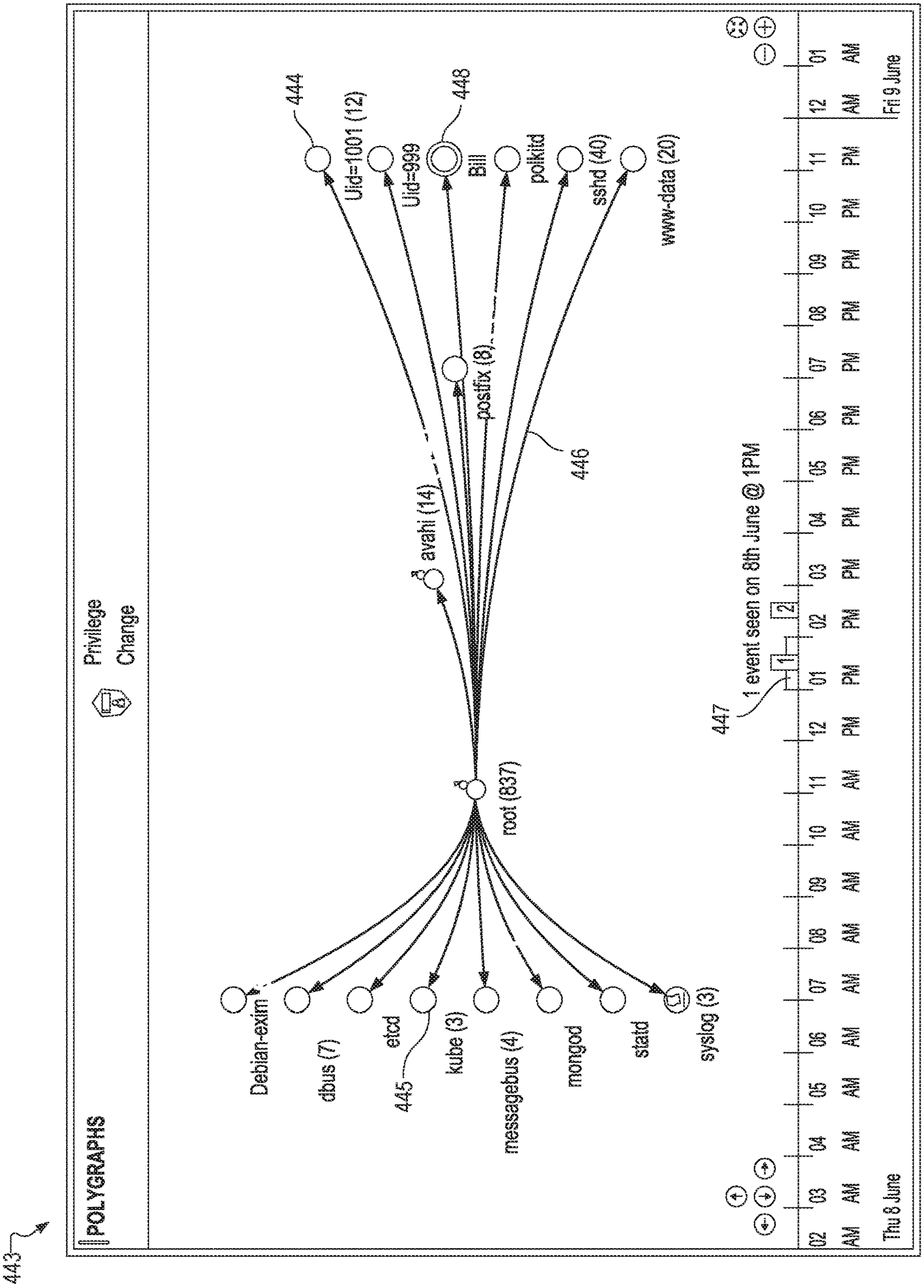
FIG. 4F illustrates an example of a privilege change graph.

FIG. 4F illustrates an example of a privilege change graph. In the example shown in FIG. 4F, each node (e.g., nodes 444 and 445) represents a user. Privilege changes are indicated by edges, such as edge 446.

As with other graphs, anomalies in graph 443 can be used to generate alerts. Three examples of such alerts are as follows:

- New user entering the datacenter. Any time a new user enters the datacenter and runs a process, the graph will show a new node, with a new CType. This indicates a new user has been detected within the datacenter. FIG. 4F is a representation of an example of an interface that depicts such an alert. Specifically, as indicated in region 447, an alert for the time period 1 pm-2 pm on June 8 was generated. The alert identifies that a new user, Bill (448) executed a process.
- Privilege change. As explained above, a new edge, from a first node (user A) to a second node (user B) indicates that user A has changed privilege to user B.
- Privilege escalation. Privilege escalation is a particular case of privilege change, in which the first user becomes root.

Figure 4G:
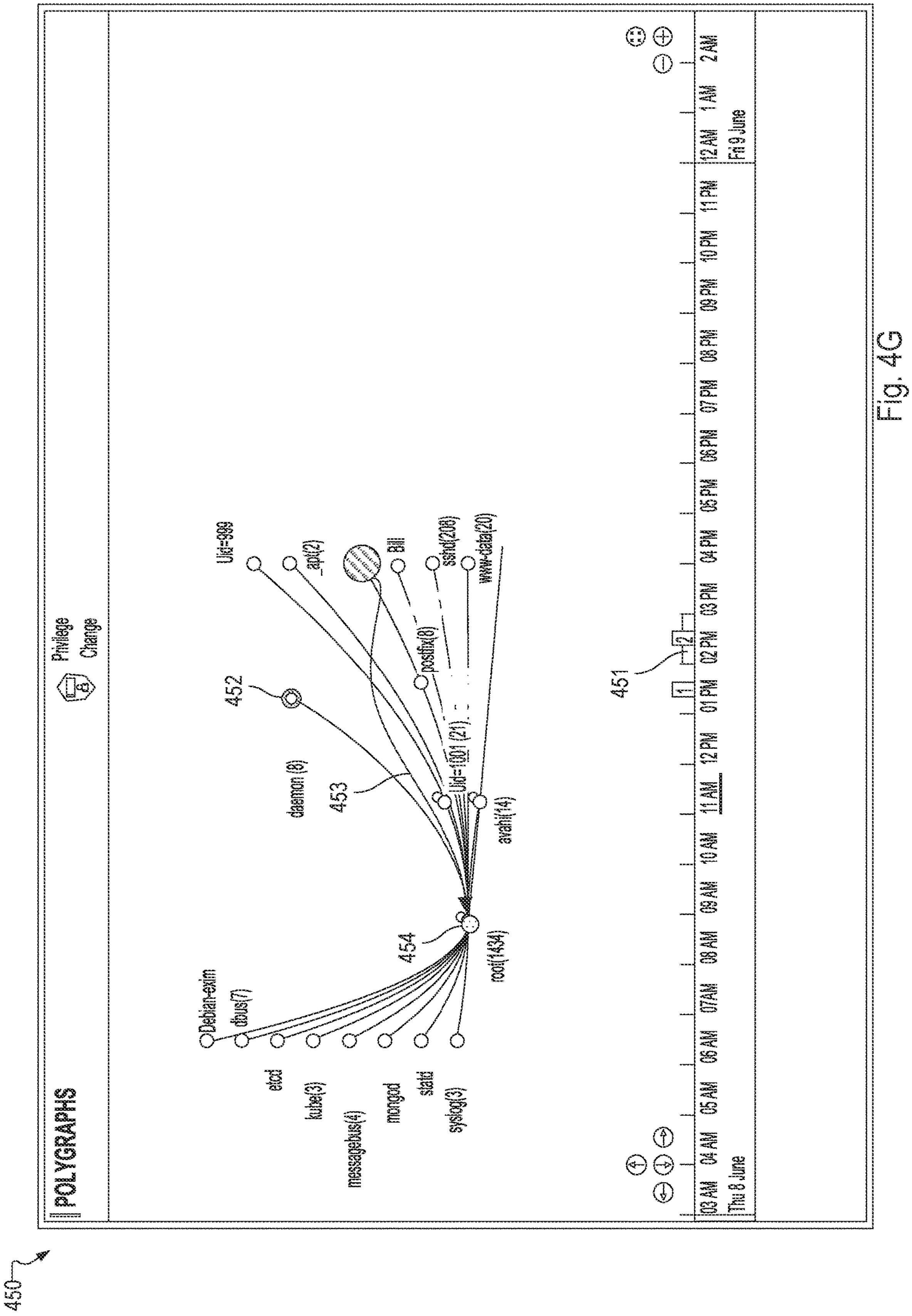
FIG. 4G illustrates an example of a privilege change graph.

An example of an anomalous privilege change and an example of an anomalous privilege escalation are each depicted in graph 450 of FIG. 4G. In particular, as indicated in region 451, two alerts for the time period 2 pm-3 pm on June 8 were generated (corresponding to the detection of the two anomalous events). In region 452, root has changed privilege to the user "daemon," which root has not previously done. This anomaly is indicated to the user by highlighting the daemon node (e.g., outlining it in a particular color, e.g., red). As indicated by edge 453, Bill has escalated his privilege to the user root (which can similarly be highlighted in region 454). This action by Bill represents a privilege escalation.

An Extensible query interface for dynamic data compositions and filter applications will now be described.

As described herein, datacenters are highly dynamic environments. And, different customers of data platform 12 (e.g., entity A vs. entity B) may have different/disparate needs/requirements of data platform 12, e.g., due to having different types of assets, different applications, etc. Further, as time progresses, new software tools will be developed, new types of anomalous behavior will be possible (and should be detectable), etc. In various embodiments, data platform 12 makes use of predefined relational schema (including by having different predefined relational schema for different customers). However, the complexity and cost of maintaining/updating such predefined relational schema can rapidly become problematic-particularly where the schema includes a mix of relational, nested, and hierarchical (graph) datasets. In other embodiments, the data models and filtering applications used by data platform 12 are extensible. As will be described in more detail below, in various embodiments, data platform 12 supports dynamic query generation by automatic discovery of join relations via static or dynamic filtering key specifications among composable data sets. This allows a user of data platform 12 to be agnostic to modifications made to existing data sets as well as creation of new data sets. The extensible query interface also provides a declarative and configurable specification for optimizing internal data generation and derivations.

As will also be described in more detail below, data platform 12 is configured to dynamically translate user interactions (e.g., received via web app 120) into SQL queries (and without the user needing to know how to write queries). Such queries can then be performed (e.g., by query service 166) against any compatible backend (e.g., data store 30).

Figure 4H:
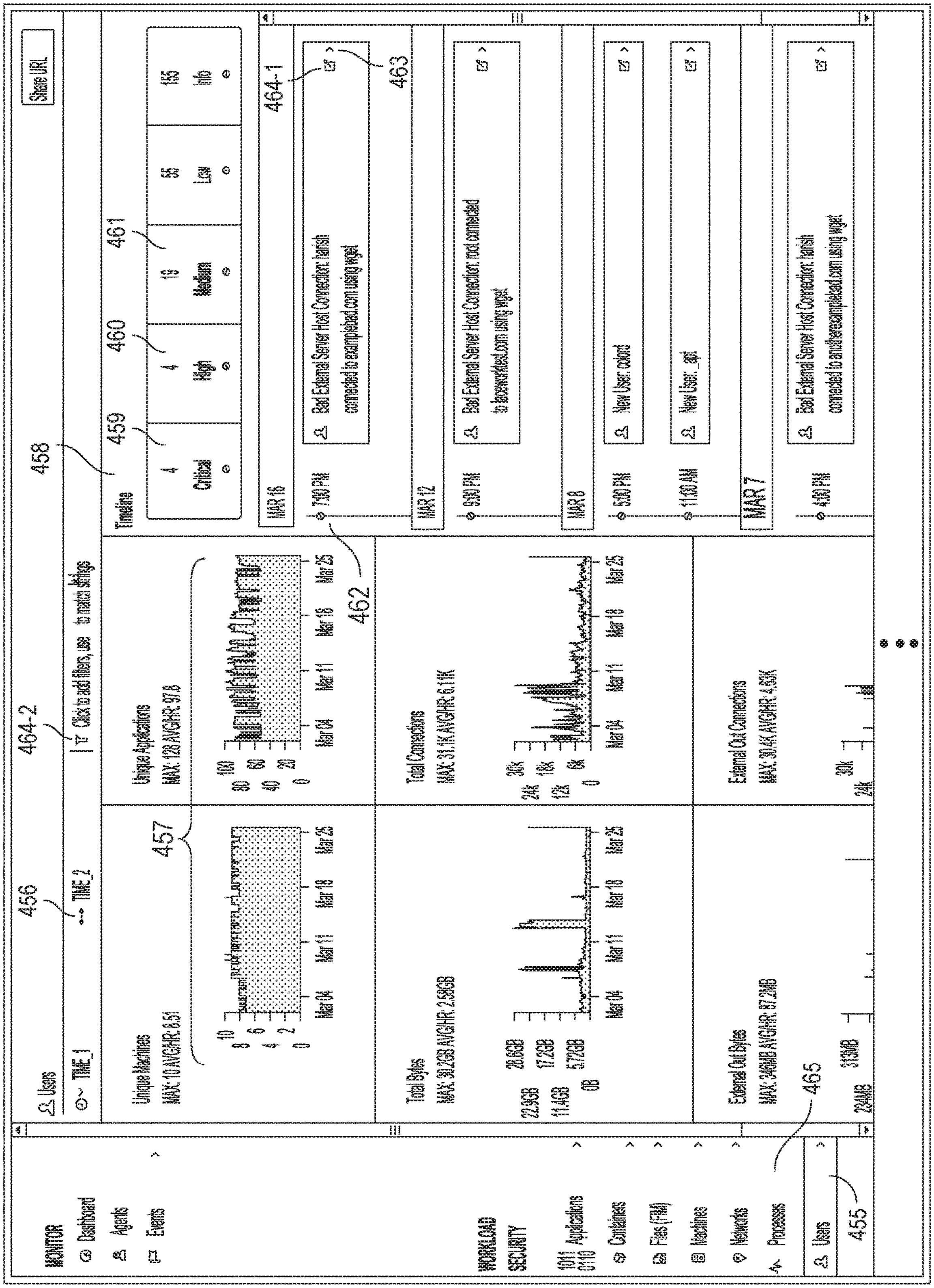
FIG. 4H illustrates an example of a user interacting with a portion of an interface.

FIG. 4H illustrates an example of a user interacting with a portion of an interface. When a user visits data platform 12 (e.g., via web app 120 using a browser), data is extracted from data store 30 as needed (e.g., by query service 166), to provide the user with information, such as the visualizations depicted variously herein. As the user continues to interact with such visualizations (e.g., clicking on graph nodes, entering text into search boxes, navigating between tabs (e.g., tab 455 vs. 465)), such interactions act as triggers that cause query service 166 to continue to obtain information from data store 30 as needed (and as described in more detail below).

In the example shown in FIG. 4H, user A is viewing a dashboard that provides various information about entity A users (455), during the time period March 2 at midnight-March 25 at 7 pm (which she selected by interacting with region 456). Various statistical information is presented to user A in region 457. Region 458 presents a timeline of events that occurred during the selected time period. User A has opted to list only the critical, high, and medium events during the time period by clicking on the associated boxes (459-461). A total of 55 low severity, and 155 info-only events also occurred during the time period. Each time user A interacts with an element in FIG. 4H (e.g., clicks on box 461, clicks on link 464-1, or clicks on tab 465), her actions are translated/formalized into filters on the data set and used to dynamically generate SQL queries. The SQL queries are generated transparently to user A (and also to a designer of the user interface shown in FIG. 4H).

Figure 4I:
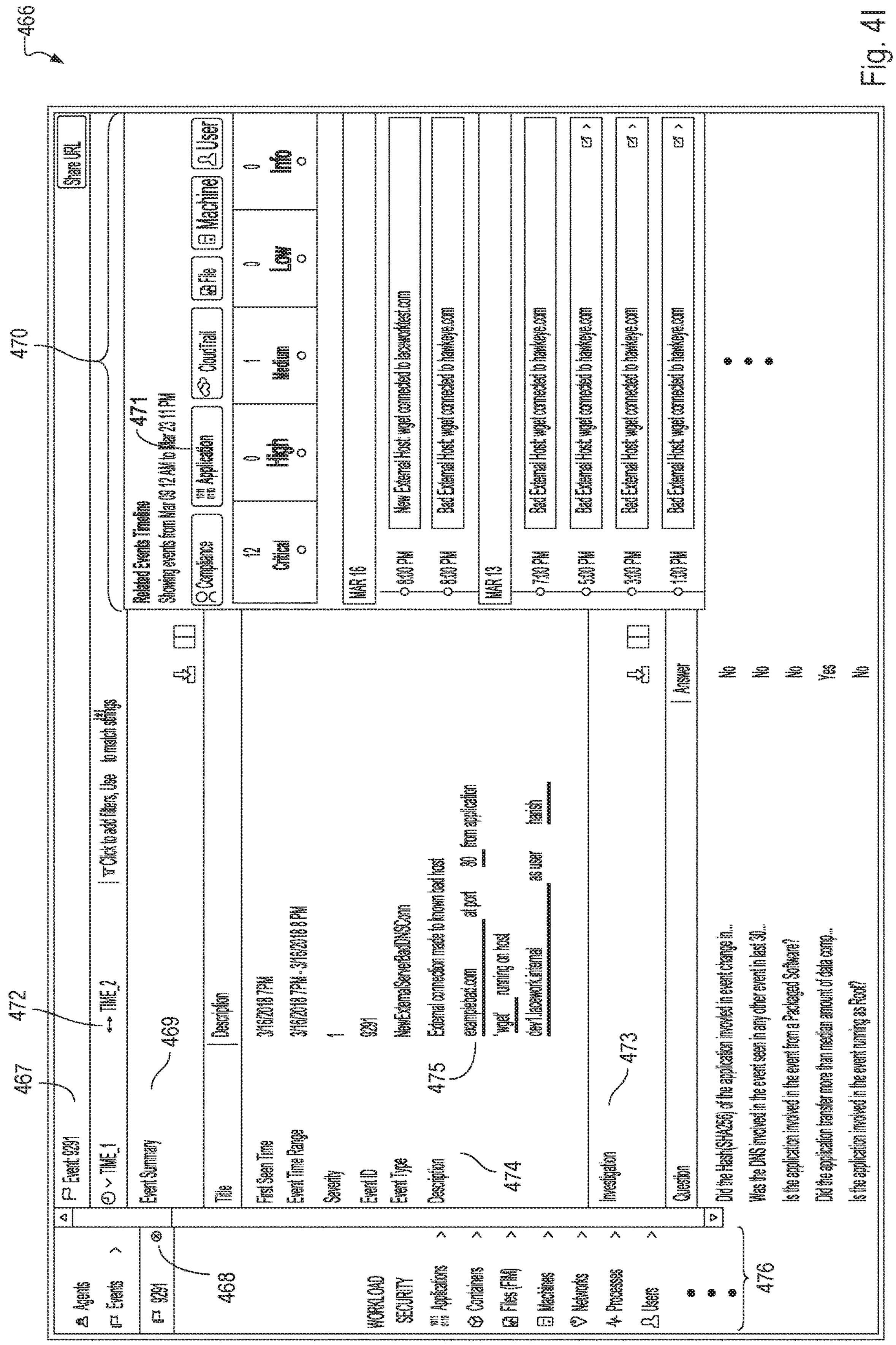
FIG. 4I illustrates an example of a dossier for an event.

User A notes in the timeline (462) that a user, UserA, connected to a known bad server (examplebad.com) using wget, an event that has a critical severity level. User A can click on region 463 to expand details about the event inline (which will display, for example, the text "External connection made to known bad host examplebad.com at port 80 from application 'wget' running on host dev1.lacework.internal as user userA") directly below timeline 462. User A can also click on link 464-1, which will take her to a dossier for the event (depicted in FIG. 4I). As will be described in more detail below, a dossier is a template for a collection of visualizations.

As shown in interface 466, the event of UserA using wget to contact examplebad.com on March 16 was assigned an event ID of 9291 by data platform 12 (467). For convenience to user A, the event is also added to her dashboard in region 476 as a bookmark (468). A summary of the event is depicted in region 469. By interacting with boxes shown in region 470, user A can see a timeline of related events. In this case, user A has indicated that she would like to see other events involving the wget application (by clicking box 471). Events of critical and medium security involving wget occurred during the one hour window selected in region 472.

Figure 4J:
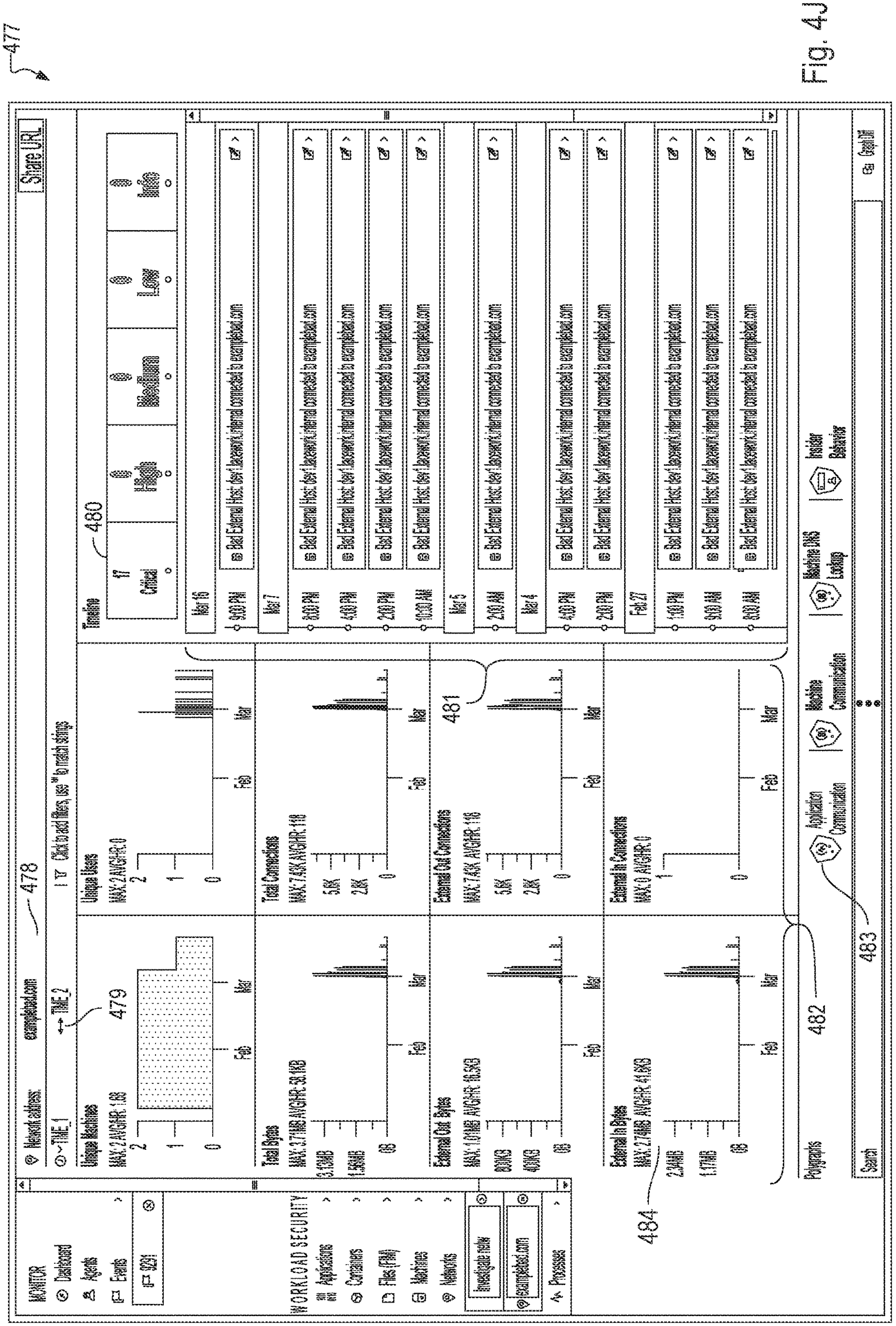
FIG. 4J illustrates an example of a dossier for a domain.

Region 473 automatically provides user A with answers to questions that may be helpful to have answers to while investigating event 9291. If user A clicks on any of the links in the event description (474), she will be taken to a corresponding dossier for the link. As one example, suppose user A clicks on link 475. She will then be presented with interface 477 shown in FIG. 4J.

Interface 477 is an embodiment of a dossier for a domain. In this example, the domain is "examplebad.com," as shown in region 478. Suppose user A would like to track down more information about interactions entity A resources have made with examplebad.com between January 1 and March 20. She selects the appropriate time period in region 479 and information in the other portions of interface 477 automatically update to provide various information corresponding to the selected time frame. As one example, user A can see that contact was made with examplebad.com a total of 17 times during the time period (480), as well as a list of each contact (481). Various statistical information is also included in the dossier for the time period (482). If she scrolls down in interface 477, user A will be able to view various polygraphs associated with examplebad.com, such as an application-communication polygraph (483).

Data stored in data store 30 can be internally organized as an activity graph. In the activity graph, nodes are also referred to as Entities. Activities generated by Entities are modeled as directional edges between nodes. Thus, each edge is an activity between two Entities. One example of an Activity is a "login" Activity, in which a user Entity logs into a machine Entity (with a directed edge from the user to the machine). A second example of an Activity is a "launch" Activity, in which a parent process launches a child process (with a directed edge from the parent to the child). A third example of an Activity is a "DNS query" Activity, in which either a process or a machine performs a query (with a directed edge from the requestor to the answer, e.g., an edge from a process to www.example.com). A fourth example of an Activity is a network "connected to" Activity, in which processes, IP addresses, and listen ports can connect to each other (with a directed edge from the initiator to the server).

As will be described in more detail below, query service 166 provides either relational views or graph views on top of data stored in data store 30. Typically, a user will want to see data filtered using the activity graph. For example, if an entity was not involved in an activity in a given time period, that entity should be filtered out of query results. Thus, a request to show "all machines" in a given time frame will be interpreted as "show distinct machines that were active" during the time frame.

Query service 166 relies on three main data model elements: fields, entities, and filters. As used herein, a field is a collection of values with the same type (logical and physical). A field can be represented in a variety of ways, including: 1. a column of relations (table/view), 2. a return field from another entity, 3. an SQL aggregation (e.g., COUNT, SUM, etc.), 4. an SQL expression with the references of other fields specified, and 5. a nested field of a JSON object. As viewed by query service 166, an entity is a collection of fields that describe a data set. The data set can be composed in a variety of ways, including: 1. a relational table, 2. a parameterized SQL statement, 3. DynamicSQL created by a Java function, and 4. join/project/aggregate/subclass of other entities. Some fields are common for all entities. One example of such a field is a "first observed" timestamp (when first use of the entity was detected). A second example of such a field is the entity classification type (e.g., one of: 1. Machine (on which an agent is installed), 2. Process, 3. Binary, 4. UID, 5. IP, 6. DNS Information, 7. ListenPort, and 8. PType). A third example of such a field is a "last observed" timestamp.

A filter is an operator that: 1. takes an entity and field values as inputs, 2. a valid SQL expression with specific reference(s) of entity fields, or 3. is a conjunct/disjunct of filters. As will be described in more detail below, filters can be used to filter data in various ways, and limit data returned by query service 166 without changing the associated data set.

As mentioned above, a dossier is a template for a collection of visualizations. Each visualization (e.g., the box including chart 484) has a corresponding card, which identifies particular target information needed (e.g., from data store 30) to generate the visualization. In various embodiments, data platform 12 maintains a global set of dossiers/cards. Users of data platform 12 such as user A can build their own dashboard interfaces using preexisting dossiers/cards as components, and/or they can make use of a default dashboard (which incorporates various of such dossiers/cards).

A JSON file can be used to store multiple cards (e.g., as part of a query service catalog). A particular card is represented by a single JSON object with a unique name as a field name. Each card may be described by the following named fields:

TYPE: the type of the card. Example values include:
- Entity (the default type)
- SQL
- Filters
- DynamicSQL
- graphFilter
- graph
- Function
- Template PARAMETERS: a JSON array object that contains an array of parameter objects with the following fields:
- name (the name of the parameter)
- required (a Boolean flag indicating whether the parameter is required or not)
- default (a default value of the parameter)
- props (a generic JSON object for properties of the parameter. Possible values are: "utype" (a user defined type), and "scope" (an optional property to configure a namespace of the parameter))
- value (a value for the parameter-non-null to override the default value defined in nested source entities)

SOURCES: a JSON array object explicitly specifying references of input entities. Each source reference has the following attributes:
- name (the card/entity name or fully-qualified Table name)
- type (required for base Table entity)
- alias (an alias to access this source entity in other fields (e.g., returns, filters, groups, etc))

RETURNS: a required JSON array object of a return field object. A return field object can be described by the following attributes:
- field (a valid field name from a source entity)
- expr (a valid SQL scalar expression. References to input fields of source entities are specified in the format of #{Entity Field}. Parameters can also be used in the expression in the format of ${ParameterName})
- type (the type of field, which is required for return fields specified by expr. It is also required for all return fields of an Entity with an SQL type)
- alias (the unique alias for return field)
- aggr (possible aggregations are: COUNT, COUNT_DISTINCT, DISTINCT, MAX, MIN, AVG, SUM, FIRST_VALUE, LAST_VALUE)
- case (JSON array object represents conditional expressions "when" and "expr")
- fieldsFrom, and, except (specification for projections from a source entity with excluded fields)
- props (general JSON object for properties of the return field. Possible properties include: "filterGroup," "title," "format," and "utype")

PROPS: generic JSON objects for other entity properties

SQL: a JSON array of string literals for SQL statements. Each string literal can contain parameterized expressions ${ParameterName} and/or composable entity by #{Entity Name} GRAPH: required for graph entity. Has the following required fields:
- source (including "type," "props," and "keys")
- target (including "type," "props," and "keys")
- edge (including "type" and "props")

JOINS: a JSON array of join operators. Possible fields for a join operator include:
- type (possible join types include: "loj"—Left Outer Join, "join"—Inner Join, "in"—Semi Join, "implicit"—Implicit Join)
- left (a left hand side field of join)
- right (a right hand side field of join)
- keys (key columns for multi-way joins)
- order (a join order of multi-way joins)

FKEYS: a JSON array of FilterKey(s). The fields for a FilterKey are:
- type (type of FilterKey)
- fieldRefs (reference(s) to return fields of an entity defined in the sources field)
- alias (an alias of the FilterKey, used in implicit join specification)

FILTERS: a JSON array of filters (conjunct). Possible fields for a filter include:
- type (types of filters, including: "eq"—equivalent to SQL=, "ne"—equivalent to SQL <>, "ge"—equivalent to SQL>=, "gt"—equivalent to SQL>, "le"—equivalent to SQL<=, "lt"—"equivalent to SQL<, "like"—equivalent to SQL LIKE, "not like"—equivalent to SQL NOT LIKE, "rlike"—equivalent to SQL RLIKE (Snowflake specific), "not_rlike"—equivalent to SQL NOT RLIKE (Snowflake specific), "in"—equivalent to SQL IN, "not_in"—equivalent to SQL NOT IN)
- expr (generic SQL expression)
- field (field name)
- value (single value)
- values (for both IN and NOT IN)

ORDERS: a JSON array of ORDER BY for returning fields. Possible attributes for the ORDER BY clause include:
- field (field ordinal index (1 based) or field alias)
- order (asc/desc, default is ascending order)

GROUPS: a JSON array of GROUP BY for returning fields. Field attributes are:
- field (ordinal index (1 based) or alias from the return fields)

LIMIT: a limit for the number of records to be returned

OFFSET: an offset of starting position of returned data. Used in combination with limit for pagination.

Suppose customers of data platform 12 (e.g., entity A and entity B) request new data transformations or a new aggregation of data from an existing data set (as well as a corresponding visualization for the newly defined data set). As mentioned above, the data models and filtering applications used by data platform 12 are extensible. Thus, two example scenarios of extensibility are (1) extending the filter data set, and (2) extending a FilterKey in the filter data set.

Data platform 12 includes a query service catalog that enumerates cards available to users of data platform 12. New cards can be included for use in data platform 12 by being added to the query service catalog (e.g., by an operator of data platform 12). For reusability and maintainability, a single external-facing card (e.g., available for use in a dossier) can be composed of multiple (nested) internal cards. Each newly added card (whether external or internal) will also have associated FilterKey(s) defined. A user interface (UI) developer can then develop a visualization for the new data set in one or more dossier templates. The same external card can be used in multiple dossier templates, and a given external card can be used multiple times in the same dossier (e.g., after customization). Examples of external card customization include customization via parameters, ordering, and/or various mappings of external data fields (columns).

As mentioned above, a second extensibility scenario is one in which a FilterKey in the filter data set is extended (i.e., existing template functions are used to define a new data set). As also mentioned above, data sets used by data platform 12 are composable/reusable/extensible, irrespective of whether the data sets are relational or graph data sets. One example data set is the User Tracking polygraph, which is generated as a graph data set (comprising nodes and edges). Like other polygraphs, User Tracking is an external data set that can be visualized both as a graph (via the nodes and edges) and can also be used as a filter data set for other cards, via the cluster identifier (CID) field.

As mentioned above, as users such as user A navigate through/interact with interfaces provided by data platform 12 (e.g., as shown in FIG. 4H), such interactions trigger query service 166 to generate and perform queries against data store 30. Dynamic composition of filter datasets can be implemented using FilterKeys and FilterKey Types. A FilterKey can be defined as a list of columns and/or fields in a nested structure (e.g., JSON). Instances of the same FilterKey Type can be formed as an Implicit Join Group. The same instance of a FilterKey can participate in different Implicit Join Groups. A list of relationships among all possible Implicit Join Groups is represented as a Join graph for the entire search space to create a final data filter set by traversing edges and producing Join Path(s).

Each card (e.g., as stored in the query service catalog and used in a dossier) can be introspected by a/card/describe/CardID REST request.

Figure 4K:
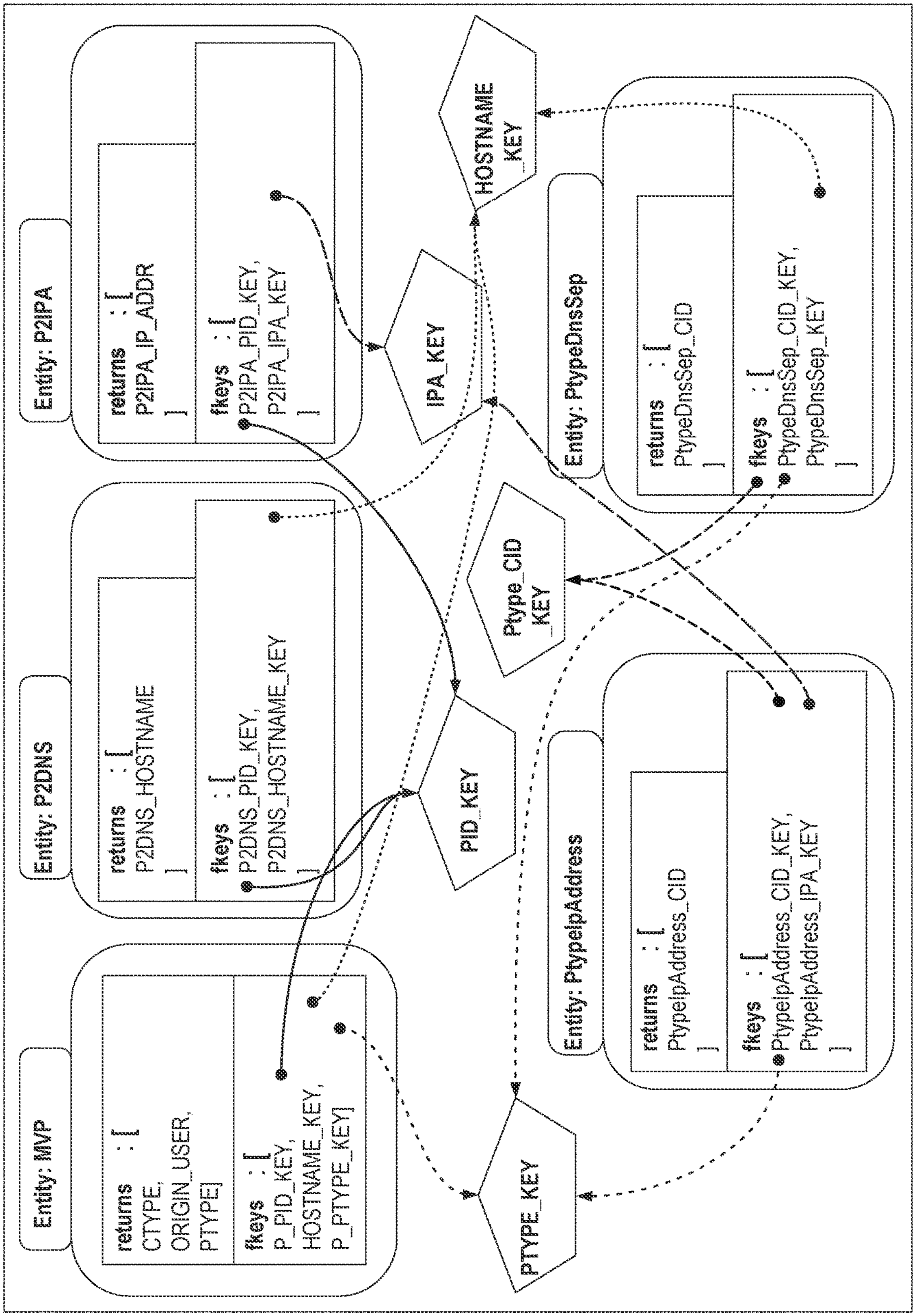
FIG. 4K depicts an example of an Entity Join graph by FilterKey and FilterKey Group (implicit join).

At runtime (e.g., whenever it receives a request from web app 120), query service 166 parses the list of implicit joins and creates a Join graph to manifest relationships of FilterKeys among Entities. A Join graph (an example of which is depicted in FIG. 4K) comprises a list of Join Link(s). A Join Link represents each implicit join group by the same FilterKey type. A Join Link maintains a reverse map (Entity-to-FilterKey) of FilterKeys and their Entities. As previously mentioned, Entities can have more than one FilterKey defined. The reverse map guarantees one FilterKey per Entity can be used for each JoinLink. Each JoinLink also maintains a list of entities for the priority order of joins. Each JoinLink is also responsible for creating and adding directional edge(s) to graphs. An edge represents a possible join between two Entities.

At runtime, each Implicit Join uses the Join graph to find all possible join paths. The search of possible join paths starts with the outer FilterKey of an implicit join. One approach is to use a shortest path approach, with breadth first traversal and subject to the following criteria:

- Use the priority order list of Join Links for all entities in the same implicit join group.
- Stop when a node (Entity) is reached which has local filter(s)
- Include all join paths at the same level (depth).
- Exclude join paths based on the predefined rules (path of edges).

Figure 4L:
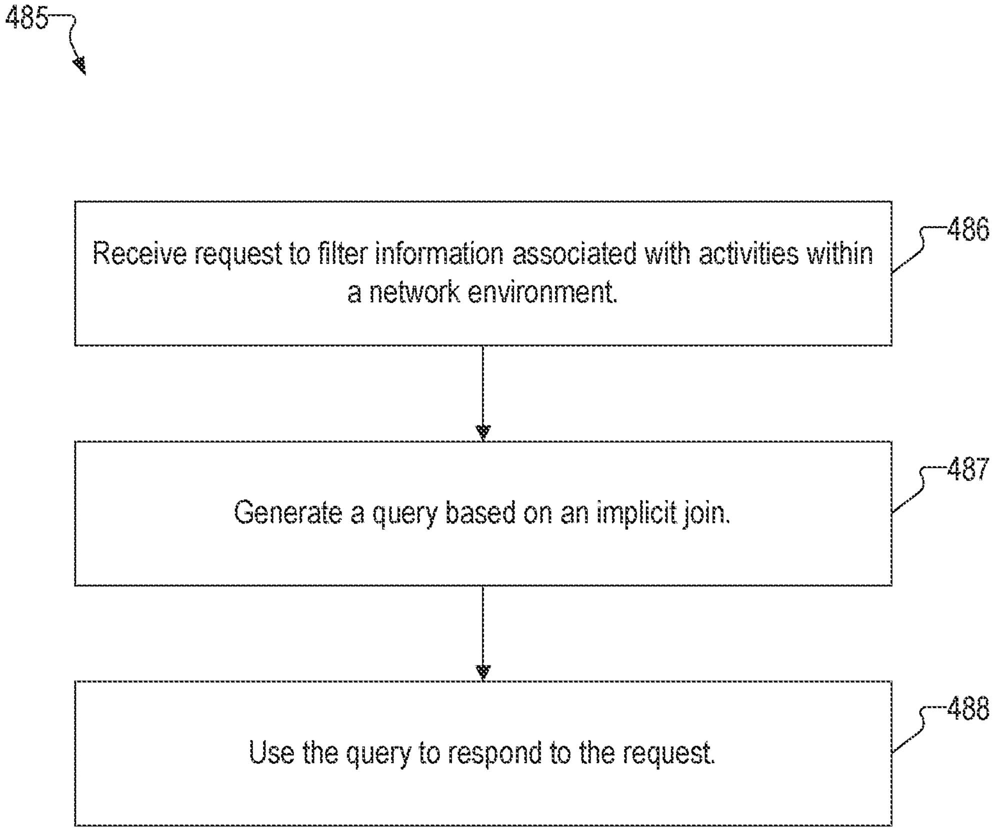
FIG. 4L illustrates an example of a process for dynamically generating and executing a query.

FIG. 4L illustrates an example of a process for dynamically generating and executing a query. In various embodiments, process 485 is performed by data platform 12. The process begins at 486 when a request is received to filter information associated with activities within a network environment. One example of such a request occurs in response to user A clicking on tab 465. Another example of such a request occurs in response to user A clicking on link 464-1. Yet another example of such a request occurs in response to user A clicking on link 464-2 and selecting (e.g., from a dropdown) an option to filter (e.g., include, exclude) based on specific criteria that she provides (e.g., an IP address, a username, a range of criteria, etc.).

At 487, a query is generated based on an implicit join. One example of processing that can be performed at 487 is as follows. As explained above, one way dynamic composition of filter datasets can be implemented is by using FilterKeys and FilterKey Types. And, instances of the same FilterKey Type can be formed as an Implicit Join Group. A Join graph for the entire search space can be constructed from a list of all relationships among all possible Join Groups. And, a final data filter set can be created by traversing edges and producing one or more Join Paths. Finally, the shortest path in the join paths is used to generate an SQL query string.

One approach to generating an SQL query string is to use a query building library (authored in an appropriate language such as Java). For example, a common interface "sqlGen" may be used in conjunction with process 485 is as follows. First, a card/entity is composed by a list of input cards/entities, where each input card recursively is composed by its own list of input cards. This nested structure can be visualized as a tree of query blocks (SELECT) in standard SQL constructs. SQL generation can be performed as the traversal of the tree from root to leaf entities (top-down), calling the sqlGen of each entity. Each entity can be treated as a subclass of the Java class (Entity). An implicit join filter (EntityFilter) is implemented as a subclass of Entity, similar to the right hand side of a SQL semi-join operator. Unlike the static SQL semi-join construct, it is conditionally and recursively generated even if it is specified in the input sources of the JSON specification. Another recursive interface can also be used in conjunction with process 485, preSQLGen, which is primarily the entry point for EntityFilter to run a search and generate nested implicit join filters. During preSQLGen recursive invocations, the applicability of implicit join filters is examined and pushed down to its input subquery list. Another top-down traversal, pullUpCachable, can be used to pull up common sub-query blocks, including those dynamically generated by preSQLGen, such that SELECT statements of those cacheable blocks are generated only once at top-level WITH clauses. A recursive interface, sqlWith, is used to generate nested subqueries inside WITH clauses. The recursive calls of a sqlWith function can generate nested WITH clauses as well. An sqlFrom function can be used to generate SQL FROM clauses by referencing those subquery blocks in the WITH clauses. It also produces INNER/OUTER join operators based on the joins in the specification. Another recursive interface, sqlWhere, can be used to generate conjuncts and disjuncts of local predicates and semi-join predicates based on implicit join transformations. Further, sqlProject, sqlGroupBy, sqlOrderBy, and sqlLimitOffset can respectively be used to translate the corresponding directives in JSON spec to SQL SELECT list, GROUP BY, ORDER BY, and LIMIT/OFFSET clauses.

Returning to process 485, at 488, the query (generated at 487) is used to respond to the request. As one example of the processing performed at 488, the generated query is used to query data store 30 and provide (e.g., to web app 120) fact data formatted in accordance with a schema (e.g., as associated with a card associated with the request received at 486).

Although the examples described herein largely relate to embodiments where data is collected from agents and ultimately stored in a data store such as those provided by Snowflake™, in other embodiments data that is collected from agents and other sources may be stored in different ways. For example, data that is collected from agents and other sources may be stored in a data warehouse, data lake, data mart, and/or any other data store.

A data warehouse may be embodied as an analytic database (e.g., a relational database) that is created from two or more data sources. Such a data warehouse may be leveraged to store historical data, often on the scale of petabytes. Data warehouses may have compute and memory resources for running complicated queries and generating reports. Data warehouses may be the data sources for business intelligence ('BI') systems, machine learning applications, and/or other applications. By leveraging a data warehouse, data that has been copied into the data warehouse may be indexed for good analytic query performance, without affecting the write performance of a database (e.g., an Online Transaction Processing ('OLTP') database). Data warehouses also enable the joining data from multiple sources for analysis. For example, a sales OLTP application probably has no need to know about the weather at various sales locations, but sales predictions could take advantage of that data. By adding historical weather data to a data warehouse, it would be possible to factor it into models of historical sales data.

Data lakes, which store files of data in their native format, may be considered as "schema on read" resources. As such, any application that reads data from the lake may impose its own types and relationships on the data. Data warehouses, on the other hand, are "schema on write," meaning that data types, indexes, and relationships are imposed on the data as it is stored in the EDW. "Schema on read" resources may be beneficial for data that may be used in several contexts and poses little risk of losing data. "Schema on write" resources may be beneficial for data that has a specific purpose, and good for data that must relate properly to data from other sources. Such data stores may include data that is encrypted using homomorphic encryption, data encrypted using privacy-preserving encryption, smart contracts, non-fungible tokens, decentralized finance, and other techniques.

Data marts may contain data oriented towards a specific business line whereas data warehouses contain enterprise-wide data. Data marts may be dependent on a data warehouse, independent of the data warehouse (e.g., drawn from an operational database or external source), or a hybrid of the two. In embodiments described herein, different types of data stores (including combinations thereof) may be leveraged. Such data stores may be proprietary or may be embodied as vendor provided products or services such as, for example, Google BigQuery®, Druid™, Amazon Redshift™, IBM [Db2] DB2®, Dremio™, Databricks™ Lakehouse Platform, Cloudera™, Azure® Synapse Analytics, and others.

The deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may be provisioned, deployed, and/or managed using infrastructure as code ('IaC'). IaC involves the managing and/or provisioning of infrastructure through code instead of through manual processes. With IaC, configuration files may be created that include infrastructure specifications. IaC can be beneficial as configurations may be edited and distributed, while also ensuring that environments are provisioned in a consistent manner. IaC approaches may be enabled in a variety of ways including, for example, using IaC software tools such as Terraform by HashiCorp. Through the usage of such tools, users may define and provide data center infrastructure using JavaScript Object Notation ('JSON'), YAML, proprietary formats, or some other format. In some embodiments, the configuration files may be used to emulate a cloud deployment for the purposes of analyzing the emulated cloud deployment using the systems described herein. Likewise, the configuration files themselves may be used as inputs to the systems described herein, such that the configuration files may be inspected to identify vulnerabilities, misconfigurations, violations of regulatory requirements, or other issues. In fact, configuration files for multiple cloud deployments may even be used by the systems described herein to identify best practices, to identify configuration files that deviate from typical configuration files, to identify configuration files with similarities to deployments that have been determined to be deficient in some way, or the configuration files may be leveraged in some other ways to detect vulnerabilities, misconfigurations, violations of regulatory requirements, or other issues prior to deploying an infrastructure that is described in the configuration files. In some embodiments the techniques described herein may be use in multi-cloud, multi-tenant, cross-cloud, cross-tenant, cross-user, industry cloud, digital platform, and other scenarios depending on specific need or situation.

In some embodiments, the deployments that are analyzed, monitored, evaluated, or otherwise observed by the systems described herein (e.g., systems that include components such as the platform 12 of FIG. 1D, the data collection agents described herein, and/or other components) may be monitored to determine the extent to which a particular component has experienced "drift" relative to its associated IaC configuration. Discrepancies between how cloud resources were defined in an IaC configuration file and how they are currently configured in runtime may be identified and remediation workflows may be initiated to generate an alert, reconfigure the deployment, or take some other action. Such discrepancies may occur for a variety of reasons. Such discrepancies may occur, for example, due to maintenance operations being performed, due to incident response tasks being carried out, or for some other reason. Readers will appreciate that while IaC helps avoid initial misconfigurations of a deployment by codifying and enforcing resource creation, resource configuration, security policies, and so on, the systems described herein may prevent unwanted drift from occurring during runtime and after a deployment has been created in accordance with an IaC configuration.

In some embodiments, the deployments (e.g., a customer's cloud deployment) that are analyzed, monitored, evaluated, or otherwise observed by the systems described herein (e.g., systems that include components such as the platform 12 of FIG. 1D, the data collection agents described herein, and/or other components) may also be provisioned, deployed, and/or managed using security as code ('SaC'). SaC extends IaC concepts by defining cybersecurity policies and/or standards programmatically, so that the policies and/or standards can be referenced automatically in the configuration scripts used to provision cloud deployments. Stated differently, SaC can automate policy implementation and cloud deployments may even be compared with the policies to prevent "drift." For example, if a policy is created where all personally identifiable information ('PII') or personal health information ('PHI') must be encrypted when it is stored, that policy is translated into a process that is automatically launched whenever a developer submits code, and code that violates the policy may be automatically rejected.

In some embodiments, SaC may be implemented by initially classifying workloads (e.g., by sensitivity, by criticality, by deployment model, by segment). Policies that can be instantiated as code may subsequently be designed. For example, compute-related policies may be designed, access-related policies may be designed, application-related policies may be designed, network-related policies may be designed, data-related policies may be designed, and so on. Security as code may then be instantiated through architecture and automation, as successful implementation of SaC can benefit from making key architectural-design decisions and executing the right automation capabilities. Next, operating model protections may be built and supported. For example, an operating model may "shift left" to maximize self-service and achieve full-life-cycle security automation (e.g., by standardizing common development toolchains, CI/CD pipelines, and the like). In such an example, security policies and access controls may be part of the pipeline, automatic code review and bug/defect detection may be performed, automated build processes may be performed, vulnerability scanning may be performed, checks against a risk-control framework may be made, and other tasks may be performed all before deploying an infrastructure or components thereof.

The systems described herein may be useful in analyzing, monitoring, evaluating, or otherwise observing a GitOps environment. In a GitOps environment, Git may be viewed as the one and only source of truth. As such, GitOps may require that the desired state of infrastructure (e.g., a customer's cloud deployment) be stored in version control such that the entire audit trail of changes to such infrastructure can be viewed or audited. In a GitOps environment, all changes to infrastructure are embodied as fully traceable commits that are associated with committer information, commit IDs, time stamps, and/or other information. In such an embodiment, both an application and the infrastructure (e.g., a customer's cloud deployment) that supports the execution of the application are therefore versioned artifacts and can be audited using the gold standards of software development and delivery. Readers will appreciate that while the systems described herein are described as analyzing, monitoring, evaluating, or otherwise observing a GitOps environment, in other embodiments other source control mechanisms may be utilized for creating infrastructure, making changes to infrastructure, and so on. In these embodiments, the systems described herein may similarly be used for analyzing, monitoring, evaluating, or otherwise observing such environments.

As described in other portions of the present disclosure, the systems described herein may be used to analyze, monitor, evaluate, or otherwise observe a customer's cloud deployment. While securing traditional datacenters requires managing and securing an IP-based perimeter with networks and firewalls, hardware security modules ('HSMs'), security information and event management ('SIEM') technologies, and other physical access restrictions, such solutions are not particularly useful when applied to cloud deployments. As such, the systems described herein may be configured to interact with and even monitor other solutions that are appropriate for cloud deployments such as, for example, "zero trust" solutions.

A zero trust security model (a.k.a., zero trust architecture) describes an approach to the design and implementation of IT systems. A primary concept behind zero trust is that devices should not be trusted by default, even if they are connected to a managed corporate network such as the corporate LAN and even if they were previously verified. Zero trust security models help prevent successful breaches by eliminating the concept of trust from an organization's network architecture. Zero trust security models can include multiple forms of authentication and authorization (e.g., machine authentication and authorization, human/user authentication and authorization) and can also be used to control multiple types of accesses or interactions (e.g., machine-to-machine access, human-to-machine access).

In some embodiments, the systems described herein may be configured to interact with zero trust solutions in a variety of ways. For example, agents that collect input data for the systems described herein (or other components of such systems) may be configured to access various machines, applications, data sources, or other entity through a zero trust solution, especially where local instances of the systems described herein are deployed at edge locations. Likewise, given that zero trust solutions may be part of a customer's cloud deployment, the zero trust solution itself may be monitored to identify vulnerabilities, anomalies, and so on. For example, network traffic to and from the zero trust solution may be analyzed, the zero trust solution may be monitored to detect unusual interactions, log files generated by the zero trust solution may be gathered and analyzed, and so on.

In some embodiments, the systems described herein may leverage various tools and mechanisms in the process of performing its primary tasks (e.g., monitoring a cloud deployment). For example, Linux eBPF is mechanism for writing code to be executed in the Linux kernel space. Through the usage of eBPF, user mode processes can hook into specific trace points in the kernel and access data structures and other information. For example, eBPF may be used to gather information that enables the systems described herein to attribute the utilization of networking resources or network traffic to specific processes. This may be useful in analyzing the behavior of a particular process, which may be important for observability/SIEM.

The systems described may be configured to collect security event logs (or any other type of log or similar record of activity) and telemetry in real time for threat detection, for analyzing compliance requirements, or for other purposes. In such embodiments, the systems described herein may analyze telemetry in real time (or near real time), as well as historical telemetry, to detect attacks or other activities of interest. The attacks or activities of interest may be analyzed to determine their potential severity and impact on an organization. In fact, the attacks or activities of interest may be reported, and relevant events, logs, or other information may be stored for subsequent examination.

In one embodiment, systems described herein may be configured to collect security event logs (or any other type of log or similar record of activity) and telemetry in real time to provide customers with a SIEM or SIEM-like solution. SIEM technology aggregates event data produced by security devices, network infrastructure, systems, applications, or other source. Centralizing all of the data that may be generated by a cloud deployment may be challenging for a traditional SIEM, however, as each component in a cloud deployment may generate log data or other forms of machine data, such that the collective amount of data that can be used to monitor the cloud deployment can grow to be quite large. A traditional SIEM architecture, where data is centralized and aggregated, can quickly result in large amounts of data that may be expensive to store, process, retain, and so on. As such, SIEM technologies may frequently be implemented such that silos are created to separate the data.

In some embodiments of the present disclosure, data that is ingested by the systems described herein may be stored in a cloud-based data warehouse such as those provided by Snowflake™ and others. Given that companies like Snowflake™ offer data analytics and other services to operate on data that is stored in their data warehouses, in some embodiments one or more of the components of the systems described herein may be deployed in or near Snowflake™ as part of a secure data lake architecture (a.k.a., a security data lake architecture, a security data lake/warehouse). In such an embodiment, components of the systems described herein may be deployed in or near Snowflake™ to collect data, transform data, analyze data for the purposes of detecting threats or vulnerabilities, initiate remediation workflows, generate alerts, or perform any of the other functions that can be performed by the systems described herein. In such embodiments, data may be received from a variety of sources (e.g., EDR or EDR-like tools that handle endpoint data, cloud access security broker ('CASB') or CASB-like tools that handle data describing interactions with cloud applications, Identity and Access Management ('IAM') or IAM-like tools, and many others), normalized for storage in a data warehouse, and such normalized data may be used by the systems described herein. In fact, the systems described herein may actually implement the data sources (e.g., an EDR tool, a CASB tool, an IAM tool) described above.

In some embodiments one data source that is ingested by the systems described herein is log data, although other forms of data such as network telemetry data (flows and packets) and/or many other forms of data may also be utilized. In some embodiments, event data can be combined with contextual information about users, assets, threats, vulnerabilities, and so on, for the purposes of scoring, prioritization and expediting investigations. In some embodiments, input data may be normalized, so that events, data, contextual information, or other information from disparate sources can be analyzed more efficiently for specific purposes (e.g., network security event monitoring, user activity monitoring, compliance reporting). The embodiments described here offer real-time analysis of events for security monitoring, advanced analysis of user and entity behaviors, querying and long-range analytics for historical analysis, other support for incident investigation and management, reporting (for compliance requirements, for example), and other functionality.

In some embodiments, the systems described herein may be part of an application performance monitoring ('APM') solution. APM software and tools enable the observation of application behavior, observation of its infrastructure dependencies, observation of users and business key performance indicators ('KPIs') throughout the application's life cycle, and more. The applications being observed may be developed internally, as packaged applications, as software as a service ('SaaS'), or embodied in some other ways. In such embodiments, the systems described herein may provide one or more of the following capabilities:

The ability to operate as an analytics platform that ingests, analyzes, and builds context from traces, metrics, logs, and other sources.

Automated discovery and mapping of an application and its infrastructure components.

Observation of an application's complete transactional behavior, including interactions over a data communications network.

Monitoring of applications running on mobile (native and browser) and desktop devices.

Identification of probable root causes of an application's performance problems and their impact on business outcomes.

Integration capabilities with automation and service management tools.

Analysis of business KPIs and user journeys (for example, login to check-out).

Domain-agnostic analytics capabilities for integrating data from third-party sources.

Endpoint monitoring to understand the user experience and its impact on business outcomes.

Support for virtual desktop infrastructure ('VDI') monitoring.

In embodiments where the systems described herein are used for APM, some components of the system may be modified, other components may be added, some components may be removed, and other components may remain the same. In such an example, similar mechanisms as described elsewhere in this disclosure may be used to collect information from the applications, network resources used by the application, and so on. The graph based modelling techniques may also be leveraged to perform some of the functions mentioned above, or other functions as needed.

In some embodiments, the systems described herein may be part of a solution for developing and/or managing artificial intelligence ('AI') or machine learning ('ML') applications. For example, the systems described herein may be part of an AutoML tool that automate the tasks associated with developing and deploying ML models. In such an example, the systems described herein may perform various functions as part of an AutoML tool such as, for example, monitoring the performance of a series of processes, microservices, and so on that are used to collectively form the AutoML tool. In other embodiments, the systems described herein may perform other functions as part of an AutoML tool or may be used to monitor, analyze, or otherwise observe an environment that the AutoML tool is deployed within.

In some embodiments, the systems described herein may be used to manage, analyze, or otherwise observe deployments that include other forms of AI/ML tools. For example, the systems described herein may manage, analyze, or otherwise observe deployments that include AI services. AI services are, like other resources in an as-a-service model, ready-made models and AI applications that are consumable as services and made available through APIs. In such an example, rather than using their own data to build and train models for common activities, organizations may access pre-trained models that accomplish specific tasks. Whether an organization needs natural language processing ('NLP'), automatic speech recognition ('ASR'), image recognition, or some other capability, AI services simply plug-and-play into an application through an APL Likewise, the systems described herein may be used to manage, analyze, or otherwise observe deployments that include other forms of AI/ML tools such as Amazon Sagemaker™ (or other cloud machine-learning platform that enables developers to create, train, and deploy ML models) and related services such as Data Wrangler (a service to accelerate data prep for ML) and Pipelines (a CI/CD service for ML).

In some embodiments, the systems described herein may be used to manage, analyze, or otherwise observe deployments that include various data services. For example, data services may include secure data sharing services, data marketplace services, private data exchanges services, and others. Secure data sharing services can allow access to live data from its original location, where those who are granted access to the data simply reference the data in a controlled and secure manner, without latency or contention from concurrent users. Because changes to data are made to a single version, data remains up-to-date for all consumers, which ensures data models are always using the latest version of such data. Data marketplace services operate as a single location to access live, ready-to-query data (or data that is otherwise ready for some other use). A data marketplace can even include a "feature stores," which can allow data scientists to repurpose existing work. For example, once a data scientist has converted raw data into a metric (e.g., costs of goods sold), this universal metric can be found quickly and used by other data scientists for quick analysis against that data.

In some embodiments, the systems described herein may be used to manage, analyze, or otherwise observe deployments that include distributed training engines or similar mechanisms such as, for example, such as tools built on Dask. Dask is an open source library for parallel computing that is written in Python. Dask is designed to enable data scientists to improve model accuracy faster, as Dask enables data scientists can do everything in Python end-to-end, which means that they no longer need to convert their code to execute in environments like Apache Spark. The result is reduced complexity and increased efficiency. The systems described herein may also be used to manage, analyze, or otherwise observe deployments that include technologies such as RAPIDS (an open source Python framework which is built on top of Dask). RAPIDS optimizes compute time and speed by providing data pipelines and executing data science code entirely on graphics processing units (GPUs) rather than CPUs. Multi-cluster, shared data architecture, DataFrames, Java user-defined functions (UDF) are supported to enable trained models to run within a data warehouse.

In some embodiments, the systems described herein may be leveraged for the specific use case of detecting and/or remediating ransomware attacks and/or other malicious action taken with respect to data, systems, and/or other resources associated with one or more entities. Ransomware is a type of malware from cryptovirology that threatens to publish the victim's data or perpetually block access to such data unless a ransom is paid. In such embodiments, ransomware attacks may be carried out in a manner such that patterns (e.g., specific process-to-process communications, specific data access patterns, unusual amounts of encryption/re-encryption activities) emerge, where the systems described herein may monitor for such patterns. Alternatively, ransomware attacks may involve behavior that deviates from normal behavior of a cloud deployment that is not experiencing a ransomware attack, such that the mere presence of unusual activity may trigger the systems described herein to generate alerts or take some other action, even without explicit knowledge that the unusual activity is associated with a ransomware attack.

In some embodiments, particular policies may be put in place the systems described herein may be configured to enforce such policies as part of an effort to thwart ransomware attacks. For example, particular network sharing protocols (e.g., Common Internet File System ('CIFS'), Network File System ('NFS')) may be avoided when implementing storage for backup data, policies that protect backup systems may be implemented and enforced to ensure that usable backups are always available, multifactor authentication for particular accounts may be utilized and accounts may be configured with the minimum privilege required to function, isolated recovery environments may be created and isolation may be monitored and enforced to ensure the integrity of the recovery environment, and so on. As described in the present disclosure, the systems described herein may be configured to explicitly enforce such policies or may be configured to detect unusual activity that represents a violation of such policies, such that the mere presence of unusual activity may trigger the systems described herein to generate alerts or take some other action, even without explicit knowledge that the unusual activity is associated with a violation of a particular policy.

Readers will appreciate that ransomware attacks are often deployed as part of a larger attack that may involve, for example:

Penetration of the network through means such as, for example, stolen credentials and remote access malware.

Stealing of credentials for critical system accounts, including subverting critical administrative accounts that control systems such as backup, Active Directory ('AD'), DNS, storage admin consoles, and/or other key systems.

Attacks on a backup administration console to turn off or modify backup jobs, change retention policies, or even provide a roadmap to where sensitive application data is stored. Data theft attacks.

As a result of the many aspects that are part of a ransomware attack, embodiments of the present disclosure may be configured as follows:

The systems may include one or more components that detect malicious activity based on the behavior of a process.

The systems may include one or more components that store indicator of compromise ('IOC') or indicator of attack ('IOA') data for retrospective analysis.

The systems may include one or more components that detect and block fileless malware attacks.

The systems may include one or more components that remove malware automatically when detected.

The systems may include a cloud-based, SaaS-style, multitenant infrastructure.

The systems may include one or more components that identify changes made by malware and provide the recommended remediation steps or a rollback capability.

The systems may include one or more components that detect various application vulnerabilities and memory exploit techniques.

The systems may include one or more components that continue to collect suspicious event data even when a managed endpoint is outside of an organization's network.

The systems may include one or more components that perform static, on-demand malware detection scans of folders, drives, devices, or other entities.

The systems may include data loss prevention (DLP) functionality.

In some embodiments, the systems described herein may manage, analyze, or otherwise observe deployments that include deception technologies. Deception technologies allow for the use of decoys that may be generated based on scans of true network areas and data. Such decoys may be deployed as mock networks running on the same infrastructure as the real networks, but when an intruder attempts to enter the real network, they are directed to the false network and security is immediately notified. Such technologies may be useful for detecting and stopping various types of cyber threats such as, for example, Advanced Persistent Threats ('APTs'), malware, ransomware, credential dumping, lateral movement and malicious insiders. To continue to outsmart increasingly sophisticated attackers, these solutions may continuously deploy, support, refresh and respond to deception alerts.

In some embodiments, the systems described herein may manage, analyze, or otherwise observe deployments that include various authentication technologies, such as multi-factor authentication and role-based authentication. In fact, the authentication technologies may be included in the set of resources that are managed, analyzed, or otherwise observed as interactions with the authentication technologies may monitored. Likewise, log files or other information retained by the authentication technologies may be gathered by one or more agents and used as input to the systems described herein.

In some embodiments, the systems described herein may be leveraged for the specific use case of detecting supply chain attacks. More specifically, the systems described herein may be used to monitor a deployment that includes software components, virtualized hardware components, and other components of an organization's supply chain such that interactions with an outside partner or provider with access to an organization's systems and data can be monitored. In such embodiments, supply chain attacks may be carried out in a manner such that patterns (e.g., specific interactions between internal and external systems) emerge, where the systems described herein may monitor for such patterns. Alternatively, supply chain attacks may involve behavior that deviates from normal behavior of a cloud deployment that is not experiencing a supply chain attack, such that the mere presence of unusual activity may trigger the systems described herein to generate alerts or take some other action, even without explicit knowledge that the unusual activity is associated with a supply chain attack.

In some embodiments, the systems described herein may be leveraged for other specific use cases such as, for example, detecting the presence of (or preventing infiltration from) cryptocurrency miners (e.g., bitcoin miners), token miners, hashing activity, non-fungible token activity, other viruses, other malware, and so on. As described in the present disclosure, the systems described herein may monitor for such threats using known patterns or by detecting unusual activity, such that the mere presence of unusual activity may trigger the systems described herein to generate alerts or take some other action, even without explicit knowledge that the unusual activity is associated with a particular type of threat, intrusion, vulnerability, and so on.

The systems described herein may also be leveraged for endpoint protection, such the systems described herein form all of or part of an endpoint protection platform. In such an embodiment, agents, sensors, or similar mechanisms may be deployed on or near managed endpoints such as computers, servers, virtualized hardware, internet of things ('IotT') devices, mobile devices, phones, tablets, watches, other personal digital devices, storage devices, thumb drives, secure data storage cards, or some other entity. In such an example, the endpoint protection platform may provide functionality such as:

Prevention and protection against security threats including malware that uses file-based and fileless exploits.

The ability to apply control (allow/block) to access of software, scripts, processes, microservices, and so on.

The ability to detect and prevent threats using behavioral analysis of device activity, application activity, user activity, and/or other data.

The ability for facilities to investigate incidents further and/or obtain guidance for remediation when exploits evade protection controls The ability to collect and report on inventory, configuration and policy management of the endpoints.

The ability to manage and report on operating system security control status for the monitored endpoints.

The ability to scan systems for vulnerabilities and report/manage the installation of security patches.

The ability to report on internet, network and/or application activity to derive additional indications of potentially malicious activity.

Example embodiments are described in which policy enforcement, threat detection, or some other function is carried out by the systems described herein by detecting unusual activity, such that the mere presence of unusual activity may trigger the systems described herein to generate alerts or take some other action, even without explicit knowledge that the unusual activity is associated with a particular type of threat, intrusion, vulnerability, and so on. Although these examples are largely described in terms of identifying unusual activity, in these examples the systems described herein may be configured to learn what constitutes 'normal activity'—where 'normal activity' is activity observed, modeled, or otherwise identified in the absence of a particular type of threat, intrusion, vulnerability, and so on. As such, detecting 'unusual activity' may alternatively be viewed as detecting a deviation from 'normal activity' such that 'unusual activity' does not need to be identified and sought out. Instead, deviations from 'normal activity' may be assumed to be 'unusual activity'.

Readers will appreciate that while specific examples of the functionality that the systems described herein can provide are included in the present disclosure, such examples are not to be interpreted as limitations as to the functionality that the systems described herein can provide. Other functionality may be provided by the systems described herein, all of which are within the scope of the present disclosure. For the purposes of illustration and not as a limitation, additional examples can include governance, risk, and compliance ('GRC'), threat detection and incident response, identity and access management, network and infrastructure security, data protection and privacy, identity and access management ('IAM'), and many others.

In order to provide the functionality described above, the systems described herein or the deployments that are monitored by such systems may implement a variety of techniques. For example, the systems described herein or the deployments that are monitored by such systems may tag data and logs to provide meaning or context, persistent monitoring techniques may be used to monitor a deployment at all times and in real time, custom alerts may be generated based on rules, tags, and/or known baselines from one or more polygraphs, and so on.

Although examples are described above where data may be collected from one or more agents, in some embodiments other methods and mechanisms for obtaining data may be utilized. For example, some embodiments may utilize agentless deployments where no agent (or similar mechanism) is deployed on one or more customer devices, deployed within a customer's cloud deployment, or deployed at another location that is external to the data platform. In such embodiments, the data platform may acquire data through one or more APIs such as the APIs that are available through various cloud services. For example, one or more APIs that enable a user to access data captured by Amazon CloudTrail™ may be utilized by the data platform to obtain data from a customer's cloud deployment without the use of an agent that is deployed on the customer's resources. In some embodiments, agents may be deployed as part of a data acquisition service or tool that does not utilize a customer's resources or environment. In some embodiments, agents (deployed on a customer's resources or elsewhere) and mechanisms in the data platform that can be used to obtain data from through one or more APIs such as the APIs that are available through various cloud services may be utilized. In some embodiments, one or more cloud services themselves may be configured to push data to some entity (deployed anywhere), which may or may not be an agent. In some embodiments, other data acquisition techniques may be utilized, including combinations and variations of the techniques described above, each of which is within the scope of the present disclosure.

Readers will appreciate that while specific examples of the cloud deployments that may be monitored, analyzed, or otherwise observed by the systems described herein have been provided, such examples are not to be interpreted as limitations as to the types of deployments that may be monitored, analyzed, or otherwise observed by the systems described herein. Other deployments may be monitored, analyzed, or otherwise observed by the systems described herein, all of which are within the scope of the present disclosure. For the purposes of illustration and not as a limitation, additional examples can include multi-cloud deployments, on-premises environments, hybrid cloud environments, sovereign cloud environments, heterogeneous environments, DevOps environments, DevSecOps environments, GitOps environments, quantum computing environments, data fabrics, composable applications, composable networks, decentralized applications, and many others.

Readers will appreciate that while specific examples of the types of data that may be collected, transformed, stored, and/or analyzed by the systems described herein have been provided, such examples are not to be interpreted as limitations as to the types of data that may be collected, transformed, stored, and/or analyzed by the systems described herein. Other types of data can include, for example, data collected from different tools (e.g., DevOps tools, DevSecOps, GitOps tools), different forms of network data (e.g., routing data, network translation data, message payload data, Wifi data, Bluetooth data, personal area networking data, payment device data, near field communication data, metadata describing interactions carried out over a network, and many others), data describing processes executing in a container, lambda, EC2 instance, virtual machine, or other execution environment), information describing the execution environment itself, and many other types of data.

Data platforms may be configured to perform various functions (e.g., generating graphs to facilitate identification of anomalies, security vulnerabilities, etc.) based on data ingested from compute environments (e.g., cloud compute environments, non-cloud compute environments, etc.). In some cases, such functionality may be enabled and/or supported by agents executing within compute assets in the compute environments. For example, as described above in relation to FIG. 1B, agents 38 executing within compute assets 16 of a cloud environment 14 (or compute assets of another suitable compute environment) may provide data to data platform 12 that, once ingested by data ingestion resources 18 and stored in data store 30, may be analyzed and processed by data processing resources 20 to provide valuable insights to a user of computing device 24 (e.g., by way of user interface resources 22). Other agent-based data collection has also been described above (e.g., in relation to agents 112 in FIG. 1D, etc.). Various agents described above may be configured to collect information corresponding to connections and their ownership information (e.g., in terms of processes or containers, etc.). Additionally, information collected by agents may be used for finding vulnerabilities, ensuring file integrity, and so forth. There may be a set of tables in which such information is collected with a collection frequency or timeline that is determined by the types of information being collected, how the information is changing (e.g., how dynamic the data is in nature), the type of service to which an owner of the data (e.g., a user of the data platform) is subscribed, and/or other suitable factors.

Whatever the frequency or timeline, certain agents may be configured at deployment to detect, collect, and provide data (e.g., all the data they can or certain types of data they are preprogrammed to target) back to the data platform. For instance, these agents may perform such functions continually for as long as the agents are deployed and as long as the cloud compute environment is being monitored by the data platform. As will now be described in more detail, other agents may be configured to adjust their operation or function based on direction received from the data platform (e.g., direction provided based on the data that the agent itself has collected and provided to the data platform). Such adjustments are referred to herein as "operational adjustments" and will be understood to be implemented (e.g., undertaken, applied, etc.) by agents based on specific direction from data platforms such as in the form of new rules to be added to an agent operations ruleset employed by the agent (or, in some examples, in the form of existing rules being removed or changed). For example, an agent operations ruleset may be associated with an agent deployed in a cloud compute environment to define the way that the agent is currently configured to perform any of various operations and functions including, without limitation, data collection within the cloud compute environment, data reporting back to the data platform, security analysis and alerting, and so forth.

By directing an agent to implement operational adjustments to its agent operations ruleset as the agent continues operating (e.g., collecting data within the cloud compute environment, etc.), a data platform may gain more control over the data it receives and how the assets of the cloud compute environment are managed. Various benefits may arise from this increase in control, including improved security postures for the compute assets in the cloud environment, more efficiency for the data platform, and so forth.

For example, if the data platform determines that it is receiving redundant data from one or more agents or data that is otherwise not useful or valuable for the analysis the data platform is performing, the data platform may direct the agent to implement an operational adjustment to reduce data collection in any of various ways described in more detail below. Such an operational adjustment may serve to reduce the amount of data that is provided by the agent to the data platform, thereby reducing usage of (and increasing efficiency for) communication resources (e.g., network connections used to transmit/receive ingested data, etc.), storage resources (e.g., the data store used to store ingested data), processing resources (e.g., processors and memory used to analyze the ingested data), and/or other such finite resources.

As another example, if the data platform determines that there is a certain type of data (e.g., data from a particular connection within the cloud compute environment, data relating to a particular type of event or indicating a particular type of information, etc.) that would be useful to target but that is not currently being collected or provided by the agent, the data platform may direct the agent to implement an operational adjustment to increase data collection. Such an operational adjustment may serve to ensure that the target type of data is collected and provided to the data platform, thereby allowing the data platform to perform its function more effectively with the useful data.

As yet another example, if the data platform determines that there are certain conditions that can or should be directly monitored by agents within the cloud compute environment (e.g., rather than or in addition to being monitored by the data platform itself based on data that has been ingested and processed), the data platform may direct the agent to implement an operational adjustment to add a new agent-produced alert or to change the way that the agent produces such alerts. Such an operational adjustment may serve to ensure that agent-produced alerts are timely and relevant to users by ensuring that neither too many alerts are provided (e.g., constantly alerting on conditions that are not particularly actionable or of interest to users) nor that too few alerts are provided (e.g., failing to timely alert on conditions that would be actionable and/or of particular interest to the users).

In all of these cases and for other suitable situations described herein or as may occur for a given scenario, operational adjustments may be made dynamically (e.g., in real time or near real time to address quickly-changing conditions as the agent is actively collecting data and performing its function in accordance with an agent operations ruleset) or more statically (e.g., based on patterns observed over longer periods of time to address more persistent conditions in more enduring ways). Such operational adjustments provide intelligence to agents that is based on backend data modeling and complex insights that may be difficult or impossible for the agent itself to identify in the data, but that become apparent only by way of the data analysis performed by the data platform (e.g., using polygraph and other techniques described herein).

Figure 5A:
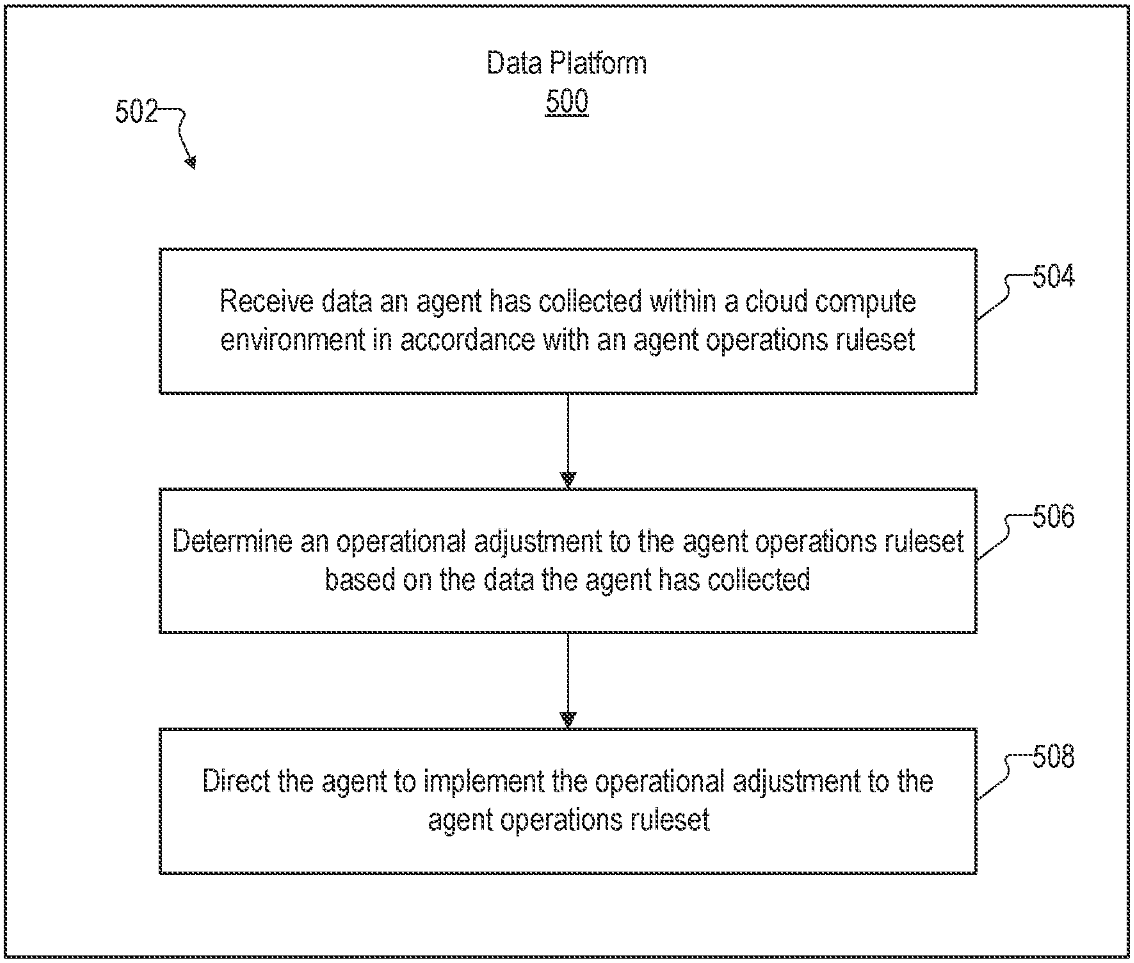
FIG. 5A illustrates an example data platform configured to perform an illustrative process to facilitate an operational adjustment for an agent collecting data from a cloud compute environment monitored by the data platform.

FIG. 5A illustrates an example data platform 500 configured to perform an illustrative process 502 to facilitate an operational adjustment for an agent collecting data from a cloud compute environment monitored by the data platform. As shown, process 502 may include a plurality of operations 504, 506, and 508, each of which may be performed, in full or in part, by data platform 500. Data platform 500 may implement data platform 12 illustrated and described above, or any other data platform described herein.

While process 502 shows illustrative operations according to one implementation, other implementations may omit, add to, reorder, and/or modify any of the operations shown in process 502. In some examples, multiple operations shown in process 502 may be performed concurrently (e.g., in parallel) with one another, rather than being performed sequentially as illustrated and/or described. One or more of the operations shown in FIG. 5A may be performed by data processing resources (e.g., data processing resources 20 of data platform 12), user interface resources (e.g., user interface resources 22 of data platform 12), communication resources, and/or other suitable computing resources of data platform 500.

The operations of process 502 may be performed prior to, in parallel with, or subsequent to other operations described above to be performed by the data platform. For example, the operations of process 502 may be performed before, during, or after the data platform constructs a graph (e.g., a polygraph) with respect to data received from the agent and ingested in the ways described herein. Each of operations 504-508 of process 502 will now be described in more detail as the operations may be performed by computing resources of data platform 500.

At operation 504, data platform 500 (e.g., computing resources operating on the data platform) may receive data from an agent deployed in a cloud compute environment monitored by the data platform. For example, the data received at operation 504 may comprise data the agent has collected, in accordance with an agent operations ruleset, within the cloud compute environment. For example, data may be collected and received that corresponds to processes and/or containerized applications executing in the cloud compute environment and the connections between them. As mentioned above, the agent operations ruleset may represent an implicit or explicit set of rules by which the agent operates. For example, an explicit set of rules or instructions defining what data is to be collected (and what data is not to be collected), when alerts are to be produced, how data is to be provided to the data platform, and so forth, may implement one type of agent operations ruleset. Other implementations of an agent operations ruleset may not include explicit rules, per se, but rather may refer to a configuration, scheme, strategy, framework, or other set of principles based upon which operations of the agent are performed.

At operation 506, data platform 500 may determine an operational adjustment to the agent operations ruleset. For example, based on data the agent has collected (e.g., at least some of the data received by data platform 500 at operation 504) and based on data modeling (e.g., including by constructing a graph in the ways described herein) and/or other assessments of the data being collected (e.g., machine-learning-based assessments, etc.), data platform 500 may determine that the agent is to change or alter its operation in some way. For instance, data platform 500 may determine that data platform functions could be done more effectively if the agent began to collect data that was not collected previously, or that the data platform could operate more efficiently if the agent were to cease collecting data that is redundant or otherwise not useful or valuable to data platform 500. As another example, data platform 500 may determine that valuable alerts could be provided in more timely or helpful ways to users if agents were to monitor for certain conditions and directly provide real-time (or at least more immediate) alerts rather than such alerts being delayed until the full data ingestion process can be performed at the data platform. For any of these determinations, data platform 500 may identify an operational adjustment that, if implemented on the agent operations ruleset, could serve to help effect change in the agent's operations.

Accordingly, at operation 508, data platform 500 may direct the agent to implement the operational adjustment determined at operation 506 to the agent operations ruleset. In this way, the agent operations ruleset may be updated (e.g., with a new rule or aspect, with changed rules or aspects, etc.) for use as the agent continues collecting data within the cloud compute environment in accordance with the agent operations ruleset. For example, such updates to the agent operations ruleset may be performed dynamically and frequently to address evolving conditions and needs of data platform 500 and/or may be performed more statically (e.g., one-off changes to the ruleset) to address longstanding needs and patterns that are identified for certain applications.

Figure 5B:
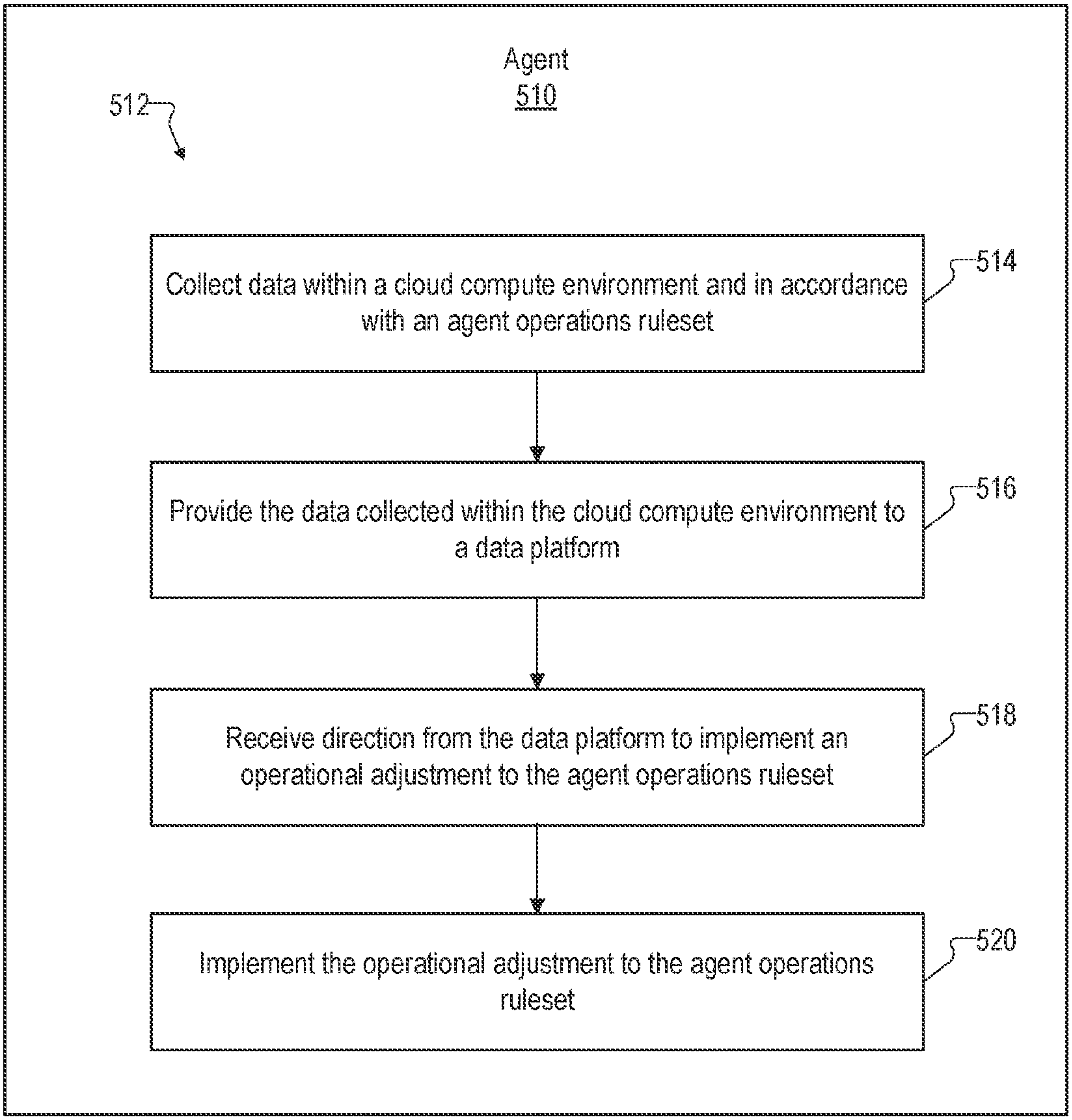
FIG. 5B illustrates an example agent configured to collect data from a cloud compute environment monitored by a data platform and configured to perform an illustrative process to facilitate an operational adjustment for the agent.

FIG. 5B illustrates an example agent 510 configured to collect data from a cloud compute environment monitored by a data platform (e.g., an implementation of data platform 500) and configured to perform an illustrative process 512 to facilitate an operational adjustment for agent 510. As shown, process 512 may include a plurality of operations 514, 516, 518, and 520 each of which may be performed, in full or in part, by agent 510. Agent 510 may implement any of agents 38 (FIG. 1B) or agents 112 (FIG. 1D) illustrated and described above, or any other agent described herein or as may serve a particular implementation.

While process 512 shows illustrative operations according to one implementation, other implementations may omit, add to, reorder, and/or modify any of the operations shown in process 512. In some examples, multiple operations shown in process 512 may be performed concurrently (e.g., in parallel) with one another, rather than being performed sequentially as illustrated and/or described. One or more of the operations shown in FIG. 5B may be performed by suitable computing resources (e.g., resources of compute assets 16 within cloud environment 14) that host agents (e.g., agent 510) deployed to a cloud compute environment monitored by a data platform (e.g., data platform 500). Each of operations 514-520 of process 512 will now be described in more detail as the operations may be performed by computing resources associated with agent 510.

At operation 514, agent 510 (e.g., a compute asset hosting agent 510) may collect data within a cloud compute environment in which agent 510 is deployed and that is being monitored (e.g., by use of agent 510) by a data platform such as data platform 500. This collecting of data at operation 514 may be performed in accordance with an agent operations ruleset such as described above.

At operation 516, agent 510 may provide, to the data platform, the data collected at operation 514 within the cloud compute environment. Agent 510 may provide some or all of the collected data in any of the ways described herein and in accordance with the agent operations ruleset.

At operation 518, agent 510 may receive direction to implement an operational adjustment to the agent operations ruleset. For example, the direction received at operation 518 may come from the data platform, which, as described above, may determine the operational adjustment based on the data collected within the cloud compute environment (e.g., the data provided at operation 516).

Accordingly, at operation 520, agent 510 may implement the operational adjustment to the agent operations ruleset based on the direction received from the data platform at operation 518. In this way, the operational adjustment to the agent operations ruleset may affect the functionality of agent 510 as the agent continues collecting data within the cloud compute environment in accordance with the agent operations ruleset. As described above, the data platform, which may have greater insight into various aspects of operations in the cloud compute environment as a result of the significant resources it brings to bear on data modeling and analysis (e.g., graphing, etc.), may therefore gain a greater degree of control over agent 510. As a consequence, the data platform may be enabled to operate more effectively, efficiently, and/or optimally.

Figure 6:
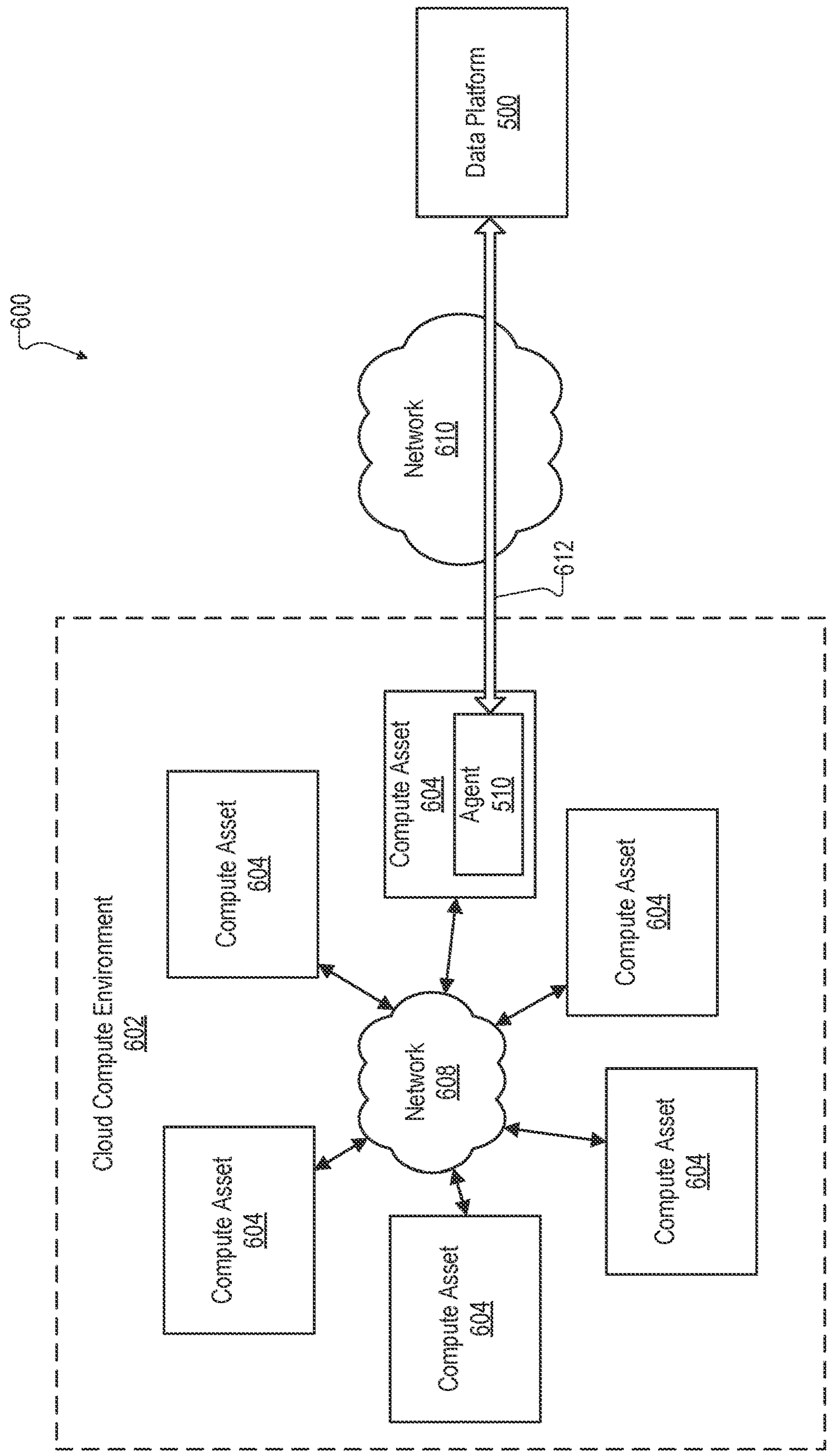
FIG. 6 illustrates an example configuration within which an operational adjustment may be carried out for an agent collecting data from a cloud compute environment monitored by a data platform.

FIG. 6 illustrates an example configuration 600 within which an operational adjustment may be carried out for an agent collecting data from a cloud compute environment monitored by a data platform. More particularly, as shown, configuration 600 includes an implementation of data platform 500 that communicates with an implementation of agent 510 that is deployed in a cloud compute environment 602 by executing on resources of a compute asset 604 within cloud compute environment 602. The compute asset 604 hosting agent 510 is shown to be in communication with other compute assets 604 in cloud compute environment 602 by way of a network 608. Cloud compute environment 602 may represent an implementation of cloud environment 14 of FIGS. 1A-1B (e.g., compute resources provided by a cloud service provider such as AWS, GCP, Azure, etc.) or any other cloud environment described herein or as may serve a particular implementation. As such, the compute assets 604 included therein may implement compute assets 16 of FIGS. 1A-1B (e.g., containers, container runtime environments, virtual machines, workloads, applications, processes, physical computing devices, compute nodes or clusters of nodes, etc.) or other suitable compute assets as may serve a particular implementation.

While the implementation of agent 510 is only shown to be present within one compute asset 604 of the various compute assets 604 shown in FIG. 6, it will be understood that two or more of the compute assets 604 (up to and including all of the compute assets 604) may similarly incorporate or execute their own respective agents that communicate with one another and/or with data platform 500 in similar ways. While network 608 is referred to as a network and may be implemented as such (e.g., similar or identical to a network 610 that is used to transport communications 612 between agent 510 and data platform 500, as described below), it will be understood that different types of compute assets 604 may intercommunicate via a variety of different means and media, some of which may not typically be referred to or thought of networks. In any case, network 608 will be understood to represent any hardware, software, interfacing, or other aspects of a communicative fabric by way of which various compute assets 604 within cloud compute environment 602 communicate with one another.

As further shown in FIG. 6 (and as mentioned above), a network 610 may provide a communicative medium by way of which agent 510 may exchange (e.g., provide to and/or receive from) various communications 612 with data platform 500. For example, network 610 may be implemented by any suitable private or public networks (e.g., the Internet, a wide area network (WAN), a local area network (LAN), a provider-specific communications network such as a cellular carrier network operated by a mobile carrier entity, etc.) and may use any communication technologies, devices, media, protocols, or the like, as may serve a particular implementation. Communications 612 exchanged between data platform 500 and agent 510 may be used to carry out operational adjustments for agent 510 (e.g., based on data collected from cloud compute environment 602 as data platform 500 monitors cloud compute environment and 602) and will now be described in more detail in relation to FIG. 7.

Figure 7:
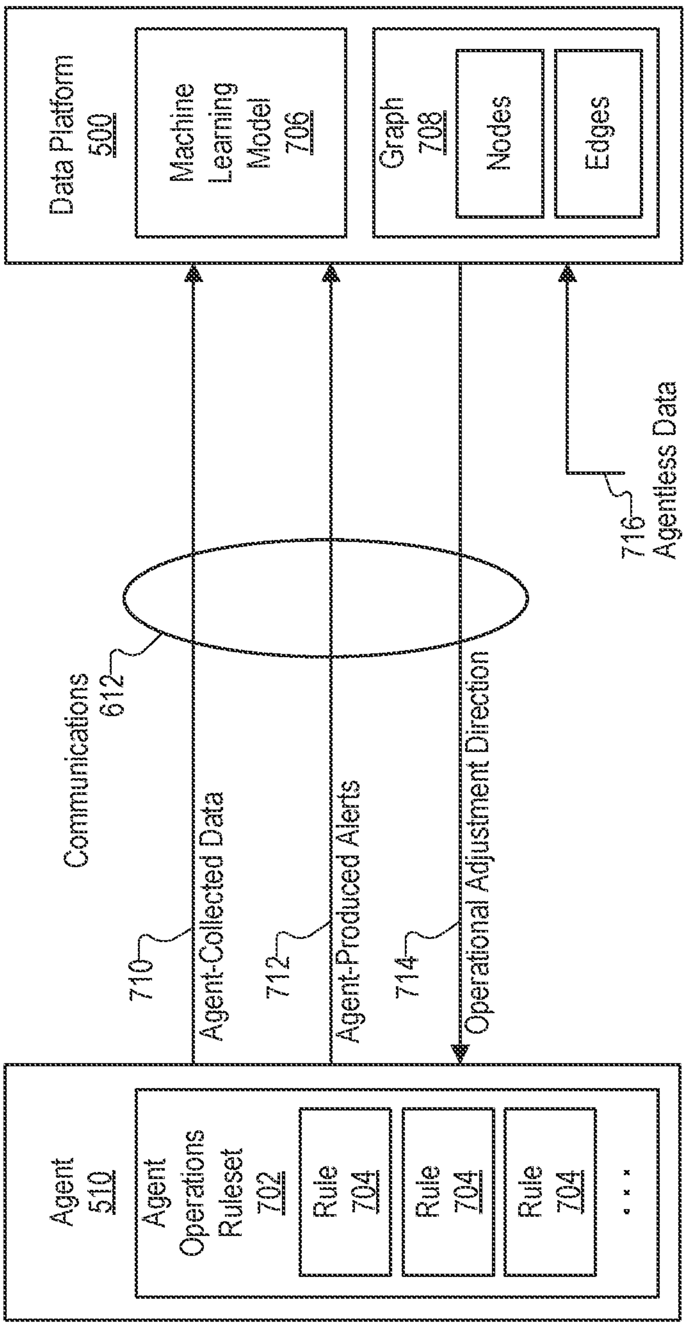
FIG. 7 illustrates example aspects of how an operational adjustment may be carried out for an agent collecting data from a cloud compute environment monitored by a data platform.

FIG. 7 illustrates various aspects of how an operational adjustment may be carried out for agent 510 as the agent collects data from a cloud compute environment (e.g., cloud compute environment 602) monitored by data platform 500. For example, among these aspects, FIG. 7 shows an agent operations ruleset 702 associated with agent 510 and including a plurality of rules 704, a machine learning model 706 and a graph 708 associated with data platform 500, and several examples of the types of communications 612 that may be exchanged between data platform 500 and agent 510 to carry out the operational adjustment for agent 510. As shown, these communications 612 include a communication of agent-collected data 710 provided by agent 510 to data platform 500, a communication of agent-produced alerts 712 transmitted by agent 510 to data platform 500, and a communication of operational adjustment direction 714 provided by data platform 500 to agent 510. FIG. 7 also shows that data platform 500 may access or receive agentless data 716 (which may be similar to or different from agent-collected data 710 and may be accessed from the cloud compute environment in different ways that do not involve an agent), and it will be understood that other communications and data may be received and sent that are not explicitly shown in FIG. 7.

Agent operations ruleset 702 may represent various principles of operation followed by agent 510 as agent 510 performs the agent functions described herein. To this end, various rules 704 may represent the various operational principles defining the behavior of agent 510. Rules 704 may be initially hardcoded into agent 510 and/or may be added, removed, modified, or otherwise managed so as to define the way that agent 510 performs its various operations and functions. For example, one or more rules 704 may control the behavior of agent 510 with respect to data collection within the cloud compute environment (not shown in FIG. 7), one or more other rules 704 may control the behavior of agent 510 with respect to how collected data is provided to data platform 500 (e.g., by agent-collected data 710), one or more other rules 704 may control the behavior of agent 510 with respect to analyzing collected data and producing and providing alerts to data platform 500 or other entities (e.g., by agent-produced alerts 712), and so forth.

Collectively, rules 704 of agent operations ruleset 702 may form an operational framework (e.g., or configuration, scheme, strategy, etc.) that controls many or all aspects of how agent 510 behaves. Accordingly, to change the behavior of agent 510 (e.g., to make the behavior more effective, optimized, efficient, etc., for a given application or set of circumstances), operational adjustment direction 714 from data platform 500 may function, at least conceptually, by adding a new rule 704 to agent operations ruleset 702, by removing an existing rule 704 from agent operations ruleset 702, or by modifying one of the rules 704 of agent operations ruleset 702 in a manner calculated to accomplish the desired operational behavior of agent 510. In some examples, operational adjustment direction 714 may comprise a preconfigured set of such operational adjustments (e.g., a set of rule changes for existing rules 704, a set of entirely new rules 704 configured to replace or override existing rules 704, etc.). In this way, the operational adjustment direction 714 provided by data platform 500 to agent 510 may be selected, delivered, implemented, and/or otherwise handled as a package of related operational adjustments (e.g., adjustments that relate to a unified theme or that are configured to interoperate to serve a common goal).

Data platform 500 may determine what operational adjustment direction 714 is to be provided to agent 510 based on any suitable data and factors as may serve a particular implementation. For example, as has been mentioned, an operational adjustment that is to be directed to the agent operations ruleset may be based on at least the data collected by the agent (i.e., agent-collected data 710). But it will be understood that the determining of the operational adjustment may also be based on other communications 612 such as agent-produced alerts 712 (e.g., if data platform 500 determines that too many or too few agent-produced alerts are being issued, etc.) or on other information data platform 500 receives regarding the cloud compute environment such as agentless data 716, agent-collected data from other agents in the cloud compute environment, or the like.

One example of a tool that data platform 500 may use to analyze data and determine the operational adjustment that is to be implemented to agent operations ruleset 702 (i.e., the operational adjustment direction 714 that is to be provided) is machine learning technology. For example, as shown, data platform 500 may maintain or otherwise be associated with a machine learning model 706 configured to analyze incoming data from all these sources and to identify patterns, make predictions, and so forth, that ultimately result in actionable insights about how agent 510 could modify its behavior or principles of operation (i.e., its agent operations ruleset 702) to operate more effectively, efficiently, and/or optimally. Accordingly, the determining, by data platform 500, of one or more operational adjustments to agent operations ruleset 702 may include analyzing, using machine learning model 706, the data the agent has collected (i.e., agent-collected data) and/or other relevant data (e.g., agentless data 716, data collected by other agents, etc.).

Another example of a tool that data platform 500 may use to analyze incoming data and determine one or more operational adjustments to agent operations ruleset 702 is data modeling techniques configured to result in graph 708. For example, by performing various types of data modeling described above, a polygraph representation of the received data (or another suitable graph 708 representation) may be used to identify the insights about what types of operational adjustments to agent operations ruleset 702 would be appropriate or helpful. As shown in FIG. 7, one or more nodes and/or edges such as described for polygraph implementations set forth above may be included in graph 708. For example, the determining, by data platform 500, of one or more operational adjustments to agent operations ruleset 702 may include constructing graph 708 based on the data the agent has collected (e.g., agent-collected data 710) and/or other relevant data (e.g., agentless data 716, data collected by other agents such that what one agent deployed to one compute asset collects can influence what another agent deployed to another compute asset collects, etc.), and this graph 708 may comprise a plurality of nodes connected by a plurality of edges. As has been described, each node of the plurality of nodes in a polygraph may represent a logical entity and each edge of the plurality of edges may represent a behavioral relationship between nodes connected by the edge. Collectively, the nodes and edges may form a robust model of the collected data that may be mined for various types of useful information described herein (e.g., security vulnerabilities, anomalies, etc.) and one or more operational adjustments may therefore be determined based on this model of graph 708.

FIGS. 8A-8D will now be described to illustrate example aspects of how an agent may collect data from a cloud compute environment and provide the collected data to a data platform monitoring the cloud compute environment, and to illustrate various examples of operational adjustments that may be carried out for the agent to optimize its operation. More specifically, FIG. 8A introduces various elements common to all of FIGS. 8A-8D and illustrates what may be understood as a default functionality for a particular configuration, while each of FIGS. 8B-8D introduce different examples of operational adjustments that may be made from those defaults and illustrate the effects that these illustrative operational adjustments may have.

Common to each of FIGS. 8A-8D, a particular compute asset 604 is shown to include an agent 510 having an agent operations ruleset 702. Each of these components will be understood to be implemented in any suitable ways in accordance with the descriptions of these components above. By way of a suitable communication interface (not explicitly shown), the agent 510 of the compute asset 604 in each of FIGS. 8A-8D is shown to receive data 802 from various other compute assets 604 within the cloud compute environment. For example, as shown, a stream of data 802-1 is shown to be received from a compute asset 604-1, a stream of data 802-2 is shown to be received from a compute asset 604-2, a stream of data 802-3 is shown to be received from a compute asset 604-3, and an ellipsis labeled 802-N will be understood to represent other data that may potentially be received from other compute assets within the cloud compute environment.

Within each of these data streams being monitored within the cloud compute environment, FIGS. 8A-8D show small boxes with different fill patterns and numbered indicators. For example, data 802-1 shows boxes labeled 1-1 through 1-9, which will be referred to as datapoints 802-1-1 through 802-1-9, respectively. As further shown, data 802-2 from compute asset 604-2 includes datapoints 802-2-1 through 802-2-9 and data 802-3 from compute asset 604-3 includes datapoints 802-3-1 through 802-3-9. Each datapoint shown in FIGS. 8A-8D therefore indicates its source (by the first digit: 1, 2, or 3) and an arbitrary index (indicated by the second digit: 1-9) that allows the datapoint to be distinguished from other datapoints from the same source. As further shown in each of FIGS. 8A-8D, different fill patterns including a diagonal hash pattern (such as shown for datapoint 802-1-1 and various other datapoints), a horizonal hash pattern (such as shown for datapoint 802-1-2 and various other datapoints) and a dotted pattern (such as shown for datapoint 802-1-4 and various other datapoints) characterize the datapoints to represent different types of data (e.g., different types of packets, packets addressed to different destinations, data representing different classes of information, etc.) that may be received from each compute asset 604.

Data 802 collected from the various compute assets 604 in the cloud compute environment may represent any data as may be received, monitored, and/or collected by the compute asset from other assets in the cloud compute environment. For example, data 802 may represent any of several classes of information that may be collected for compliance requirements, such as data output by a running process and its runtime arguments (e.g., a configuration file used, ownership information, permissions of control files, etc.); data from an API server (e.g., collected directly from APIs or using kubectl commands); cloud-provider specific information (e.g., AWS-specific, GCP-specific data, etc.); and so forth. In some examples, datapoints within the streams of data 802 may represent individual packets of data, collections or streams of data packets, files, or other suitable points of data that may be detected within the cloud compute environment, collected by agents deployed to the cloud compute environment, and ultimately monitored within the cloud compute environment by data platform 500 (e.g., by way of the datapoints being provided by the agents to data platform 500).

Figure 8A:
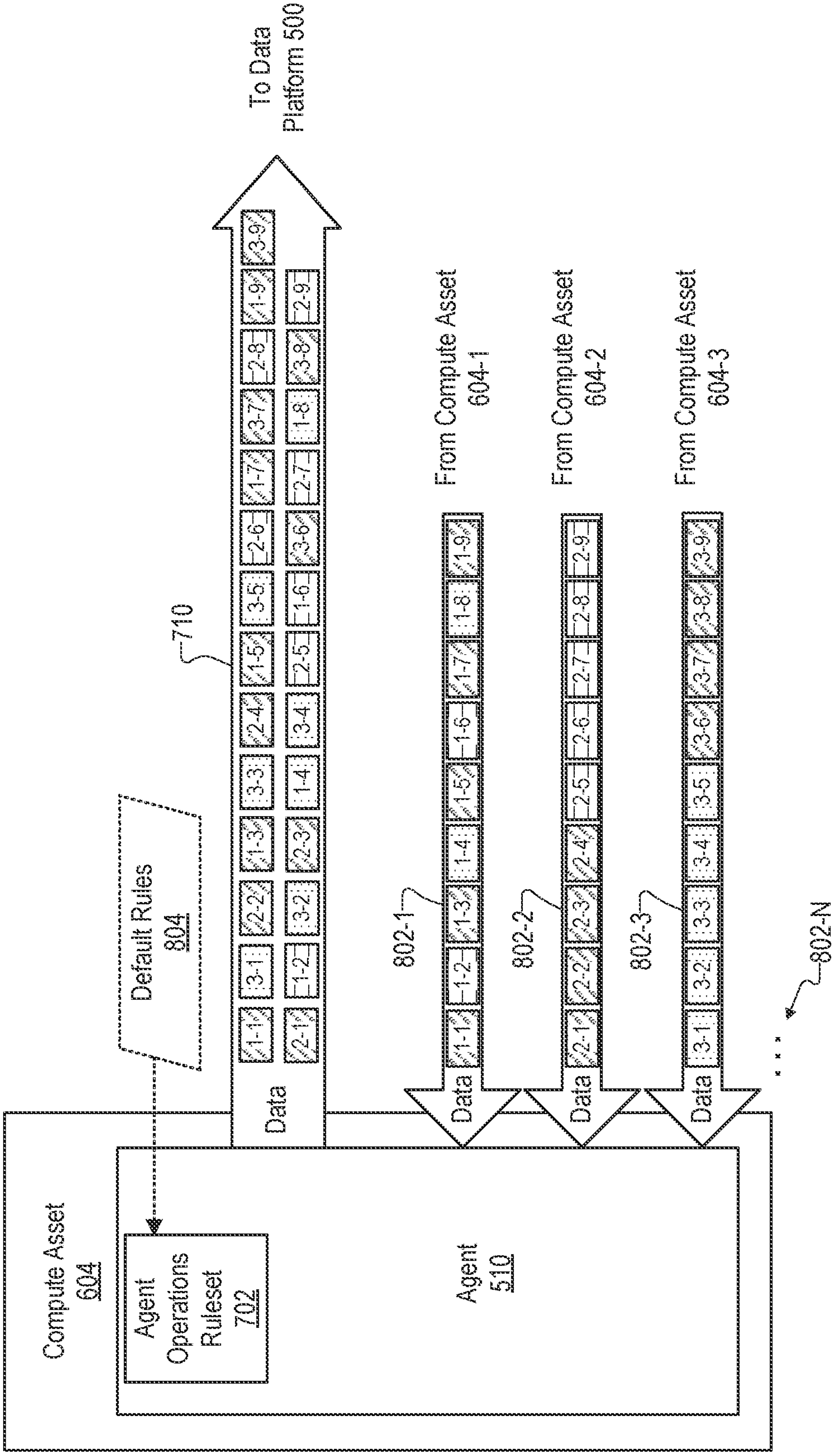
FIG. 8A illustrates example aspects of how an agent may collect data from a cloud compute environment and provide the collected data to a data platform monitoring the cloud compute environment.
Figure 8B:
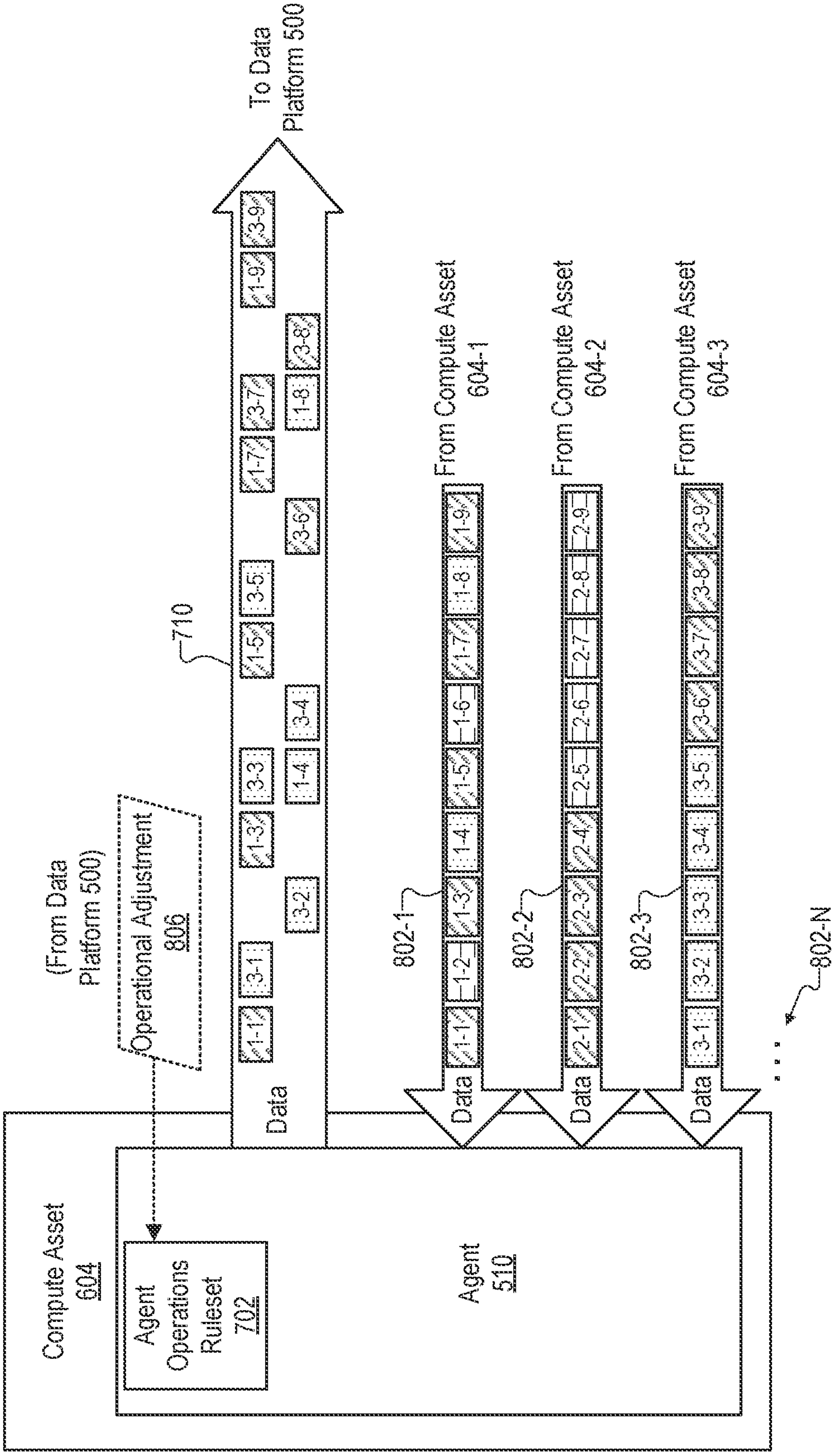
FIG. 8B illustrates a first example of an operational adjustment that may be carried out for an agent collecting data from a cloud compute environment monitored by a data platform.
Figure 8C:
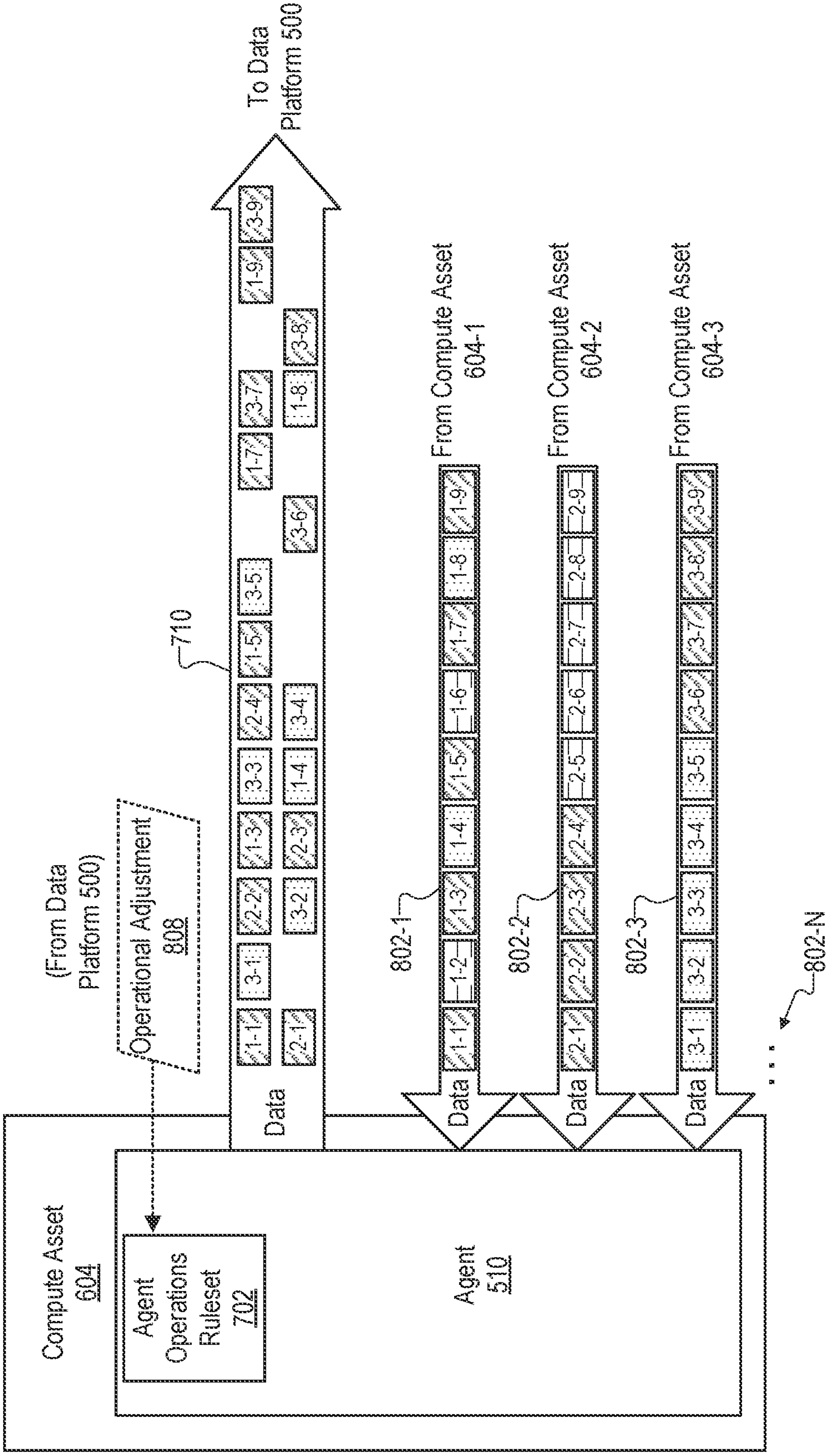
FIG. 8C illustrates a second example of an operational adjustment that may be carried out for an agent collecting data from a cloud compute environment monitored by a data platform.
Figure 8D:
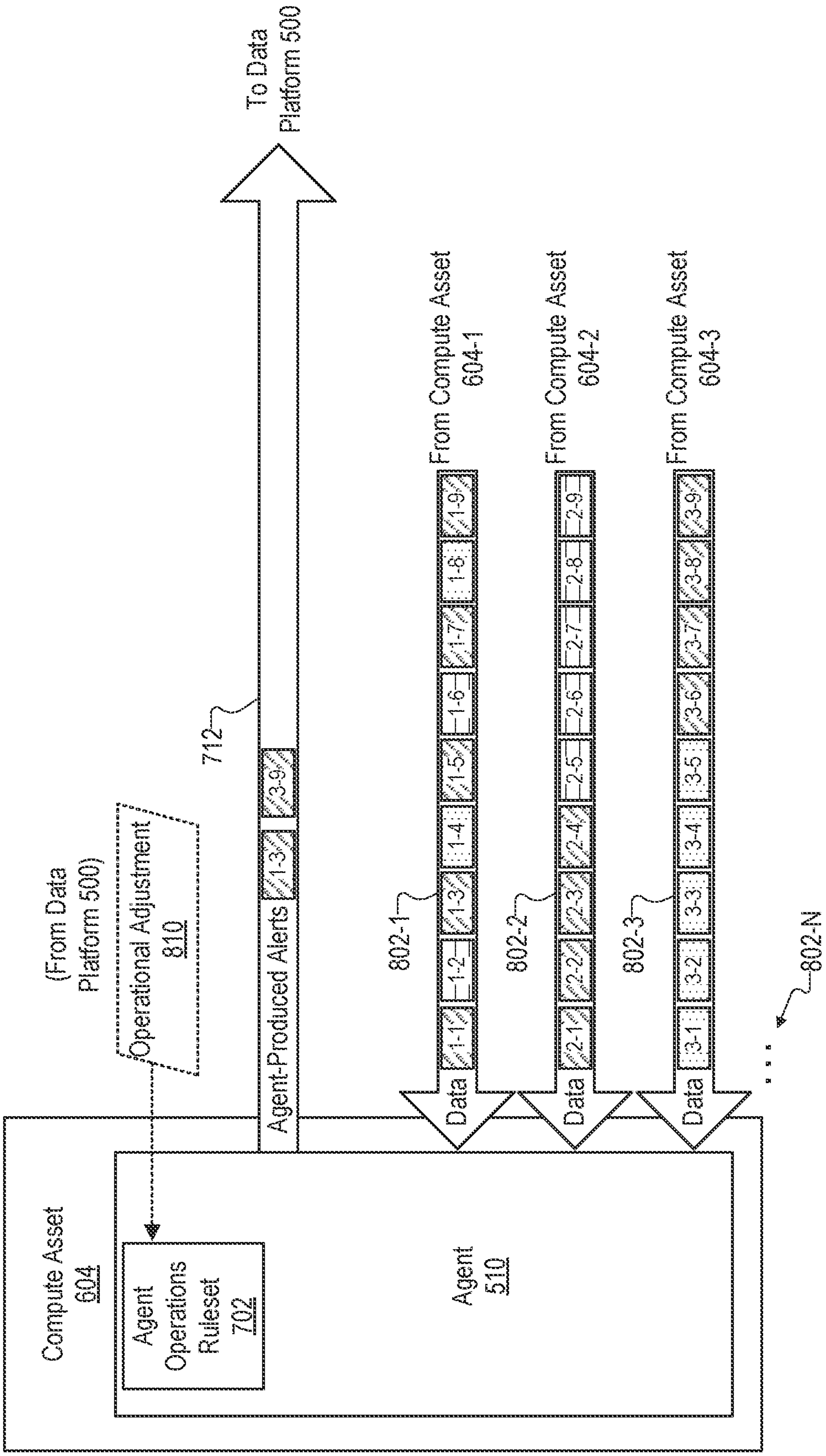
FIG. 8D illustrates a third example of an operational adjustment that may be carried out for an agent collecting data from a cloud compute environment monitored by a data platform.

Also shown in each of FIGS. 8A-8D is a different communication 612 from the agent 510 to data platform 500. Specifically, in FIGS. 8A-8C, the communication 612 shown is a particular set of agent-collected data 710 that includes certain of the datapoints collected from the incoming sets of data 802. In FIG. 8D the communication 612 shown is a set of agent-produced alerts 712. As will now be described in relation to each different FIG. 8A through 8D, the communication 612 provided by agent 510 to data platform 500 for a given scenario may be dependent on (or otherwise influenced by) how the agent 510 is configured to operate. More particularly, the communication 612 (i.e., the agent-collected data 710 or the agent-produced alerts 712) shown in each example are dependent on rules implemented within agent operations ruleset 702 and operational adjustments to those rules that will be described.

Turning first to the example of FIG. 8A, the agent operations ruleset 702 of the agent 510 is shown to be initialized with a set of default rules 804. For example, default rules 804 may represent the operational principles hard-coded into agent 510 or that are present at an arbitrary point in time when the example of FIG. 8A takes place. As will be described in more detail below, default rules 804 may be operationally adjusted based on direction from data platform 500 to cause agent 510 to behave in different ways, but at the initial moment in time represented in FIG. 8A, default rules 804 will be understood to define agent operations ruleset 702 in a particular way that, for example, causes the agent 510 to provide all the datapoints collected from incoming data 802 to data platform 500 as agent-collected data 710. In other words, as shown, agent operations ruleset 702 may function to cause agent 510 to collect all the data possible from the cloud compute environment (e.g., from other compute assets 604) and then indiscriminately provide all of that data to data platform 500. Specifically, as shown in this example of agent-collected data 710, all of datapoints 802-1-1 through 802-1-9, datapoints 802-2-1 through 802-2-9, and datapoints 802-3-1 through 802-3-9 are included in the agent collected data 710 that is provided to data platform 500.

While the representations of datapoints being output in FIGS. 8A-8D are shown to be identical to datapoints being input as part of data 802 (i.e., the various shaded boxes with two 1-digit indicators and different fill patterns), it will be understood that, in certain implementations and/or under certain circumstances, an agent 510 may transform data it receives such that collected data being output may be in a different form than how it is received (e.g., a transformed representation of at least a subset of raw data that is actually captured). For example, one or more rules defined in agent operations ruleset 702 may be configured to cause the agent 510 to transform raw data collected within the cloud compute environment by aggregating, deduplicating, filtering, condensing, or otherwise processing the raw data. The providing of the agent-collected data 710 by the agent 510 (and the receiving of that data by data platform 500) may then include providing (and receiving) a transformed representation of the raw data that has undergone the at least one of the aggregating, deduplicating, filtering, or condensing. As such, though the datapoints drawn in FIGS. 8A-8D appear identical when being input as part of data 802 and when being output as part of data 710, it will be understood that data 802 may represent "raw" data captured from other compute assets while data 710 may represent "treated" data (e.g., aggregated data, deduplicated data, filtered data, condensed data, summarized data, etc.) that has been processed in any of these ways by the agent 510.

Turning next to the example of FIG. 8B, the agent operations ruleset 702 of the agent 510 in this example is shown to be operationally adjusted based on direction from the data platform 500. Specifically, as shown, an operational adjustment 806 indicated to be received "from data platform 500" (e.g., as part of an operational adjustment direction 714 communication) is implemented within the agent operations ruleset 702 for use as the agent 510 continues collecting data 802 within the cloud compute environment in accordance with the agent operations ruleset 702. While, for convenience, the same input data 802 is shown to be received in FIG. 8B as was received in FIG. 8A, the implementation of agent-collected data 710 in FIG. 8B is shown to include a significantly reduced number of datapoints as compared to the agent-collected data 710 in the example of FIG. 8A. Specifically, as illustrated by this example, operational adjustment 806 may indicate that the stream of data 802-2 received from compute asset 604-2 is no longer to be collected and/or provided to data platform 500 (e.g., due to being redundant, wasteful, unhelpful for the goals of data platform 500, or otherwise non-optimal). Additionally, as further shown, one or more rule additions or changes incorporated into operational adjustment 806 may also indicate that datapoints of the data type represented by the horizonal hashing pattern (e.g., including datapoints 802-1-2 and 802-1-6, which otherwise would be collected and provided) are also no longer to be collected and/or provided.

In this example, then, it is shown that operational adjustment 806 to the agent operations ruleset 702 may comprise adding or modifying a rule associated with which data the agent 510 collects within the cloud compute environment to cause the agent 510 to cease collecting a particular type of data set forth by the added or modified rule (e.g., data received from compute asset 604-2 and data of the horizonal hashing pattern type in this example). Upon implementing this operational adjustment 806 as directed by data platform 500, the agent 510 ceases collecting the particular type of data so that there is a reduction in data collected and provided to data platform 500 by the agent (e.g., agent-collected data 710) as compared to if the rule(s) of operational adjustment 806 were not added or modified within agent operations ruleset 702.

As has been mentioned, reducing data provided to a data platform by agents may result in various benefits including, for example, increased efficiency of resource usage (e.g., including communication resources, storage resources, processing resources, etc.), saved costs, and so forth.

While certain examples of types of data that may be reduced by operational adjustment 806 are illustrated in general terms in FIG. 8B (i.e., datapoints from a certain compute asset and datapoints of a certain class represented by a particular fill pattern), it will be understood that operational adjustment 806 may direct the collected data to be reduced in various flexible ways involving a variety of criteria.

As one example, operational adjustment 806 may indicate that TCP connections should not be monitored on more than one network interface on a host. In this way, packets that would be redundantly captured on multiple network interfaces (e.g., packets that are transmitted over network 608 so as to be collected by agents deployed at every compute asset 604 on which an agent is deployed) may only be collected and provided to data platform 500 once. For instance, a rule incorporated into operational adjustment 806 may cause the agent 510 to ignore redundant data on all but one network interface (e.g., relying solely on the type of network interface, the type of packet, and the IP address, and not differentiating between individual TCP connections).

As another example, operational adjustment 806 may cause the agent 510 to monitor the same connection on multiple interfaces for certain scenarios (e.g., scenarios in which the earlier rule is inadequate). In this example, multiple data records would be generated for the same connection and provided to data platform 500, so deduplication may be performed prior to transmitting agent-collected data 710.

As yet another example, a global cache may be used to assign ownership of a connection between compute assets to a particular network interface. In this way, even if multiple network interfaces of multiple compute assets receive data for the same connection, ownership of that data would be clearly defined and duplicate or redundant data may be avoided. Ownership may be unambiguously assigned to exactly one network interface in this example, and there may be a mechanism to pass ownership of data to another owner if the original owner goes away. In still other examples, intelligent operational adjustments 806 determined by data platform 500 may reduce collected data provided by the agent 510 in other suitable ways as may serve a particular implementation.

Turning next to the example of FIG. 8C, the agent operations ruleset 702 of the agent 510 in this example is again shown to be operationally adjusted based on direction from the data platform 500. Specifically, as shown in this example, an operational adjustment 808 (again indicated to be received "from data platform 500") is again implemented within the agent operations ruleset 702 for use as the agent 510 continues collecting data 802 within the cloud compute environment in accordance with the agent operations ruleset 702. While, for convenience, the same input data 802 is shown to be received in FIG. 8C as was received in FIG. 8B, the implementation of agent-collected data 710 in FIG. 8C is now shown to include an increase in the number of datapoints as compared to the agent-collected data 710 in the example of FIG. 8B. Specifically, as illustrated by this example, operational adjustment 808 may indicate that the stream of data 802-2 received from compute asset 604-2 may now be collected and provided to data platform 500 (e.g., whereas it was not provided in the example of FIG. 8B, as described above). As further shown, however, the rule(s) of operational adjustment 806 configured to reduce datapoints of the data type represented by the horizonal hashing pattern are still in place from operational adjustment 806 (i.e., such that datapoints 802-2-5 through 802-2-9 are still excluded from the agent-collected data 710 in FIG. 8C even though datapoints 802-2-1 through 802-2-4 are now included).

In this example, then, it is shown that operational adjustment 808 to the agent operations ruleset 702 may comprise adding or modifying a rule associated with which data the agent 510 collects within the cloud compute environment to cause the agent 510 to begin collecting a particular type of data set forth by the added or modified rule (e.g., data 802-2 that is received from compute asset 604-2 and that is not excluded for another reason such as its class). Upon implementing this operational adjustment 808 as directed by data platform 500, the agent 510 begins collecting the particular type of data so that there is an increase in data collected and provided to data platform 500 by the agent (e.g., agent-collected data 710) as compared to if the rule(s) of operational adjustment 808 were not added or modified (i.e., as compared to the state of the ruleset for the example of FIG. 8B).

As has been mentioned, increasing data provided to a data platform by agents may result in various benefits including, for example, increased effectiveness of data modeling and vulnerability/security management that relies on having access to target data of various types. This, in turn, may lead to increased data security for the cloud compute environment, increased case of data management for users, and so forth.

Turning now to the example of FIG. 8D, the agent operations ruleset 702 of the agent 510 in this example is again shown to be operationally adjusted based on direction from the data platform 500. Specifically, as shown in this example, an operational adjustment 810 (again indicated to be received "from data platform 500") is again implemented within the agent operations ruleset 702 for use as the agent 510 continues collecting data 802 within the cloud compute environment in accordance with the agent operations ruleset 702. In contrast to the implementations of agent-collected data 710 in FIGS. 8B and 8C, however, the example of FIG. 8D shows certain agent-produced alerts 712 (e.g., alerts triggered by data 802-1-3 and 802-3-9 in this arbitrary example).

In this example, it is shown that operational adjustment 810 to the agent operations ruleset 702 may comprise adding or modifying a rule defining when an alert is to be provided by the agent 510 to data platform 500 while the agent 510 collects data in accordance with the agent operations ruleset 702. Specifically, upon implementing this operational adjustment 810 as directed by data platform 500, the agent 510 produces alerts (e.g., agent-produced alerts based on anomalies associated with datapoints 802-1-3 and 802-3-9 in this example) in accordance with the conditions defined by the alert protocol as set forth by the added or modified rule.

Agent-produced alerts 712 provided by the agent 510 in accordance with operational adjustment 810 to agent operations ruleset 702 may be provided in real time as the conditions defined by the alert protocol occur or are detected, or at least may be provided in near-real time (e.g., during an hourly agent data scan or in accordance with another such time period) so as to allow issues to be addressed as timely as possible. The conditions defined by the alert protocol may include any alert conditions described herein or as may serve a particular implementation. For example, agent-produced alerts 712 may be provided if a new image is discovered that is not part of the official registries and that has a particular vulnerability state and/or has executing containers associated with it. In other examples, agent-produced alerts 712 may be provided when critical vulnerabilities with high severity scores are discovered on specific sets of repositories, or while containers are executing, or while containers are executing in privilege mode, when a particular CVSS risk factor is satisfied, when a host is online and an external IP address is not null, and/or under other suitable circumstances as may serve a particular implementation.

As has been mentioned, agent-produced alerts 712 provided to a data platform (or provided more directly to users in some manner not associated with the data platform, in certain implementations) by agents may result in various benefits. For example, one benefit is that users may be made aware of detected anomalies, security threats, and so forth in real time or at least sooner than they would be made aware of the alerts if a full data ingestion process, data-modeling procedure, and security analysis were first performed for the data. This, in turn, may lead to increased data security for the cloud compute environment by allowing users to address issues more immediately and before relatively minor issues grow into more major issues.

While certain specific examples of operational adjustments to agent operations rulesets have been illustrated and described in relation to the figures above, it will be understood that such examples are not exhaustive or intended to be limiting of the types of operational adjustments that may be made to agents based on data platform direction. For instance, in other examples that have not been explicitly illustrated or mentioned, an operational adjustment may change or influence the timing of agent scans or communications between the agent and the data platform. For example, one operational adjustment may reduce or increase a frequency of updates to the data platform (e.g., from sending agent-collected data 710 and/or agent-produced alerts 712 every hour to every half hour, from sending these communications 612 every half hour to sending them in real time for at least certain types of data, etc.). In some examples, machine learning or data modeling may determine that updates for particular data types (or for all data) can be most efficient and effective when sent with irregular frequencies (e.g., at minute marks such as 1 minute, 2 minutes, 5 minutes, 10 minutes, 20 minutes, 40 minutes, etc.) or based on predictable patterns such as peak usage times, seasonal patterns, or the like.

Agent-based monitoring by a data platform may help provide increased visibility into applications executing in a compute environment (e.g., a cloud environment, a non-cloud environment, or other suitable compute environment). In some cases, this increased visibility may help expose vulnerabilities, security threats, anomalies, areas of non-compliance, and/or other issues that might otherwise be difficult to discover and/or easy to overlook. Agents may be configured for the scale, velocity, and temporal nature of compute components to help monitor and provide visibility into the compute environment regardless of host operating system or other characteristics of compute assets in the compute environment. With agents deployed directly on compute systems within data centers or other locations (e.g., cloud systems, on-prem physical or virtual servers, etc.), agents may complement other layered defenses (e.g., agent-less cloud configuration checks, host-based vulnerability scanning of containers and pods, etc.). For example, agents may be uniquely positioned to perform runtime threat detection of known and/or unknown threats, file integrity monitoring, host-based intrusion detection, configuration checks, and host vulnerability scans.

To provide these benefits and other benefits that have been described, agents may be configured to be flexible in where and under what circumstances they operate. Such flexibility may allow agents to provide similar services when deployed to compute assets with different types of operating systems (OSes) or other differences. For example, agents described herein may be configured to operate within Linux-based environments (or environments associated with other Unix-based OSes), Windows-based environments (e.g., hosts running a Windows Server OS or another Windows-based OS), or other environments associated with other OSes as may serve a particular implementation.

In many respects, different versions of an agent configured to be deployed to different types of environments (e.g., Linux-based environments with Linux-based OSes, Windows-based environments with Windows-based OSes, etc.) may be configured to provide the same or similar functionality and/or to operate in the same or similar ways. For instance, agents in these environments may be configured to continuously monitor their respective hosts (i.e., the compute assets to which they are deployed) and any other compute assets associated therewith (e.g., containers in the environment, other compute assets in communication with their hosts, etc.) to send relevant data to the data platform for threat detection, logging, and reporting (e.g., generating alerts). In these environments, agents may gain deep telemetry as they help monitor containers, microservices, pods, and so forth, including traffic between containers and pods or between other types of compute assets. As another example of how agents deployed to different types of environments may be similar, both a Linux-based agent and a Windows-based agent may be configured to be lightweight (e.g., to take up minimal disk space, processing and memory resources, etc.), and to employ guardrails to prevent the agent from consuming unlimited memory and/or processing resources on the host compute asset. Moreover, agents operating in different environments may be configured to operate in passive mode in the user space (e.g., rather than in the kernel space) to avoid impacting the host OS.

At the same time, there are other respects in which agents configured for deployment to different types of environments (e.g., configured to operate with different OSes, etc.) may be configured differently. As one example, unlike Linux-based OSes, Windows-based OSes such as Windows Server or other OSes may rely on registry space such as a Windows Registry within the Windows-based operating system. As will be described in more detail below, such registry spaces may be configured to persistently store configuration settings for the operating system (e.g., the Windows-based OS) and/or applications running within the operating system. For example, the registry space may implement a database schema that is highly flexible and configured to persistently store arbitrary data including the desired configuration settings for which the registry space is intended and other data that may be undesirable or may pose a security threat.

Because various threat actors may target a registry space as a way to persistently store malicious program code or to trigger such code to be executed, agents described herein may be configured to monitor the registry space in accordance with principles that will now be described. For example, as set forth in the following description, an agent configured to operate in a Windows environment may be configured to interact with Windows components (e.g., the Windows Registry, various Windows filters, etc.) in the context of monitoring compute environments such as have been described. Such agents may perform real-time monitoring to facilitate threat detection and alerting for various registry-related scenarios including, for example, changes to autorun keys in the Windows Registry. In some examples, agents described herein may perform periodic scans for registry autorun changes and/or perform real-time monitoring and alerting for such autorun changes. In this way, various benefits of agent-based monitoring of a compute environment (e.g., runtime monitoring and logging, runtime threat detection, file integrity monitoring, host-based intrusion detection, and other agent benefits described herein) may be provided to various hosts and environments, including to compute assets that run in Windows environments and/or other compute assets that are associated with registry spaces having security vulnerabilities not necessarily shared in other types of environments.

Figure 9:
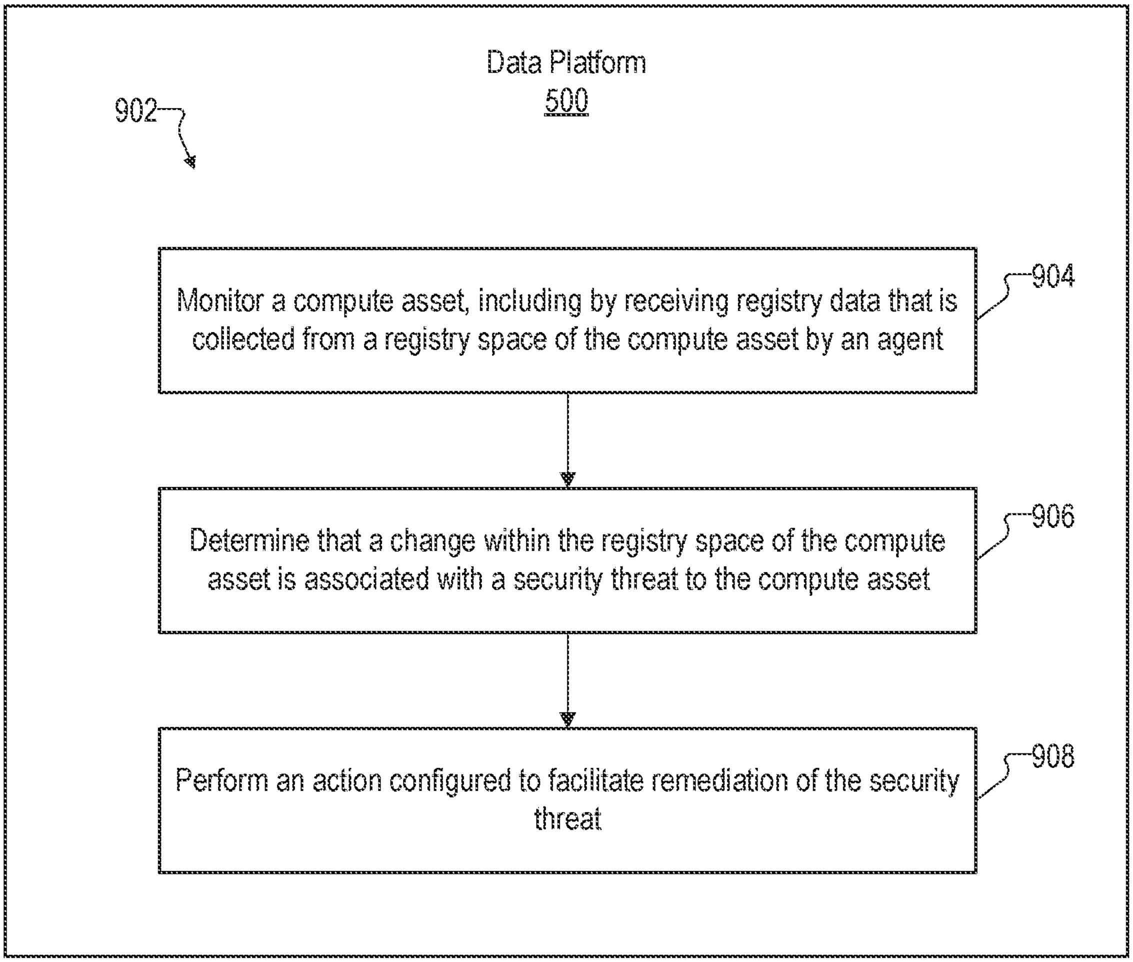
FIG. 9 illustrates an example data platform configured to perform an illustrative process to facilitate agent-based monitoring of a registry space of a compute asset within a compute environment.

FIG. 9 illustrates an example in which data platform 500 is configured to perform an illustrative process 902 to facilitate agent-based monitoring of a registry space of a compute asset within a cloud compute environment or another suitable compute environment described herein (e.g., cloud environment 14, an on-prem compute environment in which agents are employed within physical or virtual servers, a non-cloud server environment, etc.). As shown, process 902 may include a plurality of operations 904, 906, and 908, each of which may be performed, in full or in part, by data platform 500, which may be implemented by any of the data platforms described herein.

While process 902 shows illustrative operations according to one implementation, other implementations may omit, add to, reorder, and/or modify any of the operations shown in process 902. In some examples, multiple operations shown in process 902 may be performed concurrently (e.g., in parallel) with one another, rather than being performed sequentially as illustrated and/or described. One or more of the operations shown in FIG. 9 may be performed by data processing resources, user interface resources, communication resources, and/or other suitable computing resources of any suitable implementation of data platform 500. Additionally or alternatively, it will be understood that similar or analogous operations to those shown in process 502 and/or other operations described herein as being performed by computing resources of the data platform may, in certain implementations, be performed by one or more agents operating in the compute environment or by other suitable actors.

The operations of process 902 may be performed prior to, in parallel with, or subsequent to other operations described above to be performed by the data platform. For example, the operations of process 902 may be performed before, during, or after the data platform constructs a graph (e.g., a polygraph) with respect to data received from the agent and ingested in the ways described herein. Each of operations 904-908 of process 902 will now be described in more detail as the operations may be performed by computing resources of data platform 500.

At operation 904, data platform 500 (e.g., computing resources operating on the data platform) may monitor a compute asset (e.g., a compute asset 604 or any other compute asset described herein) within a compute environment (e.g., within cloud compute environment 602 or any other cloud or non-cloud compute environment described herein). The monitoring at operation 904 may include any of the functionality that has been described, including receiving agent-collected data (e.g., agent-collected data 710) from an agent deployed to the compute asset (e.g., an agent 510), providing direction for the agent to implement an operation adjustment (e.g., operational adjustment direction 714), and so forth. Additionally, as will be described in more detail below, the monitoring at operation 904 may further include receiving registry data from the agent deployed to the compute asset. For instance, such registry data may be collected, by the agent, from a registry space of the compute asset (e.g., a Windows Registry of a Windows-based compute asset).

At operation 906, data platform 500 may determine that a change within the registry space of the compute asset is associated with a security threat to the compute asset. For instance, upon receiving the registry data collected by the agent and provided to data platform 500 at operation 906, data platform 500 may make the registry change determination of operation 906 at least based on the registry data and possibly based on other information accessible to data platform 500. As will be described in more detail below, the determination of operation 906 may be made in any suitable way (e.g., based on any of various types of analysis that may be performed on the various types of registry data that the data platform may receive at operation 904).

As the determination is made at operation 906 that the change within the registry space is associated with the security threat to the compute asset, it will be understood that there need not necessarily be a determination made that there has indeed been a malicious attempt aimed at compromising the security of the compute asset in some way (what may be referred to as an "actual threat"). Rather, in certain examples, it may be that a certain change to the registry data is identified to be associated with a security threat due to a prior determination that such changes may correspond to actual threats even though, upon further examination, such changes may sometimes turn out to be benign and/or completely legitimate. As such, the term "security threat," as used in the following description, may be broadly understood to cover various issues identifiable from registry data and/or other agent-collected data (e.g., non-compliance issues, vulnerability issues, resource configuration issues, anomalous behavior, etc.), and will not necessarily be interpreted as applying only to actual security threats (e.g., actual attempts by threat actors to compromise compute asset security in some way). Rather, security threats will be understood to broadly cover these actual threats along with apparent security threats that, while meeting anomalous and/or suspicious criteria of patterns that have not previously been observed or that have been correlated with problematic functionality, do not amount to actual threats (and may, in fact, turn out to relate to neutral or even desirable behavior for the compute asset). Various examples of security threats and ways that they may be identified within changing registry data collected by an agent will be described in more detail below.

At operation 908, data platform 500 may perform an action configured to facilitate remediation of the security threat identified at operation 906 (i.e., the security threat determined, based on the registry data received from the agent at operation 904, to be associated with the change within the registry space of the compute asset). This action may be based on the determining at operation 906 that the change within the registry space is associated with the security threat, and may be any suitable action aimed at facilitating any type of remediation in any manner as may serve a particular implementation. For example, as will be described and illustrated in more detail below, the action may involve generating various types of alerts to inform a user of the existence of the security threat (e.g., to thereby allow the user to act appropriately to address the security threat). As another example, the action may facilitate remediation of the security threat by directing the agent to quarantine the host itself, or one or more software processes executing thereon, to reduce or eliminate the damage being done by (and/or the risk posed by) the security threat while the threat is otherwise investigated and handled (e.g., by automatic or manual methods).

Figure 10:
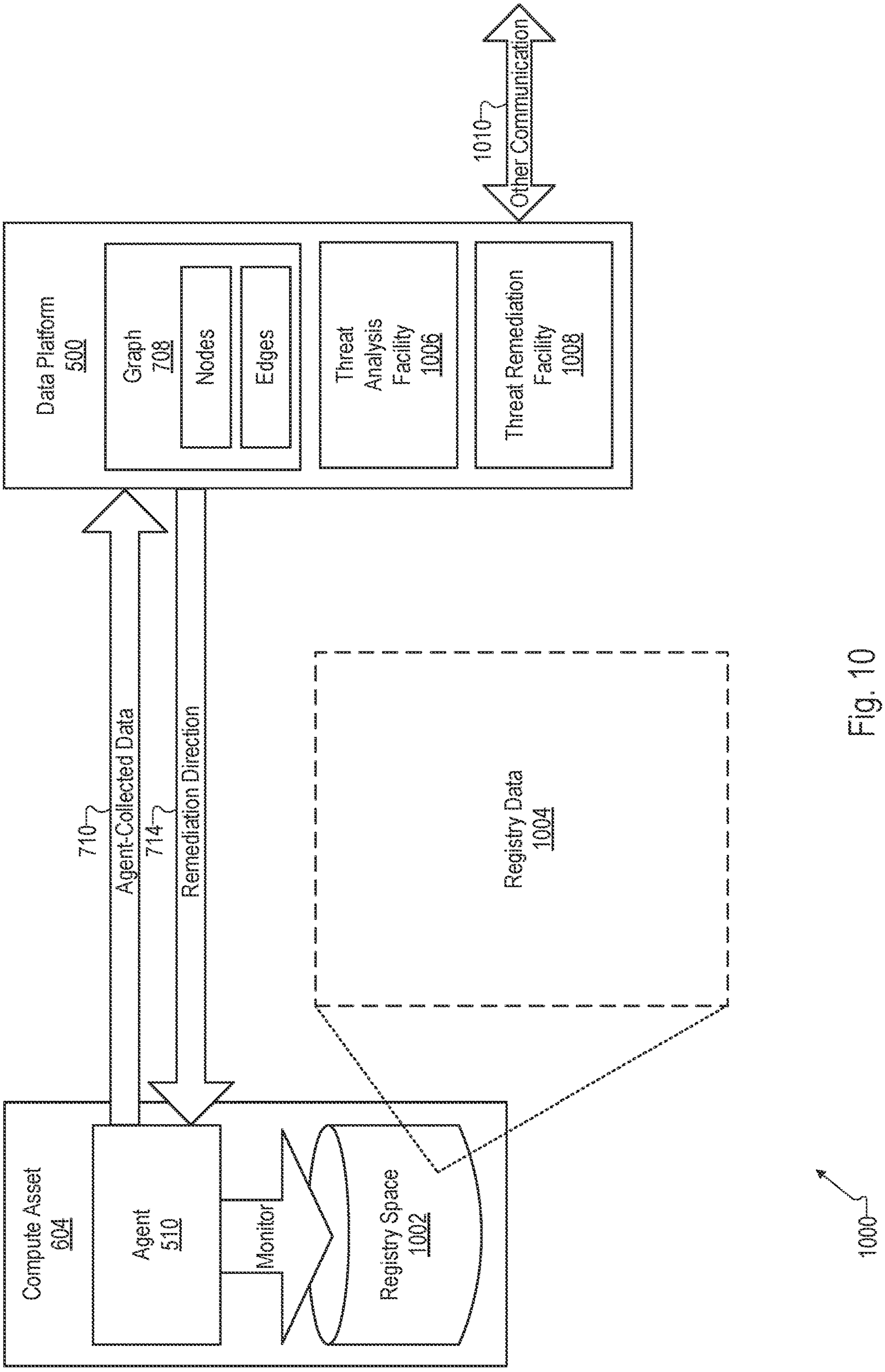
FIG. 10 illustrates an example configuration by way of which agent-based monitoring of a registry space of a compute asset may be performed.

FIG. 10 illustrates an example configuration 1000 by way of which agent-based monitoring of a registry space of a compute asset may be performed. Specifically, as shown and as will be described in more detail below, a compute asset 604 (implementing any of compute assets 604 described herein) within a compute environment (not explicitly shown in FIG. 10) is shown to include an agent 510 (implementing any of agents 510 described herein) that monitors, possibly among other aspects of compute asset 604, a registry space 1002 of compute asset 604. The registry space 1002 includes various registry data 1004 that agent 510 may help to monitor such that, if a change to registry data is anomalous, suspicious, or otherwise indicative of a possible security issue, that change may be identified as a security threat based on registry data 1004 being collected and provided by agent 510 to data platform 500 as part of agent-collected data 710. As described above, data platform 500 may generate graph 708 based on agent-collected data 710. As further shown, data platform 500 may include a threat analysis facility 1006 that, based on graph 708 and/or other criteria, may determine whether changes to registry space 1002 (based on registry data 1004 received as part of agent-collected data 710) are associated with security threats to compute asset 604. Data platform 500 further includes a threat remediation facility 1008 that may perform various actions to facilitate remediation of security threats identified by threat analysis facility 1006. For example, an implementation of operational adjustment direction 714 specifically referred to, in the context of FIG. 10, as remediation direction 714 may represent certain remediation actions performed by threat remediation facility 1008, while other remediation actions may be applied by way of other communication 1010 from data platform 500 to other entities (e.g., to a user interface of data platform 500, to a user device used by a user to interface with data platform 500, etc.).

Additional detail about each of the elements of configuration 1000 will now be described in relation to FIG. 10, as well as in relation to FIGS. 11A-11D and 12A-12C.

Agent 510 may be deployed to compute asset 604 and may be implemented by any agent described herein, including by any of various implementations of agent 510 that have been described above. While performing any or all of the operations described for agents in previous examples, the agent 510 of configuration 1000 may also be configured to continuously monitor registry space 1002 of compute asset 604 such that the data platform's receiving of registry data 1004 collected by agent 500, as well as the data platform's determining that the change within the registry space is associated with the security threat, may be performed in substantially real time as the change within registry space 1002 occurs. In some examples, agent 510 may monitor the entire registry space 1002 and provide much or substantially all of the registry data 1004 collected thereby to data platform 500 as part of agent-collected data 710. In other examples, agent 510 may monitor only specific portions of registry space 1002 and/or may provide a filtered subset of registry data 1004 (e.g., only data that has changed since a previous scan, etc.) rather than all the data that could be collected.

The implementation of agent 510 illustrated in configuration 1000 (hereafter referred to simply as agent 510) will be understood to represent a Windows®-based agent (i.e., an agent configured to operate in a Windows-based environment or to run within a Windows®-based OS such as Windows Server™) that is similar to, but distinct in certain ways from, other agents 510 that may be configured for Linux® or other OSes or environments. As a Windows®-based agent, agent 510 may perform similar functionality as a Linux®-based agent and may be implemented as a non-intrusive, lightweight service having low overhead, modest memory and CPU usage, and similar tolerances. Like Linux®-based agents, agent 510 may collect relevant data from the OS such as information about applications, services, network data, and login behavior. Unlike a Linux®-based agent, however, agent 510 may also be configured to collect data associated with registry space 1002 and to be signed and validated by standard Windows®-based security measures (e.g., public signing/authorizing procedures designated for Windows® by Microsoft®). Agent 510 may support or he compatible with automated deployments using Windows® Automation toolchains (e.g., Powershell®) and/or orchestration tools (e.g., Chef/AWS™ SSM, etc.). Agent 510 may also be upgradeable, updatable (e.g., with or without reboot), configured to fail gracefully with failure debug logs available for supportability, and configured to report status to data platform 500 at regular intervals in real time as the status is determined. Agent 510 may also be configured to be installed, directed (i.e., controlled), communicated with, and so forth, in ways similar or analogous to Linux®-based agents so that data platform 500 may easily communicate with different agents deployed to different types of platforms in a unified manner.

Registry space 1002 represents a hierarchical database allocated by an operating system of compute asset 604 (e.g., a Windows®-based OS) and configured for storing low-level settings for the operating system and/or applications (e.g., containers, etc.) running on the operating system and opting to use the database. For example, in implementations in which compute asset 604 is implemented as a physical or virtual computing device executing a Windows®-based operating system (e.g., Windows Server™, etc.), compute asset 604 may implement registry space 1002 as a Windows Registry™ within the Windows®-based operating system.

Various elements of compute asset 604 including, for example, the kernel, one or more device drivers, various services, account managers, user interfaces, and so forth, may opt to leverage persistent storage associated with registry space 1002 for any of various reasons. As such, any of these elements may be responsible for storing certain registry data 1004 in registry space 1002 and for recalling that data as needed.

Registry data 1004 may include any data that may be stored to registry space 1002 in any format. That being said, an anticipated use of registry space 1002 intended by the designers of the OS may call for registry data 1004 with particular characteristics. For example, typical registry data may include two basic elements: registry keys ("keys") and value data corresponding to those registry keys ("values"). Registry keys may be implemented as data containment objects similar to folders, while the registry values corresponding to those keys may be implemented as non-container objects similar to files. In certain examples, keys may contain values and/or subkeys. Keys may be referenced with pathnames similar to paths to files and folders in a filesystem. In conventional Windows®-based operating systems (e.g., using the Win32™ API), a hierarchy of registry keys may be accessed from a known root key handle defined in the API. For example, predefined root keys defined by the Win32™ API include HKEY_LOCAL_MACHINE, HKEY_CURRENT_CONFIG, HKEY_CLASSES_ROOT, HKEY_CURRENT_USER, HKEY_USERS, HKEY_PERFORMANCE_DATA (only in Windows NT®), and HKEY_DYN_DATA (only in Windows® 9x).

Like other folders and services, registry keys may be restricted by access control lists (ACLs) implementing levels of user privilege (e.g., read-only, read-write, etc.) or by other security measures (e.g., security tokens acquired by applications, security policies enforced by the system, etc.) so that different users, programs, services, or remote systems may only see certain parts of the hierarchy (or distinct hierarchies from the same root keys). Even in spite of such security measures and restrictions, however, registry space 1002 may be, for threat actors who wish to compromise compute asset 604 and/or its data, an attractive place to store persistent data. For example, if malicious executable program code is embedded in registry data 1004, this code may be more likely to evade certain security scans that might otherwise more easily discover the illicit code. As another example, malicious program code that is stored at another location outside of registry space 1002 may be invoked automatically as a result of illicit changes to autorun registry key/value pairs within registry data 1004.

Autorun registry keys and values are associated with OS settings that dictate which programs are automatically executed (i.e., autorun) upon the occurrence of certain events such as, for example, system startup, a login of a particular account, or the startup of a particular program or service. As one example, an autorun registry key associated with autorun for bootup may cause a list of programs stored in various places in storage of compute asset 604 (not explicitly shown in FIG. 10) to begin execution as soon as compute asset 604 is started up (e.g., as the OS is initialized and begins operating). Changes to this list of autorun programs may be relatively rare once a system is initially set up, so any changes that would cause a new application to be autorun may be regarded as suspicious and worthy of the agent's and the data platform's attention, just as would finding executable program code embedded in registry data 1004.

To illustrate, FIGS. 11A-11D show several examples of registry data 1004 that may be collected by agent 510 and provided (e.g., as agent-collected data 710) for use by data platform 500 in determining that a change within registry space 1002 of compute asset 604 is associated with a security threat to compute asset 604. Specifically, each of FIGS. 11A-11D show different ways that certain registry data 1004 (e.g., data implementing one or more key/value pairs within registry data 1004) and/or changes thereto may be detected and included within agent-collected data 710 reported by agent 510 to data platform 500. As will be described in more detail below, data platform 500 may then analyze this collected data to determine whether changes to the registry data 1004 are associated with a security threat to compute asset 604.

Figure 11A:
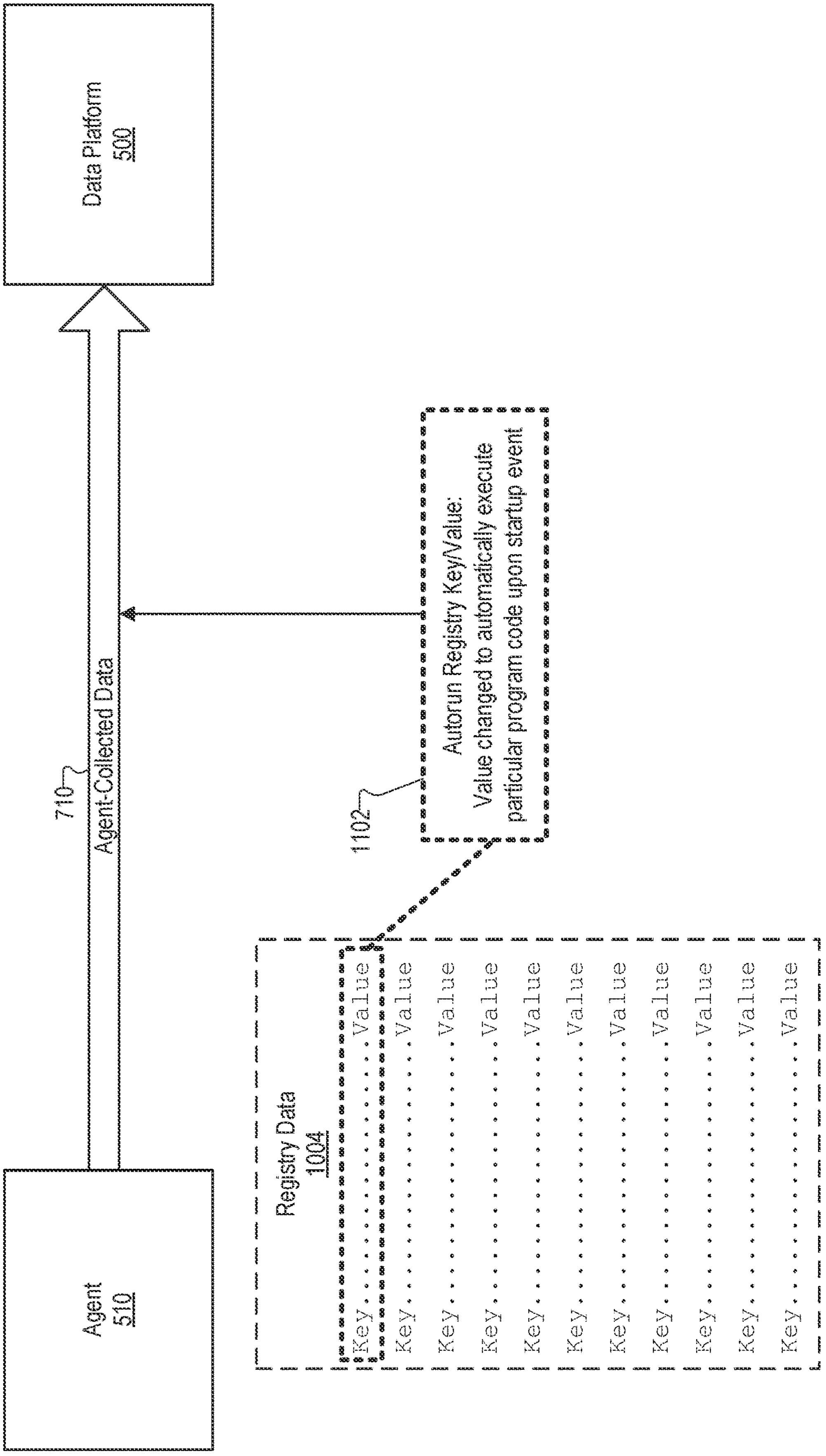
FIG. 11A illustrates a first example of registry data collected by an agent and provided for use by a data platform in determining that a change within a registry space of a compute asset is associated with a security threat to the compute asset.

In the example of FIG. 11A, a particular change 1102 within the registry space 1002 (i.e., a change to one of the key/value pairs in registry data 1004) is shown to be included (or otherwise indicated) by agent 510 in the agent-collected data 710 that is provided to data platform 500. In this example, change 1102 is shown to represent a change to a particular autorun registry key/value pair such that the registry value associated with the autorun registry key is changed to automatically execute particular program code (e.g., malicious program code representing a security threat to compute asset 604) when triggered by a system startup event (initial bootup of the system). As such, upon receiving the agent-collected data 710 that indicates change 1102, data platform 500 may determine that change 1102 is associated with a security threat by determining that value data associated with the autorun registry key within registry space 1002 has been changed to cause executable program code designated by the value data to automatically be executed upon occurrence of an autorun event associated with the autorun registry key, where that autorun event is the startup event that occurs when compute asset 604 is booted.

Figure 11B:
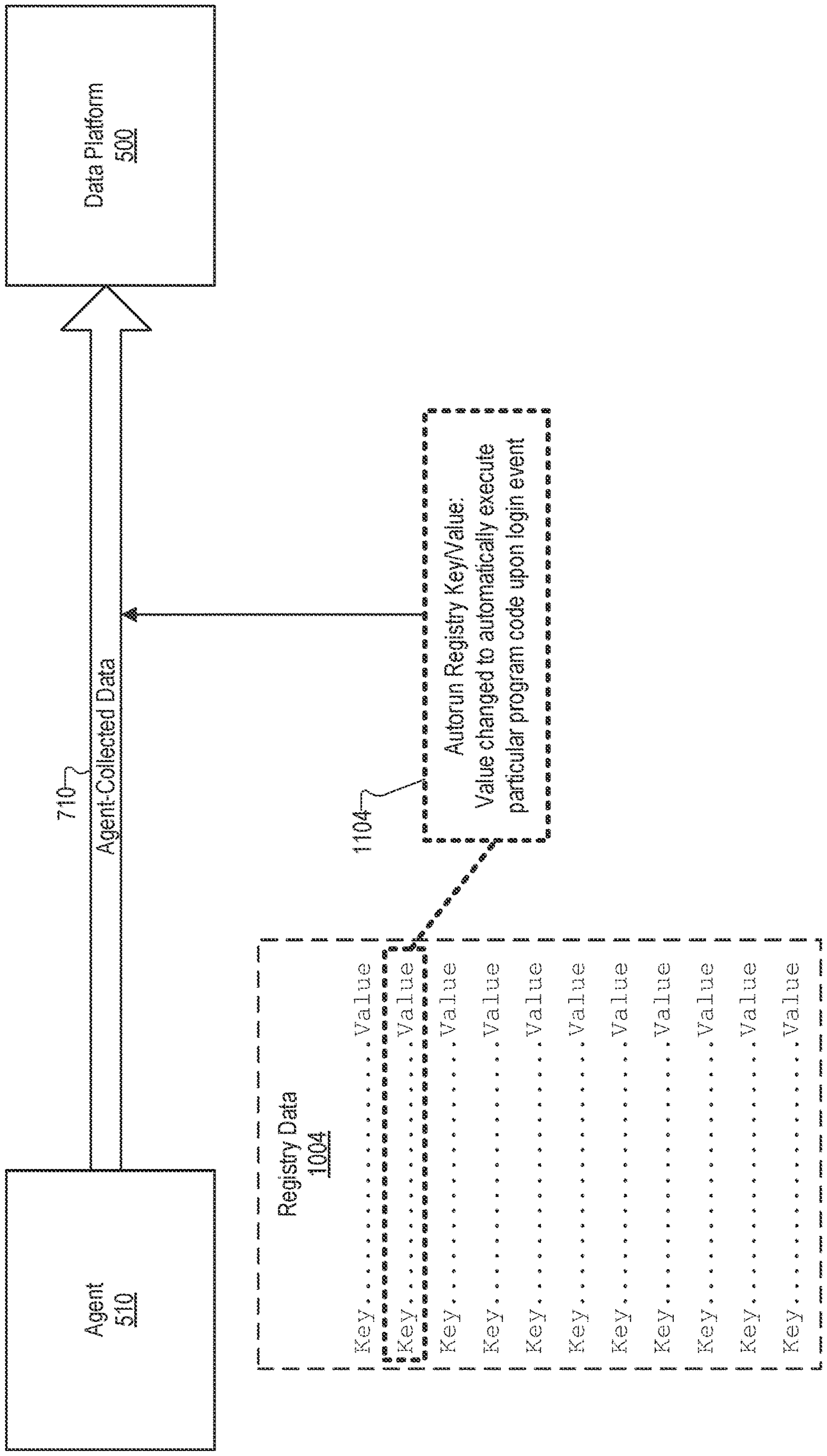
FIG. 11B illustrates a second example of registry data collected by an agent.

In the example of FIG. 11B, a particular change 1104 within the registry space 1002 (i.e., a change to another one of the key/value pairs in registry data 1004) is shown to be included (or otherwise indicated) by agent 510 in the agent-collected data 710 that is provided to data platform 500. Similar to the example of FIG. 11A, change 1104 of the example of FIG. 11B is shown to represent a change to a particular autorun registry key/value pair such that the registry value associated with the autorun registry key is changed to automatically execute particular program code (e.g., malicious program code representing a security threat to compute asset 604) when triggered by a particular event. However, rather than the system startup event of change 1102, change 1104 shows that the program code is set to automatically execute upon a system login event (e.g., when a particular account is logged into on compute asset 604, when a particular user logs in to access compute asset 604, etc.). As such, upon receiving the agent-collected data 710 that indicates change 1104, data platform 500 may determine that change 1104 is associated with a security threat by determining that value data associated with the autorun registry key within registry space 1002 has been changed to cause executable program code designated by the value data to automatically be executed upon occurrence of an autorun event associated with the autorun registry key, where that autorun event is the login event that is associated with the particular account and that occurs when the particular account is logged into on compute asset 604.

Figure 11C:
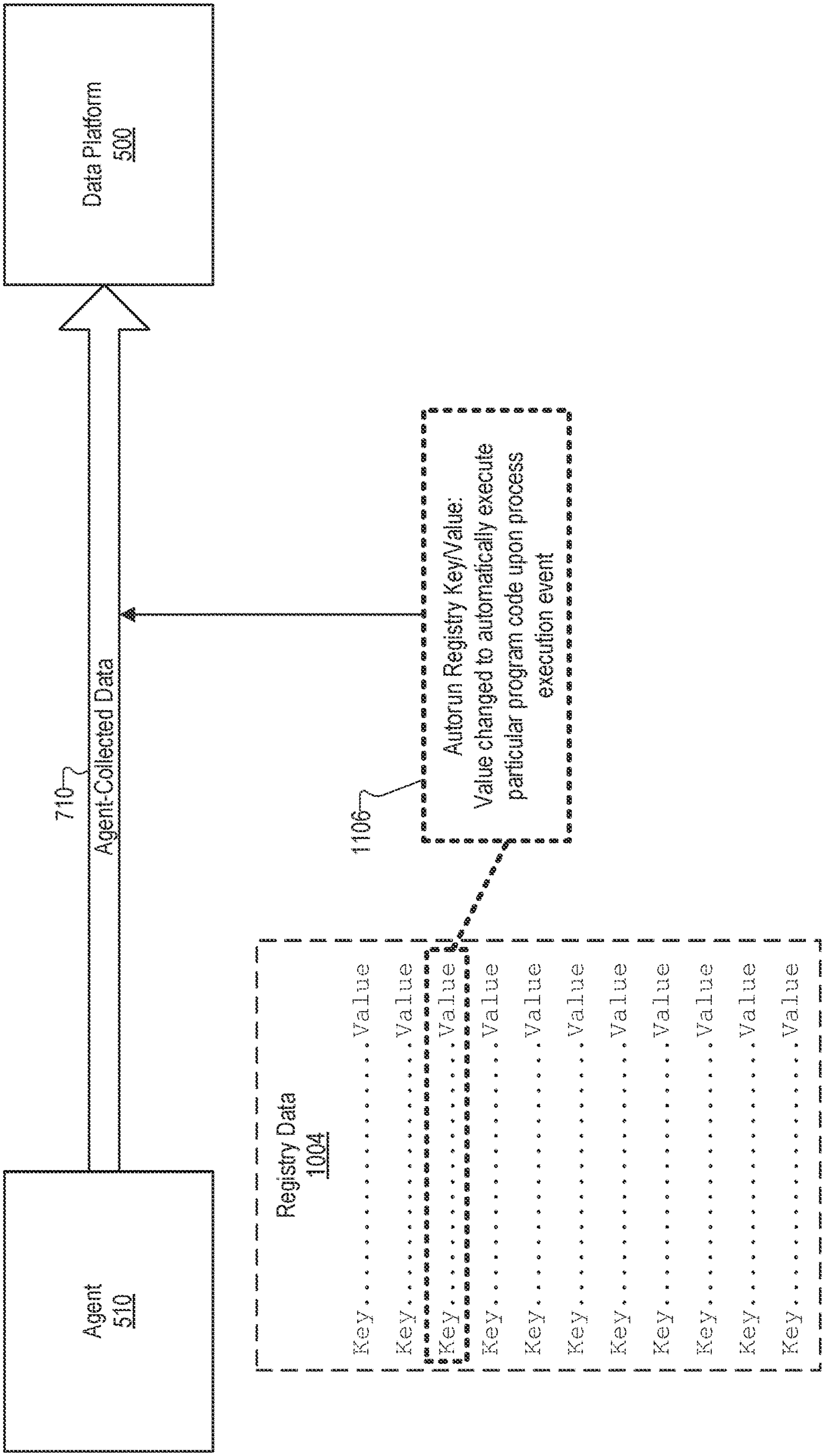
FIG. 11C illustrates a third example of registry data collected by an agent.

In the example of FIG. 11C, a particular change 1106 within the registry space 1002 (i.e., a change to another one of the key/value pairs in registry data 1004) is shown to be included (or otherwise indicated) by agent 510 in the agent-collected data 710 that is provided to data platform 500. Similar to the examples of FIGS. 11A and 11B, change 1106 of the example of FIG. 11C is shown to represent a change to a particular autorun registry key/value pair such that the registry value associated with the autorun registry key is changed to automatically execute particular program code (e.g., malicious program code representing a security threat to compute asset 604) when triggered by a particular event. However, rather than the system startup event of change 1102 or the login event of change 1104, change 1106 shows that the program code is set to automatically execute upon a process execution event (e.g., when a particular application, service, program, or other process begins executing on compute asset 604). As such, upon receiving the agent-collected data 710 that indicates change 1106, data platform 500 may determine that change 1106 is associated with a security threat by determining that value data associated with the autorun registry key within registry space 1002 has been changed to cause executable program code designated by the value data to automatically be executed upon occurrence of an autorun event associated with the autorun registry key, where that autorun event is the process execution event that is associated with the particular software process and that occurs when the particular software process is executed on compute asset 604.

Figure 11D:
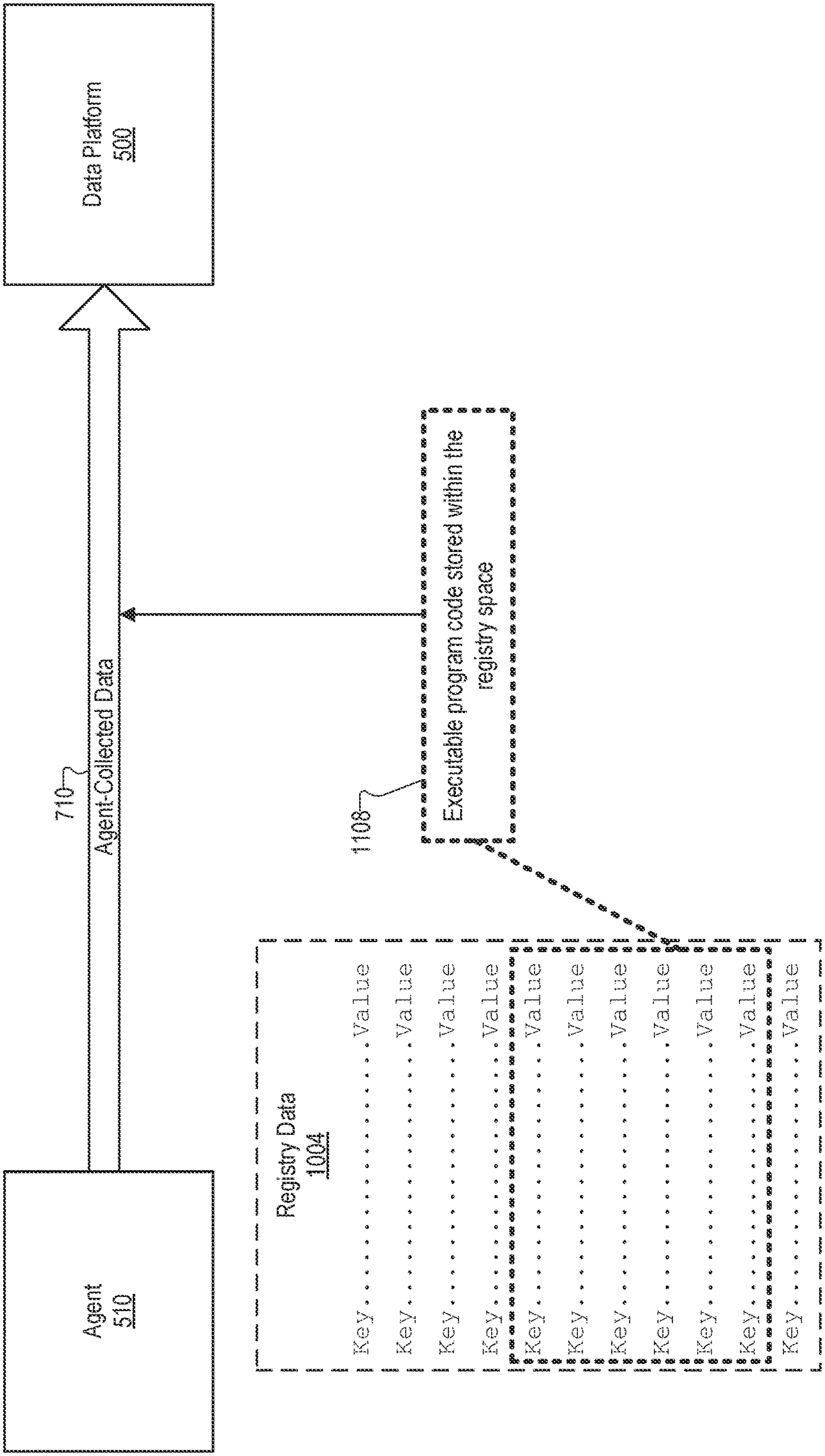
FIG. 11D illustrates a fourth example of registry data collected by an agent.

In the example of FIG. 11D, a particular change 1108 within the registry space 1002 (i.e., a change to a block of several key/value pairs in registry data 1004 in this example) is shown to be included (or otherwise indicated) by agent 510 in the agent-collected data 710 that is provided to data platform 500. In contrast to the examples of FIGS. 11A-11C, change 1108 of the example of FIG. 11D is shown not to represent a change to a particular autorun registry key/value pair such that the registry value associated with the autorun registry key is changed to automatically execute particular program code when triggered by a autorun event, but, rather, to represent executable program code that is actually stored within registry space 1002 as part of registry data 1004. In other words, rather than pointing to executable program code stored at another location that a threat actor intends to begin execution upon being triggered by the autorun event, the example of FIG. 11D represents actual executable program code embedded right into registry data 1004. As such, upon receiving the agent-collected data 710 that indicates change 1106, data platform 500 may determine that change 1108 is associated with a security threat by determining that the executable program code has been stored in the registry space that was not previously stored in the registry space.

In any of the examples of FIGS. 11A-11D, the agent-collected data 710 provided by agent 510 to data platform 500 may include a table (or data formatted in another suitable way) that displays changes in relevant registry paths (e.g., autorun paths or other paths that could be modified to cause automatic execution of applications). For example, such a table may include a registry key (i.e., the registry key that was modified), a value name (e.g., the registry key value that was modified), value data (e.g., the registry key value data that was modified), a hostname (e.g., the hostname of the compute asset on which the registry key was modified), a modified time (e.g., the time and data when the registry key was modified), an operation (e.g., the type of registry change that was detected), and/or any other information as may serve a particular implementation. While certain specific registry changes have been shown and illustrated in these examples, it will also be understood that various other registry changes may be detected and reported by agent 510 in other examples. For instance, any anomalous change to a registry key, any new registry key/value being added that is not commonly found with particular workloads, etc., may be cause for agent 510 to provide registry change data to data platform 500 for further analysis.

Returning to FIG. 10, agent-collected data 710 is shown to be provided from agent 510 of compute asset 604 to data platform 500. It will be understood that the data collecting and reporting represented by this data may be configured and controlled in any manner as may serve a particular implementation. For example, registry monitoring may be enabled or disabled by a user setting up agent 510 to cause agent-collected data 710 to include changed registry data 1004 (such as any of changes 1102-1108 or other detected changes) when enabled, or to leave out changed registry data 1004 when disabled. Other control settings for agent 510 may dictate or influence what parts of the registry space 1002 are scanned (e.g., whether the entire registry space or just a particular portion is monitored), whether changes are considered to include any creation, deletion, or updates to registry values (or whether only some of these operations are to be considered actionable "changes"), what information is to be reported when a registry change is detected, and so forth. In some examples, a listing of registry paths may be set for agent 510 to monitor and report on in agent-collected data 710. This listing may include certain default registry paths known to be common targets of modification by threat actors (e.g., registry paths associated with autorun registry keys, etc.) and may be customized (changing the defaults) to optimally serve certain situations and applications. For example, certain registry paths may be selected (e.g., added to or explicitly confirmed on the default listing), excluded (e.g., removed from the default listing), overridden (e.g., replaced on the default listing), and so forth in accordance with the needs and circumstances of a particular application.

Upon receiving agent-collected data 710, including information representing changes to registry data 1004, data platform 500 may process and analyze the data in any suitable way to determine whether changes to registry space 1002 of compute asset 604 may be associated with security threats to compute asset 604. As one example, data platform 500 may construct a graph 708 based on data collected within the compute environment and provided to data platform 500 by agent 510. As has been described, graph 708 may be implemented by any of the graphs described herein (e.g., polygraphs, etc.) and may comprise a plurality of nodes connected by a plurality of edges, where each node of the plurality of nodes may represent a logical entity and each edge of the plurality of edges may represent a behavioral relationship between nodes connected by the edge. In examples in which graph 708 is constructed in these ways based on registry data represented within agent-collected data 710, data platform 500 may determine, based on graph 708, that a change within registry space 1002 is associated with a security threat.

Data platform 500 may make such determinations by way of threat analysis facility 1006, which may access agent-collected data 710, graph 708 and the nodes and edges incorporated therein, machine learning models (not explicitly shown in FIG. 10), and/or any other suitable data that may facilitate the determination of whether a particular registry data change is associated with a security threat to compute asset 604. In certain cases, threat analysis facility 1006 may operate using relatively simple, bright-line rules such as that any executable program code found in registry data 1004 or any new autorun location added to an autorun registry key is to be deemed a security threat. In other cases, threat analysis facility 1006 may operate with more nuance than this, determining threats based on more complex analyses (e.g., using machine learning or other advanced analysis techniques) of an array of different factors, none of which dispositively indicates whether a particular change to registry data 1004 is to be designated as a security threat. Such factors may include, for example, how anomalous a particular change is in the context of previous observations, how much risk is associated with a particular change if the change happens to indeed represent a malicious attempt at compromising security, a particular client's threat sensitivity (e.g., embodied by threat sensitivity settings configured to indicate a desired balance between being alerted to all potential problems and avoiding "alert fatigue" that results from an inordinate percentage of designated security threats turning out to be benign), and so forth.

Upon determining that a change within registry space 1002 is associated with a security threat, data platform 500 may use threat remediation facility 1008 to perform an action (e.g., a remediation action) configured to facilitate remediation of the identified security threat. Such remediation actions may include any suitable actions that data platform 500 is capable of performing to help lead to the remediation of the threat. In some cases, such remediation may involve completely eliminating or neutralizing the threat (e.g., by deleting or quarantining malicious code, etc.). In other cases, such remediation may involve mitigating or otherwise reducing the risk from the threat without necessarily completely removing the security threat (e.g., by alerting a user to the existence of the threat to allow the user to further investigate and, if appropriate, take further actions to eliminate or neutralize the threat or to remedy harm that the threat has already caused). In any case, actions aimed at facilitating remediation of a security threat may be performed independently of whether (as described above) the security threat represents an actual threat or represents a false alarm (e.g., an anomaly that appears as a threat but ultimately poses an acceptable risk of harm to the compute asset and its data).

The action performed by threat remediation facility 1008 may involve communication to other entities such as to agent 510, to a user interface used by personnel managing security for compute asset 604, or to another suitable entity as may serve a particular implementation. As one example, certain operational adjustment direction 714 labeled in FIG. 10 as remediation direction 714 may be provided to agent 510 in an effort to direct agent 510 to help handle the security threat. As another example, other communication 1010 may be delivered to other entities such as to a user interface of data platform 500 or to a user device communicatively coupled to data platform 500 (not explicitly shown in FIG. 10).

Figure 12A:
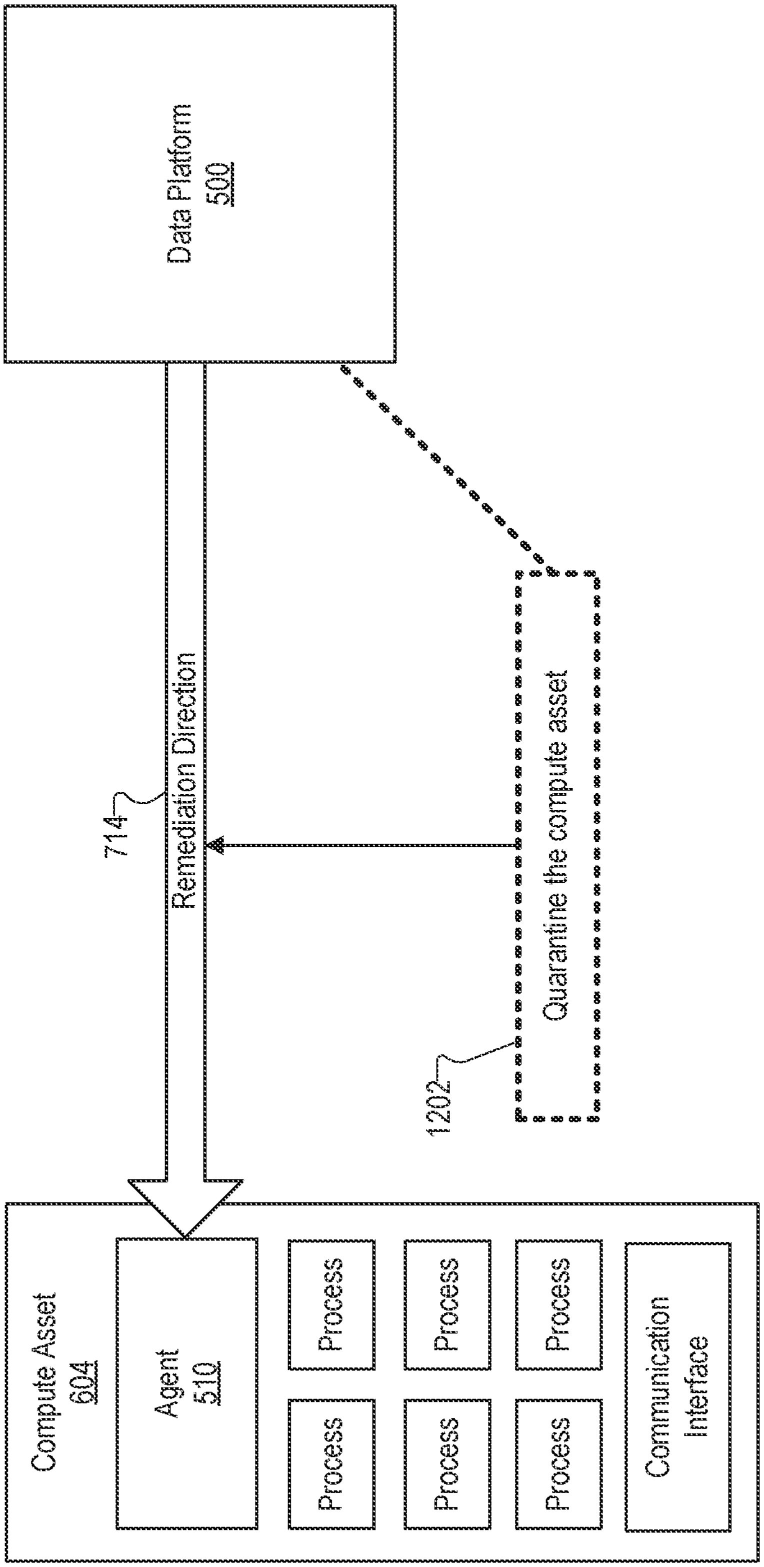
FIG. 12A illustrates a first example of an action performed by a data platform to facilitate remediation of a security threat.
Figure 12B:
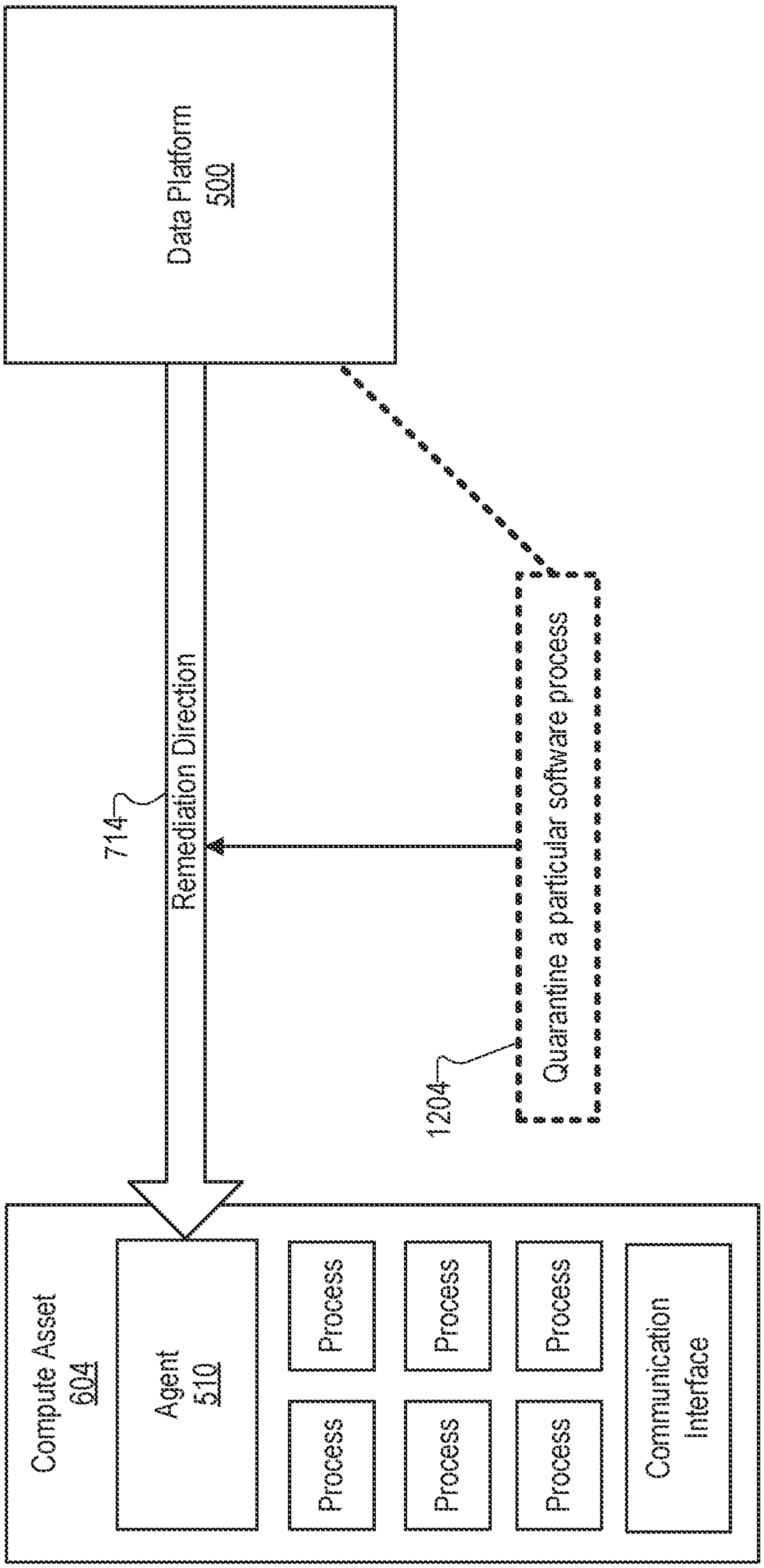
FIG. 12B illustrates a second example of an action performed by a data platform to facilitate remediation of a security threat.
Figure 12C:
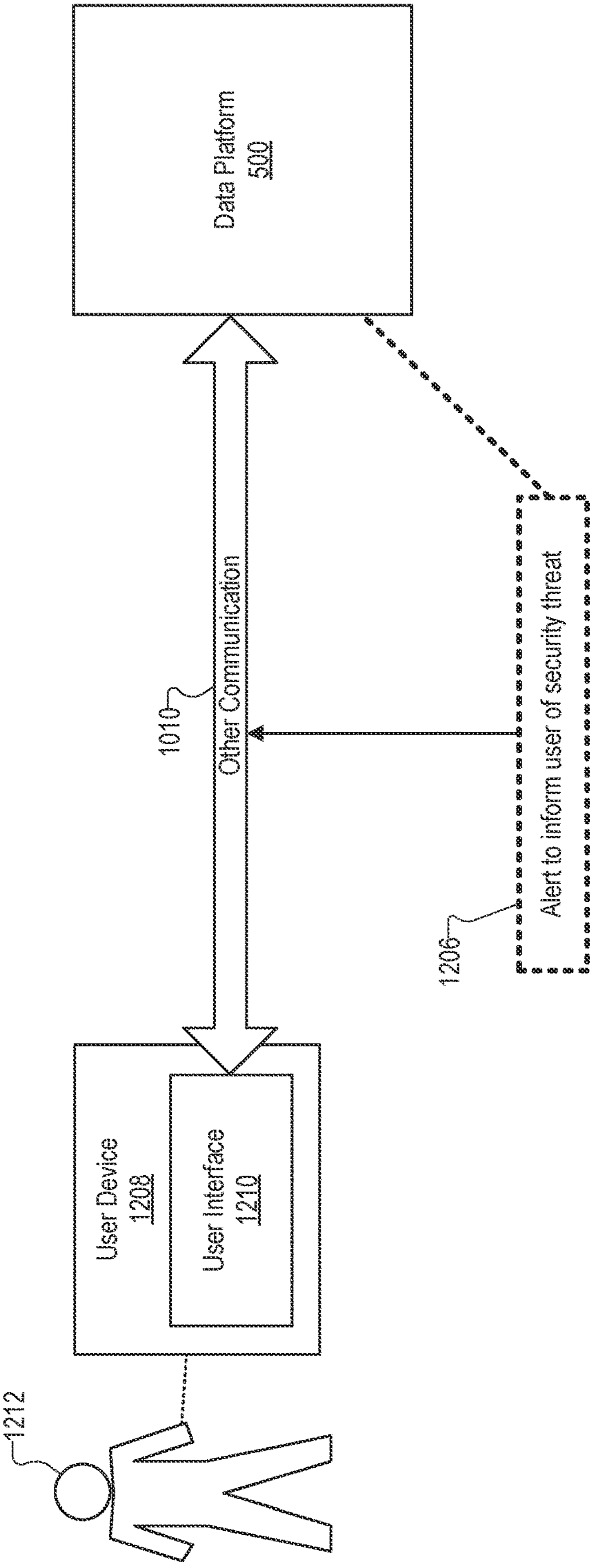
FIG. 12C illustrates a third example of an action performed by a data platform to facilitate remediation of a security threat.

To illustrate, FIGS. 12A-12C each show different examples of actions performed by data platform 500 to facilitate remediation of an identified security threat discovered by changes to the registry data as described above.

More particularly, FIG. 12A shows an action 1202 that is performed by data platform 500 by way of remediation direction 714 to agent 510. In this example, action 1202 is configured to facilitate remediation of the security threat by directing agent 510 to quarantine compute asset 604 such that communication between compute asset 604 and any entity other than data platform 500 is disallowed while the quarantining of the compute asset persists. For example, while various processes shown to be executing on compute asset 604 may normally use the illustrated communication interface to exchange information with various other entities (e.g., other compute assets within the compute environment), action 1202 may be configured to block such communications and only allow compute asset 604 to communicate with data platform 500 (at least until the threat is neutralized and fully resolved to the satisfaction of data platform 500). In this way, any damage that the security threat may have already incurred, as well as risk of further damage, may be limited as data platform 500 continues communications with the compute asset and/or its processes (e.g., by way of agent 510) to detect whether the security threat is an actual threat, to forensically investigate the threat and gather artifacts, to determine whether the security threat is responsible for any damage already incurred (and to assess bow widespread any damage is), and so forth. Once data platform 500 is satisfied that the extent of the damage is known and addressed appropriately, the communication maintained between compute asset 604 and data platform 500 may be used to unquarantine compute asset 604 so that it can resume normal operations with the security threat having be neutralized. In some examples, if the security threat is not able to be neutralized during quarantine, compute asset 604 may be shut down or otherwise taken offline to allow the threat to be further dealt with in a safe manner that will not allow the threat to spread to other assets.

Similarly, FIG. 12B shows an action 1204 that is performed by data platform 500 by way of remediation direction 714 to agent 510. In this example, action 1204 is configured to facilitate remediation of the security threat by directing agent 510 to quarantine not the entire compute asset 604 (as done in action 1202), but, rather, to quarantine a particular software process associated with the security threat (e.g., one of the processes shown to be running on compute asset 604) such that communication between the particular software process and any entity other than the data platform is disallowed while the quarantining of the particular software process persists. For example, while the various processes shown to be executing on compute asset 604 may normally intercommunicate with one another and/or may use the illustrated communication interface to exchange information with external entities (e.g., other compute assets within the compute environment), action 1204 may be configured to block all such communications for a quarantined process such that the process may only communicate with data platform 500 (at least until the threat is neutralized and fully resolved to the satisfaction of data platform 500). Once data platform 500 is satisfied that the extent of the damage is known and addressed appropriately, the communication maintained between the particular process and data platform 500 may be used to unquarantine the particular process so that normal operations may be resumed with the security threat having be neutralized. In some examples, if the security threat is not able to be neutralized during quarantine, the process associated with the security threat may be stopped, killed, or otherwise removed from the picture to allow the threat to be further dealt with in a safe manner that will not allow the threat to spread to other assets.

FIG. 12C shows an action 1206 that is performed by data platform 500 by way of other communication 1010 with, in this example, a user device 1208 that includes a user interface 1210 allowing the user device to be controlled and used by a user 1212. As shown, action 1206 may involve an alert provided to user 1212 (e.g., by way of user device 1208 and user interface 1210) that informs user 1212 of the security threat. For example, user interface 1210 may present user 1212 with a dashboard showing various alerts (including alerts associated with registry-related security threats and alerts associated with other types of security threats that may have been identified) categorized in any manner as may serve a particular implementation. For instance, in certain embodiments, user interface 1210 may categorize alerts by type, by importance (e.g., separating critical, high, medium, low, and informational alerts into different categories), by time detected, and/or by other suitable criteria.

In some examples, along with informing user 1212, an alert provided as part of action 1206 may be configured to provide other information and/or to accomplish other objectives. As one example, the performing of action 1206 may include generating an alert that is configured, when provided to user 1212, to both inform user 1212 of the security threat to the compute asset, as well as to indicate the change within the registry space of the compute asset. For instance, the change may be indicated by showing "before" and "after" segments of code or other information stored in registry space 1002, by providing a description of how the registry data has changed, or in other suitable ways.

As another example of what an alert may be configured to accomplish along with informing user 1212 of the security threat, an alert such as shown in action 1206 may be used in combination with other types of remediation actions such as actions 1202 and 1204. For example, the performing of a remediation action configured to facilitate remediation of the security threat may include generating an alert that is configured, when provided to user 1212, to both inform the user of the security threat to the compute asset, as well as to allow the user to select whether data platform 500 will direct agent 510 to perform other remediation actions. For instance, the alert may direct user device 1208 to provide user-selectable options to quarantine the compute asset (as described in relation to the example of FIG. 12A), to quarantine a particular software process associated with the security threat (as described in relation to the example of FIG. 12B), or to abstain from quarantining the compute asset or any software process executing thereon. While there are various advantages of allowing data platform 500 to autonomously handle remediation actions such as quarantining, there may also be situations in which it is beneficial to bring user 1212 into the decision loop prior to quarantining. For instance, if data platform 500 determines that a crypto mining operation is occurring (e.g., having been started based on a new autorun registry entry or based on code embedded in registry data 1004), user 1212 may be more aware than data platform 500 how likely this is to be a problem (and, therefore, how desirable it would be to quarantine the mining process). If user 1212 knows that the compute asset is operating a cryptocurrency-related application for a cryptocurrency company, for example, the autorunning of a new crypto mining application may not raise a red flag, and user 1212 may indicate that no action is to be taken (i.e., that agent 510 is to abstain from quarantining any compute asset or process). Conversely, if user 1212 does not expect any such crypto mining application to take place, the user may be in a good position to determine whether only a particular process is to be quarantined, whether the whole compute asset is to be quarantined, whether either of these should be completely shut down or removed, or whether other mitigative action is to be taken.

Along with providing registry-space monitoring as has been described, Windows-based agents may also be configured to operate in other ways that may be similar to or distinct from Linux-based agents or agents configured for use with other platforms.

For example, one feature that may be implemented with either a Windows®-based or Linux®-based agent is to monitor and analyze command line data provided to and executed by the compute asset. Command-line analysis may be configured to capture commands that are run on a host and to analyze the parameters passed into the commands so that anomaly-based detection can be run to identify when an anomalous or unexpected element is present (e.g., a suspicious or unanticipated command, parameter, combination of parameters, etc.). Threat actors commonly attempt to take advantage of existing tools operating within a given OS environment (i.e., tools that do not, in and of themselves, tend to give any cause for alarm) to try to implement malicious designs by way of the tools. Accordingly, security may be increased by monitoring and analyzing data coming from such tools, including command line tools.

Another feature that may be implemented for Windows-based and/or Linux-based agents involves generating allow lists (also referred to as "whitelists") for processes and communications that exist within a given operating system environment. Conventional security models have often enumerated signatures of known threats so as to block them, but it has generally been impractical or prohibitively expensive (e.g., in terms of resource usage, etc.) to perform an inverse operation of this based on an allow list of known legitimate data and processes that are expected to be present in the environment. However, given the wealth of data and insight a data platform such as data platform 500 may accumulate after receiving data from an agent over a long period of time, it may be practical and advantageous for such data platforms to generate allow lists with all the processes and network connections that are known to be acceptable for the environment. For example, a listing may include processes characterized by information such as file names, locations, hashes of the file (e.g., to uniquely identify the file so that it cannot be surreptitiously swapped out for another file), etc., and may further include connections characterized by information such as DNS names (e.g., human readable names of connection), IP addresses, and so forth. Based on such an allow list, a policy may be generated that is enforceable by the agent to only permit known legitimate entities to exist (and to inherently block illegitimate threats).

Yet another feature that may be implemented for Windows-based and/or other types of agents involves monitoring for lateral data movement on communicative connections that go to other compute assets and hosts within the compute environment. When a threat actor comprises one host asset, it is expected that they may also attempt to use that information to move on and compromise other hosts (e.g., within the same compute environment). Accordingly, monitoring for lateral movement of data provides an ability to generate alerts or other remediation actions when, for example, two compute assets that have not previously communicated are detected to communicate for the first time, or the like.

Advantages and features of the present disclosure can be further described by the following statements:

1. A method comprising: accessing, by an agent deployed in a cloud compute environment monitored by a data platform, kernel data generated by a kernel of an operating system used within the cloud compute environment; detecting, by the agent and based on the kernel data, a launch of a new container entity of a set of container entities deployed to the cloud compute environment and managed by a container runtime executing on the operating system; and based on the detecting, providing, by the agent to the data platform, agent data that indicates the launch of the new container entity.

2. The method of any of the preceding statements, wherein: the operating system is a Windows operating system; the kernel data includes a silo creation callback generated by the kernel of the Windows operating system; and the detecting of the launch of the new container entity includes: identifying, within the silo creation callback, a container entity name, and determining that the container entity name has not yet been observed in previous callbacks produced by the kernel of the Windows operating system.

3. The method of any of the preceding statements, wherein: the container runtime is a Docker® runtime; and the identifying of the container entity name is performed based on a Docker®-based job-naming scheme.

4. The method of any of the preceding statements, wherein: the container runtime is a containerd runtime; and the identifying of the container entity name is performed based on a containerd-based job-naming scheme.

5. The method of any of the preceding statements, wherein the new container entity is implemented as a containerized application or as a pod that includes one or more containerized applications.

6. The method of any of the preceding statements, further comprising: collecting, by the agent and subsequent to the detecting of the launch of the new container entity, additional data associated with the new container entity, the additional data collected from the container runtime based on a container entity name indicated by the kernel data; and as part of the providing of the agent data to the data platform, providing the additional data collected from the container runtime.

7. The method of any of the preceding statements, further comprising: detecting, by the agent and based on additional kernel data generated by the kernel subsequent to the detecting of the launch of the new container entity, a launch of a new process on the operating system; correlating, by the agent and based on a container entity name indicated by the kernel data and a process name indicated by the additional kernel data, the new process to the new container entity; and as part of the providing of the agent data to the data platform, providing process data indicating that the new process has launched and is correlated with the new container entity.

8. The method of any of the preceding statements, further comprising: collecting, by the agent from the container runtime, container data indicative of one or more container entities of the set of container entities that are deployed to the cloud compute environment and managed by the container runtime prior to the launch of the new container entity; and as part of the providing of the agent data to the data platform, providing the container data collected from the container runtime.

9. The method of any of the preceding statements, further comprising: identifying, by the agent, a set of processes executing on the operating system and associated with the set of container entities; monitoring, by the agent, network activity produced or received by the set of processes that has been identified; and as part of the providing of the agent data to the data platform, providing process data generated based on the monitoring of the network activity.

10. The method of any of the preceding statements, wherein the agent data provided to the data platform is configured to be used by the data platform for generation of a data model that facilitates the data platform in assessing a security posture of the cloud compute environment.

11. The method of any of the preceding statements, wherein: the data model is a graph comprising a plurality of graph nodes connected by a plurality of edges; each graph node of the plurality of graph nodes represents a logical entity and each edge of the plurality of edges represents a behavioral relationship between graph nodes connected by the edge; and the plurality of graph nodes includes a container launch event graph node associated with the launch of the new container entity to allow the assessing of the security posture to account for the launch of the new container entity.

12. The method of any of the preceding statements, wherein the assessing of the security posture of the cloud compute environment includes identifying, based on the data model, at least one of an anomaly, a security threat, or a compliance issue with respect to the set of container entities deployed to the cloud compute environment.

13. A computer program product embodied in a non-transitory computer-readable storage medium and comprising computer instructions for performing a process comprising: accessing kernel data generated by a kernel of an operating system used within a compute environment to which the computer program product is deployed; detecting, based on the kernel data, a launch of a new container entity of a set of container entities deployed to the compute environment and managed by a container runtime executing on the operating system; and based on the detecting, providing, to a data platform that monitors the compute environment to which the computer program product is deployed, agent data that indicates the launch of the new container entity.

14. The computer program product of any of the preceding statements, wherein: the operating system is a Windows® operating system; the kernel data includes a silo creation callback generated by the kernel of the Windows® operating system; and the detecting of the launch of the new container entity includes: identifying, within the silo creation callback, a container entity name, and determining that the container entity name has not yet been observed in previous callbacks produced by the kernel of the Windows® operating system.

15. The computer program product of any of the preceding statements, wherein the process further comprises: collecting, subsequent to the detecting of the launch of the new container entity, additional data associated with the new container entity, the additional data collected from the container runtime based on a container entity name indicated by the kernel data; and as part of the providing of the agent data to the data platform, providing the additional data collected from the container runtime.

16. The computer program product of any of the preceding statements, wherein the process further comprises: detecting, based on additional kernel data generated by the kernel subsequent to the detecting of the launch of the new container entity, a launch of a new process on the operating system; correlating, based on a container entity name indicated by the kernel data and a process name indicated by the additional kernel data, the new process to the new container entity; and as part of the providing of the agent data to the data platform, providing process data indicating that the new process has launched and is correlated with the new container entity.

17. The computer program product of any of the preceding statements, wherein the process further comprises: collecting, from the container runtime, container data indicative of one or more container entities of the set of container entities that are deployed to the compute environment and managed by the container runtime prior to the launch of the new container entity; and as part of the providing of the agent data to the data platform, providing the container data collected from the container runtime.

18. The computer program product of any of the preceding statements, wherein the agent data provided to the data platform is configured to be used by the data platform for generation of a data model that facilitates the data platform in assessing a security posture of the compute environment.

19. The computer program product of any of the preceding statements, wherein: the data model is a graph comprising a plurality of graph nodes connected by a plurality of edges; each graph node of the plurality of graph nodes represents a logical entity and each edge of the plurality of edges represents a behavioral relationship between graph nodes connected by the edge; and the plurality of graph nodes includes a container launch event graph node associated with the launch of the new container entity to allow the assessing of the security posture to account for the launch of the new container entity.

20. A computing system within a compute environment to which an agent is deployed, the computing system comprising: a memory storing instructions implementing the agent, and one or more processors communicatively coupled to the memory and configured to execute the instructions to perform a process comprising: accessing kernel data generated by a kernel of an operating system used within the compute environment; detecting, based on the kernel data, a launch of a new container entity of a set of container entities deployed to the compute environment and managed by a container runtime executing on the operating system, and based on the detecting, providing, to a data platform that monitors the compute environment, agent data that indicates the launch of the new container entity.

21. A method comprising: collecting, by a containerized agent that is deployed to a compute node of a cloud compute environment and that executes in both user space and kernel space of the compute node, data associated with a first container entity that is deployed to the compute node and that executes only in the user space of the compute node such that the first container entity is isolated from other entities executing in the user space of the compute node; and providing, by the containerized agent, the collected data associated with the first container entity to a data platform that is monitoring the cloud compute environment using the containerized agent.

22. The method of any of the preceding statements, wherein: the compute node of the cloud compute environment operates using a Windows® operating system; and the containerized agent includes a containerized service component executing in the user space of the compute node and a Windows® kernel driver executing in the kernel space of the compute node.

23. The method of any of the preceding statements, wherein: the compute node of the cloud compute environment operates using a Windows® operating system; and the containerized agent is implemented as a Host Process container.

24. The method of any of the preceding statements, wherein: the first container entity is implemented as a containerized application deployed to a first dedicated pod not shared by other containerized applications; and the Host Process container implementing the containerized agent is deployed to a second dedicated pod not shared by other containerized applications.

25. The method of any of the preceding statements, wherein: the containerized agent is deployed to the compute node during a session that begins with a setup routine and ends with a cleanup routine; and the method further comprises: installing, by the containerized agent as part of the setup routine, a kernel driver for the containerized agent that executes in the kernel space, and uninstalling, by the containerized agent as part of the cleanup routine, the kernel driver for the containerized agent.

26. The method of any of the preceding statements, wherein the compute node is a Kubernetes® worker node managed by a Kubernetes® master node.

27. The method of any of the preceding statements, further comprising: collecting, by the containerized agent, additional data associated with a second container entity that is deployed to the compute node and that executes only in the user space of the compute node such that the second container entity is isolated from the first container entity and the other entities executing in the user space of the compute node by way of at least one of namespace isolation, filesystem isolation, and registry isolation; and providing to the data platform, by the containerized agent and together with the providing of the collected data associated with the first container entity, the collected additional data associated with the second container entity.

28. The method of any of the preceding statements, wherein the containerized agent and the first container entity are managed by a container runtime executing on the compute node.

29. The method of any of the preceding statements, wherein the collected data provided to the data platform is configured to be used by the data platform for generation of a data model that facilitates the data platform in assessing a security posture of the cloud compute environment.

30. The method of any of the preceding statements, wherein: the data model is a graph comprising a plurality of graph nodes connected by a plurality of edges; each graph node of the plurality of graph nodes represents a logical entity and each edge of the plurality of edges represents a behavioral relationship between graph nodes connected by the edge; and the plurality of graph nodes includes a graph node associated with the first container entity to allow the assessing of the security posture to account for the first container entity.

31. The method of any of the preceding statements, wherein the assessing of the security posture of the cloud compute environment includes identifying, based on the data model, at least one of an anomaly, a security threat, or a compliance issue with respect to the first container entity that is deployed to the compute node of the cloud compute environment.

32. A computer program product embodied in a non-transitory computer-readable storage medium and comprising computer instructions implementing a containerized agent that is deployed to a compute node of a compute environment and that executes in both user space and kernel space of the compute node to perform a process comprising: collecting data associated with a first container entity that is deployed to the compute node and that executes only in the user space of the compute node such that the first container entity is isolated from other entities executing in the user space of the compute node; and providing the collected data associated with the first container entity to a data platform that is monitoring the compute environment using the containerized agent.

33. The computer program product of any of the preceding statements, wherein: the compute node of the compute environment operates using a Windows operating system; and the containerized agent includes a containerized service component executing in the user space of the compute node and a Windows kernel driver executing in the kernel space of the compute node.

34. The computer program product of any of the preceding statements, wherein: the compute node of the compute environment operates using a Windows operating system; and the containerized agent is implemented as a Host Process container.

35. The computer program product of any of the preceding statements, wherein: the first container entity is implemented as a containerized application deployed to a first dedicated pod not shared by other containerized applications; and the Host Process container implementing the containerized agent is deployed to a second dedicated pod not shared by other containerized applications.

36. The computer program product of any of the preceding statements, wherein: the containerized agent is deployed to the compute node during a session that begins with a setup routine and ends with a cleanup routine; and the process further comprises: installing, as part of the setup routine, a kernel driver for the containerized agent that executes in the kernel space, and uninstalling, as part of the cleanup routine, the kernel driver for the containerized agent.

37. The computer program product of any of the preceding statements, wherein the compute node is a Kubernetes worker node managed by a Kubernetes master node.

38. The computer program product of any of the preceding statements, wherein the process further comprises: collecting additional data associated with a second container entity that is deployed to the compute node and that executes only in the user space of the compute node such that the second container entity is isolated from the first container entity and the other entities executing in the user space of the compute node by way of at least one of namespace isolation, filesystem isolation, and registry isolation; and providing to the data platform, together with the providing of the collected data associated with the first container entity, the collected additional data associated with the second container entity.

39. The computer program product of any of the preceding statements, wherein the collected data provided to the data platform is configured to be used by the data platform for generation of a data model that facilitates the data platform in assessing a security posture of the compute environment.

40. A computing system within a compute environment monitored by a data platform using a containerized agent that executes in both user space and kernel space of the computing system, the computing system comprising: a memory storing instructions; and one or more processors communicatively coupled to the memory and configured to execute the instructions to implement the containerized agent and cause the containerized agent to perform a process comprising: collecting data associated with a first container entity that is deployed to the computing system and that executes only in the user space of the computing system such that the first container entity is isolated from other entities executing in the user space of the computing system; and providing the collected data associated with the first container entity to the data platform that is monitoring the compute environment using the containerized agent.

A variety of implementations of agent 510 have been described to facilitate a data platform (e.g., data platform 500) in monitoring compute environments (e.g., cloud compute environments, on-prem compute environments, etc.) in different ways. For example, as has been described, various implementations of agent 510 (and/or other agents described herein) may be configured to monitor activity by and between software applications (e.g., containerized applications, etc.) deployed to the compute environment and to report back on (provide data associated with) the monitored activity to the data platform. Based on this agent data, the data platform may gain insight into the security posture of the compute environment and the software deployed thereto, so as to be able to identify anomalies, threats, irregularities (e.g., areas of non-compliance), and so forth that the data platform may, as appropriate, automatically remediate and/or bring to the attention of a user who is in a position to troubleshoot and/or remediate the issue.

Some types of activity monitored and reported on by agents described herein involves data that is generated by different instances of software deployed to a given compute environment and/or data that is exchanged between such instances of software. Another important type of activity that may also or alternatively be monitored and reported on by agents described herein involves the launching and/or termination of software applications within the compute environment. For example, whenever a new container entity (e.g., a container implementing a containerized application, a pod including one or more such containers, etc.) is initially deployed to a compute environment (i.e., launched within the compute environment), certain agents described herein may monitor and report to the data platform that this launch of the container entity has occurred. Similarly, if a containerized application initializes a new process, the agents may monitor and report to the data platform about this launch of the new process as well.

In some examples (e.g., for agents running on certain operating systems such as Linux®-based operating systems), the launching of new container entities and/or processes associated with such container entities may be monitored in connection with and with significant reliance on information provided by a container runtime (e.g., Docker®, Containerd®, etc.) or other container tool. Container runtimes (also referred to as container engines, container runtime engines, etc.) may operate in user space of the operating system and be configured to manage container entities within the compute environment. As such, when a new container entity is launched, the container runtime may be involved in setting up and configuring the new container entity and may thus b positioned to provide information to an agent tasked with monitoring the occurrence of such launch activities. For example, an agent may use a REST API or the like to periodically query the container runtime (e.g., on a particular schedule such as once every few minutes, etc.) to determine if the container runtime has managed the launch of any ne\v container entities or processes since the last time the agent checked in. As another example, an agent may subscribe to notifications that the container runtime is configured to generate so that the agent can be immediately made aware of new container entities and/or processes when they are launched (without having to wait until the next query time). In either of these examples, the agent may be able to obtain the desired information regarding the launch event, but communication with the container runtime (and often multiple rounds of such communication) may be required to do so. For example, even when a notification is received by an agent employing a notification-based monitoring with the container runtime, the agent may need to further query the container runtime for additional details about newly launched entities. This may take additional time and processing, as well as adding complexity to the agent's capabilities, all of which may take a toll on the overall effectiveness and efficiency of the agent-based environment monitoring and the ultimate objectives of the data platform relying on such agents.

Kernel-based monitoring of container activity in a compute environment will now be described that may help address some of the issues that have been outlined to improve the effectiveness and efficiency of agents configured to monitor the launch and/or termination of new container entities and processes in certain compute environments (e.g., compute environments operating using operating systems that offer certain features that will be described). More particularly, as will now be described and illustrated in more detail, certain operating systems (e.g., Windows®-based operating systems that have been described) may be configured to provide kernel data (e.g., in the form of various types of callbacks, etc.) that may be monitored independently from the container runtime, and that may provide some of the same data that the container runtime would normally be relied on to provide. For example, on a Windows®-based operating system, creation callbacks for new container entities (e.g., job or silo creation callbacks) and/or new processes (e.g., process creation callbacks) generated by the Windows® kernel may allow the agent to detect and monitor the launch of container entities and processes in the Windows® compute environment without reliance on any data provided by a container runtime managing the container entities and/or processes. For example, as will be described in more detail, a Windows® agent may use such callbacks to obtain an identifier for a container entity (e.g., a container entity name) from a Windows® job name and match processes to this container entity accordingly. In some cases, the agent may also use this container identifier to query the container runtime for more information about the container entity before providing all this data to the data platform for use in identifying security issues and/or monitoring the security posture of the compute environment.

Kernel-based monitoring of container activity in a compute environment described herein (e.g., using Windows® callbacks and/or other such kernel data instead of or in addition to data generated by container runtimes) may provide various benefits and advantages for agent embodiments described herein. As one example, kernel data such as Windows® callbacks may be generated automatically and without needing to be queried on a set schedule. Accordingly, not only may an agent avoid the potential inefficiency of having to constantly check in with the container runtime (even when there is nothing new to report), but the agent may be guaranteed to receive information about the launch of a new container entity or process regardless of how short-lived the container entity or process may be. For example, if a container or process is launched and terminated over a relatively short amount of time, it is possible that an agent relying on periodic queries to a container runtime managing the container or process may never discover or report back to the data platform 1 about this short-lived container or process. In contrast, for an agent relying on kernel data such as silo or process creation callbacks provided automatically by the Windows® kernel, the agent may be guaranteed to receive information about all such container entities and processes regardless of how briefly they may execute. Along these lines, as already mentioned, an agent performing this type of kernel-based monitoring may be apprised of new launch events immediately as they occur rather than needing to wait until the next periodic check-in with the container runtime to learn of a given launch event.

As also mentioned briefly above, kernel-based monitoring of container and process launch activity may also be advantageous over monitoring relying solely on information provided by container runtimes due to the reduced complexity associated with the kernel-based monitoring. For example, as mentioned, even if an agent subscribes to receive a notification from the container runtime any time a launch event occurs, there may still be a certain amount of complexity and communicative back-and-forth that is required for the agent to fully investigate the nature of the new launch event Different container runtimes such as Docker® and Containerd® may employ different APIs and he associated with different querying procedures for the agent, after having received a notification that a launch event has occurred, to determine the desired details about the launch event. In contrast, as will be described below, kernel data provided by the kernel of certain operating systems (e.g., a Windows® kernel configured to provide creation callbacks, etc.) may indicate this desired information without a need for the agent to engage in any additional querying or communication with the container runtime or any other entity (as will be described, such querying and communication may optionally still be done in certain implementations or under certain circumstances). In this way, kernel-based monitoring may alleviate the different API calls, procedural complexities, and so forth, that may be associated with investigating a launch event by way of a container runtime alone (i.e., without access to such kernel data).

Figure 13A:
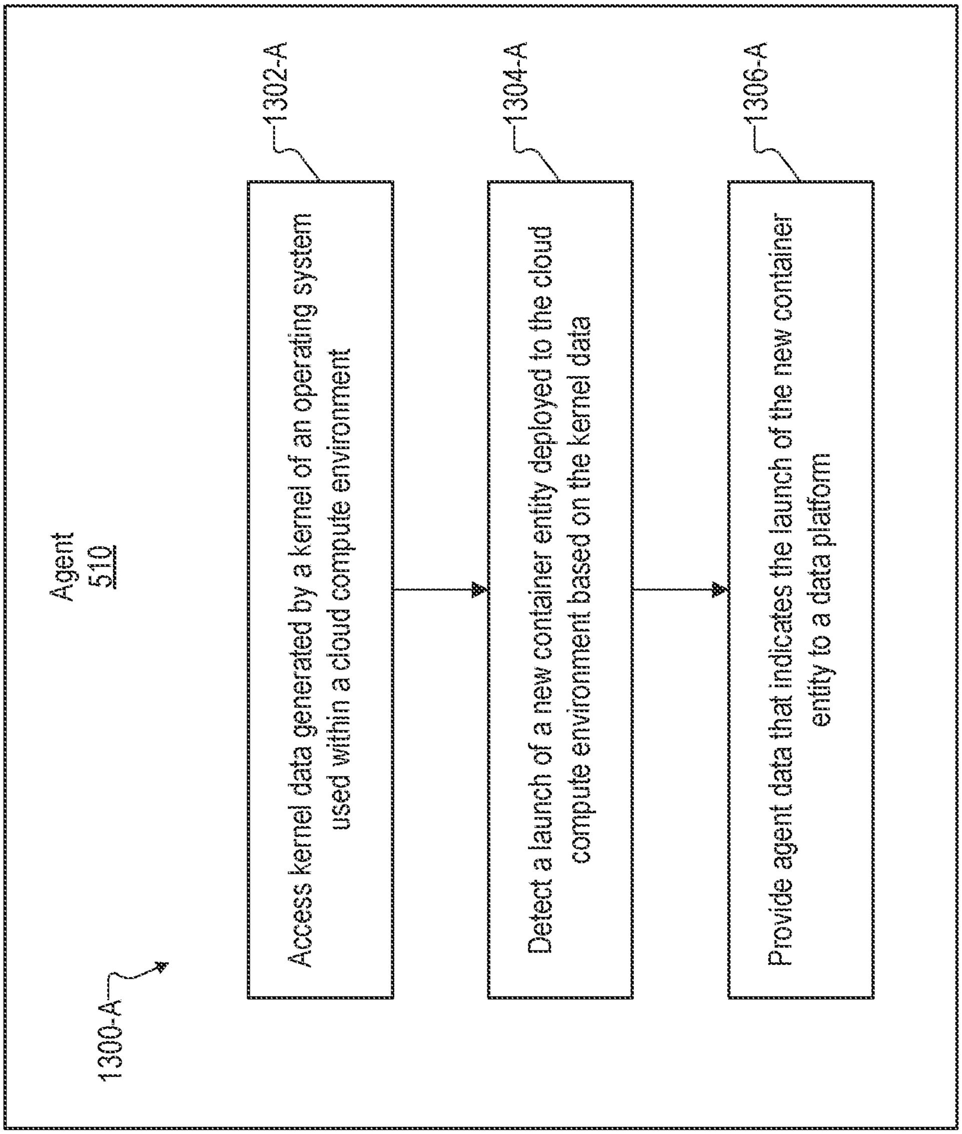
FIG. 13A illustrates an example agent and an illustrative process that the agent may perform to facilitate kernel-based monitoring of container activity in a compute environment.

FIG. 13A illustrates an example agent 510 (e.g., another example implementation of the agents 510 that have been described) and an illustrative process 1300-A that this agent 510 may perform to facilitate kernel-based monitoring of container activity in a compute environment (e.g., a cloud compute environment or the like). This implementation of agent 510 will be understood to implement any of agents 38 (FIG. 1B) or agents 112 (FIG. 1D) illustrated and described above, or any other agent described herein or as may serve a particular implementation. As such, this example agent 510 shown in FIG. 13A may be configured, as with other implementations of agent 510 that have been described, to collect data from a compute environment monitored by a data platform (e.g., an implementation of data platform 500) and to provide this collected data (also referred to as agent data) to the data platform so that the data platform may use the collected data in any of the ways that have been described. As shown, process 1300-A may include a plurality of operations 1302-A, 1304-A, and 1306-A, each of which may be performed, in full or in part, by this implementation of agent 510. As will be described in more detail below, process 1300-A and the operations included therein may represent a relatively generalized implementation of a kernel-based monitoring process, while a more specific implementation of the process (process 1300-B) will be described below with respect to FIG. 13B.

While process 1300-A shows illustrative operations according to one implementation, other implementations may omit, add to, reorder, and/or modify any of the operations shown in process 1300-A. In some examples, multiple operations shown in process 1300-A may be performed concurrently (e.g., in parallel) with one another, rather than being performed sequentially as illustrated and/or described. One or more of the operations shown in FIG. 13A may be performed by suitable computing resources (e.g., resources of compute assets 16 within cloud environment 14) that host the agent 510 within a compute environment monitored by a data platform (e.g., data platform 500). While the implementation of agent 510 shown in FIG. 13A is described as being deployed in a cloud compute environment monitored by a data platform (e.g., similar to other cloud environments described above such as cloud environment 14, etc.), it will be understood that process 1300-A may also be performed by an implementation of agent 510 deployed to other (non-cloud) types of compute environments. For example, rather than a cloud compute environment operated and controlled by a cloud provider entity (e.g., an AWS environment, a GCP environment, etc.), an implementation of agent 510 may be deployed to an on-premise compute environment (operated and controlled by an entity other than a cloud provider entity) and may perform process 1300-A within that compute environment in the same ways described herein. Each of operations 1302-A through 1306-A of process 1300-A will now be described in more detail as the operations may be performed by computing resources associated with agent 510.

At operation 1302-A, agent 510 (e.g., a compute asset hosting agent 510 in a cloud compute environment monitored by a data platform) may access kernel data generated by a kernel of an operating system used within the cloud compute environment. The kernel of the operating system may include various low-level software processes that directly interface with hardware components of the compute assets that are restricted from being directly accessed by most software running on the system (e.g., software running in user space). As such, kernel data generated by this kernel will be understood to be produced and provided independently from any container runtime or other such management tool that operates in user space of the operating system to manage container entities deployed to the system. The kernel data may be accessed by agent 510 at operation 1302-A in any suitable way. For example, the kernel data may be automatically received by agent 510 if the agent has subscribed to or is monitoring for this type of kernel data. Specific examples of kernel data that can be accessed at operation 1302-A will be described below.

At operation 1304-A, agent 510 may detect a launch of a new container entity based on the kernel data accessed at operation 1302-A. For example, as will be described in more detail below, the kernel data may indicate when a new job associated with the new container entity has been initiated in the operating system, such that an analysis of the kernel data may reveal that the new container entity has been launched and is now executing in the cloud compute environment. The new container entity detected at operation 1304-A may represent one container entity of a set of container entities deployed to the cloud compute environment and managed by a container runtime executing on the operating system. As such, it will be understood that the container runtime may also be configured to provide information about the launch of the new container entity when queried or by way of notifications such as described above. However, at least for the reasons described above, it will be understood that in this example, the detection of the launch event at operation 1304-A may be based exclusively on the kernel data and not on any data generated or provided by the container runtime. As will be described in more detail below, agent 510 may be configured in certain examples to query the container runtime for additional information about the new container entity in response to detecting the launch of the new container entity based on the kernel data. In such cases, agent 510 may report data back to the data platform that is derived both from the kernel data accessed at operation 1302-A and from data received from the container runtime.

At operation 1306-A, agent 510 may provide agent data to the data platform monitoring the cloud compute environment. For example, the providing of the agent data may be based on the detecting of the launch of the new container entity at operation 1304-A and the agent data may be configured to indicate the launch of the new container entity to the data platform in a manner that allows the data platform to incorporate or otherwise account for the launch event in its monitoring of the cloud compute environment. Examples of how the data platform may account for new container launch events and other similar occurrences represented by agent data provided by agent 510 have been described above and will be described with more particularity below.

Figure 13B:
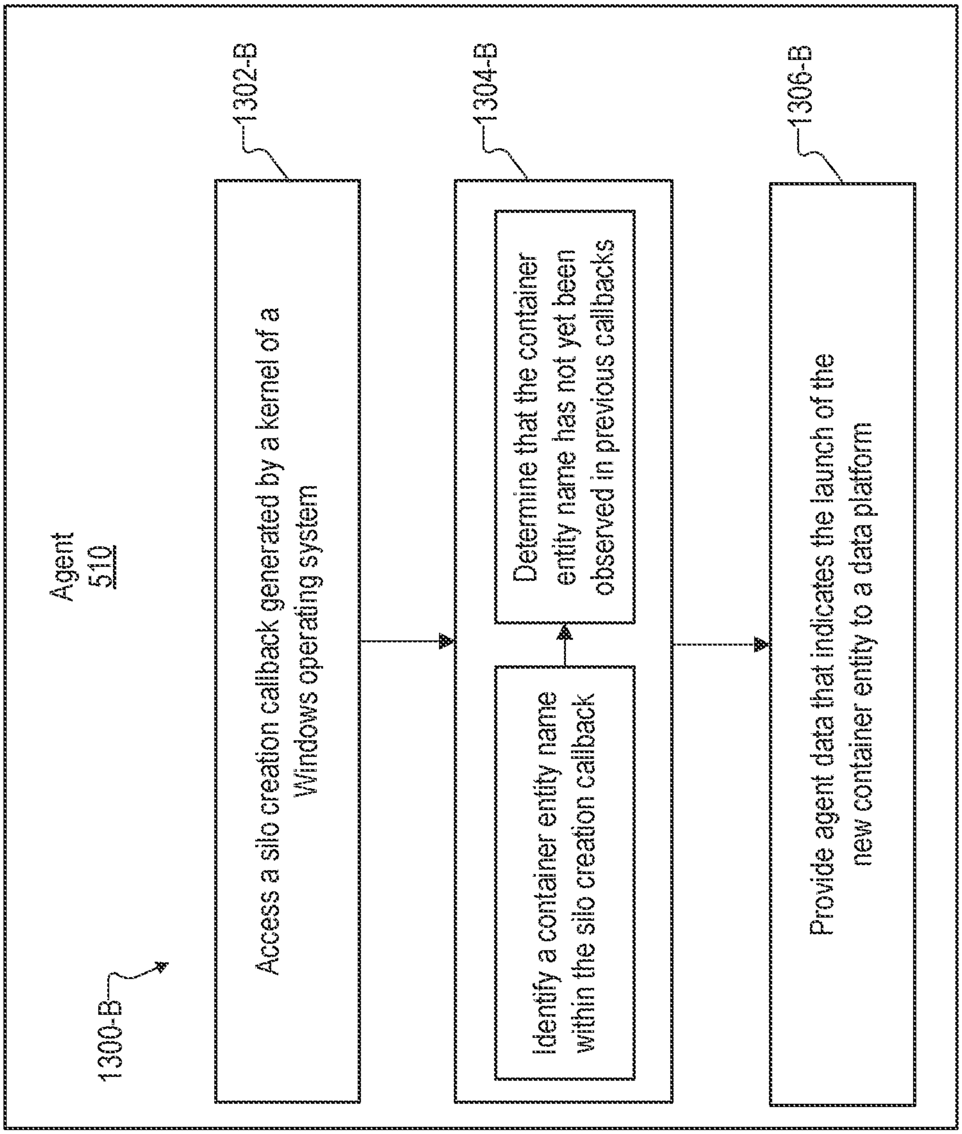
FIG. 13B illustrates a particular implementation of the agent of FIG. 13A and the illustrative process that the agent may perform to facilitate the kernel-based monitoring of the container activity in the compute environment.

FIG. 13B illustrates a particular implementation of the example agent 510 of FIG. 13A together with a particular implementation of process 1300-A that is labeled as process 1300-B. As with process 1300-A, the illustrated implementation of agent 510 may be configured to perform process 1300-B to facilitate the kernel-based monitoring of the container activity in the compute environment. Like process 1300-B itself, operations of process 1300-B are labeled with corresponding numbers to those used for the operations of process 1300-A to indicate that these are more specific (less generalized) examples of the same operations that have been described. For example, an operation 1302-B illustrated in FIG. 13B will be understood to relate to a specific way in which the example operation 1302-A may be performed, an operation 1304-B will be understood to relate to a specific way in which operation 1304-A may be performed, and an operation 1306-B will be understood to relate to a specific way in which the example operation 1306-A may be performed.

At operation 1302-B, the accessing of the kernel data described above in relation to operation 1302-A is shown to be performed by accessing a silo creation callback generated by a kernel of a Windows®-based operating system. In this example, the operating system is a Windows® operating system such as any of the Windows® operating systems described above and the kernel data described in relation to operation 1302-A includes a silo creation callback generated by the kernel of this Windows® operating system. It will be understood that silo creation callbacks may be automatically generated by Windows® kernels when new jobs are initiated, including when new container entities are deployed and launched to be executed on the Windows® operating system. Accordingly, silo creation callbacks may include information of interest to agent 510 such as a container entity name and/or other information about the newly launched container entity.

At operation 1304-B, the detecting of the launch of the new container entity described above in relation to operation 1304-A is thus shown to include two suboperations in which, first, agent 510 identifies a container entity name within the silo creation callback, and, second, agent 510 determines that the container entity name has not yet been observed in previous callbacks produced by the kernel of the Windows operating system. By identifying the container entity name and determining that it has not yet been observed, agent 510 may deduce that this container entity name belongs to a newly-launched container entity. Based on this deduction, agent 510 may detect the launch of the new container entity as described above in operation 1304-A.

At operation 1306-B, the providing of the agent data that indicates the launch of the new container entity to the data platform may be based on the performance of operations 1302-B and 1304-B and may be performed in the same manner as described above in relation to operation 1306-A.

Agent 510 may be implemented in any suitable way as it performs processes 1300-A and 1300-B. For example, certain implementations of agent 510 may be configured as software applications that execute in user space alongside container runtimes and/or other software applications that may be executing on given compute assets (e.g., servers or other computing devices within a compute environment). In other examples, it may be desirable for implementations of agent 510 to be implemented as containerized applications that are managed by container runtimes and run alongside the container entities that the agent is configured to monitor. For example, containerized agents implemented in this way could enjoy all the advantages associated with containerized applications including ease and convenience of deployment (using well-established container orchestration tools such as Kubernetes®), scalability, portability (e.g., replication to various compute resources and/or compute environments, etc.), and so forth.

Unfortunately, the abstraction that leads to many of the advantages associated with containerized applications also comes at a cost that complicates the prospect of a containerized agent. Specifically, one factor leading to the great portability and scalability, etc., of containerized applications is the isolation that containerized applications have from one another. Containerized applications generally operate in a virtualized user space provided by the container entity in which the application is deployed. This virtualized user space is purposely isolated from the virtualized user spaces of other container entities deployed to the same compute resource and/or running on the same instance of the operating system so that each containerized application may be developed and configured as if it is to execute on its own device with the operating system and hardware resources all to itself. Other applications actually sharing operating system and hardware resources are therefore abstracted away or hidden from the containerized application by way of this isolation, therefore making it easy to scale up, replicate, move, and/or otherwise conveniently orchestrate the execution of the containerized applications in various ways. The challenge, therefore, for a containerized agent is that a primary objective of the agent may be to monitor other containerized applications running alongside itself—that is, to monitor the very applications and events that a typical container entity would be configured to isolate the containerized agent from.

Figure 14A:
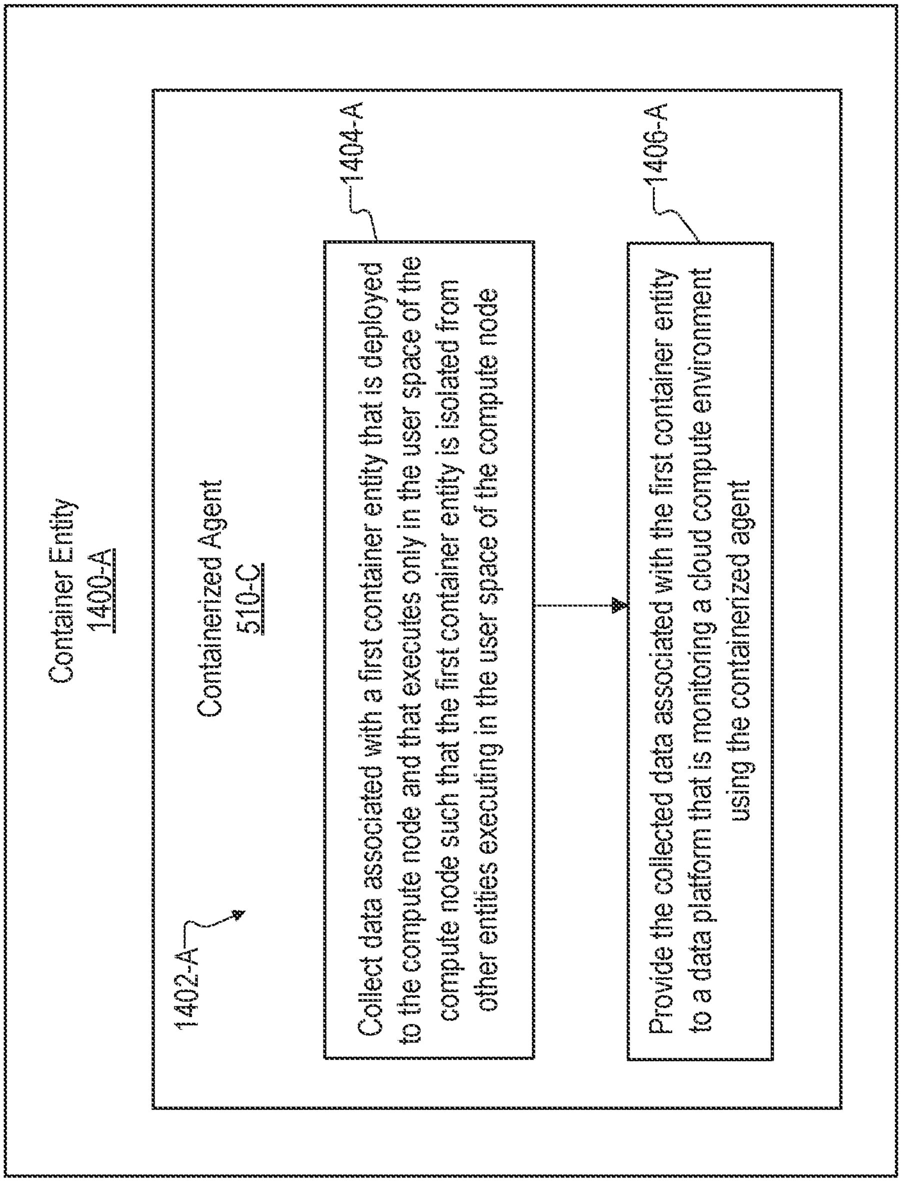
FIG. 14A illustrates an example containerized agent and an illustrative process that the containerized agent may perform to facilitate monitoring container activity in a compute environment.

To achieve the benefits of containerization while still fulfilling the typical objectives that an agent may be tasked with, a containerized agent for monitoring container activity in a compute environment may be implemented using a special type of container entity such as, for example, a Host Process container or other privileged container. As will be described in more detail below, a Host Process container is a type of container that is supported by certain container orchestration tools (e.g., newer versions of Kubernetes configured for orchestration of Windows container entities) and that includes not only a user-space module but also a kernel-space module (e.g., a Windows driver) that allows the container to overcome some of the isolation issues described above and to monitor other containers (e.g., standard user-space-only containers) that may be executing in the compute environment. A containerized agent orchestrated to run as a Host Process container on a particular compute node may therefore have visibility into other containers running on the compute node and may include both a service component (executing in user space) and a kernel driver (executing in kernel space). As will be described and illustrated below, the kernel driver may obtain information about container activity from the kernel of the compute node (e.g., a Windows kernel in certain examples) to thereby achieve the visibility of other containers on the compute node that is needed for the monitoring functions described herein to be performed by the agent FIG. 14A illustrates an example containerized agent 510-C(e.g., another example implementation of the agents 510 that have been described, this particular one implemented as a containerized application as indicated by the '-C' in the reference number) deployed within a container entity 1400-A (e.g., a container, a pod, or a combination of the two that is configured to host the containerized agent in any suitable way) that will be understood to execute both within user space and within kernel space of an operating system. FIG. 14A further shows an illustrative process 1402-A that containerized agent 510-C may perform to facilitate monitoring container activity in a compute environment (e.g., a cloud compute environment, etc.) in accordance with principles described herein.

This containerized implementation of agent 510 (i.e., agent 510-C) will be understood to represent a containerized implementation of any of agents 38 (FIG. 1B), agents 112 (FIG. 1D), or other agents described herein. As such, containerized agent 510-C may be configured, similar to these other implementations of agent 510 that have been described, to collect data from a compute environment monitored by a data platform (e.g., an implementation of data platform 500) and to provide this collected data (also referred to as agent data) to the data platform so that the data platform may use the collected data in any of the ways described herein. As shown, process 1402-A may include a plurality of operations 1404-A and 1406-A, each of which may be performed, in full or in part, by this implementation of containerized agent 510-C. Similar to process 1300-A described above, process 1402-A and the operations included therein will be understood to represent a relatively generalized implementation of a process for monitoring container activity by way of a containerized agent, while a more specific implementation of the process (process 1402-B) will be described below with respect to FIG. 14B.

While process 1402-A shows illustrative operations according to one implementation, other implementations may omit, add to, reorder, and/or modify any of the operations shown in process 1402-A. In some examples, multiple operations shown in process 1402-A may be performed concurrently (e.g., in parallel) with one another, rather than being performed sequentially as illustrated and/or described. One or more of the operations shown in FIG. 14A may be performed by suitable computing resources (e.g., resources of compute assets 16 within cloud environment 14) that host the containerized agent 510-C within a compute environment monitored by a data platform (e.g., data platform 500). While the implementation of containerized agent 510-C shown in FIG. 14A is understood to be deployed to a compute node of a cloud compute environment monitored by a data platform (e.g., similar to other cloud environments described above such as cloud environment 14, etc.) and to execute in both user space and kernel space of that compute node, it will be understood that process 1402-A may also be performed by an implementation of containerized agent 510-C deployed to other (non-cloud) types of compute environments. For example, rather than a cloud compute environment operated and controlled by a cloud provider entity (e.g., an AWS environment, a GCP environment, etc.), an implementation of containerized agent 510-C may be deployed to an on-premise compute environment (operated and controlled by an entity other than a cloud provider entity) and may perform process 1402-A within that compute environment in the same ways described herein. Each of operations 1404-A and 1406-A of process 1402-A will now be described in more detail as the operations may be performed by computing resources associated with containerized agent 510-C.

At operation 1404-A, containerized agent 510-C may collect data associated with a first container entity that is deployed to the same compute node as containerized agent 510-C. For example, the collected data associated with the first container entity may be generated and used internally by the first container entity (e.g., a call to a resource/process of the first container entity or response from the resource/process of the first container entity, etc.), generated by the first container entity for network transmission to another entity (e.g., including data for establishing a connection to another entity, etc.), generated by a different entity and transmitted to the first container entity, or otherwise associated with the first container entity in any suitable way. Whereas containerized agent 510-C executes in both user space and kernel space of the compute node (e.g., using a Host Process container in examples in which the cloud compute environment operates using a Windows operating system, using another type of privileged container in examples in which the cloud compute environment operates using other types of operating systems, etc.), the first container entity may execute only in the user space of the compute node. Accordingly, unlike containerized agent 510-C, the first container entity may be isolated from other entities executing in the user space of the compute node (e.g., a second container entity operating only in the user space, a third container entity operating only in the user space, etc.) while being subject to monitoring by (and not being isolated from) privileged container entities executing in both the user space and the kernel space of the compute node (such as a Host Process container used by containerized agent 510-C).

At operation 1406-A, containerized agent 510-C may provide the collected data associated with the first container entity (i.e., the data collected at operation 1404-A) to a data platform that is monitoring the cloud compute environment using containerized agent 510-C. For example, the containerized agent 510-C may transmit the collected data over a network to the data platform in any of the ways described herein and to facilitate any of the monitoring objectives that have been described herein for the data platform. For example, containerized agent 510-C may provide the collected data to the data platform for use in identifying security issues and/or the security posture of the compute node or the cloud compute environment more generally, such as by modeling the information (e.g., using one or more polygraphs, etc.) and using the modeled information to detect anomalies in container activity.

Figure 14B:
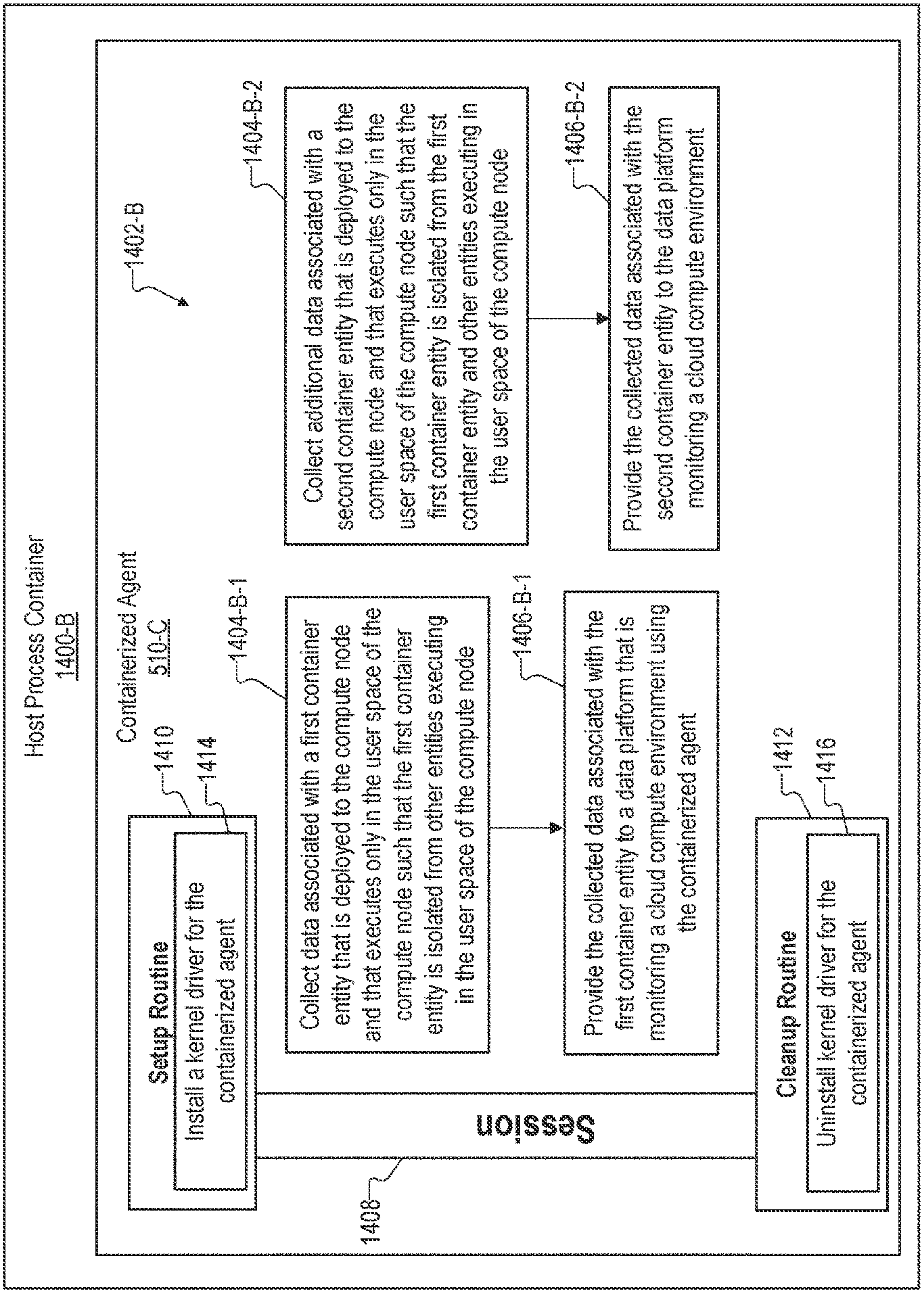
FIG. 14B illustrates a particular implementation of the containerized agent of FIG. 14A and the illustrative process that the containerized agent may perform to facilitate the monitoring of the container activity in the compute environment.

FIG. 14B illustrates a particular implementation of the containerized agent 510-C of FIG. 14A that is implemented using a Host Process container 1400-B (i.e., a particular implementation of container entity 1400-A) that will be understood to execute in both the user space and the kernel space. In FIG. 14B, containerized agent 510-C is shown to perform a particular implementation of process 1402-A that is labeled as process 1402-B. As with process 1402-A, the illustrated implementation of containerized agent 510-C may be configured to perform process 1402-B to facilitate the monitoring of the container activity in the compute environment. As with Host Process container 1400-B and process 1402-B itself, operations of process 1402-B are labeled with corresponding numbers to those used for the operations of process 1300-A to indicate that these are more specific (less generalized) examples of the same operations that have been described. For example, operations 1404-B-1 and 1404-B-2 illustrated in FIG. 14B will be understood to relate to a specific way in which the example operation 1404-A may be performed (but with respect to two different container entities), while operations 1406-B-1 and 1406-B-2 will be understood to relate to a specific way in which operation 1406-A may be performed (for those two different container entities). Additionally, FIG. 14B illustrates that containerized agent 510-C may be deployed to the compute node during (and the collection and data providing operations 1404-B and 1406-B may be performed in connection with) a session 1408 that begins with a setup routine 1410 and ends with a cleanup routine 1412. There are various challenges involved in containerizing an agent such as containerized agent 1510-C. For instance, it is non-trivial to run a Windows kernel driver and service as part of a container and clean it up on container exit. Accordingly, install and cleanup routines in the entry point process of the container may be used. As shown, these routines may involve additional operations that are performed with respect to a kernel driver that is installed and uninstalled for the Host Process container 1400-B to execute in both the user space and the kernel space. It will be understood that these steps may not be required for the other container entities that execute only in the user space.

At operation 1404-B-1, containerized agent 510-C is shown to perform data collection in the same way as described above in relation to operation 1404-A. Specifically, containerized agent 510-C may collect data associated with a first container entity that is deployed to the compute node and that executes only in the user space of the compute node such that the first container entity is isolated from other entities executing in the user space of the compute node. Similarly, at operation 1404-B-2, containerized agent 510-C is shown to collect additional data associated with a second container entity that is deployed to the compute node (e.g., the same compute node to which Host Process container 1400-B and the first container entity are deployed) and that also (like the first container entity) executes only in the user space of the compute node. As shown, the second container entity may be isolated from the first container entity (as well as any other entities executing in the user space of the compute node that are not explicitly shown) by way of namespace isolation, filesystem isolation, registry isolation, and/or other types of isolation.

At operation 1406-B-1, containerized agent 510-C is shown to provide the data collected at operation 1404-B-1 in the same way as described above in relation to operation 1406-A. Specifically, containerized agent 510-C may provide the collected data associated with the first container entity to the data platform that is monitoring a cloud compute environment using containerized agent 510-C. Similarly, at operation 1406-B-2, containerized agent 510-C may provide to the data platform, together with the providing of the collected data associated with the first container entity, the additional data associated with the second container entity (i.e., the additional data collected at operation 1404-B-2).

As mentioned above, FIG. 14B further illustrates that containerized agent 510-C may be deployed to the compute node during a session 1408 that begins with setup routine 1410 and ends with cleanup routine 1412. The additional steps associated with these routines may be required for Host Process container 1400-B to provide not only the user space service (which may need to be registered with the operating system as part of these routines) but also to install driver software to the kernel space and remove that driver software when it is no longer needed.

Accordingly, at operation 1414 (as part of setup routine 1410), process 1402-B shows that containerized agent 510-C may install a kernel driver that executes in the kernel space. This kernel driver is one thing that may set containerized agent 510-C apart from other containerized applications executing using other container entities that execute only in the user space (i.e., containerized applications executing using the first and second container entities), since those containerized applications would not use a kernel driver or otherwise execute in the kernel space.

At operation 1416 (as part of cleanup routine 1412), process 1402-B shows that containerized agent 510-C may uninstall the kernel driver for the containerized agent 510-C. This cleanup may be required by the operating system when the kernel driver is no longer in use after session 1408 is complete and the agent monitoring terminates.

Figure 15:
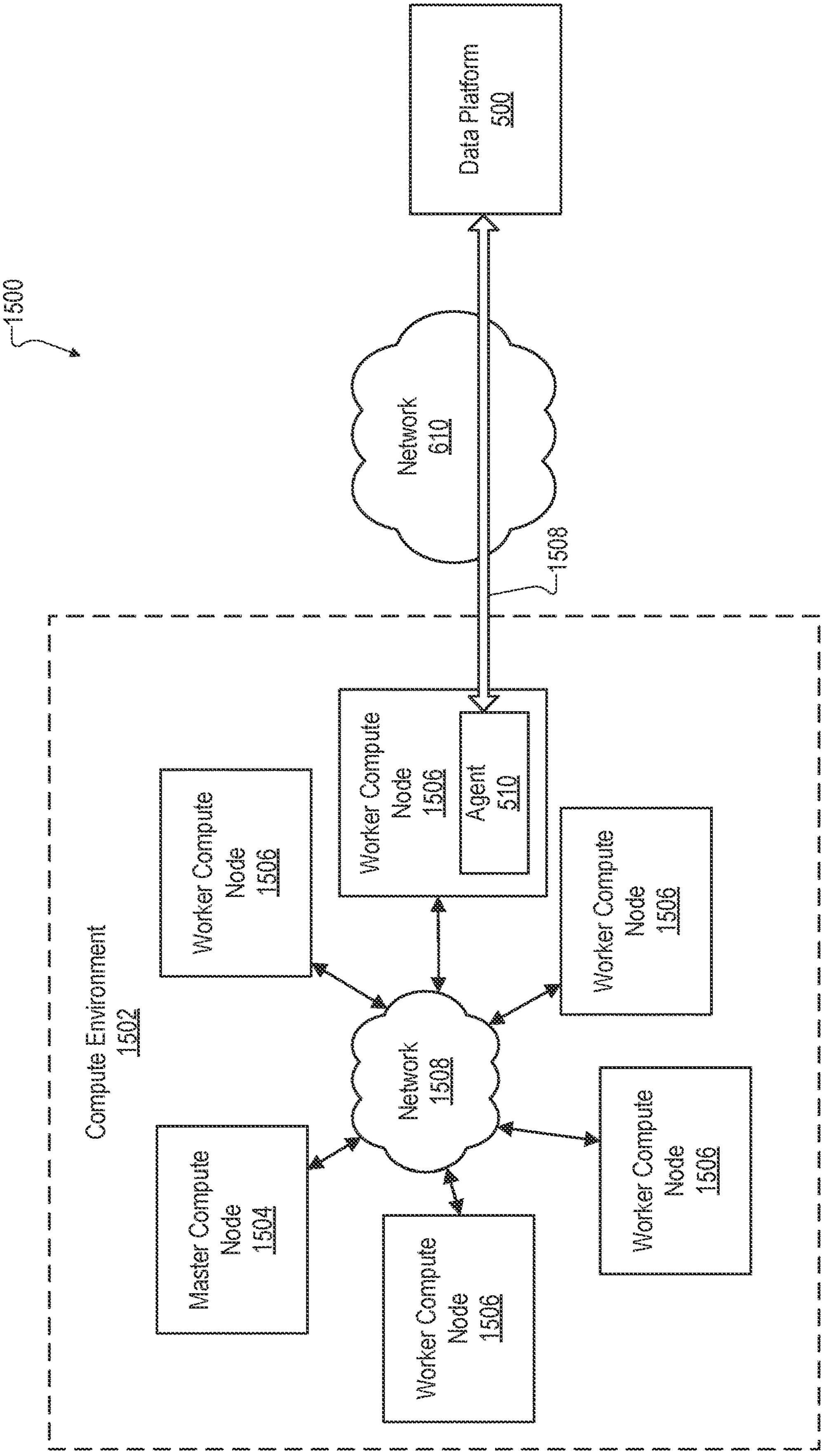
FIG. 15 illustrates an example compute environment within which the agents of FIGS. 13A-14B may operate to assist a data platform in monitoring the compute environment.

FIG. 15 illustrates an example configuration 1500 within which kernel-based monitoring of container activity in a compute environment (e.g., including by containerized agents in certain implementations) may be performed in accordance with principles described herein (including principles described above in relation to FIGS. 13A-14B). More particularly, as shown, configuration 1500 includes an implementation of data platform 500 that communicates with an implementation of agent 510 (e.g., an implementation of agent 510 described above in relation to FIGS. 13A-13B, a containerized implementation such as containerized agent 510-C described above in relation to FIGS. 14A-14B, etc.) that is deployed in a compute environment 1502. Compute environment 1502 is shown to include a master compute node 1504 and a plurality of worker compute nodes 1506, one of which is shown to include the resources to which agent 510 is deployed. The worker compute node 1506 hosting agent $10 is shown to be in communication with the master compute node 1504 and with other worker compute nodes 1506 in compute environment 1502 by way of a network 1508. Compute environment 1502 may represent an implementation of cloud environment 14 of FIGS. 1A-1B (e.g., compute resources provided by a cloud service provider such as AWS, GCP, Azure, etc.), another cloud environment described herein, an on-premise or other compute environment similar to a cloud compute environment, or any other compute environment as may serve a particular implementation.

While the implementation of agent 510 is only shown to be present within one compute node within compute environment 1502 (e.g., a worker compute node 1506 in this example), it will be understood that two or more of the compute nodes 1504 and/or 1506 (up to and including all of the compute nodes) may similarly incorporate or execute their own respective implementations of agent 510 that communicate with one another and/or with data platform 500 in similar ways. While network 1508 is referred to as a network and may be implemented as such (e.g., similar or identical to the network 610 described above that is used to transport communications 1508 between agent 510 and data platform 500), it will be understood that different types of compute node implementations may intercommunicate via a variety of different means and media, some of which may not typically be referred to or thought of networks. In any case, network 1508 will be understood to represent any hardware, software, interfacing, or other aspects of a communicative fabric by way of which various compute nodes 1504 and 1506 within compute environment 1502 communicate with one another.

In some examples, master compute node 1504 may be configured as a Kubernetes® master node and the worker compute node 1506 hosting agent 510 may be a Kubernetes® worker node managed by the Kubernetes® master node. In such examples, as has been described, standard container entities hosted by these Kubernetes® nodes would generally execute exclusively in the user space of the compute nodes such that the container entities would be isolated from each other by means of namespace isolation, filesystem isolation, registry isolation, and so forth. However, as has also been described in relation to FIGS. 14A and 14B, certain versions of Kubernetes® (e.g., where the compute nodes are running Windows® operating systems) may support privileged container entities (e.g., Host Process containers) that allow for agent 510 to be implemented as a containerized agent under certain circumstances.

Figure 16:
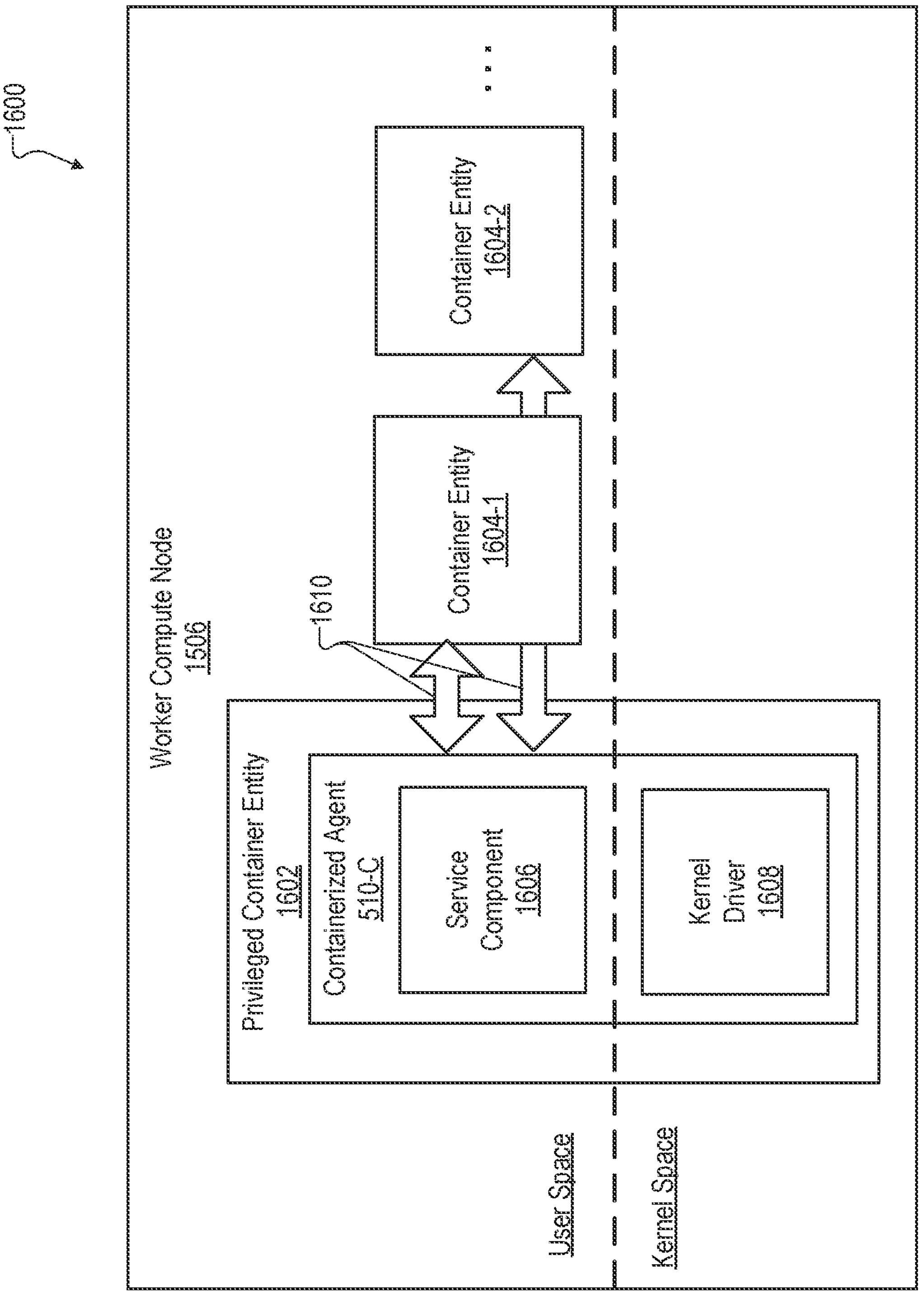
FIG. 16 illustrates an example implementation of a containerized agent deployed to a compute node to which other container entities are also deployed.

To further illustrate this type of containerized embodiment of agent 510, FIG. 16 shows an example implementation of containerized agent 510-C deployed to a particular worker compute node 1506 to which other container entities are also deployed. Specifically, a privileged container entity 1602 (e.g., a Host Process container or the like) is shown to be associated with an implementation of containerized agent 510-C, while two other example container entities 1604 (i.e., a container entity 1604-1 and a container entity 1604-2) are shown to be hosted by the same worker compute node 1506 (an ellipsis illustrates that additional container entities 1604 could also be included in certain implementations).

It will be understood that, for this example, worker compute node 1506 may operate using a Windows operating system and, as shown, the containerized agent 510-C includes a containerized service component 1606 executing in the user space of worker compute node 1506 and a Windows kernel driver 1608 executing in the kernel space of the worker compute node 1506. It will be understood that similar components applicable to other operating systems may be employed in other examples in which the worker compute node operates using an operating system other than Windows. When a Kubernetes master compute node (e.g., master compute node 1504) launches an agent container such as the privileged container entity 1602 used by the illustrated containerized agent 510-C, the master compute node may launch a process that will not only use the service component 1606 (an agent service in the user space) but will also install the kernel driver 1608 (in the kernel space) before beginning to monitor (as indicated by arrows indicating monitoring 1610) other container entities 1604 executing in the user space. As described above, privileged container entity 1602 may be implemented as a Host Process container, as a pod that contains one or more Host Process containers, or as another suitable privileged container entity that executes with components in both the user space and the kernel space of the compute node, as shown.

Privileged containers such as Host Process containers may extend the Windows® container model to enable a wider range of Kubernetes® cluster management scenarios. For example, Host Process containers may run directly on the host and maintain behavior and access similar to that of a regular process. Host Process containers may allow users to package and distribute management operations and functionalities that require host access while retaining versioning and deployment methods provided by containers. Windows® Host Process containers may enable containerized workloads to be executed on a Windows® host. These containers operate as normal processes but have access to the host network namespace, storage, and devices when given the appropriate user privileges. Host Process containers can be used to deploy network plugins, storage configurations, device plugins, kube-proxy, and other components to Windows® nodes without the need for dedicated proxies or the direct installation of host services.

Accordingly, by utilizing a privileged container entity (e.g., a Host Process container) such as privileged container entity 1602, FIG. 16 shows that containerized agent 510-C is shown to execute both in the user space (service component 1606) and in the kernel space (kernel driver 1608) so as to be able to monitor various data that would be isolated from a containerized agent implemented in a standard container entity such as container entities 1604. For example, due to constraints of namespace isolation and other forms of isolation that apply to standard container entities, these container entities (and software applications implemented therein) are not able to observe or monitor one another. In contrast, using the kernel driver 1608 made possible by the use of privileged container entity 1602, containerized agent 510-C may have full visibility regarding data associated with other standard container entities such as container entities 1604. Accordingly, as shown, containerized agent 510-C may engage in monitoring 1610 of any or all of the data associated with container entities 1604.

As currently supported by Kubernetes®, Host Process pods may be limited to only contain Host Process containers (and not a combination of standard and privileged containers). Accordingly, in certain implementations, the first and second container entities 1604-1 and 1604-2 may be implemented as containerized applications deployed to respective first and second dedicated pods not shared by other containerized applications, while a Host Process container implementing containerized agent 510-C may be deployed to a different dedicated pod not shared by other containerized applications. Privileged container entity 1602 will he understood to represent either or both of the Host Process container to which containerized agent 510-C is deployed and the dedicated pod containing that Host Process container. While not explicitly shown in FIG. 16, it will be understood that containerized agent 510 and each of the container entities 1604 (i.e., first container entity 1604-1, second container entity 1604-2, etc.) may be managed by a container runtime (e.g., Docker®, Containerd®, etc.) executing on worker compute node 1506.

Figure 17:
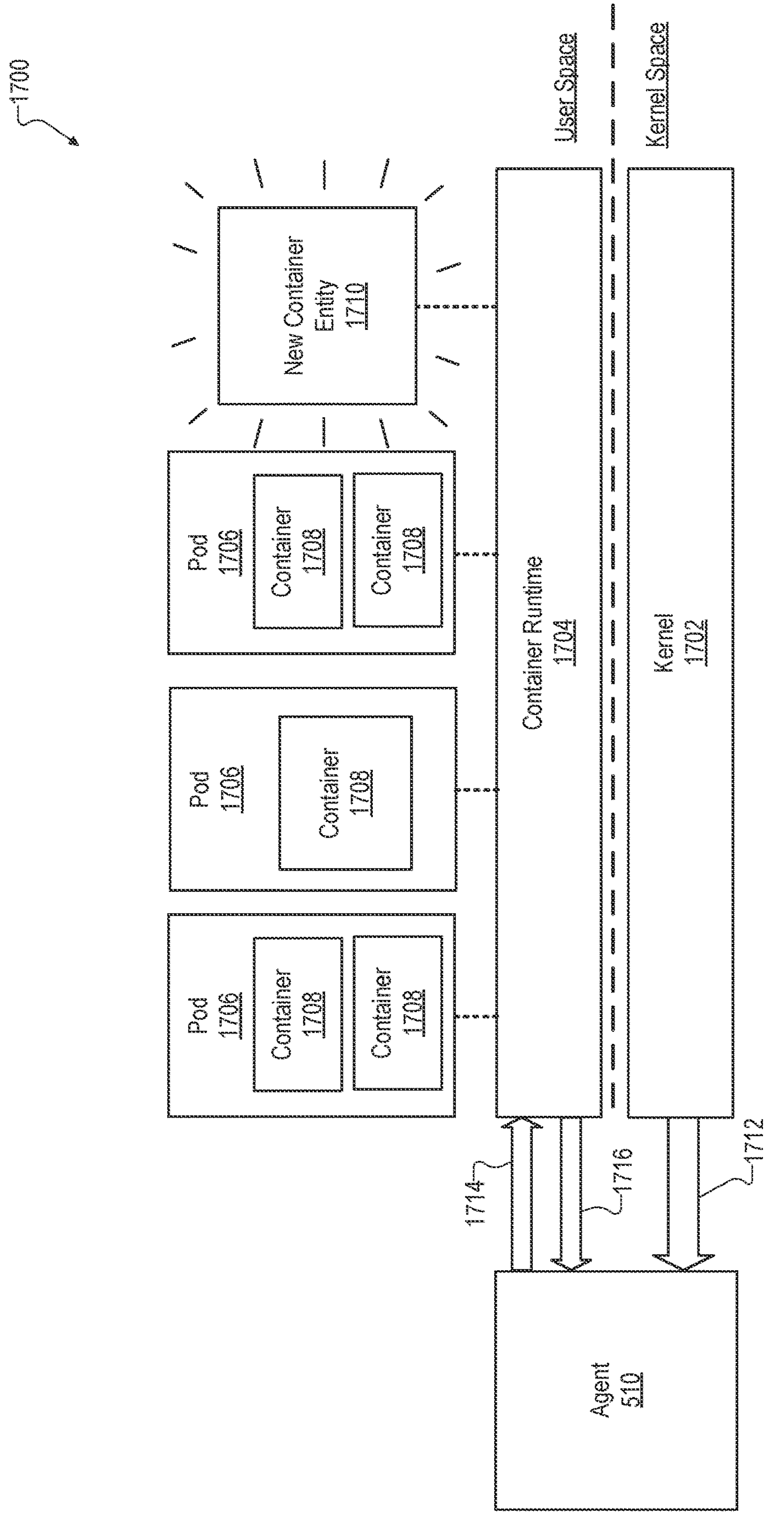
FIG. 17 illustrates illustrative aspects of how an agent may monitor container entities within a compute environment based on kernel data and/or additional data generated by a container runtime managing the container entities.

FIG. 17 illustrates certain aspects of how an agent 510 may monitor container entities within a compute environment based on kernel data and/or additional data generated by a container runtime managing the container entities. The agent 510 shown in FIG. 17 will be understood to be implemented by any of the agents 510 described herein, including containerized agents (e.g., implementations of containerized agent 510-C described above) and non-containerized agents that operate as standard software applications deployed to a compute node. In particular, a configuration 1700 illustrated in FIG. 17 shows aspects of how agent 510 may perform kernel-based monitoring of container activity in a compute environment in accordance with principles described above in relation to FIGS. 13A-13B.

As shown, configuration 1700 includes a software stack that will be understood to be executing on hardware resources of a compute node such as one of worker compute nodes 1506 described above. At the bottom of the software stack, a kernel 1702 is shown to be operating in the kernel space of the compute node. For example, if the compute node is running a Windows® operating system, kernel 1702 may be a Windows® kernel In the user space of the compute node, a container runtime 1704 is shown to run on kernel 1702. Container runtime 1704 may be implemented as a Docker® runtime, a Containerd® runtime, or another suitable container runtime or container engine that operates on kernel 1702. As shown, container runtime 1704 may manage a variety of different container entities that are shown above the container runtime. As used herein, a container entity may refer to a containerized application (i.e., a software application implemented within a container) or a pod that holds one or more such containerized applications. As shown, for example, various pods 1706 are shown to hold one or more containerized applications referred to herein (and labeled as) containers 1708. Container entities 1604 or other container entities that have been described (e.g., including implementations of containerized agent 510-C) will be understood to be implemented in this way as any of pods 1706 or containers 1708.

Also shown in configuration 1700 is a new container entity 1710. Like other container entities described above, new container entity 1710 will also be understood to be implemented as a containerized application, as a pod that includes one or more containerized applications, or as a combination of the two (a new pod including a new containerized application). New container entity 1710 will be understood to be "new" in the sense that this container entity may have been recently launched and not necessarily yet observed by or reported to data platform 500 by agent 510. Various communications will now be described to demonstrate how agent 510 may become apprised of the existence of new container entity 1710 and may collect relevant data regarding new container entity 1710 so that agent 510 may provide agent data about the new container entity to data platform 500.

As described above in relation to FIGS. 13A-13B, agent 510 may detect a launch of new container entity 1710 based on kernel data generated by a kernel of an operating system used within the compute environment. This is illustrated in FIG. 17 by kernel data 1712 that is generated by kernel 1702 and accessed by agent 510 in any of the ways described herein. For example, if the operating system is a Windows operating system, kernel data 1712 may include silo and/or process creation callbacks generated by kernel 1702 (e.g., a Windows kernel in this example) such that agent 510 may detect the launch new container entity 1710 based on a particular creation callback (e.g., by identifying a container entity name and determining that the container entity name has not yet been observed in previous callbacks produced by kernel 1702, etc.)

The callback mechanism of a Windows® kernel implementing kernel 1702 win be understood to be a general way for drivers to request and provide notifications when certain conditions are satisfied. For example, one kernel driver can create a callback object and other kernel drivers can request to receive notifications for conditions associated with this driver-defined callback. In addition, the operating system itself may define various callback objects for driver use (e.g., callbacks involving the system time, power state, and so forth). To request a notification from a system-defined callback or a driver-defined callback, a kernel driver opens a callback object and registers a callback routine. Then, when the conditions defined for the callback come to pass, the notification is triggered and received by the registered driver. Accordingly, for the present example, when a container entity is created, agent 510 may be registered to receive job (silo) and/or process creation callbacks from kernel 1702 to indicate that a new job (e.g., a new container entity) or new container process has been created. As will be described and illustrated in more detail below, if container runtime 1704 is a Docker® runtime, a job creation callback in kernel data 1712 may include a container entity name in accordance with a Docker®-based job-naming scheme and the identifying of the container entity name by agent 510 may be performed based on the Docker®-based job-naming scheme. Similarly, if container runtime 1704 is a Containerd® runtime, a job creation callback in kernel data 1712 may include a container entity name in accordance with a Containerd®-based job-naming scheme and the identifying of the container entity name by agent 510 may be performed based on the Containerd®-based job-naming scheme.

While agent 510 may collect sufficient information from kernel data 1712 (e.g., the Windows creation callbacks, etc.) to allow agent 510 to report back to the data platform regarding the launch, container entity name, and certain other details about new container entity 1710 (i.e., and to collect and report this information independent of any involvement from container runtime 1704), it may still be advantageous in some examples and/or under certain circumstances for agent 510 to communicate with and retrieve data from container runtime 1704. As one example, agent 510 may collect, from container runtime 1704, container data indicative of one or more container entities (e.g., pods 1706, containers 1708, etc.) of the set of container entities that are deployed to the compute environment and managed by container runtime 1704 prior to the launch of new container entity 1710. For example, when agent 510 starts up, certain container entities (e.g., certain of pods 1706 and/or containers 1708) may already be executing in the compute environment and agent 510 may be too late to receive kernel data 1712 indicative of these container entities (e.g., because the callbacks were provided prior to deployment of agent 510, etc.). Accordingly, agent 510 may use communications 1714 and 1716 to discover information about previously-launched (and currently-executing) container entities. For instance, container runtime 1704 may query container runtime 1704 by way of a communication 1714 to request information about container entities that are presently executing and being managed by the container runtime, and may receive, by way of a communication 1716 from container runtime 1704, the requested information about these previously-launched container entities. Agent 510 may then provide, as part of the providing of the agent data to the data platform, this container data collected from container runtime 1704.

As another example of where agent 510 may still rely on data from container runtime 1704 to complement kernel data 1712 from kernel 1702, agent 510 may collect, subsequent to the detecting of the launch of new container entity 1710, additional data associated with new container entity 1710. This additional data may be collected from container runtime 1704 based on a container entity name indicated by kernel data 1712. For example, in response to receiving a silo creation callback within kernel data 1712 that apprises agent 510 of the launch of new container entity 1710 and its container entity name (as well as other basic data), agent 510 may query container runtime 1704 by way of communication 1714 to request additional information about the new container entity 1710 based on the container entity name (e.g., additional information not indicated in kernel data 1712). Container runtime 1704 may provide the requested information by way of communication 1716 and agent 510 may provide, as part of the providing of the agent data to the data platform, this additional data collected from container runtime 1704. In this way, container runtime 1704 may serve as an ancillary and optional source of information for agent 510 with regard to the launch of new container entities and/or processes associated therewith. The information about the launch of new container entity 1710, for instance, may be provided by kernel 1702, while additional (e.g., optional) information may also be obtained from the container runtime 1704 (e.g., using the container entity name) and reported together with the launch indication or at a later time. In either case, agent 510 may advantageously avoid unnecessarily querying container runtime 1704 to determine whether a new container entity has been launched since agent 510 instead relies on the kernel data (e.g., the creation callbacks) to detect such launch events.

Along with detecting the launch of new container entities such as pods and containers (i.e., containerized applications), it has also been mentioned that kernel data may be used to detect new processes and to correlate them with their corresponding containers. More particularly, as will now be illustrated, agent 510 may detect, based on additional kernel data generated by kernel 1702 subsequent to the detecting of the launch of new container entity 1710 (e.g., based on a process creation callback included within kernel data 1712), a launch of a new process on the operating system. The agent may then correlate, based on a container entity name indicated by kernel data 1712 (e.g., identified within an earlier silo creation callback) and based on a process name indicated by the additional kernel data (e.g., identified within the process creation callback), the new process to the new container entity. Agent 510 may then provide, as part of the providing of the agent data to the data platform, process data indicating that the new process has launched and is correlated with the new container entity. Thereafter, agent 510 may also be configured to monitor the new processes (and other processes already running within the compute environment) to track network activity, data generated by the processes, data received by the processes, actions performed by the processes, and so forth. More particularly, agent 510 may: 1) identify a set of processes executing on the operating system and associated with the set of container entities (e.g., pods 1706 and/or containers 1708); 2) monitor network activity produced or received by the set of processes that has been identified; and 3) provide, as part of the providing of the agent data to the data platform, process data generated based on the monitoring of the network activity.

To illustrate how new container entities and processes may be detected, monitored, and reported on, FIGS. 18A-18E show how various instances of kernel data provided to an implementation of agent 510 (e.g., any of the implementations described herein, including containerized agent 510-C) by a kernel (e.g., kernel 1702) may be used by the agent 510 to monitor container activity in a compute environment.

As shown on the left side of each of these figures, new container entities and processes associated with the container entities may be launched within a compute environment in a piecemeal manner (i.e., one entity at a time as illustrated by the progression from figure to figure). As the launching of various container entities and processes progresses from FIG. 18A to FIG. 18E, a notation is used in which an emboldened container entity or process represents a newly-launched entity (i.e., the emboldened pod and container in FIG. 18A, the emboldened process in FIG. 18B, etc.). On the right side of these figures, a Windows kernel 1702-W (i.e., a Windows-based implementation of kernel 1702 described above) is shown to provide kernel data 1712 to an implementation of agent 510. More particularly, a set of callbacks 1802 is introduced during the progression from FIG. 18A to FIG. 18E (e.g., callback 1802-1 in FIG. 18A, callback 1802-2 in FIG. 18B, etc.) that each is emboldened for a particular figure to indicate the entity at left to which the callback corresponds.

Figure 18A:
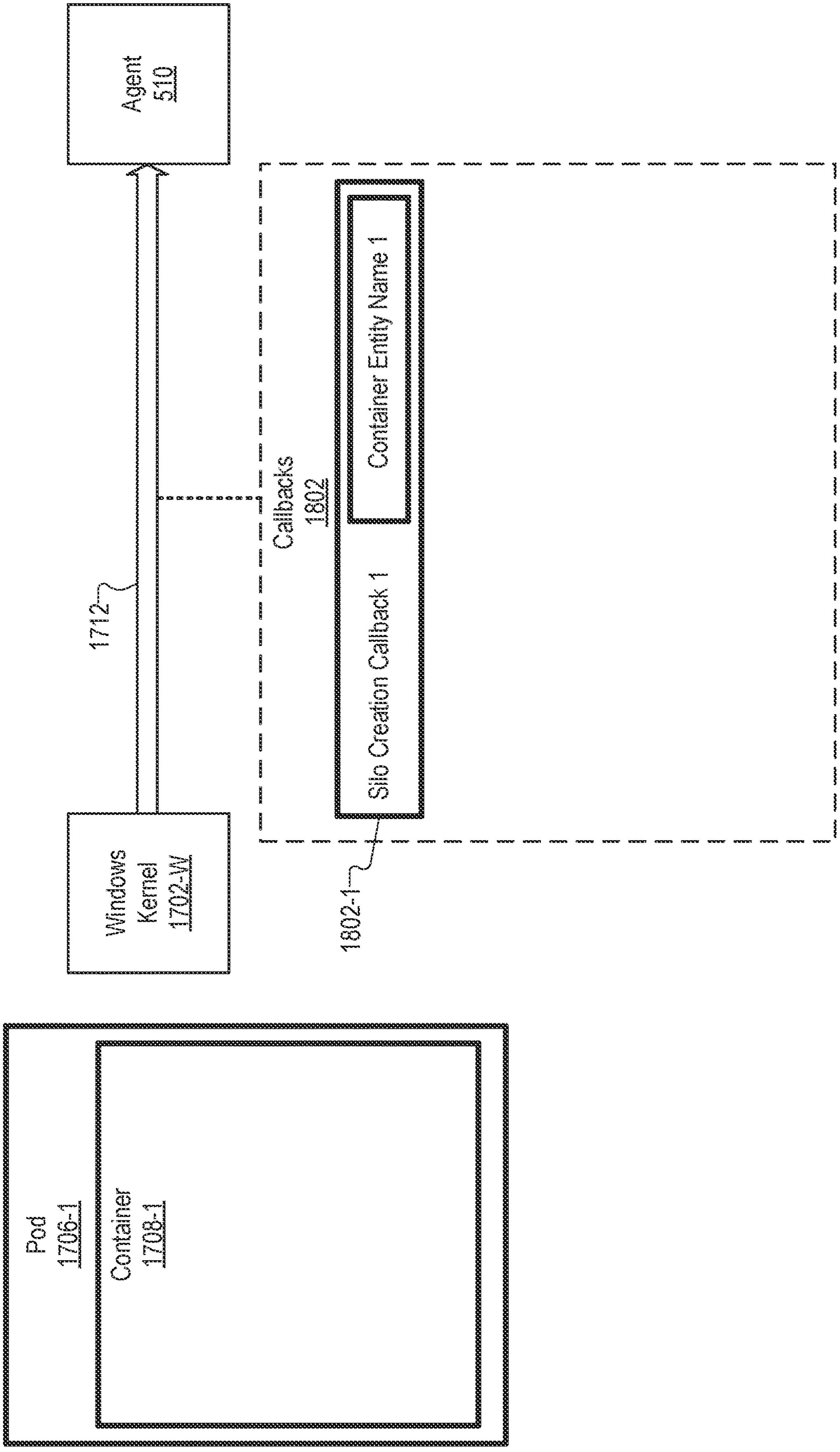
FIGS. 18A, 18B, 18C, 18D, and, 18E illustrate how various instances of kernel data provided to an agent by a kernel may be used by the agent to monitor container activity in a compute environment.

More specifically, as shown in FIG. 18A, callback 1802-1 is shown to be a silo or job creation callback ("Silo Creation Callback 1") that corresponds with the emboldened container entities shown at left, namely, a pod 1706-1 and a container (i.e., containerized application) 1708-1. In some examples, pod 1706-1 and container 1708-1 may be closely related (e.g., in a one-to-one manner) and may come together as a set indicated by a single silo creation callback as shown. In other examples, it will be understood that these container entities may be less closely related (e.g., one pod may host multiple different containers that are created at different times, etc.) such that the silo creation callback 1802-1 would represent one or the other of these container entities at the time of its launch, but not necessarily both.

Within silo creation callback 1802-1, a container entity name is shown ("Container Entity Name 1") to be included. As has been described, upon receiving kernel data 1712, agent 510 ma analyze the callbacks such as callback 1802-1 to identify the container entity names and thereby detect the launch of new container entities (e.g., when a new name is identified that has not yet been observed). The container entity name included in a given callback 1802 may be identified based on what type of container runtime is managing the new container entities, since different container runtimes may have different job-naming schemes. For example, as mentioned above, if the container runtime is a Docker® runtime, the identifying of the container entity mane may be performed based on a Docker®-based job-naming scheme (e.g., a job name having the form: "container [ImageID]", where the ImageID is an identification string such as "cce30d6f8d7e95437d06a622 65875e77bc7509618a4979b8bbfa12"). Similarly, if the container runtime is a Containerd® runtime, the identifying of the container entity name may be performed based on a Containerd®-based job-naming scheme (e.g., a job name having the form: "\BaseNamedObject\JobContainer_[ImageID]", where the ImageID is an identification string such as "0f0bf7dl32b80cc8dc5f17e07c36b856815").

Figure 18B:
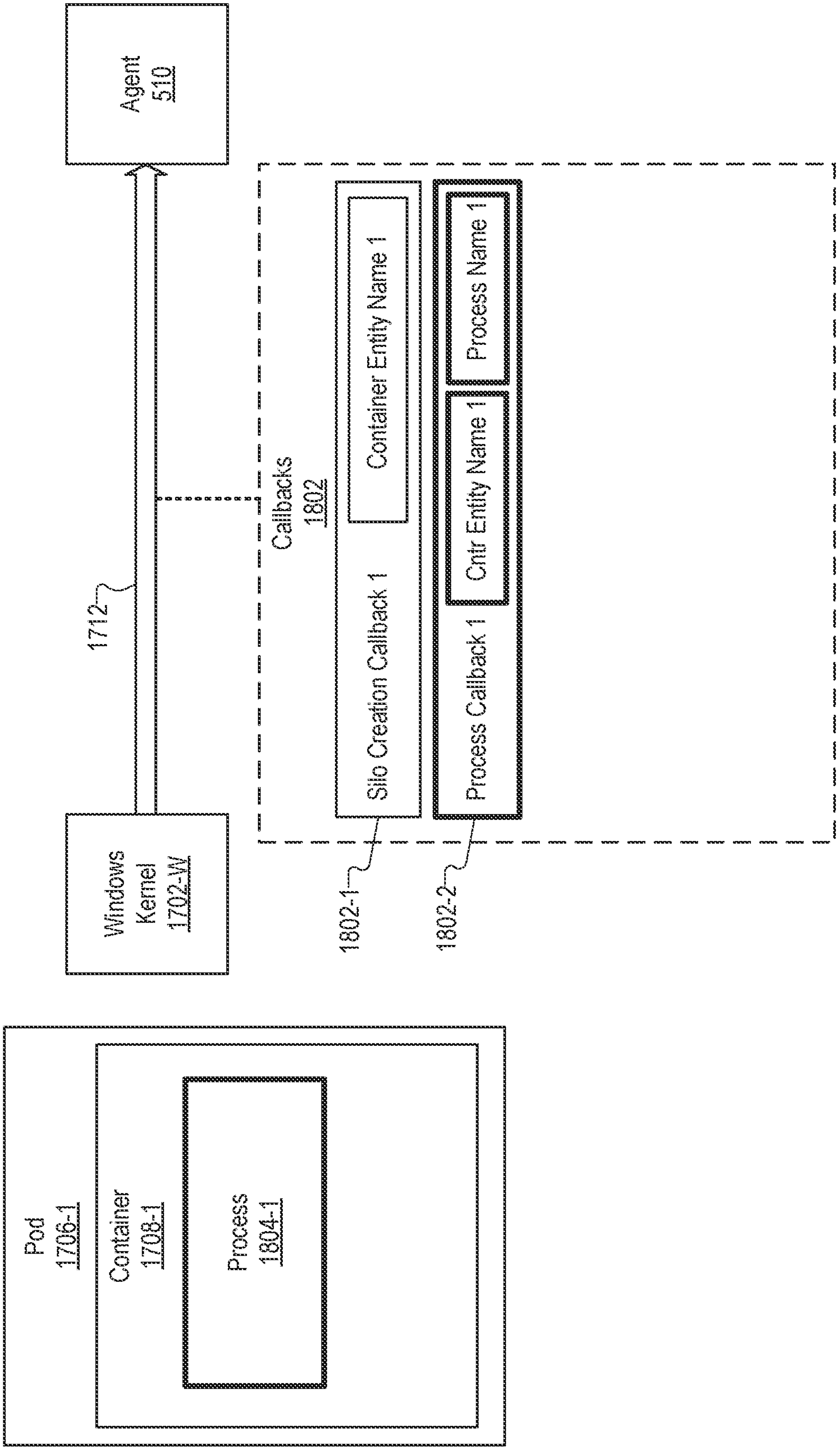

FIG. 18B shows an emboldened new process 1804-1 that is launched in connection with pod 1706-1 and container 1708-1 (also referred to as containerized application 1708-1). The launch of this process is indicated within kernel data, as shown, by an emboldened process callback 1802-2 (also referred to as a process creation callback) that may indicate not only the name of the process ("Process Name 1") but also the name of the container entity ("Cntr Entity Name 1") to which the process corresponds. Accordingly, based on this callback 1802-2, agent 510 may detect the launch of the new process 1804-1 and correlate it to containerized application 1708-1 based all on information found in kernel data 1712 (as opposed to information queried from the container runtime). As will be described in more detail below, process data indicating that new process 1804-1 has launched and is correlated with container 1708-1 may be generated and provided to the data platform by agent 510. With the exception of Host Process containers, all the container processes may also be part of a unique session ID which may also be obtained in process creation callbacks (not explicitly shown in FIGS. 18A-18E). This information may also be collected, recorded, and/or reported on as may serve a particular implementation.

Figure 18C:
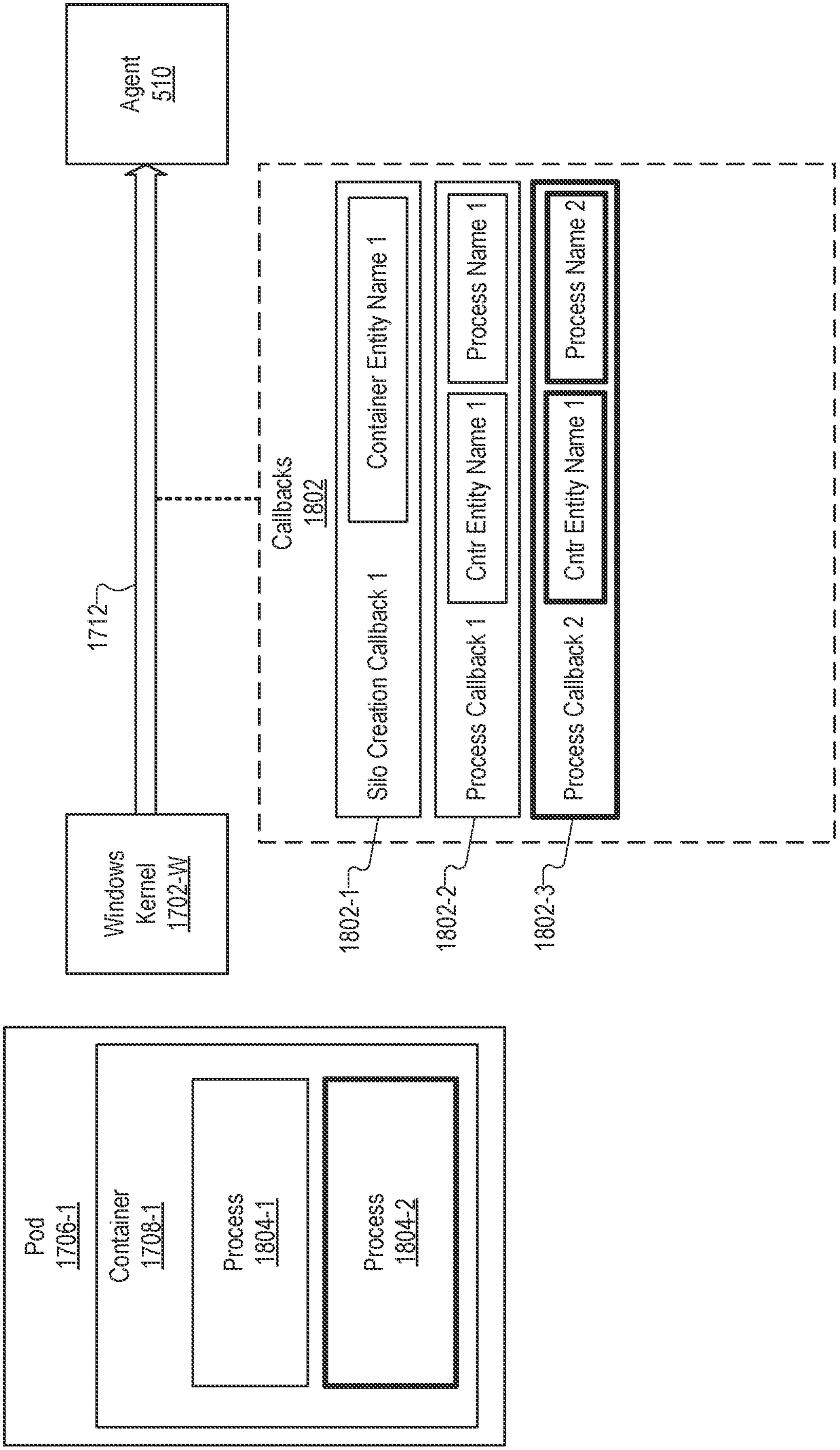
Figure 18D:
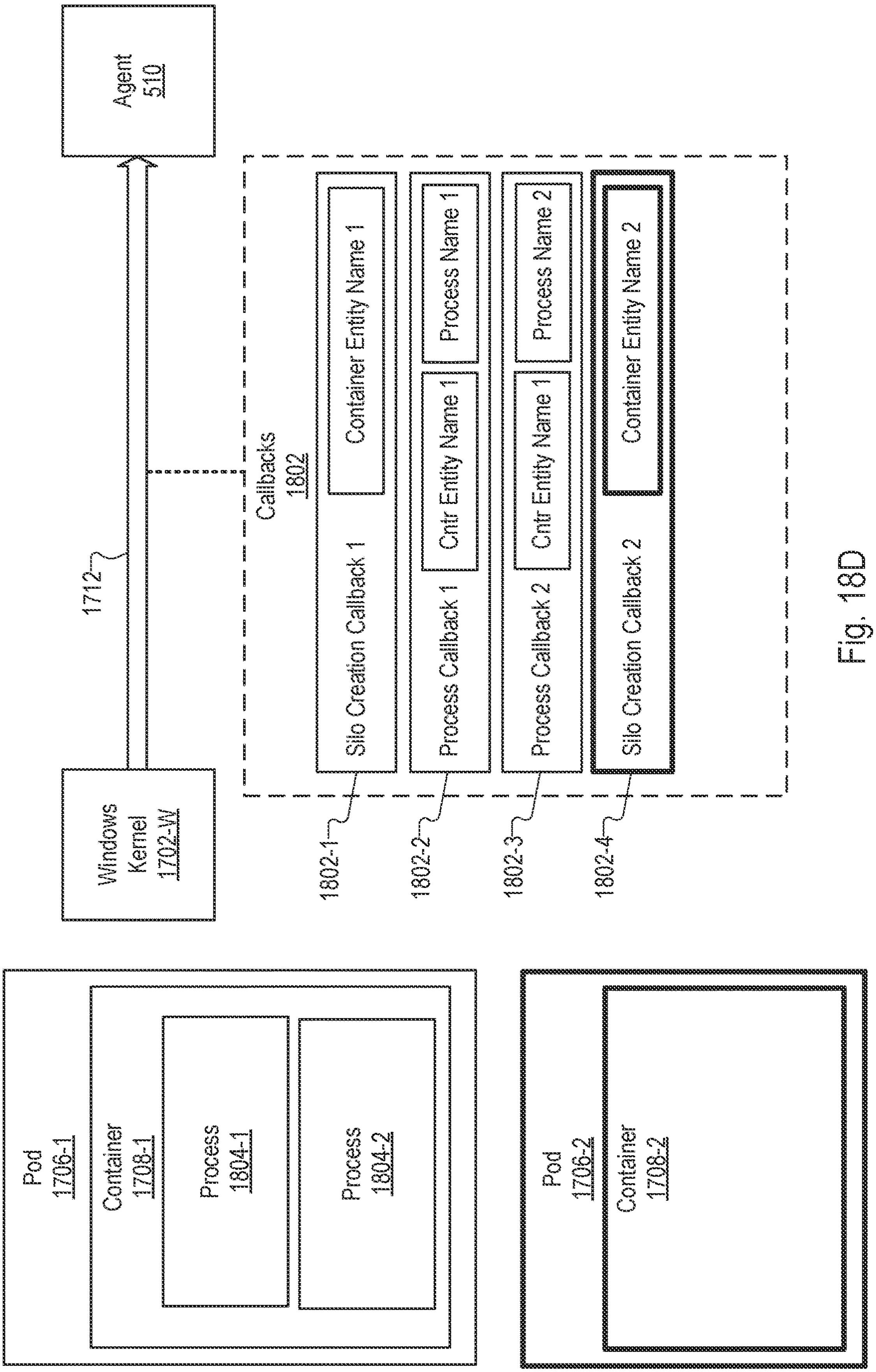
Figure 18E:
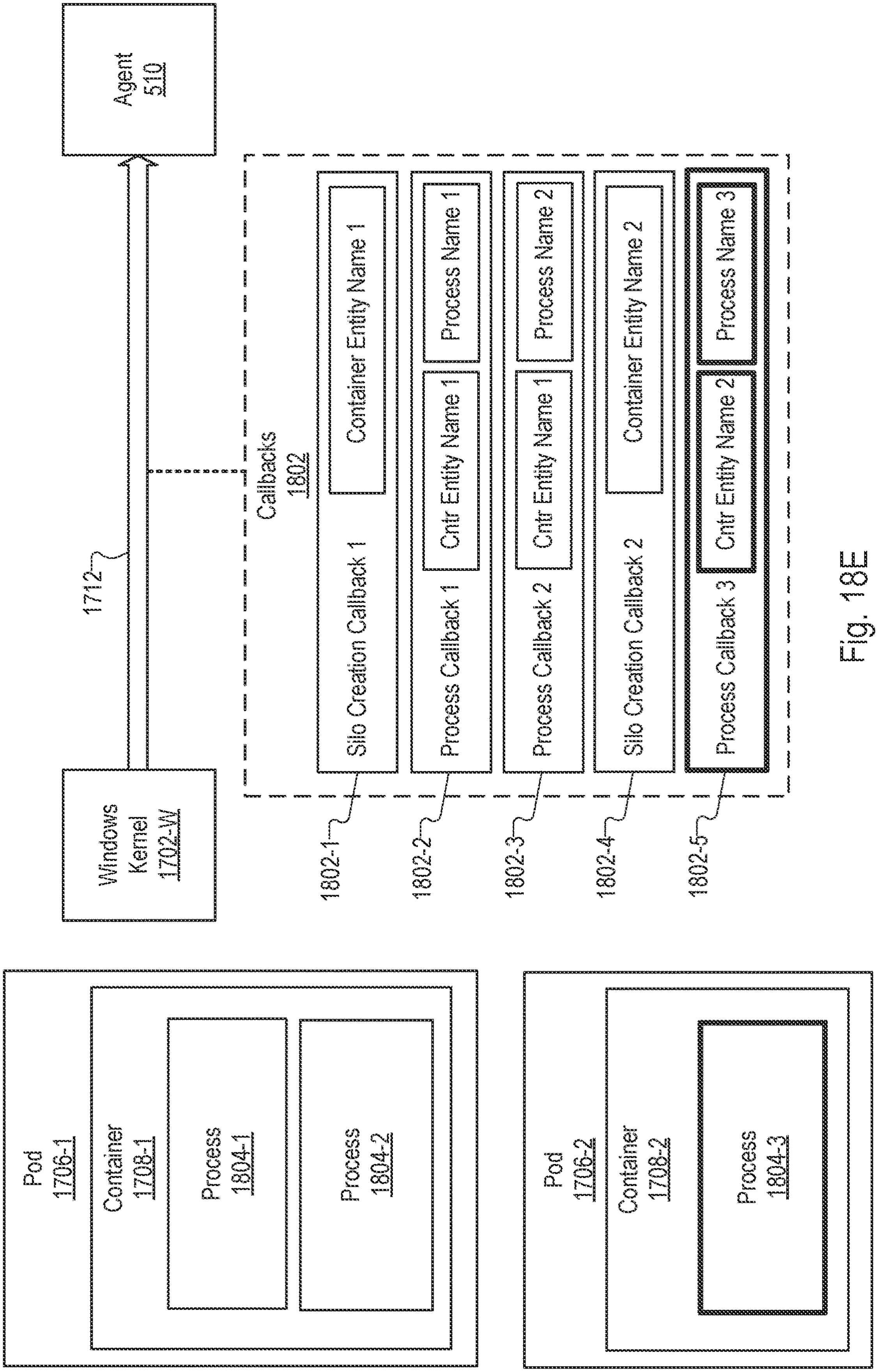

FIGS. 18C-18E show further examples of new container entities and processes being detected as they are launched. These examples illustrate the same principles described above in relation to FIGS. 18A-18B. Specifically, in FIG. 18C, a second process 1804-2 associated with container 1708-1 is shown to be emboldened (i.e., newly launched), and a corresponding new process callback 1802-3 is shown to be communicated in kernel data 1712 to indicate the process's process name ("Process Name 2") and its corresponding container entity ("Cntr Entity Name 1"). In FIG. 18D, a second set of new container entities (i.e., a pod 1706-2 and a corresponding container 1708-2) is shown to be emboldened (i.e., newly launched), and, accordingly, a corresponding new silo creation callback. 1802-4 is shown to be communicated in kernel data 1712 to indicate the container entities' process name ("Container Entity Name 2"). In FIG. 18E, a third process 1804-3 associated with container 1708-2 is shown to be emboldened (i.e., newly launched), and a corresponding new process callback 1802-5 is shown to be communicated in kernel data 1712 to indicate the process's process name ("Process Name 3" and its corresponding container entity ("Cntr Entity Name 2").

As has been described, when an agent 510 collects data from a kernel (e.g., kernel data 1712 including callbacks 1802 and received from a kernel such as Windows kernel 1702-W as illustrated in FIGS. 18A-18E, etc.) and/or from a container runtime (e.g., additional data such as queried and received by way of communications 1714 and 1716 from a container runtime such as container runtime 1704 as illustrated in FIG. 17, etc.) this collected data (also referred to as agent data) may be provided to a data platform (e.g., an implementation of data platform 500). The agent data provided to the data platform may be configured to be used by the data platform for generation of a data model that facilitates the data platform in assessing a security posture of the compute environment (e.g., the cloud compute environment in certain examples).

Figure 19:
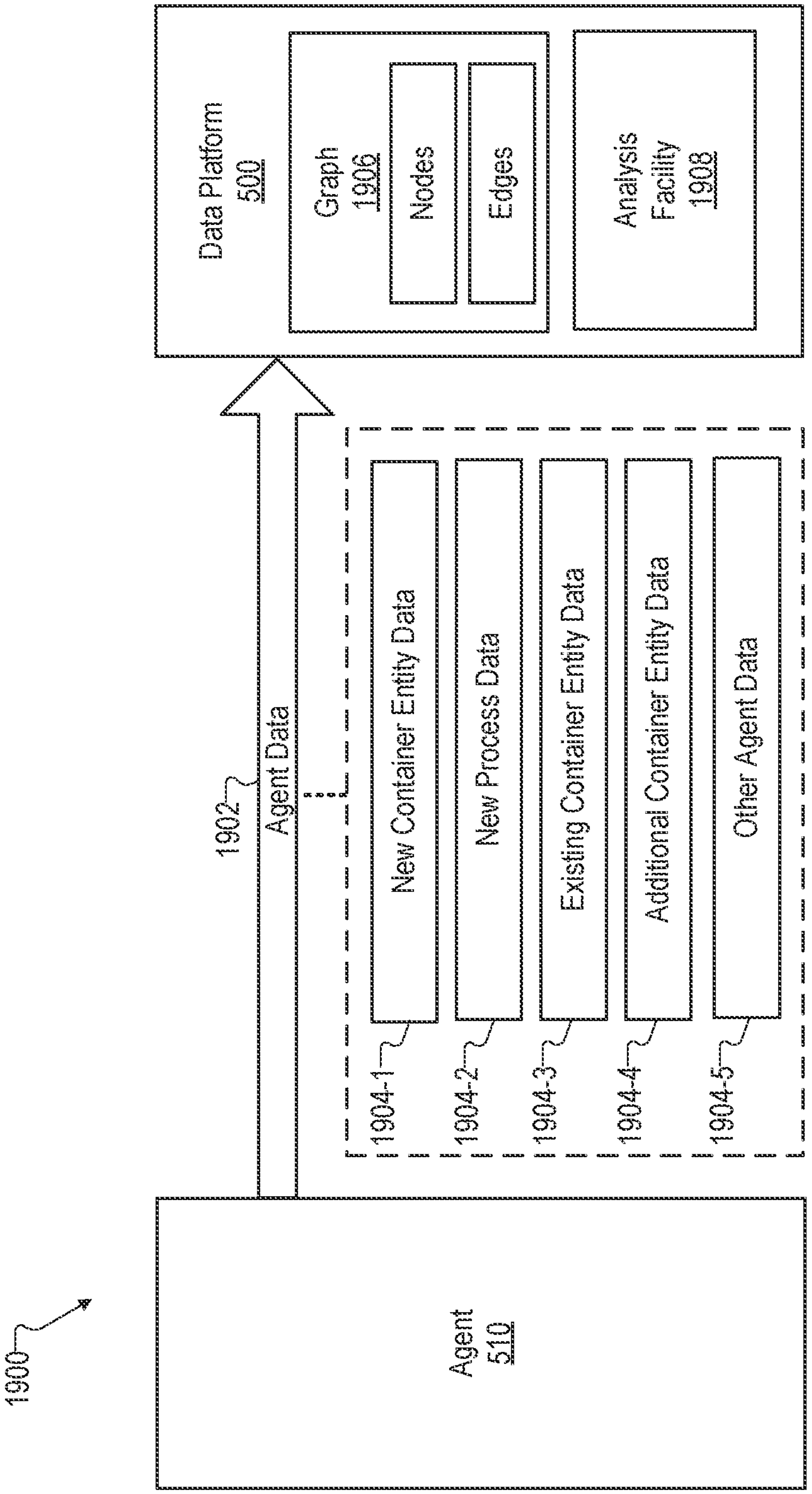
FIG. 19 illustrates various example instances of agent data that may be provided from an agent to a data platform and how the agent data may be used by the data platform to monitor a security posture of a compute environment in which the agent is deployed.

To illustrate, FIG. 19 shows a configuration 1900 in which various example instances of agent data 1902 (i.e., data instances 1904-1 through 1904-5) are provided from an agent 510 to a data platform 500. FIG. 19 also shows certain aspects of how the agent data 1902 may be used by data platform 500 to monitor a security posture of a compute environment in which the agent 510 is deployed. Specifically, the data model that facilitates data platform 500 in assessing a security posture of the compute environment in the example of configuration 1900 is shown to be a graph 1906 that comprises a plurality of graph nodes ("Nodes") connected by a plurality of edges ("Edges") in graph 1906. For example, graph 1906 may be implemented using any of the polygraph or any other graphing technologies described above, where each graph node of the plurality of graph nodes may represent a logical entity and each edge of the plurality of edges may represent a behavioral relationship between graph nodes connected by the edge. After receiving agent data 1902, the plurality of graph nodes may be made to include a container launch event graph node associated with the launch of new container entities to allow the assessing of the security posture to account for the launching of new container entities.

Along with graph 1906, FIG. 19 shows that this implementation of data platform 500 may also include an analysis facility 1908 used to help assess the security posture of the compute environment based on the graph 1906. For example, analysis facility 1908 may assess the security posture by identifying, based on the data model (e.g., based on graph 1906 or other suitable data models generated based on agent data 1902 and/or other data representing events occurring in the compute environment), any anomalies, security threats, or compliance issues that can be found with respect to the set of container entities deployed to the compute environment. The anomalies, security threats, compliance issues, and/or other security issues may be the same types of issues described above in relation to other examples, or may be specific to the launching of new container entities and/or processes as described specifically in relation to agent data 1902. As shown, FIG. 19 is similar to FIG. 10 and it will be understood that various aspects described above in relation to FIG. 10 may also apply in FIG. 19, even if not explicitly set forth in this description (e.g., aspects related to remediation of security issues, etc.).

Various agent data instances 1904 (instances 1904-1 through 1904-5) may be included in agent data 1902, as shown. These instances 1904 of agent data may be collected and reported on in any of the ways described above and may be used by data platform 500 to generate graph 1906 and/or in any of the other ways described herein to help assess and remediate the security posture. Data instance 1904-1 will be understood to represent new container entity data, such as the container entity names of newly launched container entities and/or other data described herein that agent 510 may receive from the kernel. Data instance 1904-2 will be understood to represent new process data such as the process names of newly launched processes, the container entities with which the new processes correspond, and/or other such information as may be derived from kernel data, as described above. Data instance 1904-3 will be understood to represent existing container entity data, such as may be received from a container runtime by agent 510 for container entities that are already executing and are not detected at launch time. For instance, data instance 1904-3 may indicate information about container entities that begin executing prior to agent 510 coming online or whose launch agent 510 otherwise fails to detect for various reasons. Data instance 1904-4 will be understood to represent additional container entity data beyond what is derivable from kernel data such as silo creation callbacks or other kernel data described herein. For example, data instance 1904-4 may include data received by agent 510 from a container runtime when queried about a particular container entity using a container entity name for the container entity that was derived from kernel data, such as described above. Data instance 1904-5 will be understood to represent all other agent data that has been described herein that may be provided by agent 510 to data platform 500 in a particular implementation and that is not otherwise covered by one of data instances 1904-1 through 1904-4.

What is claimed is:

1. A method comprising:

accessing, by an agent deployed in a cloud compute environment monitored by a data platform, kernel data generated by a kernel of an operating system used within the cloud compute environment;

detecting, by the agent and based on the kernel data, a launch of a new container entity of a set of container entities deployed to the cloud compute environment and managed by a container runtime executing on the operating system; and based on the detecting, providing, by the agent to the data platform, agent data that indicates the launch of the new container entity, wherein:

the kernel data includes a creation callback generated by the kernel of the operating system; and the detecting of the launch of the new container entity includes:

identifying, within the creation callback, a container entity name, and determining that the container entity name has not yet been observed in previous callbacks produced by the kernel of the operating system.

2. The method of claim 1, wherein the new container entity is implemented as a containerized application or as a pod that includes one or more containerized applications.

3. The method of claim 1, further comprising:

collecting, by the agent and subsequent to the detecting of the launch of the new container entity, additional data associated with the new container entity, the additional data collected from the container runtime based on a container entity name indicated by the kernel data; and as part of the providing of the agent data to the data platform, providing the additional data collected from the container runtime.

4. The method of claim 1, further comprising:

detecting, by the agent and based on additional kernel data generated by the kernel subsequent to the detecting of the launch of the new container entity, a launch of a new process on the operating system;

correlating, by the agent and based on a container entity name indicated by the kernel data and a process name indicated by the additional kernel data, the new process to the new container entity; and as part of the providing of the agent data to the data platform, providing process data indicating that the new process has launched and is correlated with the new container entity.

5. The method of claim 1, further comprising:

collecting, by the agent from the container runtime, container data indicative of one or more container entities of the set of container entities that are deployed to the cloud compute environment and managed by the container runtime prior to the launch of the new container entity; and as part of the providing of the agent data to the data platform, providing the container data collected from the container runtime.

6. The method of claim 1, further comprising:

identifying, by the agent, a set of processes executing on the operating system and associated with the set of container entities;

monitoring, by the agent, network activity produced or received by the set of processes that has been identified; and as part of the providing of the agent data to the data platform, providing process data generated based on the monitoring of the network activity.

7. The method of claim 1, wherein the agent data provided to the data platform is configured to be used by the data platform for generation of a data model that facilitates the data platform in assessing a security posture of the cloud compute environment.

8. The method of claim 7, wherein:

the data model is a graph comprising a plurality of graph nodes connected by a plurality of edges;

each graph node of the plurality of graph nodes represents a logical entity and each edge of the plurality of edges represents a behavioral relationship between graph nodes connected by the edge; and the plurality of graph nodes includes a container launch event graph node associated with the launch of the new container entity to allow the assessing of the security posture to account for the launch of the new container entity.

9. The method of claim 7, wherein the assessing of the security posture of the cloud compute environment includes identifying, based on the data model, at least one of an anomaly, a security threat, or a compliance issue with respect to the set of container entities deployed to the cloud compute environment.

10. A computer program product embodied in a non-transitory computer-readable storage medium and comprising computer instructions for performing a process comprising:

accessing kernel data generated by a kernel of an operating system used within a compute environment to which the computer program product is deployed;

detecting, based on the kernel data, a launch of a new container entity of a set of container entities deployed to the compute environment and managed by a container runtime executing on the operating system;

based on the detecting, providing, to a data platform that monitors the compute environment to which the computer program product is deployed, agent data that indicates the launch of the new container entity;

detecting, based on additional kernel data generated by the kernel subsequent to the detecting of the launch of the new container entity, a launch of a new process on the operating system;

correlating, based on a container entity name indicated by the kernel data and a process name indicated by the additional kernel data, the new process to the new container entity; and as part of the providing of the agent data to the data platform, providing process data indicating that the new process has launched and is correlated with the new container entity.

11. The computer program product of claim 10, wherein:

the kernel data includes a creation callback generated by the kernel of the operating system; and the detecting of the launch of the new container entity includes:

identifying, within the creation callback, a container entity name, and determining that the container entity name has not yet been observed in previous callbacks produced by the kernel of the operating system.

12. The computer program product of claim 10, wherein the process further comprises:

collecting, subsequent to the detecting of the launch of the new container entity, the additional kernel data associated with the new container entity, the additional kernel data collected from the container runtime based on a container entity name indicated by the kernel data; and as part of the providing of the agent data to the data platform, providing the additional kernel data collected from the container runtime.

13. The computer program product of claim 10, wherein the process further comprises:

collecting, from the container runtime, container data indicative of one or more container entities of the set of container entities that are deployed to the compute environment and managed by the container runtime prior to the launch of the new container entity; and as part of the providing of the agent data to the data platform, providing the container data collected from the container runtime.

14. The computer program product of claim 10, wherein the agent data provided to the data platform is configured to be used by the data platform for generation of a data model that facilitates the data platform in assessing a security posture of the compute environment.

15. The computer program product of claim 14, wherein:

the data model is a graph comprising a plurality of graph nodes connected by a plurality of edges;

each graph node of the plurality of graph nodes represents a logical entity and each edge of the plurality of edges represents a behavioral relationship between graph nodes connected by the edge; and the plurality of graph nodes includes a container launch event graph node associated with the launch of the new container entity to allow the assessing of the security posture to account for the launch of the new container entity.

16. A computing system within a compute environment to which an agent is deployed, the computing system comprising:

a memory storing instructions implementing the agent; and one or more processors communicatively coupled to the memory and configured to execute the instructions to perform a process comprising:

accessing kernel data generated by a kernel of an operating system used within the compute environment;

detecting, based on the kernel data, a launch of a new container entity of a set of container entities deployed to the compute environment and managed by a container runtime executing on the operating system; and based on the detecting, providing, to a data platform that monitors the compute environment, agent data that indicates the launch of the new container entity, wherein:

the kernel data includes a silo creation callback generated by the kernel of the operating system; and the detecting of the launch of the new container entity includes:

identifying, within the silo creation callback, a container entity name, and determining that the container entity name has not yet been observed in previous callbacks produced by the kernel of the operating system.

17. The computing system of claim 16, wherein the process further comprises:

detecting, by the agent and based on additional kernel data generated by the kernel subsequent to the detecting of the launch of the new container entity, a launch of a new process on the operating system;

correlating, by the agent and based on a container entity name indicated by the kernel data and a process name indicated by the additional kernel data, the new process to the new container entity; and as part of the providing of the agent data to the data platform, providing process data indicating that the new process has launched and is correlated with the new container entity.

18. The computing system of claim 16, wherein the agent data provided to the data platform is configured to be used by the data platform for generation of a data model that facilitates the data platform in assessing a security posture of the compute environment.

19. The computing system of claim 18, wherein:

the data model is a graph comprising a plurality of graph nodes connected by a plurality of edges;

each graph node of the plurality of graph nodes represents a logical entity and each edge of the plurality of edges represents a behavioral relationship between graph nodes connected by the edge; and the plurality of graph nodes includes a container launch event graph node associated with the launch of the new container entity to allow the assessing of the security posture to account for the launch of the new container entity.

* * * * *